US011314399B2

(12) United States Patent
Davis et al.

(10) Patent No.: US 11,314,399 B2
(45) Date of Patent: Apr. 26, 2022

(54) ADAPTIVE GRAPHIC USER INTERFACING SYSTEM

(71) Applicant: EyeCam Inc., San Francisco, CA (US)

(72) Inventors: Bryan Jonathan Davis, San Francisco, CA (US); Ronald Eugene Fisher, San Francisco, CA (US); James Fisher, Walnut Creek, CA (US); Jonathan Salzedo, Sunnyvale, CA (US); Charles Campbell, Berkley, CA (US); Mark Brinkerhoff, San Jose, CA (US); Stuart Gregory Tyrrell, Los Altos, CA (US); Walter Norman Maclay, Sunnyvale, CA (US)

(73) Assignee: EYECAM, INC., San Francisco, CA (US)

( * ) Notice: Subject to any disclaimer, the term of this patent is extended or adjusted under 35 U.S.C. 154(b) by 0 days.

(21) Appl. No.: 16/167,082

(22) Filed: Oct. 22, 2018

(65) Prior Publication Data

US 2019/0121522 A1 Apr. 25, 2019

Related U.S. Application Data

(60) Provisional application No. 62/575,424, filed on Oct. 21, 2017.

(51) Int. Cl.
*G06F 3/048* (2013.01)
*G06F 3/04845* (2022.01)
(Continued)

(52) U.S. Cl.
CPC ..... *G06F 3/04845* (2013.01); *G02B 27/0093* (2013.01); *G02B 27/017* (2013.01);
(Continued)

(58) Field of Classification Search
CPC ............. G06F 3/04845; G06F 3/04817; G06F 3/04815; G06F 3/04883; G06F 3/017;
(Continued)

(56) References Cited

U.S. PATENT DOCUMENTS

| 580,726 A | 4/1897 | Scheid |
| 591,372 A | 10/1897 | Rasmussen |

(Continued)

FOREIGN PATENT DOCUMENTS

| AU | 2011213036 B2 | 11/2013 |
| CN | 1711516 A | 12/2005 |

(Continued)

OTHER PUBLICATIONS

International Search Report dated Mar. 27, 2014 issued on International Patent Application PCT/US2013068167, filed Nov. 1, 2013, 2 pages.

(Continued)

*Primary Examiner* — Jeanette J Parker
(74) *Attorney, Agent, or Firm* — Franklin & Associates International Inc; Matthew F. Lambrinos

(57) ABSTRACT

A system and method for an adaptive graphic user interface (AGUI) (501) that can identify the characteristics of one or more users and display candidates and dynamically select display content and generate an interface (502-506 . . . ) customized to one or more users and display candidates and dynamically arrange, modify, map and adapt an AGUI display to any object (350,730), device, clothing, equipment, furniture, appliance, room, building, vehicle, person, or other passive or active display surface, screen, space or other display candidate and embodiments of an AGUI apparatus (500) that can network, coordinate and/or operate with the AGUI platform (1302) to identify one or more users and display candidates and enabling one or more users to inter- (Continued)

face with a single AGUI display across multiple display candidates.

27 Claims, 66 Drawing Sheets

(51) Int. Cl.
| | |
|---|---|
| *G06F 3/04817* | (2022.01) |
| *G06F 3/04815* | (2022.01) |
| *G06F 3/04883* | (2022.01) |
| *G02B 27/01* | (2006.01) |
| *G06K 9/00* | (2022.01) |
| *G02B 27/00* | (2006.01) |

(52) U.S. Cl.
CPC ..... *G02B 27/0172* (2013.01); *G06F 3/04815* (2013.01); *G06F 3/04817* (2013.01); *G06F 3/04883* (2013.01); *G06K 9/00355* (2013.01); *G02B 2027/0187* (2013.01)

(58) Field of Classification Search
CPC ... G06F 3/048; G02B 27/0093; G02B 27/017; G02B 27/0172; G02B 2027/0187; G06K 9/00355
See application file for complete search history.

(56) References Cited

U.S. PATENT DOCUMENTS

| | | | |
|---|---|---|---|
| 3,541,541 A | 11/1970 | Engelbart | |
| 5,807,267 A | 9/1998 | Bryars et al. | |
| 5,913,727 A | 6/1999 | Ahdoot | |
| 6,005,548 A | 12/1999 | Latypov et al. | |
| 6,647,632 B2 | 11/2003 | Tominaga et al. | |
| 6,747,632 B2 | 6/2004 | Howard | |
| 6,898,517 B1 | 5/2005 | Froeberg | |
| 7,298,360 B2 | 11/2007 | Howard | |
| 8,018,579 B1 | 9/2011 | Krah | |
| 8,228,315 B1 | 7/2012 | Starner et al. | |
| 8,292,833 B2 | 10/2012 | Son | |
| 8,320,621 B2 | 11/2012 | McEldowney | |
| 8,390,821 B2 | 3/2013 | Shpunt et al. | |
| 8,670,029 B2 | 3/2014 | McEldowney | |
| 8,717,291 B2 | 5/2014 | Sun et al. | |
| 8,749,557 B2 | 6/2014 | Evertt et al. | |
| 8,787,663 B2 | 7/2014 | Litvak et al. | |
| 9,019,267 B2 | 4/2015 | Gurman | |
| 9,047,698 B2 | 6/2015 | Maciocci et al. | |
| 9,582,889 B2 | 2/2017 | Shpunt et al. | |
| 9,690,376 B2 | 6/2017 | Davis et al. | |
| 10,061,387 B2 | 8/2018 | Toney et al. | |
| 2002/0024500 A1 | 2/2002 | Howard | |
| 2004/0036717 A1 | 2/2004 | Kjeldsen et al. | |
| 2004/0239640 A1 | 12/2004 | Lahade | |
| 2005/0041016 A1 | 2/2005 | Howard | |
| 2006/0238502 A1 | 10/2006 | Kanamori | |
| 2007/0052672 A1 | 3/2007 | Ritter et al. | |
| 2009/0046140 A1 | 2/2009 | Lashmet et al. | |
| 2009/0096783 A1 | 4/2009 | Shpunt | |
| 2009/0124379 A1* | 5/2009 | Wells | G07F 17/3211 463/31 |
| 2010/0289655 A1 | 11/2010 | Elrod et al. | |
| 2011/0022033 A1 | 1/2011 | Guzman | |
| 2011/0025827 A1 | 2/2011 | Shpunt et al. | |
| 2011/0066324 A1 | 3/2011 | Odland | |
| 2011/0080339 A1 | 4/2011 | Sun et al. | |
| 2011/0190612 A1 | 8/2011 | McKenna et al. | |
| 2011/0211754 A1 | 9/2011 | Litvak et al. | |
| 2012/0050689 A1* | 3/2012 | Cudak | G03B 17/54 353/30 |
| 2012/0212399 A1 | 8/2012 | Border et al. | |
| 2012/0214544 A1 | 8/2012 | Shivappa | |
| 2012/0249409 A1 | 10/2012 | Toney et al. | |
| 2012/0249741 A1 | 10/2012 | Maciocci et al. | |
| 2014/0028980 A1 | 1/2014 | Othmer | |
| 2014/0055352 A1 | 2/2014 | Davis et al. | |
| 2014/0125583 A1 | 5/2014 | Aoki et al. | |
| 2014/0358281 A1 | 12/2014 | Lipton et al. | |
| 2015/0222842 A1 | 8/2015 | Kwong | |
| 2015/0227164 A1 | 8/2015 | Laycock | |
| 2016/0184639 A1 | 6/2016 | Bentley et al. | |
| 2017/0123487 A1 | 5/2017 | Hazra et al. | |
| 2017/0257610 A1* | 9/2017 | Vales | G06T 19/006 |
| 2018/0129284 A1 | 5/2018 | Davis | |
| 2018/0288380 A1* | 10/2018 | Raffa | G10L 25/78 |
| 2019/0099681 A1* | 4/2019 | Rico | A63F 13/213 |

FOREIGN PATENT DOCUMENTS

| | | |
|---|---|---|
| CN | 101702103 A | 5/2010 |
| CN | 101882012 A | 11/2010 |
| CN | 102124423 A | 7/2011 |
| CN | 102129152 A | 7/2011 |
| CN | 102231037 A | 11/2011 |
| CN | 101496033 B | 3/2012 |
| CN | 102387344 A | 3/2012 |
| CN | 105027030 B | 10/2018 |
| CN | 109799900 A | 5/2019 |
| EP | 2403234 A1 | 1/2012 |
| EP | 3654146 A1 | 5/2020 |
| EP | 2915025 B8 | 6/2021 |
| JP | 4007899 B2 | 11/2007 |
| JP | 2011146835 A | 7/2011 |
| JP | 4988016 B2 | 8/2012 |
| JP | 5672862 B2 | 2/2015 |
| JP | 6155448 B2 | 2/2015 |
| KR | 20090061179 A | 6/2009 |
| KR | 20100047793 A | 5/2010 |
| KR | 101284797 B1 | 7/2013 |
| KR | 101302138 B1 | 8/2013 |
| KR | 101691633 B1 | 1/2017 |
| KR | 102065687 B1 | 2/2020 |
| RU | 2339087 C2 | 11/2008 |
| TW | 528881 B | 4/2003 |
| WO | 1998007129 A1 | 2/1998 |
| WO | 2009093461 A1 | 7/2009 |
| WO | 2011013079 A1 | 2/2011 |
| WO | 2011097291 A1 | 8/2011 |
| WO | 2014071254 A1 | 5/2014 |
| WO | 2019079790 | 4/2019 |

OTHER PUBLICATIONS

Written Opinion dated Mar. 26, 2014 issued on International Patent Application PCT/US2013068167, filed Nov. 1, 2013, 4 pages.
Final Office Action dated Feb. 25, 2019, on U.S. Appl. No. 15/633,286, filed Jun. 26, 2017, 21 pages.
Final Office Action dated Mar. 31, 2021, on US Non-Provisional U.S. Appl. No. 15/633,286, filed Jun. 26, 2017, 27 pages.
Non-Final Office Action dated May 17, 2018, on U.S. Appl. No. 15/633,286, filed Jun. 26, 2017, 8 pages.
Non- Final Office Action dated Sep. 19, 2019, on U.S. Appl. No. 15/633,286, filed Jun. 26, 2017, 22 pages.
Non- Final Office Action dated Jul. 13, 2020, on U.S. Appl. No. 15/633,286, filed Jun. 26, 2017, 26 pages.
European Search Reportdated Oct. 5, 2016 on EP13850844, filed Jan. 11, 2013, in the name of EyeCam, LLC.
Amendments submitted Apr. 27, 2017 to EPO before European Examination of EP13850844, filed Jan. 11, 2013, in the name of EyeCam, LLC.
Annex to EPO Summons dated May 18, 2020 to attend oral proceedings on EP13850844, filed Jan. 11, 2013, in the name of EyeCam, LLC.
Written submissions dated Aug. 13, 2020 in reply to Annex to EPO Summons dated May 18, 2020 to attend oral proceedings on EP13850844, filed Jan. 11, 2013, in the name of EyeCam, LLC.
Written submissions dated Sep. 15, 2020 on EP13850844, filed Jan. 11, 2013, in the name of EyeCam, LLC.

(56) References Cited

OTHER PUBLICATIONS

EPO Text Intended For Grant dated Oct. 23, 2020 issued on on EP13850844, filed Jan. 11, 2013, in the name of EyeCam, LLC.
International Written Opinion dated Apr. 25, 2019 issued on International Patent Application No. PCT/US2018/056858, filed Oct. 22, 2018 in the name of EyeCam, Inc.
International Search Report dated Feb. 27, 2019 issued on International Patent Application No. PCT/US2018/056858, filed Oct. 22, 2018 in the name of EyeCam, Inc.
Annex to EPO examination report dated Jul. 3, 2018 issued on n EP13850844, filed Jan. 11, 2013, in the name of EyeCam, LLC.
Chris Harrison Hrvoje Benko Andrew D. Wilson, Omnitouch: Wearable Multitouch Nteraction Everywhere, UST11, Oct. 16-19, 2011, Santa Barbara, CA USA.
Annex to EPO communication dated Aug. 17, 2020 from the Examining Division issued on EP Application 13850844.5.
EPO Communication under R71(3) EPC Intention to Grant dated Oct. 23, 2020 issued on EP Application 13850844.5.

\* cited by examiner

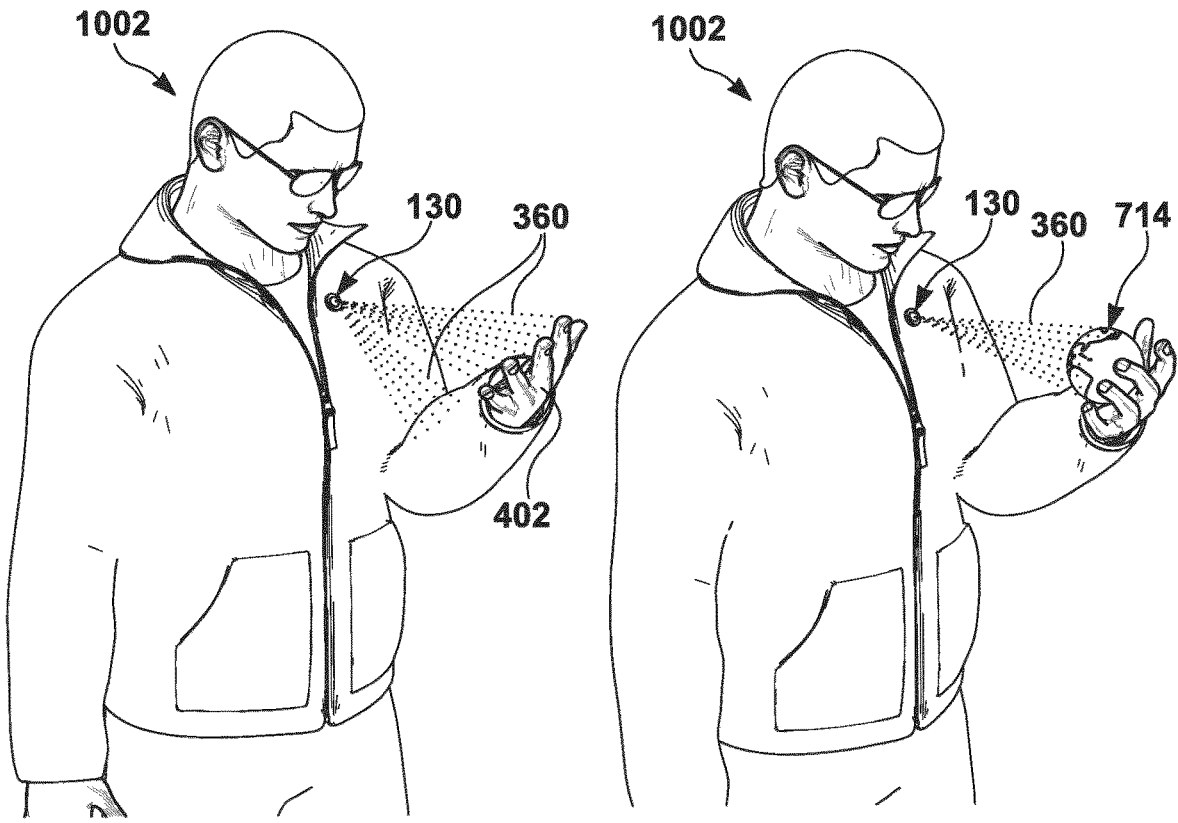
FIG. 18A
FIG. 18B
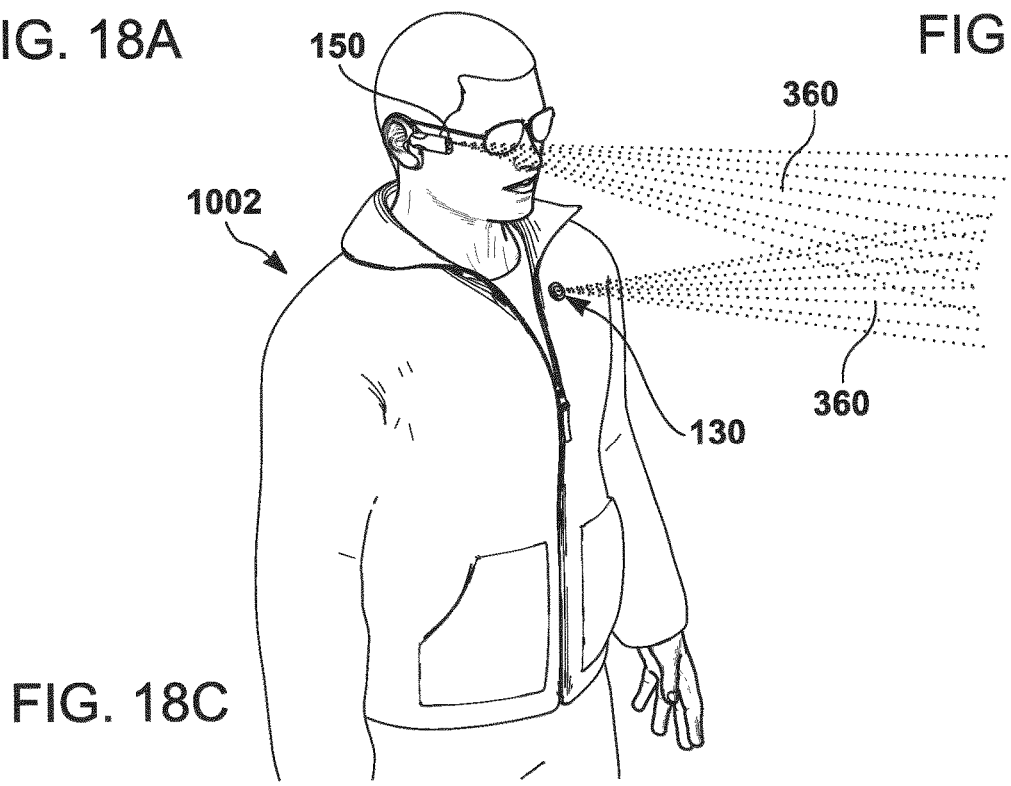
FIG. 18C

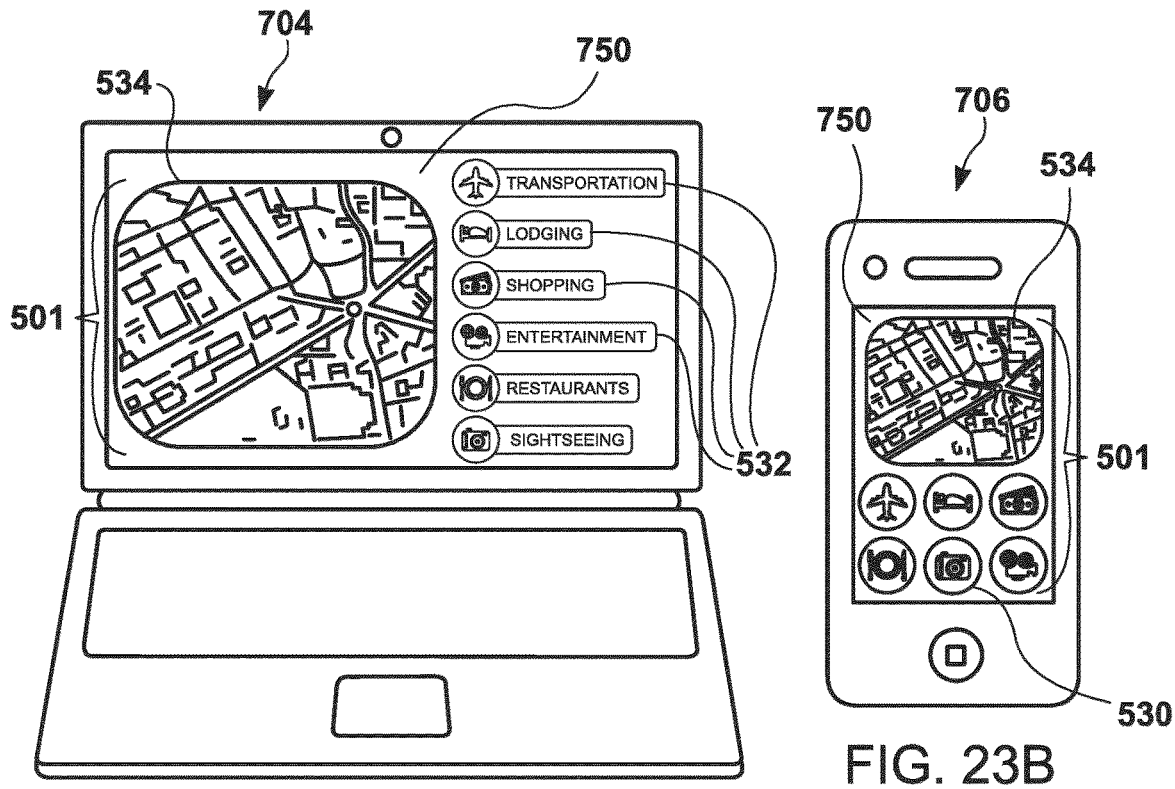
FIG. 23A
FIG. 23B
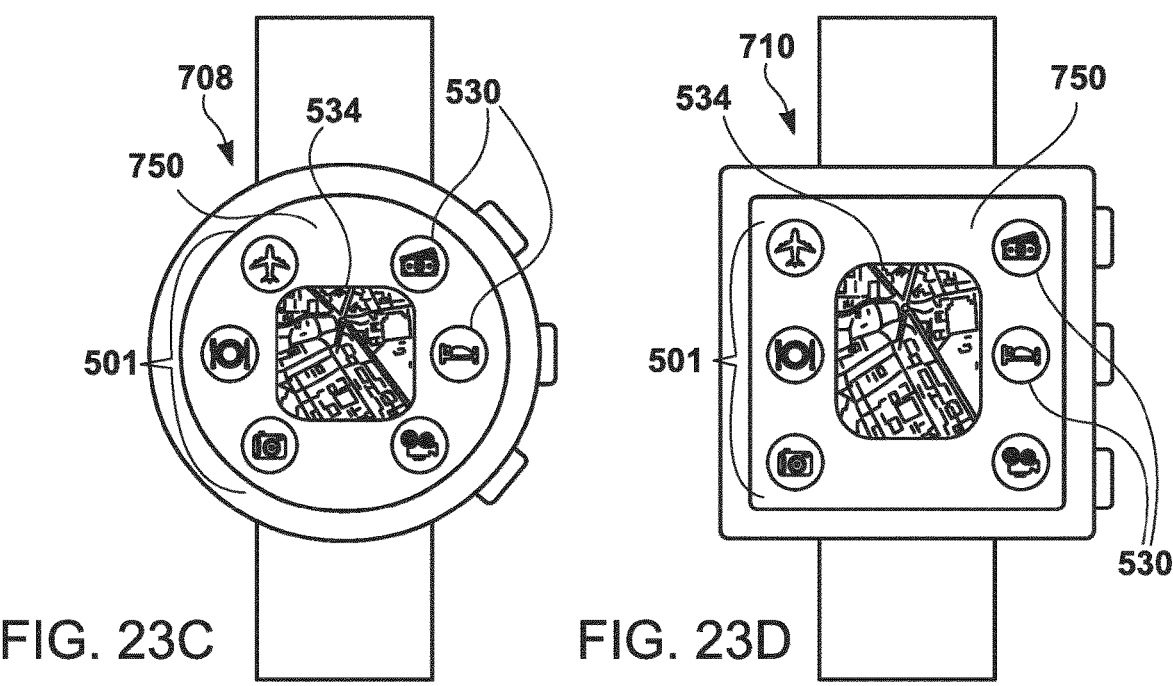
FIG. 23C
FIG. 23D

ADAPTIVE GRAPHIC USER INTERFACING SYSTEM

CROSS-REFERENCE TO RELATED APPLICATION

The present application claims priority under 35 U.S.C. 119(e) based upon U.S. Provisional Application No. 62/575,424 filed on Oct. 21, 2017. The entire disclosure of the prior application is incorporated herein by reference.

FIELD OF THE INVENTION

This invention relates to the field of computer display and user interface technology. More particularly, the invention relates to devices and methods for adaptively displaying information on a varying number of display surfaces while allowing a user to interact with them.

BACKGROUND

Existing electronic display devices include computer displays, phones, tablets, televisions, projectors and other similar devices. Many computer systems may also use multiple displays that are directly connected through a display cable or a wired or a wireless network. The electronic device may mirror the information it is displaying on each attached display so that the same information is displayed on each display, may span its display across the multiple displays so that the group of displays operate as one large display, or may display different information on each of the attached displays. Displays are typically rectangular in shape and are flat. Recently some large displays have been manufactured with a gentle curve to adapt to a viewer's point of view but are still generally flat. Curved displays have also been provided for cell phones, watches and televisions. Projectors display their output on generally flat surfaces using the resolution of the projector. Keystone correction is frequently done to ensure that the image displayed appears square even though the projection may not be located directly in front of the display surface. Though these displays are all fixed in size and/or shape there are other display technologies such as printed, painted, projected and flexible displays that are less fixed in size, shape and other variables.

User interface control devices include keyboard, touchscreen and pointer technology such a computer mouse that are basically x-y positional input devices. Some systems track the position of a device, pointer, or body part in 3-D space. Other wearable optical hand, finger and object spatial positioning systems incorporate gesture and voice recognition as well as touchscreen interfacing controls.

Display and user interface technology may be merged with a projector being used to project a virtual graphic user interface on a surface such as a desk, wall, or a body part such as a hand. By touching the projected graphic user interface or by making gestures, the system detects the motion or placement of a pointer, which allows a user to interface with the system.

A drawback of the existing technology is that the present day solutions are inflexible and limited in their use. Display setups incorporating user interfaces are difficult to set up, configure, and interact with. There is a need for an improved graphical user interface BRIEF SUMMARY According to some aspects and embodiments of the present technology, there is provided one or more system and/or one or more method for an adaptive graphic user interface (AGUI) that can identify the characteristics of one or more users and display candidates and dynamically select display content and generate an interface customized to one or more users and display candidates and dynamically arrange, modify, map and adapt an AGUI display to any object, device, clothing, equipment, furniture, appliance, room, building, vehicle, person, or other passive or active display surface, screen, space or other display candidate and embodiments of an AGUI apparatus that can network, coordinate and/or operate with the AGUI platform to identify one or more users and display candidates and enabling one or more users to interface with a single AGUI display across multiple display candidates, enabling custom AGUI displays for each display candidate, enabling one or more users to access their own custom AGUI display on one or more display candidates and enabling two or more AGUI apparatus to operate in concert to display a single or multiple AGUI displays on one or more display candidates.

According to some embodiments, a system is provided for an adaptive graphic user interface (AGUI). The system can be configured to identify the characteristics of one or more users and display candidates. Additionally or alternatively, the system can be configured to dynamically select display content and/or generate an interface. The system may be configured customize the interface to one or more users and display candidates. The system may be further configured to dynamically arrange, modify, map and/or adapt an AGUI display to any object. In some embodiments, the system is configured to dynamically arrange, modify, map and/or adapt the AGUI display to any one or any combination of the following: a device, clothing, equipment, furniture, appliance, room, building, vehicle, person, other passive and/or active display surface, screen, space, other display candidate, and embodiments of an AGUI apparatus disclosed herein. Such embodiments of the AGUI apparatus can be further configured to network, coordinate and/or operate with the AGUI platform to identify one or more users and display candidates. The aforesaid system(s) that are configured to dynamically arrange, modify, map and/or adapt the AGUI display and network, coordinate and/or operate with the AGUI platform enable one or more users to interface with a single AGUI display across multiple display candidates, enabling custom AGUI displays for each display candidate, enabling one or more users to access their own custom AGUI display on one or more display candidates and enabling two or more AGUI apparatus to operate in concert to display a single or multiple AGUI displays on one or more display candidates.

In some embodiments, the adaptive graphic user interface (AGUI) system may include an AGUI apparatus that may incorporate a computing device, group of devices and/or platform that comprises an embedded or networked sensor for mapping an environment in proximity to the sensor to identify a user and a display candidate. A display output is configured for displaying content on a passive or active display candidate. A memory contains an application coupled to a processor. The processor is configured to execute the application to generate display content. The application evaluates the display candidate and the user position and selects the display candidate as a display surface or space. The application identifies the user and the display candidate and selects display content and generates an interface customized for the user and the display candidate. The application utilizes characteristics of the display candidate and the user position to dynamically arrange, modify, map and adapt the display content and select the optimum interface layout to produce enhanced display content adapted to the display candidate and to the user. The display output displays an image of the enhanced display content on the display candidate. The display output operates in coordination with the sensor to enable the user to interface with the display candidate and control the display content in real-time. The application is continuously updating the user position and the display candidate to detect perturbations in the environment. In response to the perturbations, the application modifies the enhanced display content to improve the image or detects a control action.

According to one aspect of the present technology, there is provided an adaptive graphic user interfacing system. This system can comprise a sensor component configured or configurable to dynamically map an environment in proximity to the sensor component to detect a user and a display candidate. A display output component configured or configurable to identify a user and a display candidate and provide a display content on or to the display candidate. At least one processing unit and/or platform operably networked with and/or connected or connectable to the sensor component, the display component and at least one memory unit or networked remote data storage platform, the processing unit being configured or configurable to determine a user's relational position to the display candidate in real time, identify the display candidate and the user in real time, and continuously adapt the display content based on the user's relational position to the display candidate in real-time as the user moves in relation to the display candidate and/or the display candidate moves in relation to the user.

In some embodiments the display candidate is a passive surface and the display output is a projector. In other embodiments, the display candidate is an active display surface such as an electroluminescent, backlit, organic, embedded or other self-illuminated display such as an LED, OLED, LCD or other active display system, screen, panel or material in which the output is incorporated in the display surface.

In some embodiments the display candidate or candidates can be selected from a group consisting of passive display systems and surfaces and active display systems and surfaces.

In some embodiments, the display content can be selected from a group consisting of a graphical user interface, interactive media content such as icons, images, video, text, interactive 3D objects, environments, buttons, and control affordances.

In some embodiments, the system can further comprise a microphone and/or speaker component in operable communication with the processing unit and/or platform, and being configured or configurable to receive and/or provide an audio signal.

In some embodiments one or more microphones and/or speakers in operable communication with the processing unit and/or platform may be configured to provide an audio signal based on the spatial position of one or more users in relation to one or more microphones and/or speakers and may dynamically receive and/or provide customized audio content for each user and/or group of users.

A system and method for an adaptive graphic user interface (AGUI) that can dynamically adapt to any device, clothing, equipment, furniture, appliance, building, vehicle, person, or other object, display, screen or surface and embodiments of an AGUI apparatus that can support and coordinate with an AGUI platform enabling one or more users to interface with a single AGUI interface across multiple devices, objects and surfaces, enabling multiple users to access their own AGUI interface on multiple devices, objects and surfaces and enabling multiple AGUI apparatus to operate in concert to display a single or multiple AGUI interfaces on one or more stationary or moving devices, objects, vehicles or other surfaces.

In one approach of the present technology, an apparatus is provided which may comprise: a memory storing instructions; and one or more processors, wherein said instructions, when processed by the one or more processors, can cause: mapping, using a sensor, an environment in proximity to the apparatus to identify a user position and a display candidate; evaluating the display candidate and the user position; selecting the display candidate as a display surface; and utilizing characteristics of the display surface and the user position to generate or modify display content to produce enhanced display content. The apparatus may include a display output and wherein said instructions, processed by the one or more processors, can further cause displaying an image of the enhanced display content on the display surface.

In some embodiments of the approach, a method of adapting a graphical user interface is provided which may comprise mapping an environment in proximity to the apparatus; identifying a user position and a display candidate from said mapping using a computer device; evaluating, using said computer device, the display candidate and the user position; selecting the display candidate as a display surface; utilizing characteristics of the display surface and the user position to generate or modify display content, using said computer device, to produce enhanced display content; and displaying an image of the enhanced display content on the display surface.

In some embodiments the approach, a computer-readable medium is provided including contents that are configured to cause a computing system to adapt a graphical user interface by performing a method comprising: mapping an environment in proximity to the apparatus; identifying a user position and a display candidate from said mapping using a computer device; evaluating, using said computer device, the display candidate and the user position; selecting the display candidate as a display surface; utilizing characteristics of the display surface and the user position to generate or modify display content, using said computer device, to produce enhanced display content; and displaying an image of the enhanced display content on the display surface.

In some aspects, a system and method for an adaptive graphic user interface (AGUI) is provided that can dynamically adapt to any device, clothing, equipment, furniture, appliance, building, vehicle, person, or other object, display, screen or surface and embodiments of AGUI devices that can support and coordinate with an AGUI platform enabling one or more users to interface with a single AGUI interface across multiple devices, objects and surfaces or multiple users to each access their own individual AGUI interface on different devices, objects and surfaces.

According to one aspect, there is provided a computing device comprising one or more sensors for mapping and/or imaging an environment in proximity to the device to identify a user position and one or more display candidates. A memory containing an application coupled to a processor executes an application to generate display content. The application evaluates the display candidate and the user position and selects the display candidate as a display surface. The application utilizes characteristics of the display surface and the user position to modify the display content to produce enhanced display content. The display output displays an image or images of the enhanced display content on one or more of the display surfaces.

In some embodiments, the application continuously updates the position of one or more users and one or more display candidates to detect a perturbation in the environment. In response to the perturbation, the application modifies the enhanced display content to improve the image or the application detects a control action. In other embodiments, in response to the perturbation, the application detects a second display candidate and selects the second display candidate as the display surface. In other embodiments, the application detects two or more display candidates and modifies the display content to multiple display surfaces.

In other embodiments, the application detects two or more display candidates and modifies the display content across two or more display surfaces. Modifying the display content may further comprise dividing the display content between two or more display surfaces to produce enhanced display content for two or more display surfaces.

In other embodiments, the sensor identifies two or more display candidates and the application selects independent display content for each display surface. In other embodiments, the sensor may assign one display candidate as the master or control display and/or interfacing surface and one or more other display candidates as a slave or sub-display and/or interfacing surface or surfaces.

In other embodiments, the sensor may assign one or more display surfaces as sub display surfaces and one or more users, objects or devices as the master, input and/or control interface for one or all of the display surfaces.

In further embodiments the sensor may assign a different user, object, apparatus and/or interface to each display surface.

In other embodiments, the sensor identifies a second display candidate and the application selects the second display candidate as a second display surface. Modifying the display content further comprises dividing the display content between the display surface and the second display surface to produce second enhanced display content for the second display surface. The display output displays a second image of the second enhanced display content on the second display surface or the display output displays the same display content across two or more surfaces or the display output displays different display content on each display surface.

In other embodiments, the sensor may assign one display candidate as the master or control display and/or interfacing surface and one or more other display candidates as a slave or sub-display and/or interfacing surface or surfaces.

In other embodiments, the sensor may assign one or more display surfaces as sub display surfaces and one or more users or devices as the master, input and/or control interface for all of the displays or the sensor may assign a different device or interface to each display surface.

In some embodiments, the display surface is a passive surface and the display output is a projector. In other embodiments, the display surface is an active display surface such as an electroluminescent, backlit, organic, embedded or other self-illuminated display such as an LED, LCD, OLED or other active display system, screen, panel, material in which the output is incorporated in the display surface.

In other embodiments, the computing device or plurality of computing sub-devices or display system may be mounted on or embedded in a ceiling, wall, floor, window, desk or other furniture, appliance, object or surface.

In embodiments, the surface mounted computing device or plurality of computing sub-devices or display system may be a multi-directional surface mapping, imaging, networking, display and interfacing system and multimedia hub device further referred to collectively as "multimedia hub device" capable of adapting a graphic user interface to one or more surfaces and enabling one or more users to interface with projected or actively displayed content using touch, motion, gesture, voice command and other interfacing methods. In further embodiments two or more multimedia hub devices may be wired or wirelessly networked and may operate in concert as part of a group of devices in order to project or assign a graphic user interface and/or image, text, video or other multimedia content to one or more surrounding surfaces.

In other embodiments the computing device, sub-devices or display system may be a handheld, portable, desktop or other mobile display and/or interfacing system such as a phone, tablet, PC, laptop, touchpad, game console, mouse, controller or other display and/or interfacing device, system, or surface.

In other embodiments the computing device, sub-devices or display system may be worn on the body such as on one or both wrists, in or on the ear or worn on or in front of one or both eyes such as earphones, headphones, headsets, contact lenses, glasses, visors, helmets, cameras, projectors, screens and other wearable devices and systems worn on the face, head, chest or other body surface or attached to clothing, equipment or any combination of wearable device or sub-devices, In other embodiments the computing device or sub-devices or display system may be implanted into a users' brain, eyes, ears, skin or inside a user's body or embedded into or attached to a prosthetic device implanted, attached, worn or otherwise assigned to a user.

In other embodiments of the invention the AGUI system may comprise organic, flexible, malleable or other non-fixed form factor devices and display systems such as fabric, clothing, shoes, hats, helmets and other equipment, furniture, home, enterprise and vehicle upholstery and other objects, devices, display systems and surfaces which may naturally, mechanically or electronically change in shape, size or form and comprises a plurality of light emitting elements that together comprise the display surface.

In some embodiments, the computing device comprises a plurality of computing sub-devices networked together. In other embodiments, the computing device or plurality of computing sub-devices comprises two or more computing sub-devices mounted on or embedded in a ceiling, wall, floor, window, desk or other furniture, appliance, object or surface.

In other embodiments the computing device or sub-devices may be worn on the body such as on one or both wrists, on the face, head, chest or other body surface or may be attached or embedded into clothing, equipment or any combination of wearable sub-devices.

In other embodiments the computing device or sub-devices may be a handheld, portable, desktop or other mobile display and/or interfacing system such as a phone, tablet, PC, laptop, television, touchpad, game console, mouse, controller or other display and/or interfacing device, system, or surface.

In further embodiments, the computing device comprises a plurality of computing devices networked together and modifying the display content further comprises allocating a first portion of the image to one of the plurality of computing devices and a second portion of the image to another of the plurality of computing devices.

Some embodiments further comprise a network interface. The computer device detects a network device and determines that the network device can create a second display surface. Modifying the display content further comprises dividing the display content between the display surface and the second display surface to produce second enhanced display content for the second display surface. The computing device transmits the second enhanced display content to the network device for display on the second display surface.

In further embodiments, the computing device is a head-up display such as a pair of glasses, headset, visor, helmet or other wearable head-up display system which may incorporate any number of display methods. In some embodiments, the head-up display system incorporates one or more active display surfaces such as an LED, OLED, LCD or other screen or screens placed in front of one or both eyes or one or more pico projectors for displaying an image on one or more lenses or other display surfaces in front of one or both eyes or reflecting an image off of one or more lenses or other display surfaces into one or both eyes or for projecting display content directly into one or both eyes of a user or other head-up display method, screen or surface. The head-up display screen or surface may be transparent or have varying levels of opacity enabling the viewer to see their surrounding environment through the screen, display surface or projected image and/or displayed content into their surrounding environment. The head-up display may also include one or more cameras and sensors to capture a 2 dimensional, 3 dimensional or 4 dimensional plenoptic image and/or video of their surrounding environment for display on one or more head-up display screens or display surfaces in front of the eyes, on the surface of the eye or projected into the eye and may assign an image or other graphic user interface or display content into the captured image and/or video of the users surrounding environment. The head-up display system may have one or more methods for measuring depth of field and mapping objects, devices and surfaces surrounding the viewer such as light mapping and/or optical imaging and other depth mapping, motion, orientation and location sensors enabling the head-up display system to identify its location and spatial position in relation to surrounding objects, devices and surfaces and assign displayed image, text, video or other multimedia content to a depth of field and or assign interactive multimedia content to a surface of the body of the viewer, a handheld object or an object, device or surface surrounding the viewer or in the field of view of the viewer.

In further embodiments, the computing device is incorporated into a garment that comprises a plurality of light emitting elements that together comprise the display surface.

In further embodiments of the organic and/or flexible display system the flexible material, surface and/or light emitting elements may incorporate location, directional and/or orientational sensors that indicate to the processor the spatial position, orientation and directional facing of the plurality of light emitting elements.

In further embodiments the organic and/or flexible display system, the flexible material, surface and/or light emitting elements may incorporate light imaging, optical, haptic or other sensors for mapping, imaging or identifying surrounding objects and surfaces and/or to enable a user to interface with a graphic user interface and/or other multimedia content displayed on the organic and/or flexible display surfaces. In other embodiments the computing device or sub-devices or display system may be mounted on or embedded into one or more vehicles.

In other embodiments, the plurality of light emitting elements comprises, LED, LCD, OLED or other light emitting elements or comprises a directional sensor that indicated to the processor the facing of the plurality of light emitting elements.

In further embodiments, the computing device further comprises sporting equipment that comprise a second sensor in communication with the processor. The processor uses information received from the second sensor to produce the enhanced display content.

In some embodiments, the device is mounted in a fixed location in the environment. In other embodiments, the device is mounted on a movable platform in the environment.

According to another aspect, there is provided an imaging and display device comprising an imaging system capturing a sequence of images in a field of view. A movement sensor outputs a plurality of movement data indicative of the movement of the device within an environment. A location sensor outputs a plurality of location data indicative of a location of the device. A processor module is coupled to the imaging system, the movement sensor, and the location sensor. The processor module receives the sequence of images, the plurality of movement data, and the plurality of location data, and analyzes the sequence of images to determine if a control object in the field of view is in motion. The processor module analyzes the plurality of movement data and determines an orientation of the device. The processor module analyzes the plurality of movement data and the plurality of location data and determines the location of the device and determines if an event has occurred.

In further embodiments, the processor module further determines that the event is a control gesture performed by the control object and the processor then executes a routine indicated by the control gesture. In other embodiments, the processor module further determines that the event is a perturbation of the location of the device or the orientation of the device and optimizing a display output of the device. If the processor module further determines that the event is a change in an environment of the device, the processor module reconfigures the device and/or the displayed content for the environment.

In some embodiments, the reconfiguration of the device comprises choosing a new display surface.

According to the another aspect of the present technology; an imaging and display device is provided that may include: a memory storing instructions; and one or more processors, wherein said instructions, when processed by the one or more processors, can cause:
  receiving, from an imaging and display device, a sequence of images, a plurality of movement data, and a plurality of location data; analyzing the sequence of images to determine if a control object in a field of view is in motion, analyzing the plurality of movement data and determining an orientation of an imaging and display device, analyzing the plurality of movement data and the plurality of location data and determining the location of the device, and determining if an event has occurred.

In some embodiments, a method of imagining is provided which may comprise:
  receiving from an imaging and display device, a captured sequence of images in a field of view;
  receiving from a movement sensor a plurality of movement data indicative of the movement of the device within an environment;
  receiving from a location sensor a plurality of location data indicative of a location of the device;

analyzing the sequence of images to determine if a control object in the field of view is in motion;

analyzing the plurality of movement data and determining an orientation of the device; and analyzing the plurality of movement data and the plurality of location data and determining the location of the device, the processor module determining if an event has occurred. In some embodiments, a computer-readable medium is provided including contents that are configured to cause a computing system to analyze imaging by performing a method comprising:

receiving from an imaging and display device, a captured sequence of images in a field of view;

receiving from a movement sensor a plurality of movement data indicative of the movement of the device within an environment;

receiving from a location sensor a plurality of location data indicative of a location of the device;

analyzing the sequence of images to determine if a control object in the field of view is in motion;

analyzing the plurality of movement data and determining an orientation of the device; and analyzing the plurality of movement data and the plurality of location data and determining the location of the device, the processor module determining if an event has occurred.

According to another aspect, there is provided a computing device displaying an image. The device comprises one or more sensors for mapping a plurality of positions corresponding to a plurality of viewers. Each of the plurality of positions comprises a viewer location and a viewer orientation. A memory containing an application coupled to a processor, the processor executes the application to generate display content on a plurality of surfaces. The application evaluates the plurality of positions and customizes the display content based on the plurality of surfaces. The application displays the display content on the plurality of surfaces.

In some embodiments, a computer display device is provided that may include: a memory storing instructions; and one or more processors, wherein said instructions, when processed by the one or more processors, can cause:

mapping, using a sensor, a plurality of positions corresponding to a plurality of viewers, each of the plurality of positions comprising a viewer location and a viewer orientation;

evaluating the plurality of positions and customizing the display content based on the plurality of surfaces, and displaying the display content on the plurality of surfaces.

In some embodiments method of adapting a graphical user interface comprises:

mapping, using a sensor a plurality of positions corresponding to a plurality of viewers, each of the plurality of positions comprising a viewer location and a viewer orientation;

evaluating the plurality of positions and customizing the display content based on the plurality of surfaces, and displaying the display content on the plurality of surfaces.

In some embodiments, a computer-readable medium is provided including contents that are configured to cause a computing system to adjust a graphical user interface by performing a method comprising:

mapping, using a sensor a plurality of positions corresponding to a plurality of viewers, each of the plurality of positions comprising a viewer location and a viewer orientation;

evaluating the plurality of positions and customizing the display content based on the plurality of surfaces, and displaying the display content on the plurality of surfaces.

In further embodiments, the environment is a vehicle. In other embodiments the environment is the interior or exterior of a building.

In other embodiments, the device optimizes the display for each of one or more viewers based on the role of each of the plurality of viewers in the operation of the vehicle. In other embodiment, the device optimizes the display for each of the plurality of viewers based on the position of each of the one or more viewers inside of the vehicle.

In some embodiments, the position of each of the plurality of viewers comprises a seating arrangement inside of the vehicle.

In other embodiments the device dynamically optimizes the display across one or more moving or stationary vehicles or other display surfaces.

In other embodiments the position of one or more viewers comprises their viewing position outside of one or more vehicles or other display surfaces.

In other embodiments, the processor optimizes the display for each of the plurality of viewers based on a physical characteristic of each of the plurality of viewers. In some embodiment, the physical characteristic comprises height.

In some embodiments, the system includes a plurality of light sensors. The processor is coupled to the plurality of light sensors and receives ambient light information from the plurality of light sensors in proximity to the plurality of users. The processor optimizes the display for each of the plurality of viewers based on the ambient light information.

Further embodiments comprise an external light sensor. The processor is coupled to the external light sensor and receives external light information from the external light sensors. The processor utilizes the external light information when optimizing the display for each of the plurality of viewers.

In some embodiments, each of the plurality of viewers has a personal mobile device providing an identity of the plurality of viewers to the processor. The processor optimizes the display for each of the plurality of viewers based on the identity of each of the plurality of viewers.

According to yet another aspect there is provided a computing device incorporated in a vehicle comprising a sensor for mapping an environment in proximity to the vehicle to identify a location of the vehicle. A memory containing an application coupled to a processor. The processor executes the application to generate display content. A display surface on an exterior surface of the vehicle. The application evaluates the location and modifies the display content to produce enhanced display content based on the location. The enhanced display content is displayed on the display surface.

In some embodiments, a computer device is provided that may comprise: a memory storing instructions; and one or more processors, wherein said instructions, when processed by the one or more processors, can cause: mapping, using a sensor, an environment in proximity to a vehicle to identify a location of the vehicle; evaluating the location of the vehicle, generating or modifying display content to produce enhanced display content based on the location, and displaying enhanced display content on display surface on an exterior surface of the vehicle.

In some embodiments, a method of adjusting a graphical user interface is provided that may comprise mapping an environment in proximity to a vehicle to identify a location of the vehicle; evaluating the location of the vehicle, generating or modifying display content to produce enhanced display content based on the location, and displaying enhanced display content on display surface on an exterior surface of the vehicle.

In some embodiments, a computer-readable medium is provided including contents that are configured to cause a computing system to adapt a graphical user interface by performing a method comprising: mapping an environment in proximity to a vehicle to identify a location of the vehicle; evaluating the location of the vehicle, generating or modifying display content to produce enhanced display content based on the location, and displaying enhanced display content on display surface on an exterior surface of the vehicle.

In some embodiments, the display surface comprises a vehicular body wrap. The vehicular body wrap may comprise LED, OLED, LCD, glass, paint or other active display systems and elements or may comprise a combination of passive surfaces with projected content and active surface displays. Displayed content may be coordinated across all active and passive vehicle display surfaces by generating a depth and surface map of all passive and active vehicle display surfaces and then mapping, zoning and adapting content to individual panels and/or display surfaces and/or across multiple display surfaces or sections of the vehicle or across the entire vehicle.

In further embodiments one or more vehicle surfaces may be mapped using one or a combination or methods such as light and/or optical depth mapping and/or imaging of the vehicle surfaces and/or sensor mapping of spatial position, orientation, motion and/or acceleration sensors and/or location sensors attached or embedded in each panel or display surface or section of the vehicle in order to generate a continuous map of the vehicle surfaces.

In some embodiments, the system includes a movement sensor to identify a velocity of the vehicle. The enhanced display content is further based on the velocity of the vehicle.

In some embodiments, the system includes a projector. The processor utilizes the location and the velocity to a produce a second enhanced display content and projects it on a fixed surface in proximity to the vehicle. In some embodiments, the fixed surface is a billboard or a bus shelter.

An aspect of the present technology can provide an adaptive graphic user interfacing system including a sensor component that can be configured or configurable to dynamically map an environment in proximity to the sensor component to detect a user and a display candidate. A display output component can be configured or configurable to provide display content on or to the display candidate. At least one processing unit can be operably connected or connectable to the sensor component, the display component and at least one memory, the processing unit being configured or configurable to determine a user's relational position to the display candidate in real time, identify the display candidate and the user, in real time, and continuously adapt the display content based on the user's relational position to the display candidate in real-time as the user moves in relation to the display candidate and/or the display candidate moves in relation to the user.

In some embodiments, the display candidate can be selected from the group consisting of passive display systems, and active display systems.

In some embodiments, the display content can be selected from the group consisting of a graphical user interface, interactive media content, icons, images, video, text, interactive 3D objects, environments, buttons, and control affordances.

In some embodiments, the system further can include a microphone and speaker component in operable communication with the processing unit, and being configured or configurable to receive and/or provide an audio signal.

In some embodiments, the processing unit can be further configured or configurable to optimize the display content or a second display content viewable by a second user based on a second user's relational position to the display candidate or a second display candidate.

Another aspect of the present technology there is provided an imaging and display system comprising a sensor subsystem including at least one sensor configured or configurable to map an environment in proximity to the system to identify a user position and a display candidate. A display subsystem can include one of at least one projector configured or configurable to project at least one display content on the display candidate, and a controller configured to control the display candidate. At least one processing unit can be operably connected or connectable to the sensor subsystem, the display subsystem and at least one memory, the at least one processing unit being configured or configurable to determine one or more characteristics of the display candidate, determine motion of an object in the environment, and configure the display content based on one of the characteristics of the display candidate, and the motion of the object.

In some embodiments, the system can be a wrist mounted device with the projector arranged to illuminate at least one of front and back of a hand wearing the unit, a wrist, forearm or finger of the hand, and the sensor is configured to detect a size or orientation of the hand wearing the unit, a wrist, forearm or finger of the hand or entering a field of view of the sensor.

In some embodiments, the processor can be continuously monitors the user hand to detect if a finger or a second object enters a predetermined area for determining interface inputs.

In some embodiments, the system can be eye glasses with the projector being located to project onto at least one lens of the eye glasses, and the sensor including at least one eye facing camera and at least one outward-facing camera.

In some embodiments, the outward-facing camera can continuously maps the environment, and the eye facing camera continuously monitors a field of view for determining interface inputs.

In some embodiments, the system can be a virtual or augmented reality headset.

In some embodiments, the system can include a plurality of interconnectable modules, with a first module including the sensor, and a second module including the projector.

In some embodiments, each module can include a communication port operably connected with a communication port of an adjacent module connected therewith.

In some embodiments, the system can further comprise one or more microphones and speakers.

In some embodiments, the system further can include an adapter configured to slidably mount the system to a track.

In some embodiments, the system can further comprise a base configured to support at least a portion of a housing including at least one of the sensor subsystem, the display subsystem, and the processor.

In some embodiments, the base can include a touch screen interface, one or more microphones and speakers, or at least one communication port configured to operably connect with a communication port of the system.

In some embodiments, the system can be associated with at least one selected from the group consisting of a rearview mirror of a vehicle, a dashboard of a vehicle, a drone, and a robot.

Yet another aspect of the present technology there is provided an imaging and display system comprising a wrist mounted unit including at least one sensor, and at least one projector. The sensor can be configured or configurable to detect a size or orientation of a hand wearing the unit, a wrist, forearm or finger of the hand, or an object held in the hand or entering a field of view of the sensor. The projector can be arranged to illuminate at least one of front and back of the hand, wrist, forearm or fingers, or the object.

In some embodiments, the system can include at least one processing unit operably connected or connectable to the sensor, the projector and at least one memory, the at least one processing unit being configured or configurable to project display content by utilizing the projector based on information received by the sensor or receive an input command by utilizing the sensor and detecting motion in the field of view of the sensor.

Still another aspect of the present technology there is provided an imaging and display system comprising a head wearable device comprising. A sensor component can be configured or configurable to dynamically map an environment in proximity to the sensor component to detect a user and a display candidate. A display output component can be configured or configurable to provide display content on or to the display candidate. At least one processing unit can be operably connected or connectable to the sensor component, the display component and at least one memory, the processing unit executing an application to generate the display content and to continuously adapt the display content based on a user's position.

In some embodiments, the display content can be projected onto a lens, at an eye of the user, or provided to an active display lens including an embedded screen.

In some embodiments, the head wearable device can be an eye glasses unit comprising at least one eye facing camera and at least one outward-facing camera, and at least one projector, the projector being located to project onto at least one lens of the eye glasses, and the outward-facing camera being configured to continuously map the environment, and the eye facing camera being configured to continuously monitor a field of view for determining interface inputs.

Yet still another aspect of the present technology there is provided an imaging and display system comprising a wearable clothing comprising. A sensor component can be configured or configurable to dynamically map an environment in proximity to the sensor component to detect a user and a display candidate. A display output component can be configured or configurable to provide display content on or to the display candidate. At least one processing unit can be operably connected or connectable to the sensor component, the display component and at least one memory, the processing unit executing an application to generate the display content and to continuously adapt the display content based on a user's position.

A further aspect of the present technology there is provided an imaging and display system comprising. A display module including at least a first and second communication ports, and at least one projector configured or configurable to project at least one display content on the display candidate. A sensor module can include at least one communication port, and at least one sensor configured or configurable to map an environment in proximity to the system to identify a user position and a display candidate, the sensor module being interconnectable with the display module for communication between the first communication port of the display module and the communication port of the sensor module. A light module can include at least one communication port, and at least one light source, the light module being interconnectable with the display module for communication between the second communication port of the display module and the communication port of the light module. At least one processing unit can be operably connected or connectable to the sensor subsystem, the display subsystem and at least one memory, the at least one processing unit being configured or configurable to determine one or more characteristics of the display candidate, determine motion of an object in the environment, and configure the display content based on one of the characteristics of the display candidate, and the motion of the object.

In some embodiments, the system can further comprise one or more microphones and speakers in operable communication with the processing unit.

In some embodiments, the system can further comprise an adapter configured to slidably mount the system to a track, the adapter being extending from the sensor module.

In some embodiments, the sensor module can include a plurality of sensors configured to provide 360 degree coverage in the environment, and the display module include a plurality projectors configured to provide 360 degree coverage in the environment.

Another aspect of the present technology there is provided an imaging and display system comprising a sensor subsystem including at least one sensor configured or configurable to map an environment in proximity to the system to identify an object position and a display candidate. A display subsystem can include at least one projector. At least one processing unit operably connected or connectable to the sensor subsystem, the display subsystem and at least one memory. At least one graphical user interface can be associated with the system and projectable by the projector onto the display candidate or displayable on the display candidate, the graphical user interface comprising at least one affordance configured or configurable to provide at least one input receivable and usable by the processing unit in controlling at least one operational function. The display content can be based on one of at least one characteristic of the display candidate detected by the sensor, and the motion of the object detected by the sensor.

Still another aspect of the present technology there is provided a computing device comprising a sensor for mapping an environment in proximity to the device to identify a user position and a display candidate. A memory can contain an application coupled to a processor, the processor executing the application to generate display content. The application can evaluate the display candidate and the user position and selecting the display candidate as a display surface. A display output, the application utilizing characteristics of the display surface and the user position to modify the display content to produce enhanced display content, the display output displaying an image of the enhanced display content on the display surface.

In some embodiments, the application can continuously update the user position and the display candidate to detect a perturbation in the environment, in response to the perturbation, the application modifying the enhanced display content to improve the image.

In some embodiments, the application can continuously update the user position and the display candidate to detect a perturbation in the environment, in response to the perturbation, the application detecting a control action.

In some embodiments, the application can continuously update the user position and the display candidate to detect a perturbation in the environment, in response to the perturbation, the application detecting a second display candidate and selecting the second display candidate as the display surface.

In some embodiments, the display surface can be a passive surface and the display output is a projector.

In some embodiments, the sensor can identify a second display candidate, the application selecting the second display candidate as a second display surface, wherein modifying the display content further comprises dividing the display content between the display surface and the second display surface to produce second enhanced display content for the second display surface, the display output displaying a second image of the second enhanced display content on the second display surface.

In some embodiments, the computing device can comprise a plurality of computing sub-devices networked together.

In some embodiments, the plurality of computing sub-devices can comprise two computing sub-devices worn on a wrist.

In some embodiments, the computing device can comprise a plurality of computing devices networked together, wherein modifying the display content further comprises allocating a first portion of the image to one of the plurality of computing devices and a second portion of the image to another of the plurality of computing devices.

In some embodiments, the system or device ca further comprise a network interface, the computing device can detect a network device and determining that the network device can create a second display surface, wherein modifying the display content further comprises dividing the display content between the display surface and the second display surface to produce second enhanced display content for the second display surface, the computing device transmitting the second enhanced display content to the network device for display on the second display surface.

In some embodiments, the computing device can be mounted on a part of the body of the user, the display surface comprising a body surface of the user.

In some embodiments, the part of the body can be a wrist and the body surface is a palm corresponding to the wrist.

In some embodiments, the part of the body can be a chest.

In some embodiments, the part of the body can be a head.

In some embodiments, the computing device can be incorporated into a garment, the garment comprising a plurality of light emitting elements that together comprise the display surface.

In some embodiments, the plurality of light emitting elements can comprise OLED elements.

In some embodiments, the plurality of light emitting elements can comprise a directional sensor that indicated to the processor the facing of the plurality of light emitting elements.

In some embodiments, the computing device can further comprise sporting equipment, the sporting equipment comprising a second sensor, the second sensor in communication with the processor, the processor using information received from the second sensor to produce the enhanced display content.

In some embodiments, the device can be mounted in a fixed location in the environment.

In some embodiments, the device can be mounted on a movable platform in the environment.

In some embodiments, the computing device can be a wrist mounted device including one or more projectors for the display output and arranged to illuminate at least one of front and back of a hand wearing the unit, a wrist, forearm or finger of the hand, or an object held in the hand, and the sensor is configured to detect a size or orientation of the hand wearing the unit, the wrist, forearm or finger of the hand, or the object or entering a field of view of the sensor.

In some embodiments, the processor can continuously monitor the user hand to detect if a finger or a second object enters a predetermined area for determining interface inputs.

In some embodiments, the computing device can be eye glasses including one or more projectors for the display output, the projectors being located to project onto at least one lens of the eye glasses, and the sensor including at least one eye facing camera and at least one outward-facing camera.

In some embodiments, the outward-facing camera can continuously map the environment, and the eye facing camera continuously monitors a field of view for determining interface inputs.

In some embodiments, the computing device can be a virtual or augmented reality headset.

In some embodiments, the computing device can include a plurality of interconnectable modules, with a first module including the sensor, and a second module including the display output.

In some embodiments, each module can include a communication port operably connected with a communication port of an adjacent module connected therewith.

In some embodiments, the display output can include one or more light emitters and projectors configured to project the display content onto the display surface, and the sensor includes one or more sensors and cameras configured to detect the display surfaces.

In some embodiments, the computing device can further comprise one or more microphones and speakers.

In some embodiments, the computing device can further comprise an adapter configured to slidably mount the computing device to a track.

In some embodiments, the computing device can further comprise a base configured to support at least a portion of the computing device.

In some embodiments, the base can include a touch screen interface, one or more microphones and speakers, or at least one communication port configured to operably connect with a communication port of the computing device.

In some embodiments, the computing device can be associated with a rearview mirror or a dashboard of a vehicle.

In some embodiments, the computing device can be associated with a drone or a robot.

Still another aspect of the present technology there is provided an imaging and display device comprising an imaging system capturing a sequence of images in a field of view. A movement sensor can output a plurality of movement data indicative of movement of the device within an environment. A location sensor can output a plurality of location data indicative of a location of the device. A processor module can be coupled to the imaging system, the movement sensor, and the location sensor, the processor module receiving the sequence of images, the plurality of movement data, and the plurality of location data, the processor module analyzing the sequence of images to determine if a control object in the field of view is in motion. The processor module can analyze the plurality of movement data and determining an orientation of the device. The processor module can analyze the plurality of movement data and the plurality of location data and determining the location of the device. The processor module can determine if an event has occurred.

In some embodiments, the processor module can further determine that the event is a control gesture performed by the control object, the processor module then executing a routine indicated by the control gesture.

In some embodiments, the processor module can further determine that the event is a perturbation of the location of the device or the orientation of the device and optimizing a display output of the device.

In some embodiments, the processor module can further determine that the event is a change in an environment of the device, the processor module reconfiguring the device for the environment.

In some embodiments, the reconfiguration of the device can comprise choosing a new display surface.

In some embodiments, the device can be a wrist mounted device including one or more projectors configured to display an image on at least one of front and back of a hand wearing the unit, a wrist, forearm or finger of the hand, or an object held in the hand, and the sensor is configured to detect a size or orientation of the hand wearing the unit, the wrist, forearm or finger of the hand, or the object or entering a field of view of the sensor.

In some embodiments, the processor can continuously monitor the user hand to determine if the event has occurred.

In some embodiments, the device can be eye glasses including one or more projectors configured to project an image onto at least one lens of the eye glasses, and at least one eye facing camera and at least one outward-facing camera.

In some embodiments, the outward-facing camera can continuously map an environment exterior of the eye glasses, and the eye facing camera continuously monitors a field of view for determining interface inputs.

In some embodiments, the device can be a virtual or augmented reality headset.

In some embodiments, the device can include a plurality of interconnectable modules, with a first module including one of the imaging sensor, movement sensor or the location sensor, and a second module including a display output.

In some embodiments, each module can include a communication port operably connected with a communication port of an adjacent module connected therewith.

In some embodiments, the device can include one or more light emitters and projectors configured to project display content onto a display surface, and the imaging sensor includes one or more sensors and cameras configured to detect the display surface.

In some embodiments, the device can further comprise one or more microphones and speakers.

In some embodiments, the device can further comprise an adapter configured to slidably mount the computing device to a track.

In some embodiments, the device can further comprise a base configured to support at least a portion of the device.

In some embodiments, the base can include a touch screen interface, one or more microphones and speakers, or at least one communication port configured to operably connect with a communication port of the device.

Yet still another aspect of the present technology there is provided a computing device displaying an image, the device comprising a sensor for mapping a plurality of positions corresponding to a plurality of viewers, each of the plurality of positions comprising a viewer location and a viewer orientation in an environment. A memory can contain an application coupled to a processor, the processor executing the application to generate display content on a plurality of surfaces. The application can evaluate the plurality of positions and customizing the display content bases on the plurality of surfaces, the application displaying the display content on the plurality of surfaces.

In some embodiments, the environment can be a vehicle.

In some embodiments, the device optimizes the display content for each of the plurality of viewers can be based on the role of each of the plurality of viewers in an operation of the vehicle.

In some embodiments, the device can optimize the display content for each of the plurality of viewers based on the position of each of the plurality of viewers in an operation of the vehicle.

In some embodiments, the position of each of the plurality of viewers can comprise a seating arrangement.

In some embodiments, the processor can optimize the display content for each of the plurality of viewers based on a physical characteristic of each of the plurality of viewers.

In some embodiments, the physical characteristic can comprise height.

In some embodiments, the system or device can further comprise a plurality of light sensors, the processor coupled to the plurality of light sensors and receiving ambient light information from the plurality of light sensors in proximity to the plurality of users, the processor optimizing the display content for each of the plurality of viewers based on the ambient light information.

In some embodiments, the system or device can further comprise an external light sensor, the processor coupled to the external light sensor and receiving external light information from the external light sensors, the processor utilizing the external light information when optimizing the display content for each of the plurality of viewers.

In some embodiments, each of the plurality of viewers can have a personal mobile device providing an identity of the plurality of viewers to the processor, the processor optimizing the display content for each of the plurality of viewers based on the identity of each of the plurality of viewers.

In some embodiments, the device can include a plurality of interconnectable modules, with a first module including the sensor, and a second module including at least one projector configured to display the display content.

In some embodiments, each module can include a communication port operably connected with a communication port of an adjacent module connected therewith.

In some embodiments, the device can include one or more light emitters and projectors configured to project the display content onto the surfaces, and the sensor includes one or more sensors and cameras configured to detect the surfaces.

In some embodiments, the device can further comprise one or more microphones and speakers.

In some embodiments, the device can further comprise an adapter configured to slidably mount the computing device to a track.

In some embodiments, the device can further comprise a base configured to support at least a portion of the computing device.

In some embodiments, the base can include a touch screen interface, one or more microphones and speakers, or at least one communication port configured to operably connect with a communication port of the computing device.

A further aspect of the present technology there is provided a computing device incorporated in a vehicle, the device comprising a sensor for mapping an environment in proximity to the vehicle to identify a location of the vehicle. A memory can contain an application coupled to a processor, the processor executing the application to generate display content. A display surface can be an exterior surface of the vehicle, the application evaluating the location and modifying the display content to produce enhanced display content based on the location, the enhanced display content being displayed on the display surface.

In some embodiments, the display surface can comprise a vehicular body wrap.

In some embodiments, the vehicular body wrap can comprise OLED elements.

In some embodiments, the system or device can further comprise a movement sensor to identify a velocity of the vehicle, the enhanced display content further bases on the velocity of the vehicle.

In some embodiments, the system or device can further comprise a projector, the processor utilizing the location and the velocity to a produce a second enhanced display content and projecting it on a fixed surface in proximity to the vehicle.

In some embodiments, the fixed surface can be a billboard.

In some embodiments, the fixed surface can be a bus shelter.

In some embodiments, the device can be associated with a rearview mirror or dashboard of the vehicle.

Still another aspect of the present technology there is provided a method of providing display content to a display candidate utilizing an imaging and display system. The method can comprise the steps of mapping an environment in proximity to an imaging and display system to identify a user position and a display candidate utilizing at least one sensor. Projecting at least one display content on the display candidate utilizing at least one projector, or controlling the display candidate to display the display content utilizing a controller. Determining one or more characteristics of the display candidate utilizing at least one processing unit operably connected or connectable to the sensor, the display and at least one memory. Determining motion of an object in the environment. Configuring the display content based on one of the characteristics of the display candidate or the motion of the object.

Still yet another aspect of the present technology there is provided an adaptive graphic user interfacing system can comprise a set of devices in communication with each other and configured to work together to adapt continuously to changing sets of input and output devices, changing sets of users, changing computation environments, and changing usage needs.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

FIG. 18A-18C illustrates a wearable AGUI projector; lapel or head mounted. Also illustrated is how the two AGUI projectors can work together.

FIG. 23A-23D illustrate how an AGUI system may adapt display content to the shape and size of displays.

REFERENCE NUMERALS IN DRAWINGS

Figure 1:
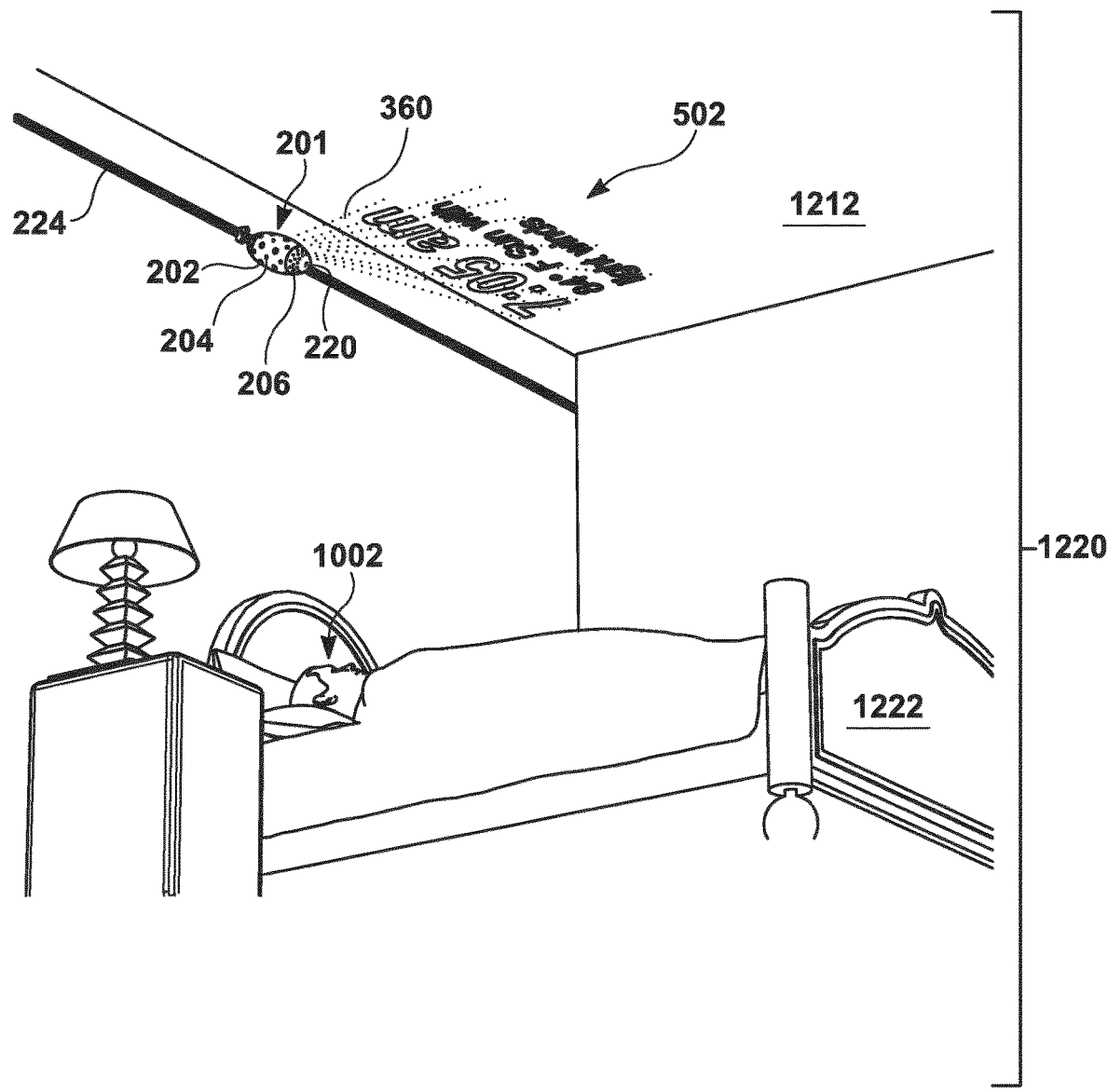
FIG. 1 illustrates an embodiment of an AGUI system projecting a display on the ceiling in the field of view of a viewer.

1 Computer System
5 Processor or multiple processors
10 Main Memory
15 Static Memory
20 Bus
30 Input Device(s)
35 Display
37 Drive Unit
40 Signal Generation Device
45 Network Interface Device
50 Computer or Machine-Readable Medium
55 Instructions and Data Structures
60 General Synopsis of the AGUI operation
62 Core Processing
64 Dynamic Display
66 Dynamic GUI
68 Change Mechanism
70 Setup
Plenoptic System
72 Objective Lens
74 Microlens Array
76 CMOS Sensor
78 Focal Plane of the Objective Lens
100 (Wearable Device/Projection Interfacing Systems)
101 Wrist mounted Projection Interfacing System
102 Wrist Module Screen
106 Wrist Straps
108 Light Emitters
110 Light Sensors
112 Cameras/Camera Array (Wrist Console)
114 Biometric IR/Light Sensors (Wrist Console)
115 Projector
116 Haptic feedback sensors (Wrist Console)
120 Head mounted Projection interfacing system
130 Chest mounted projection interfacing system
140 Heads-up projection interfacing system
150 Heads-up Display Glasses
152 Heads up display glass—Left lens
154 Heads-up display glasses—Right Lens
156 Heads-up display glasses—lens projector
158 Heads-up display glasses—eye-facing camera
160 Outward-facing cameras
168 Virtual Reality Headset
170 Augmented Reality Headset
172 Augmented Reality Headset Visor 200 (Desktop/Mounted Projection Interfacing/Multimedia Hub)
201 Multimedia Hub—mapping Imaging, Interfacing and adaptive display System
202 Light Emitters & Projector Array
204 Light Sensors & Camera Array
206 Microphone & Speaker Array
208 Primary Multimedia Hub module
210 Microphone/Speaker Module
212 Power/Data Port (in any module)
214 Adapter for use in screw-in light fixtures
216 Module with light sensors and camera array
220 Light Module (LED or Light Bulb Cover)
222 Alternate Light Module—Halogen/Light Bulb Adapter/Port
223 Standard halogen bulb/LED bulb
224 Track
225 Track mount for device
226 Track Lighting Port
228 Touch Screen Display/Interface
240 Base Unit
242 Base Unit—Charging, USB/Data Port
244 Base Unit—Phone/Cable/Internet Port
246 Base Unit—Microphone/Speaker Array
248 Base Unit—Touch Screen/Button Array
250 Table top stand with articulating arm
252 Table top stand—straight post
300 (Mapping, Imaging, Zoning & Interfacing Systems)
302 Performing Light and/or Optical Depth & Color Mapping & Imaging
304 Performing a Light Scanning Operation using one or moving beams of light
306 Performing Depth Mapping using a structured light imaging system
308 Performing Depth and Color mapping and Imaging using a camera array
310 Identifying the precise position of the joints and creases of the hand and body
312 Generating a functional rigging of the hands and body
314 Create a fully functional computer model of the hand and body capable of being animated in real time
320 Surface Zoning—Identifying objects on a surface and identifying optimum display zones around mapped objects
322 Surface Zoning—Assigning a Graphic UI and adapting content, sizing, format and layout of UI to zones around mapped objects
324 Surface Zoning—Assigning a Graphic UI to an object, device or surface
330 Hand Zone
332 Palm zone
334 Finger Zones
336 Sub Zones
338 Arm Zone
340 Palm and Fingers
342 Back of Hand and Fingers
344 Inside of Arm
346 Back of Arm
348 Surface Zoning—assigning a Graphic User Interface around mapped objects
348 Surface Zoning—assigning a Graphic User Interface to an object, device, or surface
350 Depth Mapping & imaging of an Object
352 Depth Mapping & Imaging of Multiple Surfaces
354 Depth Mapping & Imaging of a Room
360 Projection Mapping and Display
380 3D Mapping & Interfacing
382 External Mapped Object
384 External Networked Device
386 External Networked Display/Device/Computer
388 External Mapped Projection Surface
390 External Mapped Display
392 External Mapped Equipment
400 Interfacing Systems
(Touch, gesture, body motion, eye motion, voice command, audio and haptic response)
401—Multi-point touch interfacing
402—Hand & fingers
404—Arm
410 Multi-point gesture interfacing
420 Input hand
422 Display hand
(input and display hands can be interchangeable, or one hand can be both at the same time or sequentially)
430 Body motion
435 Facial motion and expression control
440 Eye motion command & point of focus
450 Voice command
460 Haptic interface
500 (AGUI Display Systems & Methods)
501 Adaptive Graphic User Interface
502 Projected Adaptive Graphic User Interface
503 Control menu/Interface
504 Keyboard/Keypad on a table/surface
505 Sub-menu/Interface
506 Projected display interface on hand-held device or object
510 Projected interactive multimedia content from remote projector
512 Projection from wrist device
515 Organic adaptive user interface
516 Organic adaptive multimedia content
520 Selected icon, menu item or tab
530 interactive icons
532 interactive tabs/menu items
534 interactive multimedia content
536 video conf.
538 virtual buildings
540 Binocular heads up display
545 Augmented or virtual graphic user interface (assigned to a virtual object/actual
object/empty space/depth of field)
550 Vehicle Head-up display/Interface
552 Projected display/Interface onto a vehicle surface
560 Projected patent vital statistics (e.g. EKG)
562 Projected patient internal organ virtual representation
600 (Clothing—Organic Adaptive Display & Interfacing)
601 Adaptive Display Clothing
602 Adaptive Display Jacket
603 Adaptive Display Pants
604 Adaptive Display Dress
605 A Graphic Display Assigned to
610 Virtual
700 (Physical Objects, Displays, Devices, Vehicles & Drones)
702 Laptop
704 Tablet
706 Smart Phone
708 Smart Watch—Round Display
710 Smart Watch—Rectangular Display
712 Note Pad
714 Game Ball—Toy
718 WebCam 720 TV Screen/Mounted TV/Display
722 Real Entertainment and
724 Sound System/Speakers
730 Dining table dinnerware, etc.
740 Table
750 UAV/Drone
760 Robot—Robotic vehicle/UTV? (unmanned terrestrial vehicle) wheeled/track vehicle
(Virtual Objects, Displays & Interfaces)
800 Virtual representation of man
802 Virtual 3D object
810 Virtual Furniture
820 Virtual TV/Display
822 Virtual Entertainment and Sound System
824 Virtual Speakers
830 Virtual footballer
831 Virtual footballers mask-helmet
832 QR Code
834 Virtual Baseball Pitcher
835 Virtual Baseball
836 Virtual Baseball Batter
838 Virtual Baseball Catcher
840 Projected instructions
842 Projected directions
844 Projected identification symbols/words/imagery
845 Displayed Text/Words
850 Projected food items for reorder/cooking prep.
852 Projected delivery truck
854 Projected meal selection
860 Virtual golf club
862 Virtual golf ball
864 Virtual golf course
866 Virtual trees
868 Virtual sand traps
870 Virtual Landscape
Interior/Exterior Vehicle Mapping, Imaging, Interfacing & Adaptive Display)
900 Car/Vehicle/Taxi
901 Interior Vehicle Multimedia Hub—Projection Mapping, Imaging, Interfacing and
Adaptive Display System
902 Rearview Mirror Vehicle Windshield Head-up Display Projection Interfacing System
904 Dashboard mounted Windshield Head-Up Display Projection Interfacing System
906 Vehicle Windshield Head-up Display (Embedded Glass or Projection Display)
908 Front Driver Window Display (Embedded Glass or Projection Display)
910 Front Passenger Window Display (Embedded Glass or Projection Display)
912 Rear Passenger Window Display (Embedded Glass or Projection Display)
914 Vehicle Interior Mapping, User Identification & Display/Content Selection
920 Bus
922 Bus Display Panels
924 Bus Side Window Displays
930 Bus Stop
932 Bus Stop Display Panels/Screens
940 Buildings
942 Building Display Windows/Panels/Screens
945 Street Display/Projection
Exterior Vehicle Mapping, etc.
950 Exterior light imaging and camera array on vehicle+ projectors
952 Vehicle wind shield
954 Vehicle Windows (side, rear)
956 Vehicle body panels
958 Vehicle Digital Wheel Display
960 Taxi Top Digital Advertisement Display
Illustrated/Mapped People/Users
1000—Person (User/Wearer)
1002—User Male (Person)
1008—Rigged User
1010—Fully Modeled and Animated User model
1020—Person Female (Person)
1021—3D mapped female
1022—Person Male Child
1024—Person Female Child
1026—Person—Patient
1028—Medical personnel/Surgery personnel/Doctor/Surgeon
1030—Group of People
1040 Professional Golfer
1042 Sensors on or embedded in clothing/Shoes
1044 Sensors embedded into equipment
1100 (Exterior Body Parts and Systems)
1102—Hand
1104—Arm
1104—Inside of Hand (Palm)
1106—Back of Hand
1108—Fingers
1110—Arm
1112—Inside of Arm
1114—Back of Arm
1150 (Interior Body Parts, Organs and Systems)
1152 Virtual Internal Body Map
1154 Nervous System
1156 Endocrine System
1158 Brain Machine Interface
1160 Prosthetics (external)
1162 Implanted Device (Pacemaker)
1164 Skeletal System
1166 Muscular System
1168 Integumentary System
1170 Cardiovascular System
1172 Respiratory System
1174 Lymphatic System
1176 Digestive System
1178 Urinary System
1180 Reproductive System
1182—Skin
1200 Physical Rooms, Environments, Objects, Devices & Surfaces
1200A residential Living Space
1202 3D Mapped Environment
1210 Entry Way
1212 Ceiling
1214 Wall
1216 Floor
1220 Bedroom
1222 Bed
1230 Kitchen
1232 Refrigerator
1234 Cabinet Display
1235 Oven
1236 Microwave
1237 Coffee Machine
1238 Counter Top
1240 Living Room
1250 Dining Room
1252 Dining Room Table
1254 Office Cubicle 1256 Office Desk
1258 Office Cubicle Front Wall
1260 Office Cubicle Side Wall
1270 Operating room at Hospital/Clinic
1272 Privacy screen
1274 Overhead lighting with integrated projection and scanning system
1300 (Networking & Communications)
1302 AGUI Internet HUB/Server/Platform
1303 Cell Tower/Wireless Communications
1304 Home Systems & Appliances
1306 AGUI Device Group Network
1308 Desktop, Enterprise and Mobile Computing Devices and Entertainment Systems
1310 Wearable, AR, VR and Mixed Reality Computing, Display and Interfacing Systems
1312 Vehicles, Robotics and Transportation Systems
1314 Business, Retail, Buildings, Billboards, Indoor and Outdoor Display Systems
1400 Operating & Intelligence Systems & Processes
1402 His . . .
1404 Hers . . .
1500 Patent Diagrams While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION OF PREFERRED EMBODIMENTS

It has been identified that graphical user interfaces are often designed for a specific device, display type or display surface with limited adaptability or interoperability between one device, display type or surface and another. It has been identified that a drawback of existing technology is that dynamic surfaces, environments and ambient lighting conditions used by projectors and active displays are difficult to manage when they change in size, shape form, color, brightness, reflectivity, orientation, or environmental conditions such as ambient light and other variables. Systems are not able to adapt to displays and display surfaces entering and exiting an environment in an unpredictable manner or when the displays are not fixed in size, shape, and orientation or when moving or transitioning from one display system or surface to another. Furthermore, graphic user interfaces are often limited to a single device, display type or surface and not adaptable to a dynamic environment and mix of displays and projection surfaces. It has been further identified that there is need for an adaptive graphic user interface (AGUI) that can take into account a variable number of displays and display surfaces that may vary in size, shape and type, with the AGUI dynamically adapting to the environment to allow a user to better interact with the system.

1. Architecture and Example Deployment

1.1. Example Embodiments

Embodiments of the AGUI may take several forms building on the key concepts and features of the system.

Embodiments of the present technology comprise hardware, software, and methods to implement an AGUI (Adaptive Graphical User Interface) system that allows a user to interface with a computerized system in a dynamic and changing environment. Components of an AGUI system can operate individually or collectively on a projector, PC, laptop, tablet, phone, television, watch, glasses, headset, clothing, vehicle or other compatible hardware, display system or surface. AGUI is an operating platform that can operate on one or more independent, paired or networked devices. The AGUI operating platform may be embedded or installed on one or more devices, appliances, homes, enterprises, vehicles and/or other systems downloaded as a program, platform or application on one or more devices and/or other systems or operate via one or more servers as an Internet or other network based HUB in which a multitude of devices and/or other systems may connect, interface and/or be managed by the AGUI system or any combination of these installation and/or operating, networking and interfacing methods.

According to one embodiment of the present technology, the AGUI system may comprise one or more ceiling, wall, floor, desktop or other surface mounted projectors. The AGUI projectors may operate independently or may be wired or wirelessly networked together and operate as a group to sense the environment, implement displays and interfaces, connect, interface with and control networked devices and systems and detect user commands.

According to another embodiment of the present technology, the AGUI system may comprise one or more handheld, mobile, desktop, mounted or other displays such as phones, PC's, monitors, laptops, tablets, televisions and other active display and interfacing systems, screens and surfaces, such as touchscreens, motion and gesture interfaces LED, OLED, LCD, Plasma and other display types. The AGUI system may adapt a graphic user interface or other multimedia content to the active display device and/or surface by receiving precise size, shape, pixel or other dimensional and display specifications from the device and then adapting and optimizing the graphic user interface or other multimedia content for the AGUI display device and/or surface. When coordinating content across two or more networked active display devices and/or surfaces the AGUI system may map or assign specific content to each device, may assign one device as the primary or master device and other devices as the control or slave devices and/or the AGUI system may organized and/or assign different functions and interfaces to each networked active display device and/or surface or the AGUI system may group the devices and/or surfaces and adapt content across some or all of the active devices and/or surfaces.

The AGUI system may also map content across both active and passive display surfaces for example if a TV screen is attached to a wall an AGUI projection.

According to another embodiment of the present technology, the AGUI system may comprise one or more wearable devices, projectors or head-up display systems including but not limited to watches, headsets, glasses, visors, helmets, windshields and other wearable devices and head-up display systems. Such as a wrist or other body worn AGUI Device with micro-projectors projecting a display and user interface on a user's hand, fingers, arm, body and/or surrounding objects and surfaces, micro-projection device may contains sensors and determines the bounds, shape, location, and orientation of the user's hand fingers, arm, body and surrounding surfaces and environment. The system also maps the hand, fingers, arm, body and surrounding objects and surfaces so as to determine the multiple surfaces that a graphic user interface, text, image, video and/or other multimedia content may be projected on as well as to map the interfacing hand, fingers or other interfacing device or object in which to control the projected graphic user interface and/or other multimedia content and display. The user interface is then projected on the hand and may be manipulated by touching the parts of the displayed surface with a hand, finger, pointer, or another device. In a similar manner, the AGUI system may also use fingers, arms, other body surfaces, and other surrounding surfaces such as a desk or wall to project on. A user is equipped with an AGUI system that comprises a micro-projector on one or both wrists or other with which to interact with their environment. User interfaces may be projected on any surface such as the hand and fingers, the arm or other body surface, on a desk or other furniture, appliance or other objects, on a wall, floor, ceiling or other surface and allows the user to control devices in the room including the laptop computer, table, television, audio system, and lights. As the user moves within a room, the system tracks where they are, their location and velocity, and adapts the AGUI for this.

The wearable projectors may operate in concert with surrounding devices and active display system such as PC's, monitors, laptops, phones, tablets, televisions, furniture, appliances, vehicles and other computing and/or display devices and systems to form an AGUI Group system. The AGUI Group system scans the environment to detect the user and identify the AGUI projectors, PC, laptop, tablet, TV or other active display devices, screens and/or surfaces. The AGUI projectors and active displays are able to communicate with each other to implement the AGUI system. The micro-projectors work in tandem with connected devices and surfaces to project an interactive graphic user interface and/or multimedia content displayed on any of the body, desktop, ceiling, wall, floor, furniture, appliances, PC, TV or other active or passive display surface for the user to interact with. The AGUI system may also adapt any type of 2D or 3D graphic user interface including icons, keyboard, text, images, video, interactive graphics or other multimedia content to all passive and active display systems and surfaces. The user may interface with the interactive graphic user interface and/or other displayed multimedia content as they would on a physical keyboard or other active touchscreen, motion, gesture or other 2D, 3D or multi-dimensional computing display and/or environment. The micro-projectors detects and maps the user's hand, fingers, and body motion and spatial position and determine which icons or other interfacing control by the user. The user may also use finger, hand, body, eye facial gesture and movements, voice command or other user commands and inputs, which are detected by sensors in or connected to the micro-projector devices, as a pointing or control device fora connected PC, laptop, phone, tablet, TV, appliance, vehicle or other connect device or system. While typing and/or interfacing the user's hands and body will move, causing the micro-projectors to move. Despite these movements or perturbations, the micro-projectors will continue to display the keyboard or other graphic user interface or multimedia display as a stable image in the assigned position on the table. The AGUI system continuously and dynamically adapts to the environment, including the top or bottom of an arm, hand, fingers, and surrounding surfaces such as a wall, floor, ceiling, furniture, appliance or other device or object depending on the orientation and position of these objects, the relations to the viewer, and the type of application. The micro-projectors will also automatically ensure that the image of the virtual keyboard or other graphic user interface, image, video or other multimedia content is optimally displayed and undistorted no matter the position of the user's hands and the angle the micro-projectors make with the table. The micro-projectors will utilize internal sensors to scan and/or map and determine the surface characteristics (color, texture, transparency, reflectivity) of the table, adjust the output image, and project the virtual keyboard image to ensure it is easily visible. The micro-projectors may also be connected via a network to a phone, PC, laptop computer, tablet, TV, appliance, headset, glasses, vehicle or other connected device or display and determine what information to display on each device as well as to which device or devices the virtual keyboard, graphic or other user interface input should be sent to.

Alternatively the AGUI Device may be a head up display system such as a pair of glasses, a headset, visor or other wearable head-up display which may incorporate one or more pico projectors to project a micro display onto one or more lenses in front of the eyes, a visor or other head-up display surface. The AGUI system may also adapt a graphic user interface for projecting an image directly into the eyes, and/or may adapt content for an active head-up display such as an LED, OLED, LCD or other screen or active display system. The AGUI system may also drive or operate in coordination with a brain machine interface and/or body machine interface in which interactive graphic and/or other multimedia content is sent directly to one or more receptors implanted in the brain or body, or to a prosthetic such as prosthetic eye, ear or other sensory system or otherwise assigned to the brain or body. In these scenarios the adaptive graphic user interface may be controlled using eye motion, brain activity or when incorporating other sensors such as but not limited to light, optical, audio, motion, location and biometric sensors may also include touch, gesture, motion, emotion and other input and interfacing methods.

According to another embodiment of the present technology the AGUI system may comprise organic, flexible, malleable or other non-fixed or non-static form factor devices and display systems such as fabric, clothing, shoes, hats, helmets and other equipment, furniture, home, enterprise and vehicle upholstery and other objects, devices, display systems and surfaces which may naturally, mechanically or electronically change in shape, size or form. The AGUI system may continuously generate a depth map of an organic display system using light and/or optical imaging of the surface, using embedded spatial position, orientation, acceleration, location or other sensors in order to generate a point cloud and depth map of the surface for the purpose of continuously adapting a graphic user interface to the adaptive display surface.

According to another embodiment of the present technology the AGUI system may comprise one or more vehicles and interior and exterior vehicle display systems and surfaces.

A) Internal Vehicle AGUI Device/Display System

B) Exterior Multi-Panel/Surface Content Mapping, Zoning and interfacing system

C) Multi-Vehicle Interfacing System/One or more viewers—Adapting content based on relational/moving position of one vehicle to another and based on the relational viewing position of one or more viewers D) Multi-Vehicle/and Outdoor Display Surfaces (Building/Roads/Bus Stops/Billboards etc.) Location/Relational/Contextual and Event specific content management The AGUI system is centered around an AGUI controller device or a collection of controller devices communicating with each other and with external devices via a wired or wireless network. A wrist mounted device is merely one or more embodiments of the AGUI controller device. As is made readily apparent from the description of embodiments of the present technology set forth herein, the AGUI Device has many other embodiments and aspects and is in no way limited to the wrist mounted device. It may also be a device fixed to a location such as to the ceiling or on a desk. The AGUI device may also be in motion, mounted on a drone or incorporated in a vehicle. It may be adapted to the interior or exterior of a car, bus, plane, boat or other vehicle. In some embodiments, a heads-up display is adapted to the windshield of a car or other vehicle and other interactive media content may be adapted to the other windows or the backs of chairs, doors and other display surfaces on the inside of a vehicle, which may be assigned based on the position of one or more passengers inside said vehicle. An adaptive display and interface may also be mapped to one or more surfaces on the outside of one or more vehicle such as doors, windows, ceiling panels and wheels or mapped across the entire external surface of a vehicle and content may be adapted or displayed across one or more stationary or moving vehicles based on the spatial position, location and orientation of one or more vehicles to one another, to stationary objects and surfaces such as a bus stop, billboard, building or store front display or to one or more viewing parties.

In some embodiments, the AGUI system supports a variety of input devices. These may be traditional devices such as a keyboard, mouse, touchscreen, knobs, and buttons. A user may also interact with a hard surface or object such as a baseball bat or tennis racket that may provide sensor input (ball hit position, speed, velocity, acceleration) to run a game or a teaching tool that can make use of this data. In a situation where multiple surfaces are available, one may be designated as an active surface (such as a bat) while another may be used for informational output (such as performance information). The baseball bat or tennis racket may be equipped with sensors and report sensor data to the main AGUI device. The sensors can report information such as position, velocity, acceleration, and impact force. Alternatively, the baseball bat or tennis racket may be passive, without sensors, and the main AGUI device will detect the position, velocity, and acceleration of the bat or racket using its built-in sensors.

Embodiments of the AGUI system incorporate a variety of sensors to provide input to the system. Sensors may be integrated into any of the AGUI components such as projectors, LCD, LED, OLED, or other screens and display types, computing and interfacing devices, and surfaces. They may also be connected via a wired or wireless interface. Sensors may also be on or within a user's body and may include medical devices such as a pacemaker. Clothing or other flexible material may contain embedded sensors including sensors that indicate the location and facing of imaging elements embedded in the material.

One embodiment of the AGUI design comprises a wrist device that is worn by a user. The wrist device is an electronic computing device running applications, an operating system, and a virtual storage system. The device comprises a number of components such as a CPU, volatile and non-volatile memory, an integrated projector, a light or optical imaging, depth map and sensor mapping system, an onboard OLED display, and a button keypad. Sensors are included, such as a GPS, a gyroscope, an accelerometer, an ambient light detector, user heart rate and temperature monitor, and surface response sensor. For communications, the device may include a manifold connector and wireless device sensors.

When turned on, the onboard OLED display may show a startup splash screen, welcoming the user. Buttons on the keypad are mapped to a set of applications that allow access to common functions, including but not limited to email, web browsing, clock, calendar, contacts, and a calculator.

One typical operating mode of the device has the device attached to the user's wrist, with the projector placed so that its display is directed onto the user's palm and fingers. The built-in mapping system identifies and quantifies this scenario. The projector projects a light pattern on the user's hand and senses it with the light imaging module. Raw mapping data consists of signal relationships between sent and returned signals. This mapping data is submitted to analysis that generates extent data for identified zones in the target surface (areas of a hand) that are candidates for display. Areas within the projector's light path satisfy an initial criterion for a display zone. If such a candidate area further satisfies setup position and size requirements, it qualifies as a display zone. Typically, the mapping system and the intelligence surrounding it identify zones corresponding to a central palm area and finger areas that extend out from the palm area.

The data for a single zone in this scenario contains a variety of geometric information such as the critical distances between the projector and the extremities of zone that define the zone's position and shape in detail and projection angles between the axis of projector's output stream and an averaged normal vector to the zone.

In order to more readily explain different approaches of the present technology, some embodiments will now be described in more detail with reference to the accompanying drawings.

FIG. 1 illustrates an embodiment of an AGUI system that comprises an AGUI device 201 mounted on the ceiling or wall in a bedroom. The AGUI system detects when the user 1002 is lying prone on the bed 1222 and their location, including the location of their eyes and point of focus. It displays a clock and weather report 502 on the ceiling 1212 at a convenient viewing angle for the prone user.

Figure 2:
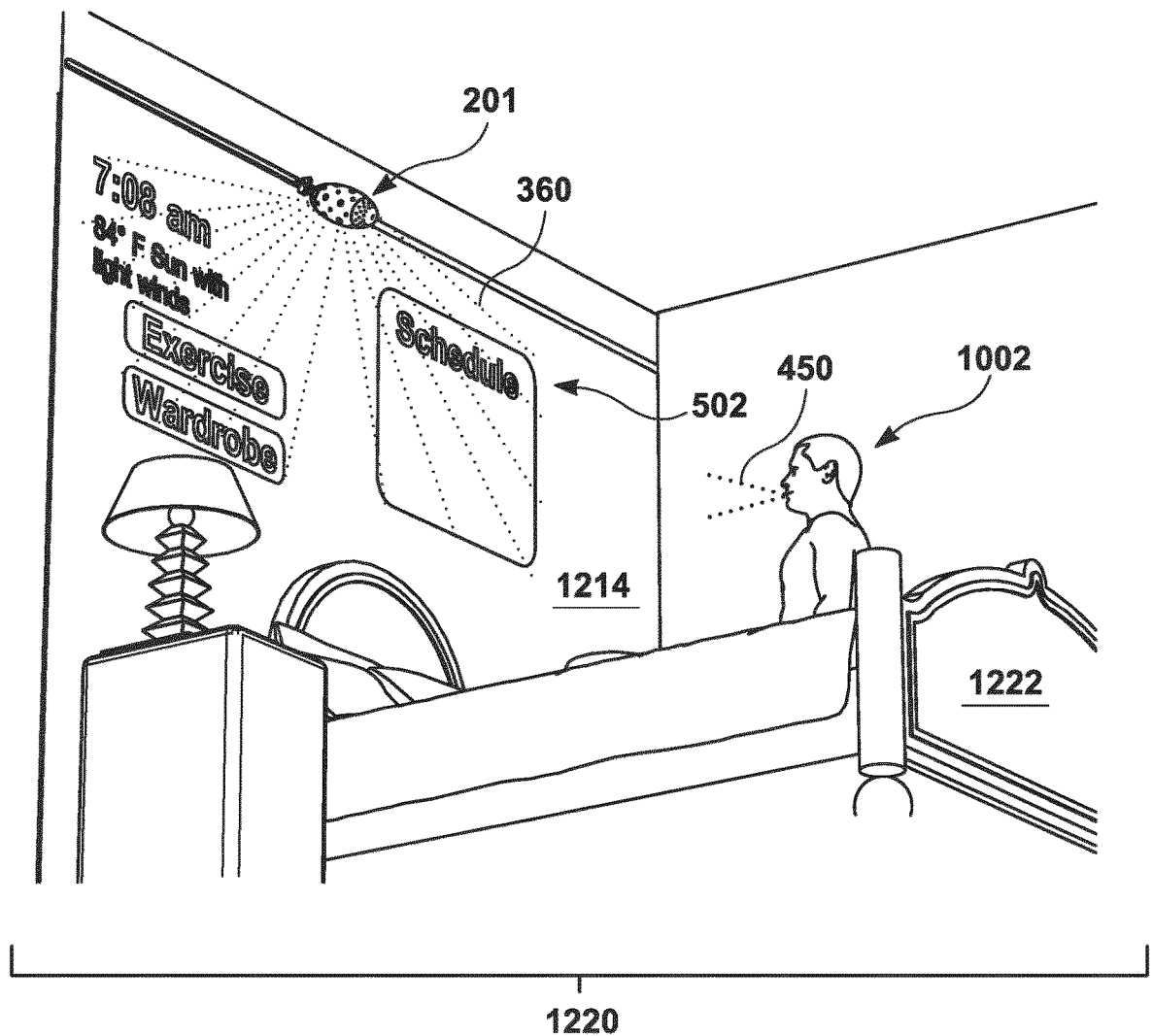
FIG. 2 illustrates how the AGUI system adapts as a viewer's position changes, displaying on a vertical wall with additional, context sensitive information.

Referring to FIG. 2, when the user 1002 sits up on the bed, the AGUI system 201 detects this and realizes that projecting on the ceiling 1212 is no longer optimal and moves and adjusts the display to be on the wall 1214, near the center of the user's field of view 450. Reacting to preprogrammed situations, such as a wake-up alarm, an alarm clock, and weather report is displayed in the new vertical display position. The AGUI 201 has also added a schedule to the display based on predefined preferences or based on a user voice command or a motion gesture.

Figure 3A:
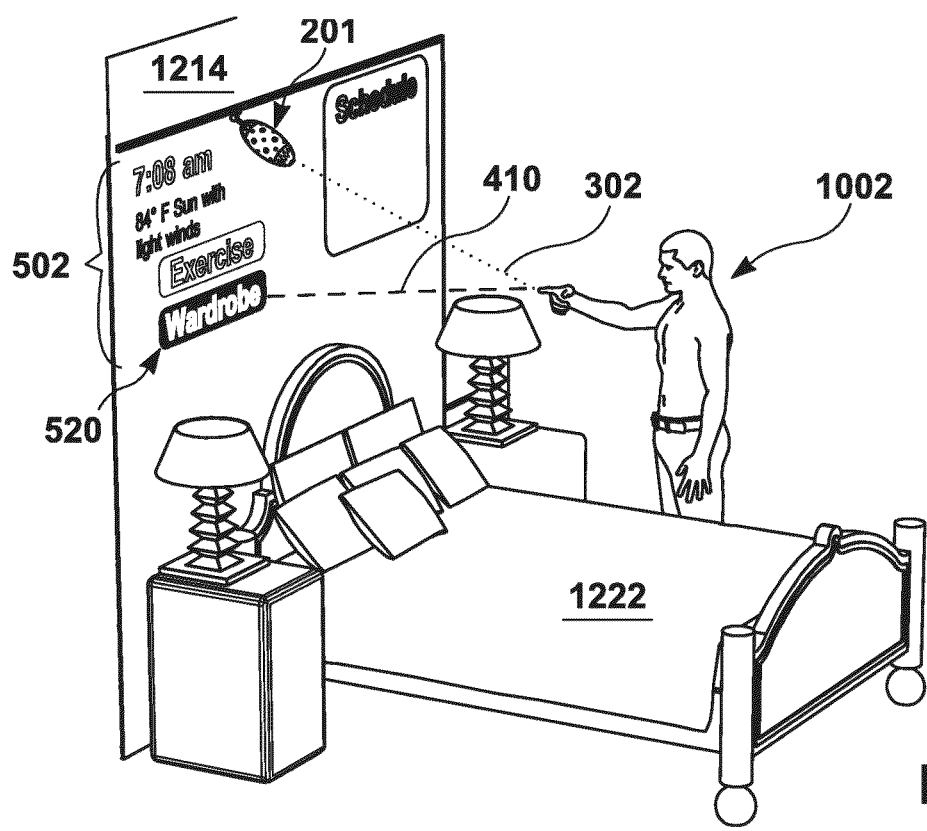
FIG. 3A illustrates how gestures can be used to control the AGUI system.
Figure 3B:
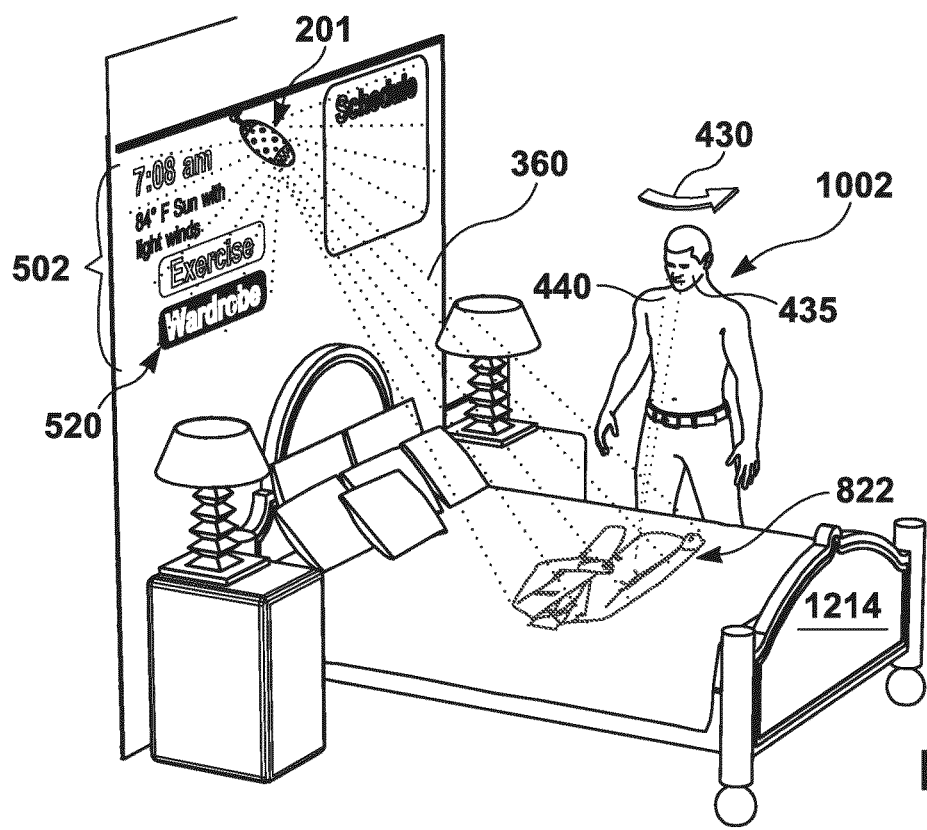
FIG. 3B illustrates how the AGUI system can dynamically select new surfaces as they become available.

Referring to FIG. 3A, when the user later stands up, the user can be seen making gestures, in this case with his hand, to control the AGUI system. Referring to FIGS. 3A and 3B, the user 1002 selects the "Wardrobe" button 520 displayed on the wall which instructs the AGUI system to project an image a piece of clothing on the bed 822. In this case, the AGUI system has detected the bed as a surface that may be used as a display surface and decided that it makes the best viewing surface for clothing given the user's position and facing, and the surface characteristics of the bed at the time of use. If the bed is unmade or the cover of the bed makes projecting a clear image on it difficult, the AGUI system would choose an alternative surface. Similarly, if there had been an AGUI aware television or monitor in the room, the AGUI system may choose it as a display.

Figure 4A:
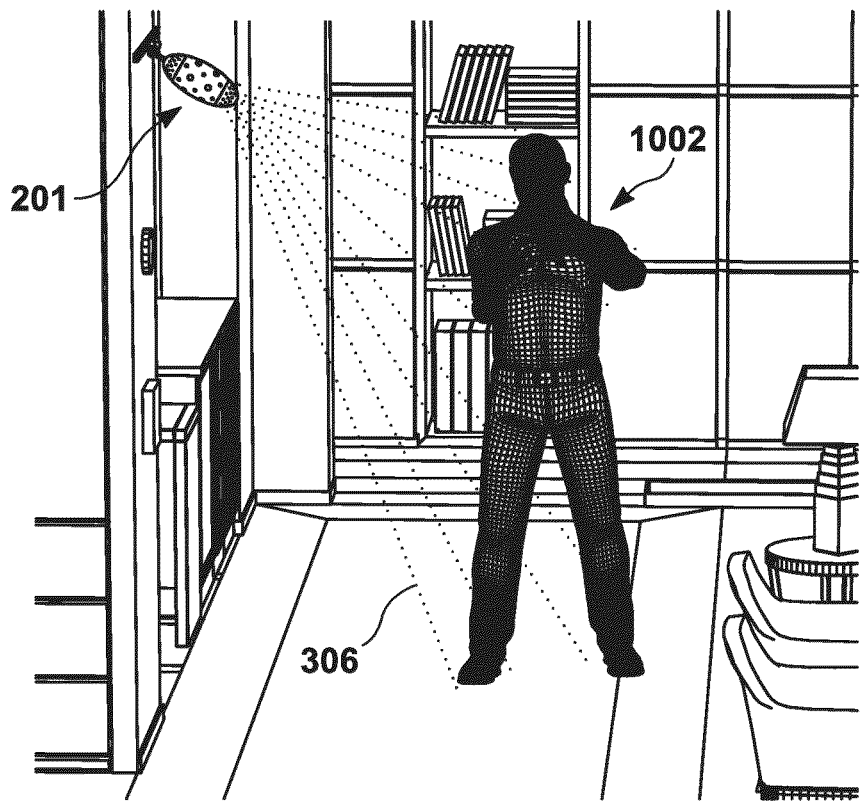
FIG. 4A illustrates how an AGUI system maps and identifies a user using structured light imaging.
Figure 4B:
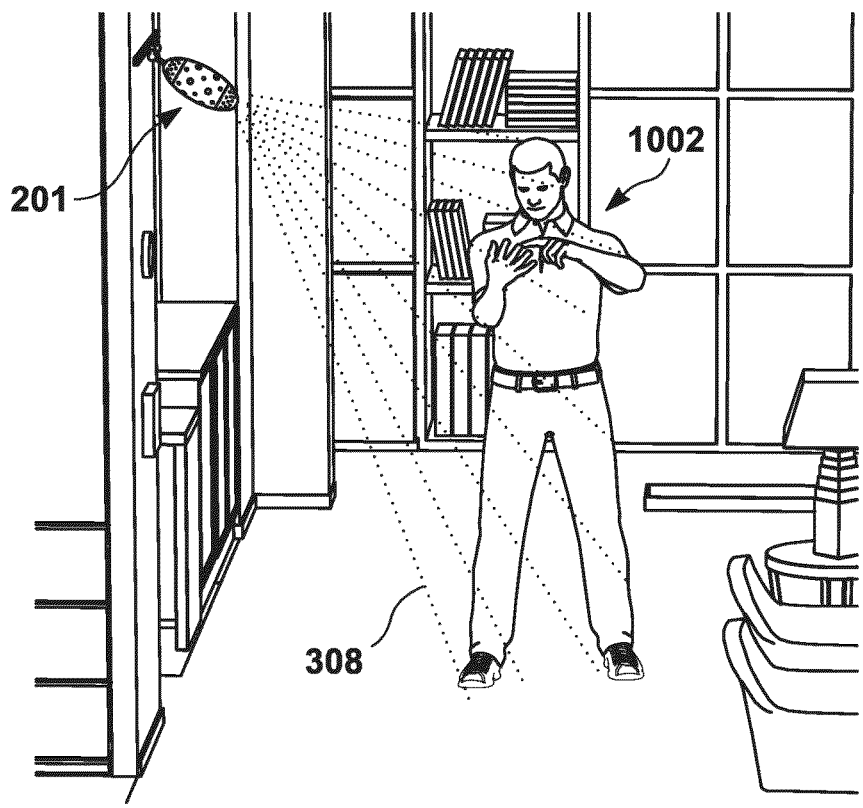
FIG. 4B illustrates how an AGUI system maps and identifies a user using color and optical light imaging.
Figure 5A:
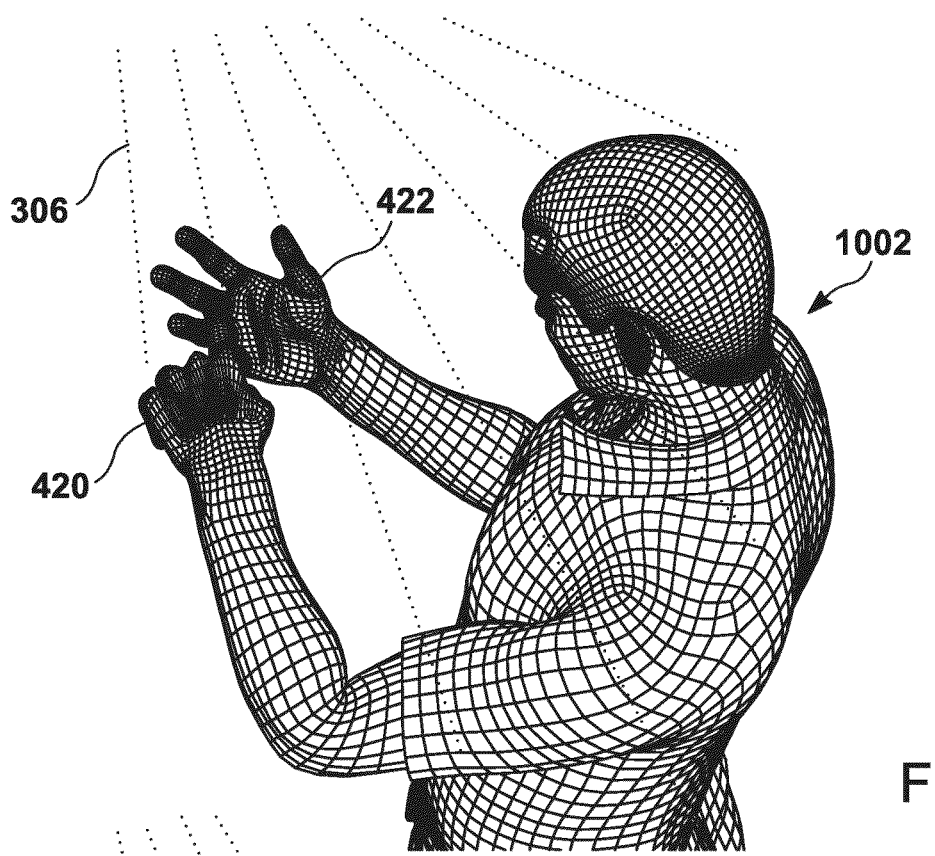
FIG. 5A illustrates how structured light mapping or depth mapping may be used to detect a user.
Figure 5B:
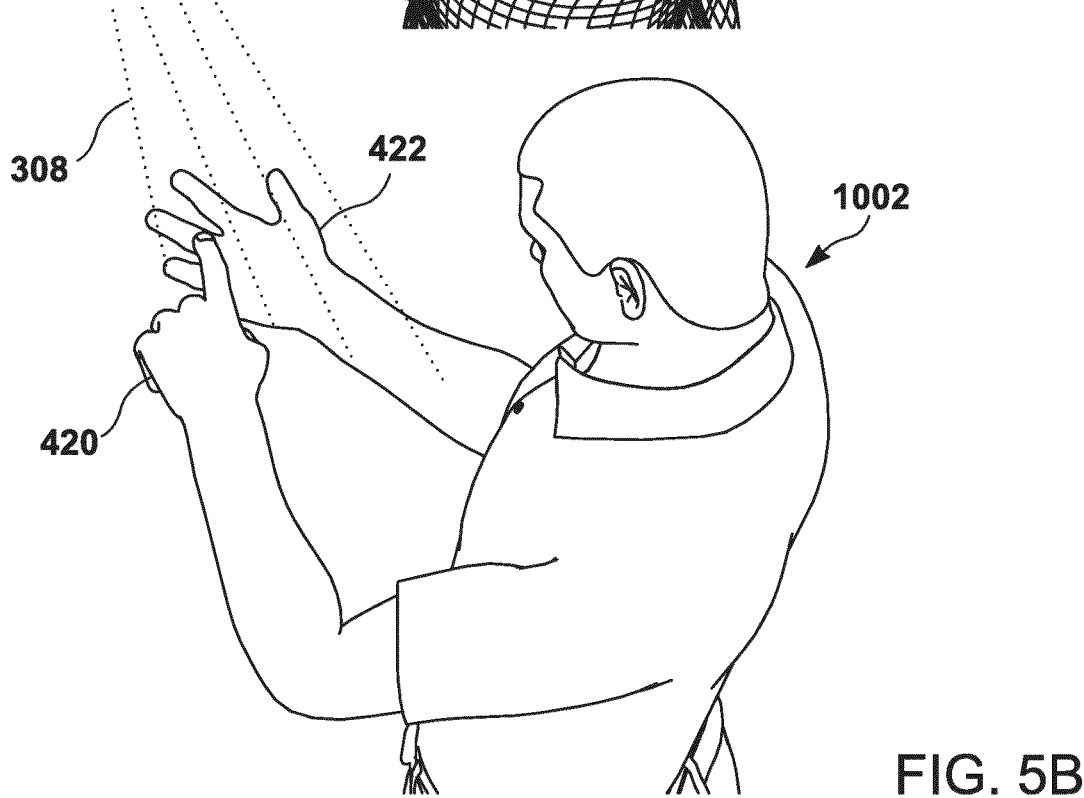
FIG. 5B how optical light can be used to map a user and identify surfaces that can be an interface.

FIG. 4A shows an embodiment of the present technology where the AGUI device 201 is positioned high on a wall in a living area of a home. The AGUI device detects when a user 1002 enters the room and maps 306 their body. The device detects the user's hands and based on predetermined or user input projects 308 a user interface on the user's hand. The user then uses their other hand to manipulate the AGUI user interface using gestures or by manipulating the interface projected on their hand. In this case, the user has positioned their palm so that the AGUI device is able to clearly project a display image on it. If this had not been the case, the AGUI system would have chosen an alternative surface in the environment, such as another body part, a wall, table, floor, or other surface.

Figure 6A:
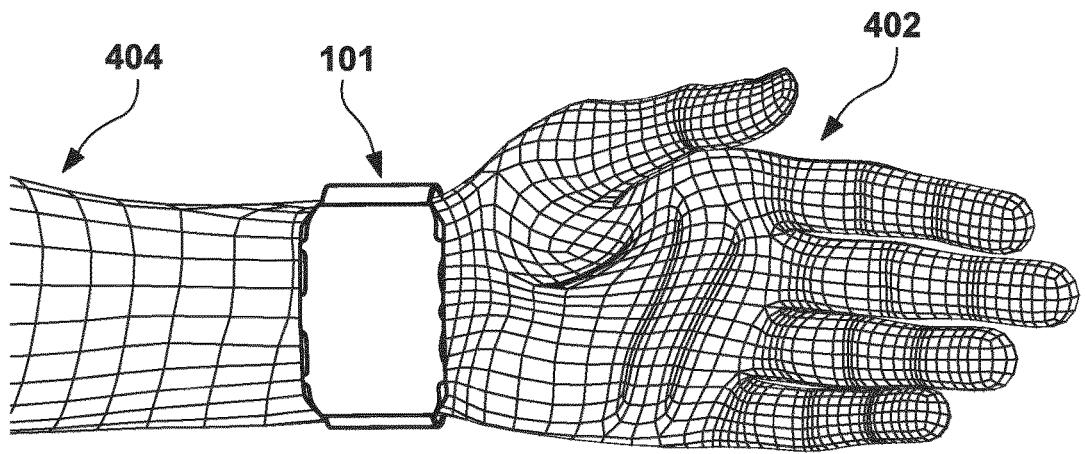
FIG. 6A-6C illustrate the use of a wrist mounted AGUI device the maps a user's surfaces, selects display surfaces, and adapts when the surfaces move.
Figure 6B:
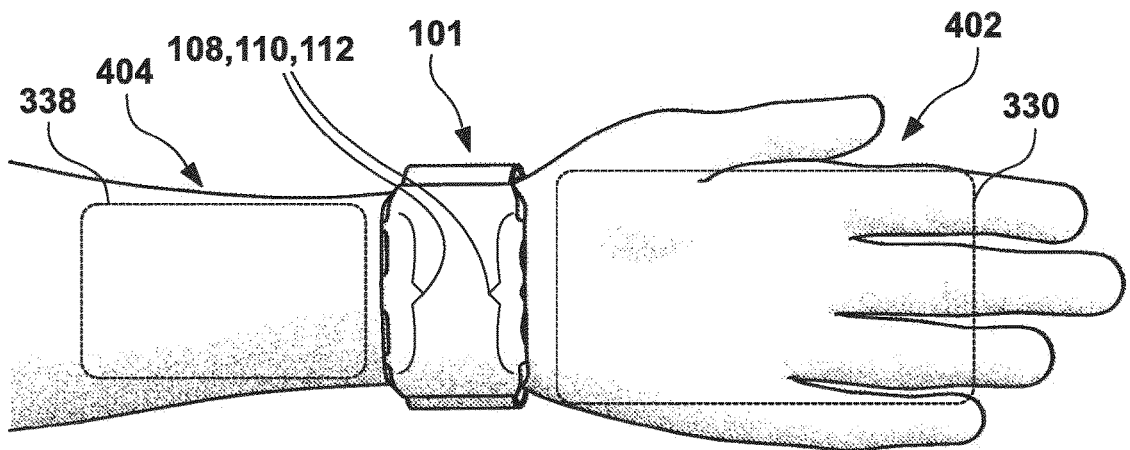
Figure 6C:
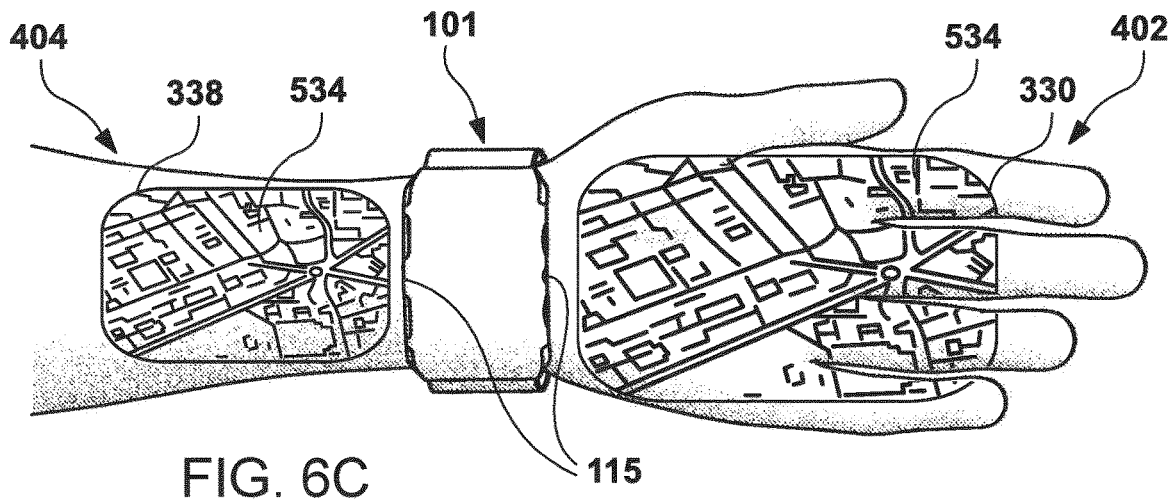

FIG. 6A illustrates another embodiment of the present technology where the AGUI system consists of a wrist mounted device 101. Multiple light projectors 108 on the AGUI illuminate the front and back of the hand 402, wrist, and forearm 404 of the user. Also referring to FIG. 6B, the AGUI system maps out the position of the body parts, detects that the user's fingers are together, and determines that it can project a large display surface 330 on the palm of the hand, including the fingers. The projectors 108, light sensors 110, cameras or camera array 112, and/or projectors 115 can be located on one or more edges of the wrist mounted device 101 to project images on either side of the device 101. The device 101 can further include infrared (IR)/light sensors 114 and haptic feedback sensors 116.

Figure 7A:
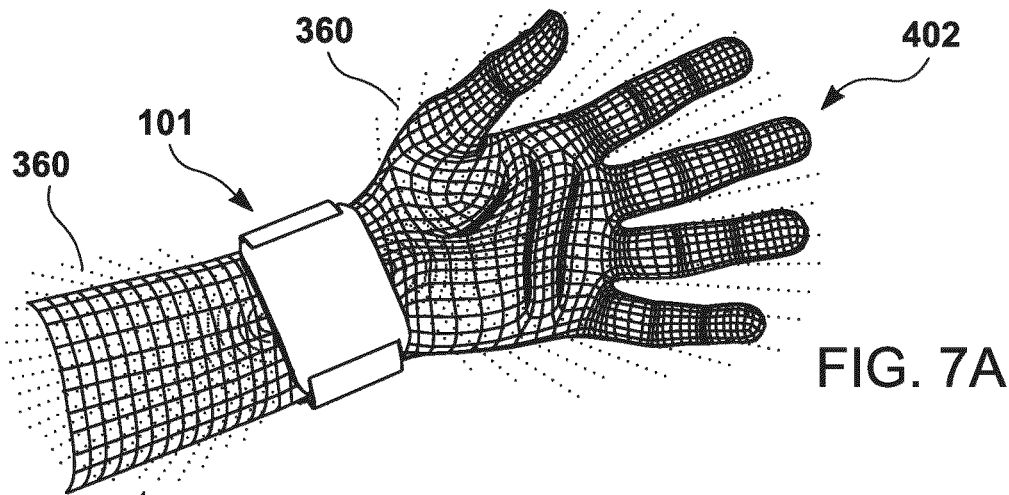
FIG. 7A-7C illustrates alternative ways of dividing up a hand into display surfaces.

Referring to FIG. 7A, the AGUI device 101 detects the placement and orientation of the hand and fingers and determines that the palm may be used as a larger surface, to display a map, and that the fingers can be used to display control surfaces 532. The AGUI device 101 continues to monitor the placement and orientation of the hand and fingers 402 and detects that the user has spread the fingers of their hand 402 requiring it to adapt the position of display control surfaces 532. The AGUI device determines the field of view of the user and the orientation of each of the five display surfaces and optimizes the projection shape, color, intensity, and other characteristics of the display so that each of the five display areas 532, 534 are clearly viewable, with undistorted color and shape. The AGUI device continuously monitors the position of the user's hand, detects movements and projects an optimized image based on the position of each surface at that point in time.

Figure 8A:
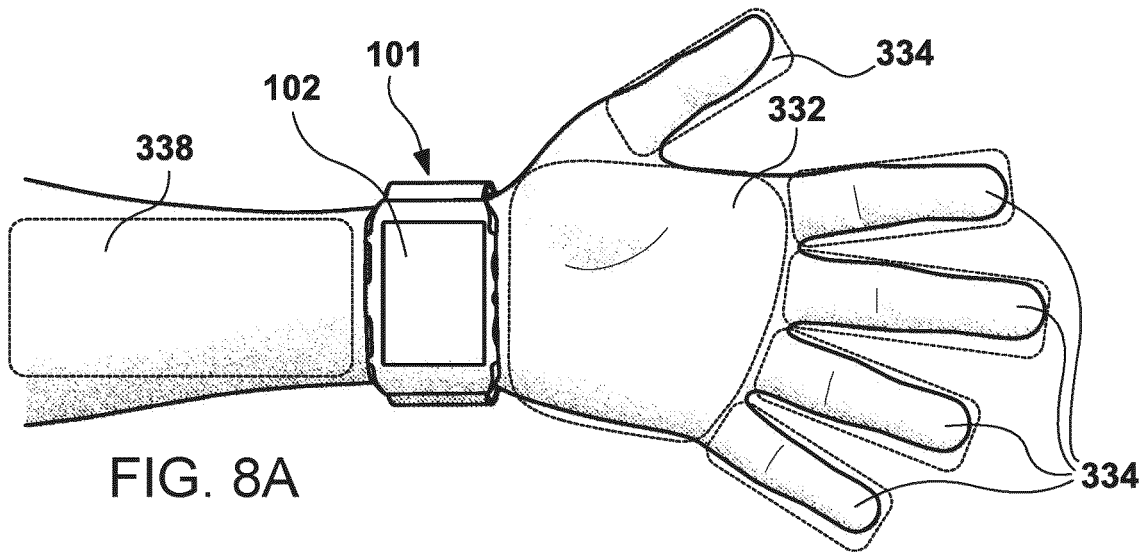
FIG. 8A-8C illustrates alternative ways of dividing up a hand and wrist into display surfaces.
Figure 8B:
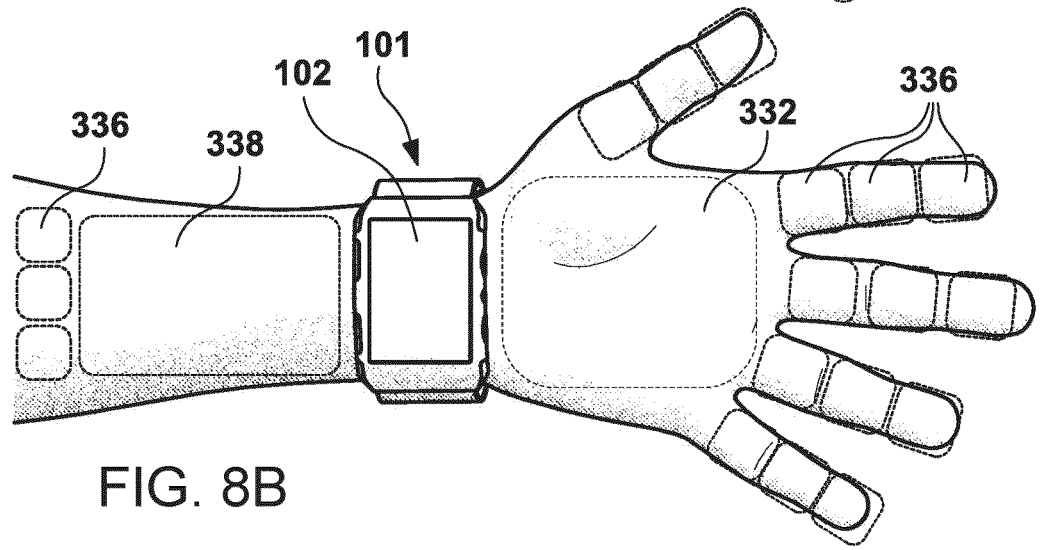
Figure 8C:
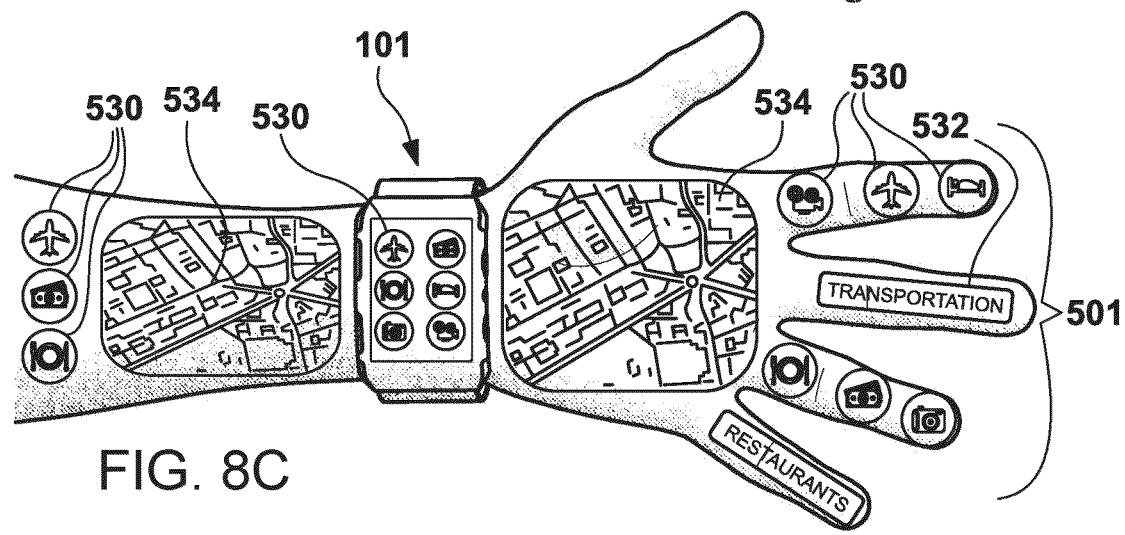

FIG. 8 illustrates the detection and use of potential surfaces identified by an AGUI wrist mounted device 101 incorporating an internal display 102. The identification of surfaces and division of the surfaces into sub-surfaces can be made dynamically based on the programming of the AGUI application, user defined surfaces, by utilizing a past set of display surfaces from the last time the application was run, or any combination of methods. In this case the AGUI device 101 is aware of its internal display 102 and identifies a large surface 338 on the inner forearm of the user, an additional surface 332 on the palm of the user's hand, and more surfaces 334 on the user's fingers and thumb. The AGUI system then decides that it may reduce the size of surface 338 to create three control surfaces 336, and that it can use each segment of the fingers and thumb as separate surfaces, 336. Finally, in FIG. 8C, the AGUI device has chosen to display an adaptive interface using control icons 530 on internal active display 102, two display surfaces 534, and nine more icons 530, and two menu controls 532.

Figure 9A:
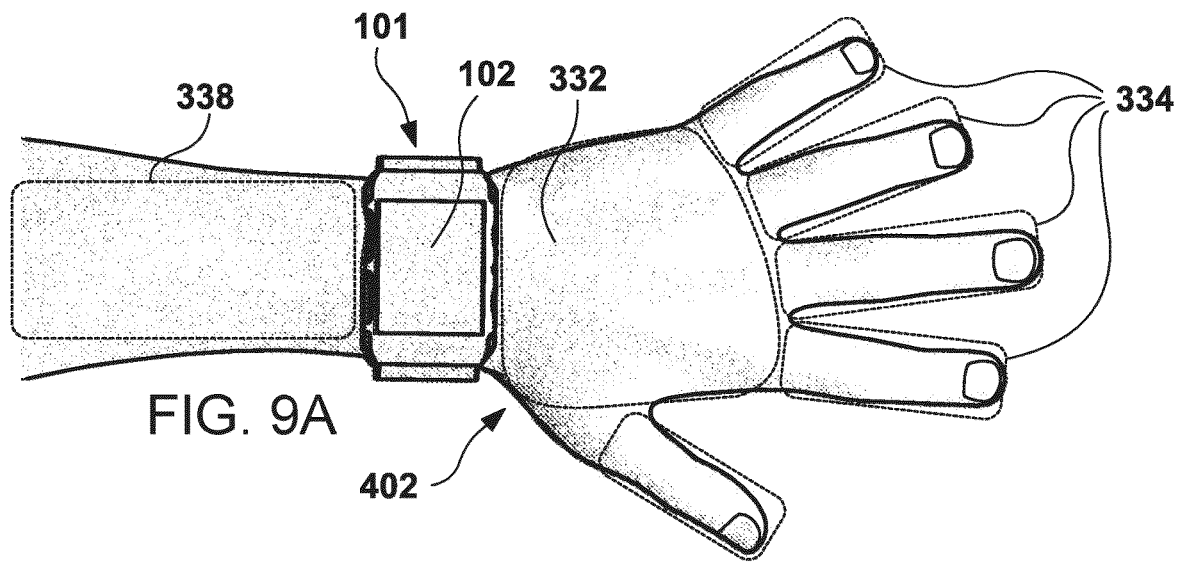
FIG. 9A-9C illustrates alternative ways of dividing up the back of a hand and forearm into display surfaces.
Figure 9B:
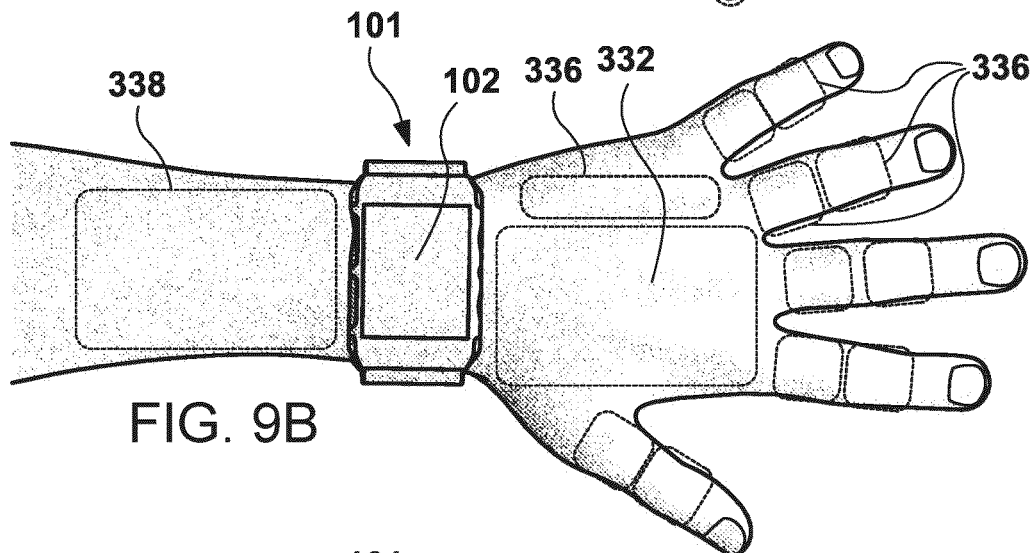
Figure 9C:
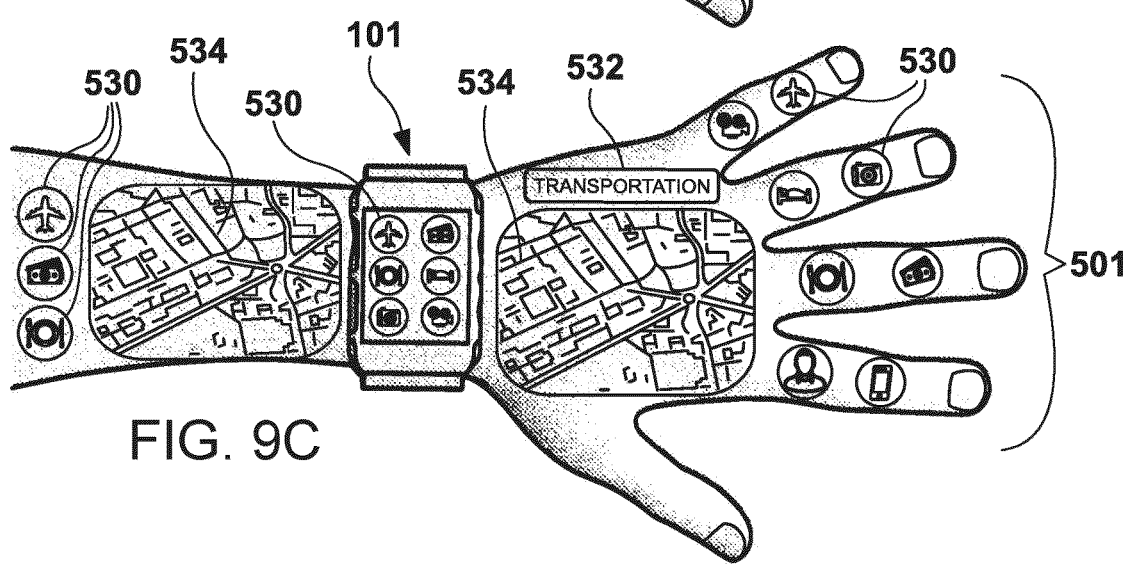

FIG. 9 illustrates alternative divisions of surfaces based on the AGUI device's 101 internal screen 102, the user's forearm 338, back of hand, and back of fingers. The AGUI system may maps surfaces differently depending on the position and viewing angle of the hand and fingers and dynamically select and optimize the display as the user moves their hand. An AGUI system may detect and select a different selection of display surfaces depending on whether the user has the palm side or back side of their hand facing them. They may also display on both sides of their hand simultaneously to both view and manipulate the AGUI interface for themselves and also for a viewer located in front of them. Display surfaces on the palm side of the arm and hand may be projected on by a wrist mounted AGUI device. Display surfaces on the back side of the hand may be projected on by another, external AGUI device.

Figure 10A:
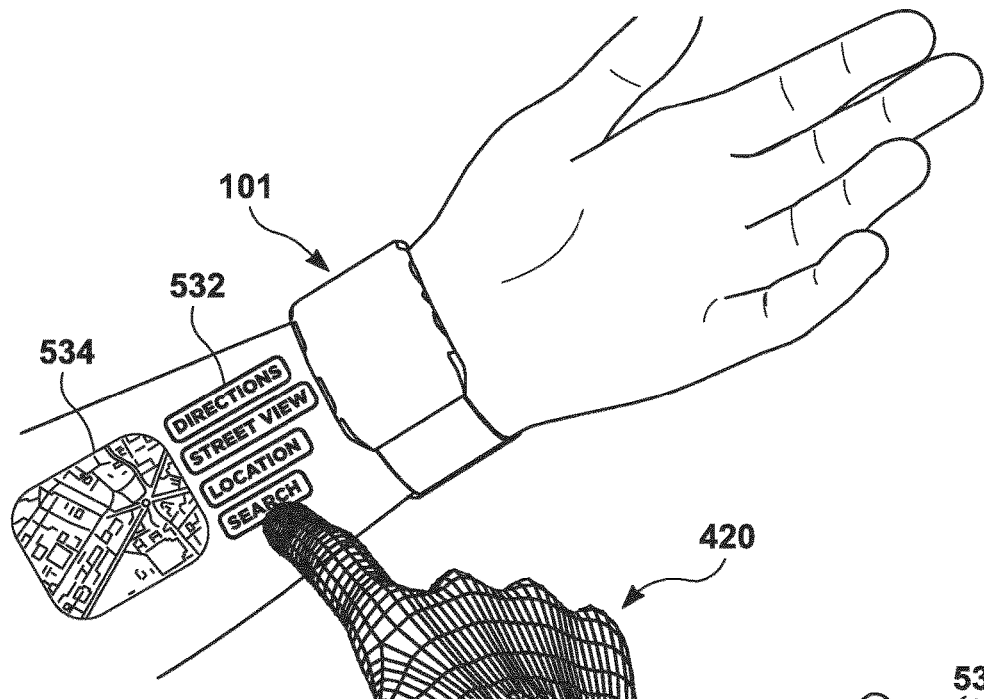
FIG. 10A-10B illustrates how a selection in one display can initiate a related display on another surface.
Figure 10B:
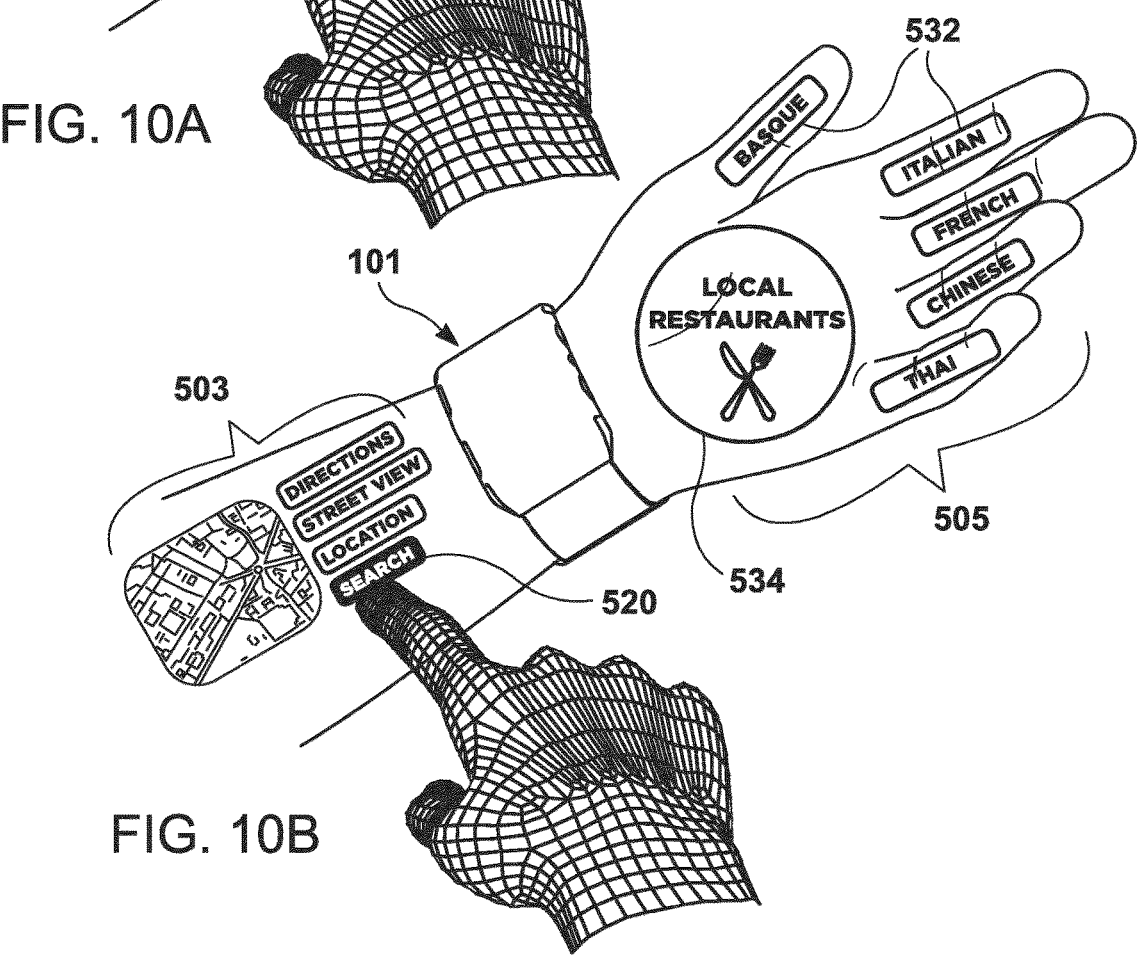

Referring to FIG. 10, an AGUI device 101 is projecting a display surface 534, containing a map, on the user's forearm. The AGUI device is also projecting menu controls 532 on the user's forearm. Furthermore, the AGUI device has identified the user's hand and finger as a pointing device and tracks the user's hand 420. When the AGUI device detects that the finger has touched the SEARCH menu control 520, it instructs the running application program to display a sub-menu 505. The AGUI device is aware of the size and placement of the user's hand and that it is in the field of view of the user and selects the user's palm and fingers to display the sub-menu 505 comprising a large display surface 534 and further menu controls 532.

Figure 11A:
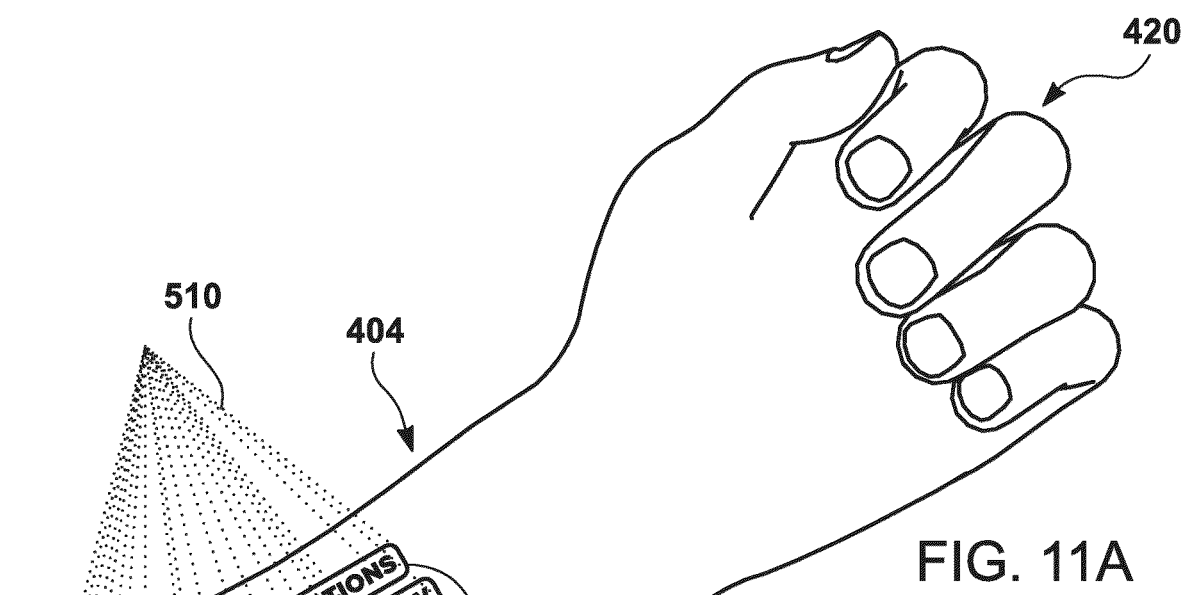
FIG. 11A-11B illustrates how display content can be projected from a variety of sources.
Figure 11B:
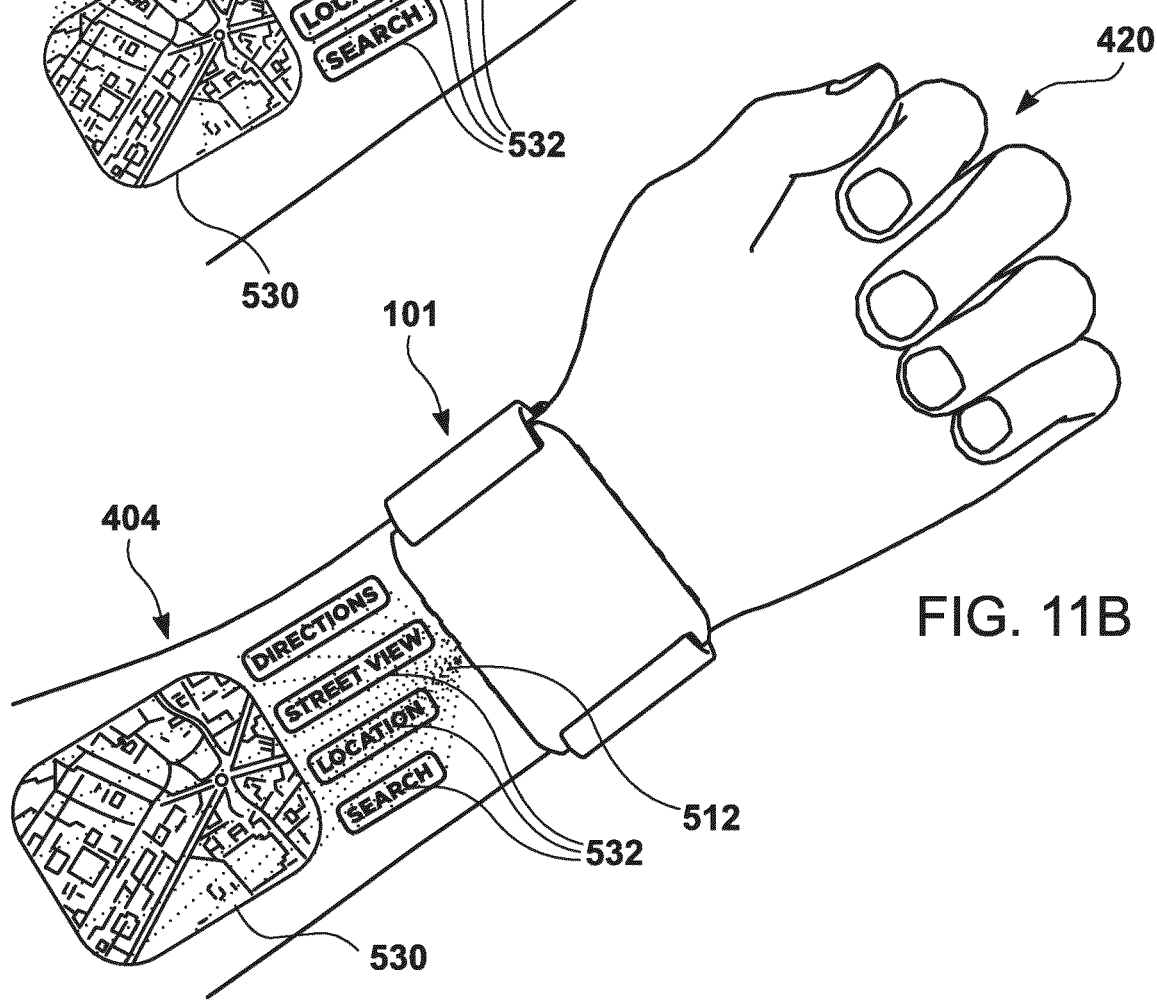
Figure 12A:
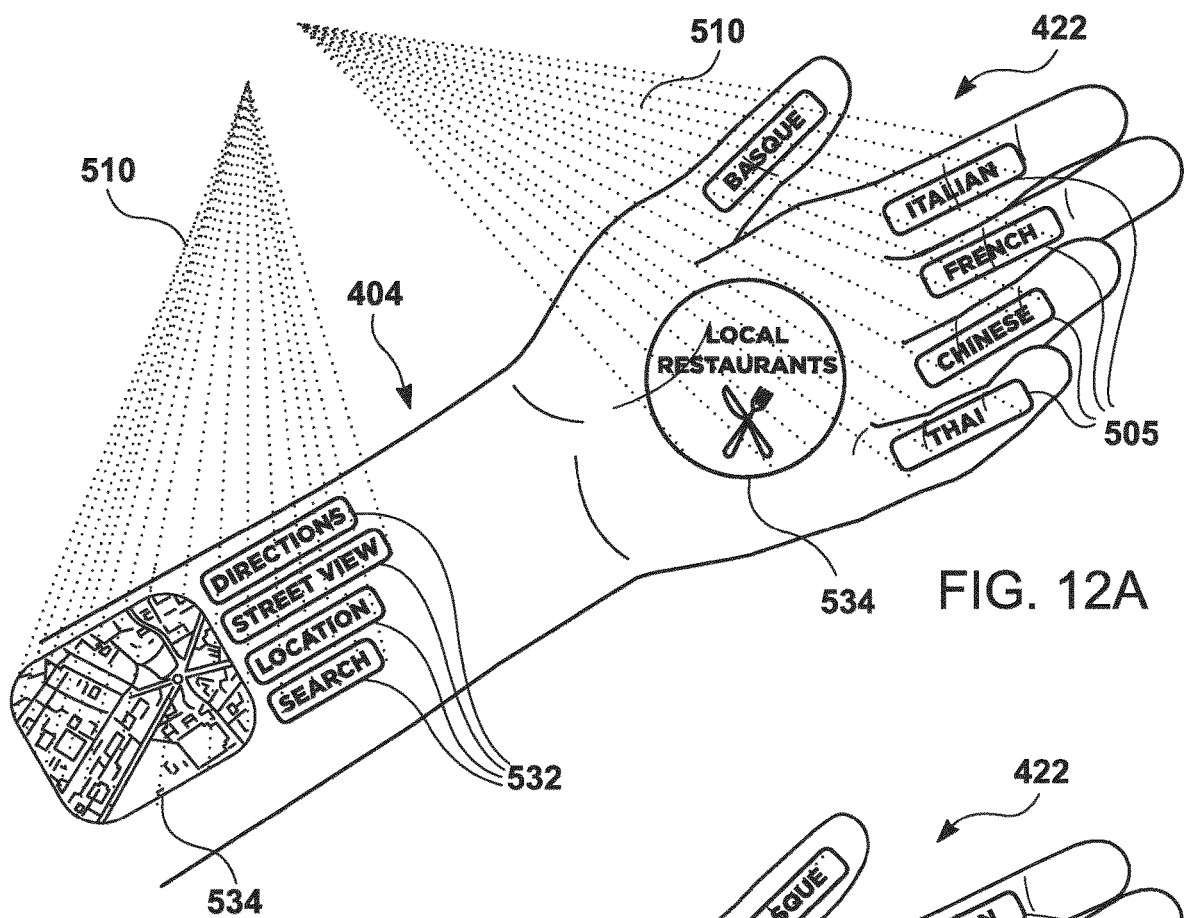
FIG. 12A-12B illustrates how a illustrates how display content can be projected from a variety of sources for both a main display and related display.
Figure 12B:
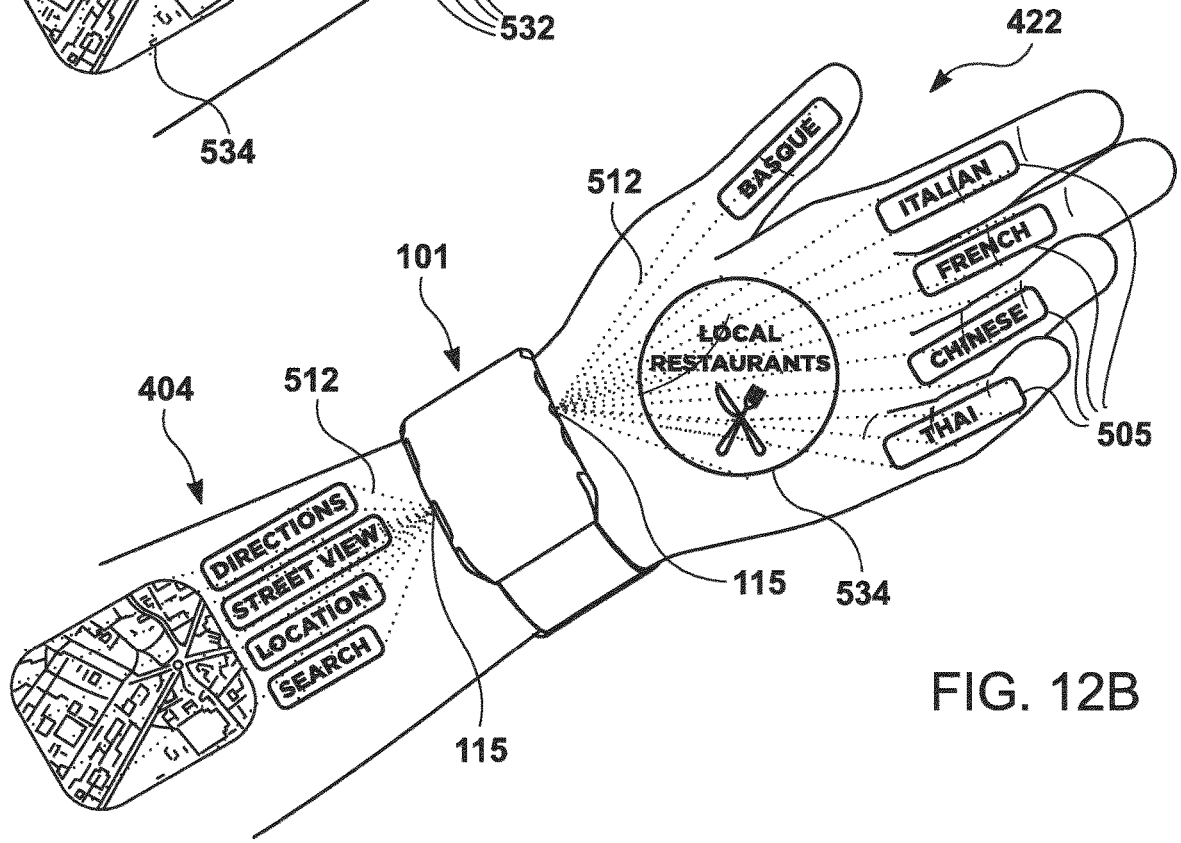

Referring to FIG. 11, an AGUI system may consist of a number of AGUI devices that are networked together. A wrist mounted AGUI device 101 may be used together with an external AGUI device to implement a user interface 530, 532 on a user's arm 404. Whether the AGUI system may choose to use the wrist mounted AGUI device 101 or an external, remote projector 510 to project the content onto the user's arm 404. It can be observed that since the user's hand is in the shape of a fist, the areas on the palm and fingers are not available as display objects. FIG. 12 shows how the AGUI system adapts when the user then opens their hand 422. Now the AGUI system detects their palm and finders as potential and decides to use them as display surfaces 534, 505. The AGUI system may use either the wrist mounted AGUI device 101 or a remote projector to project any of the display surfaces independently.

Figure 13A:
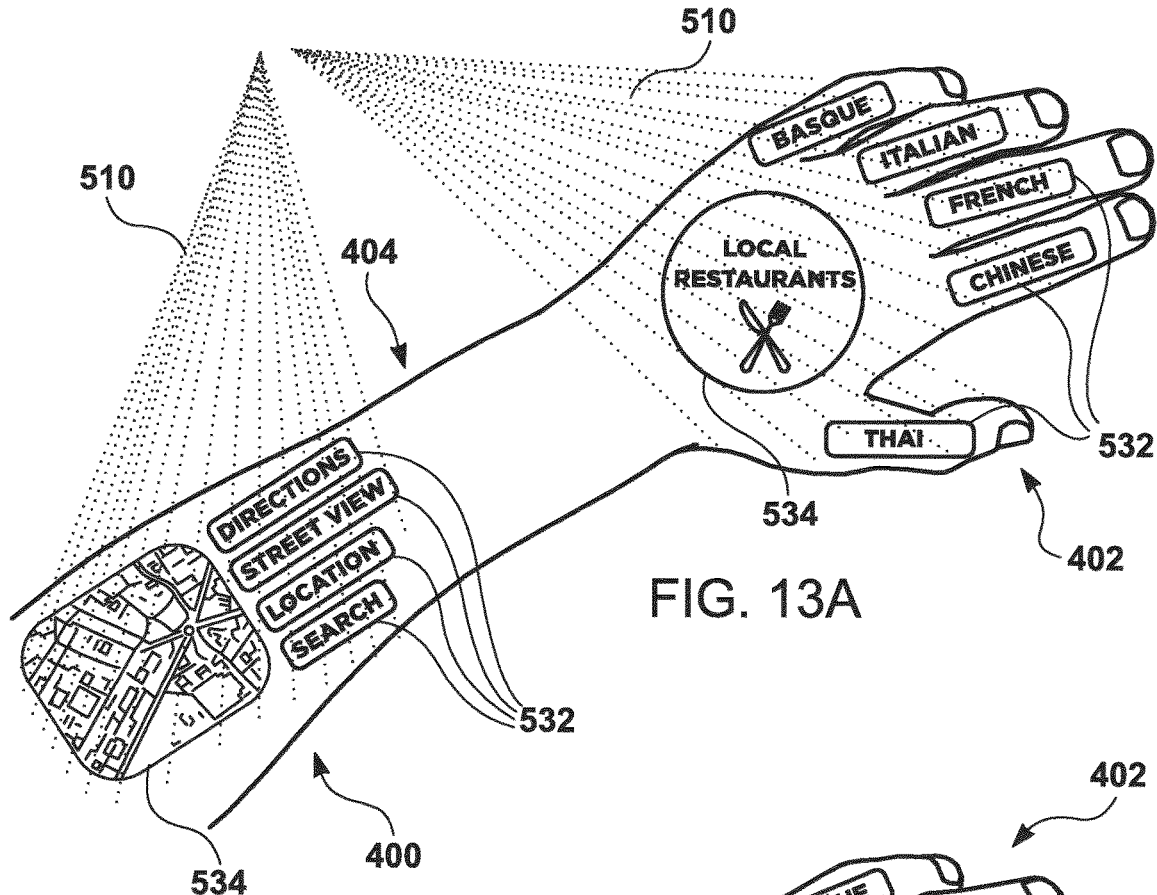
FIG. 13A-13B illustrates how display content can be projected from a variety of sources for both a main display and related display. Additionally, there is a third active display on a wrist mounted AGUI device.
Figure 13B:
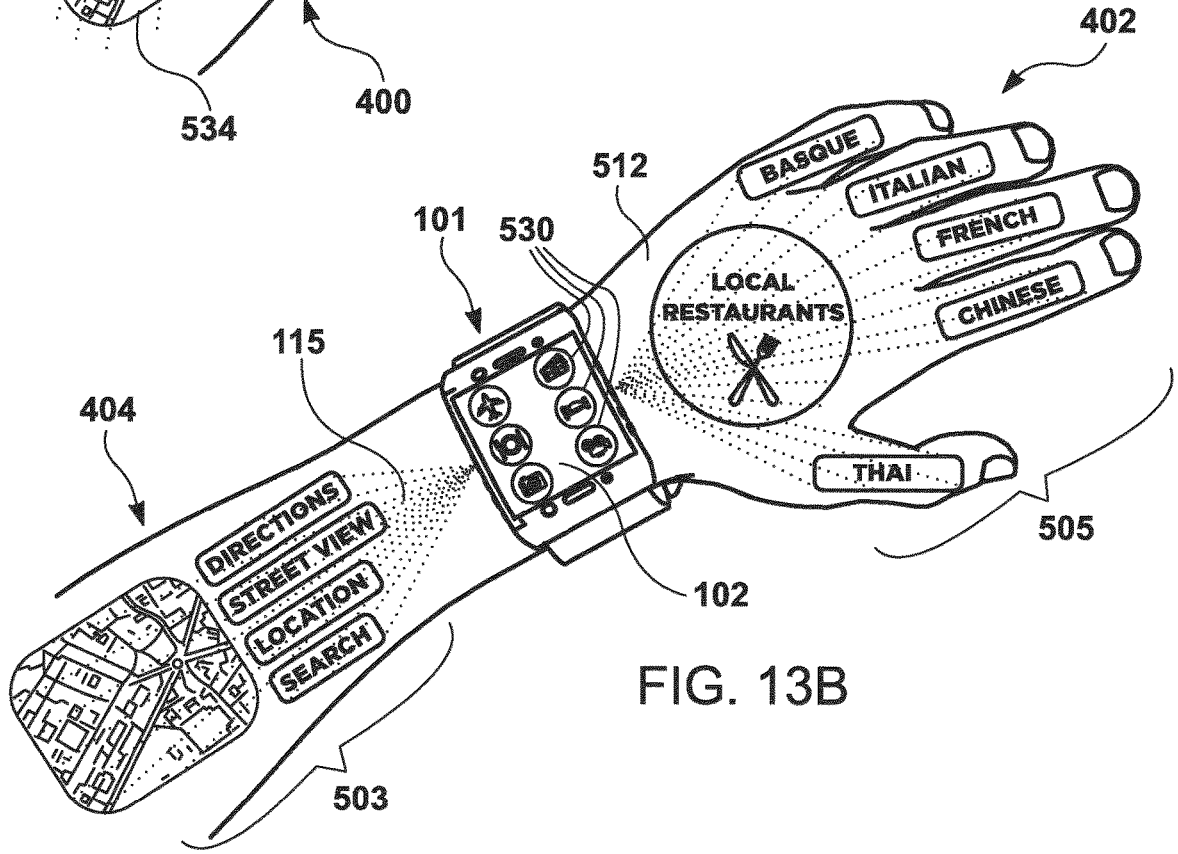

FIG. 13 illustrates how the addition of a wrist mounted AGUI device 101 provides and additional display screen 102 that allows the AGUI system to display additional information.

Figure 14A:
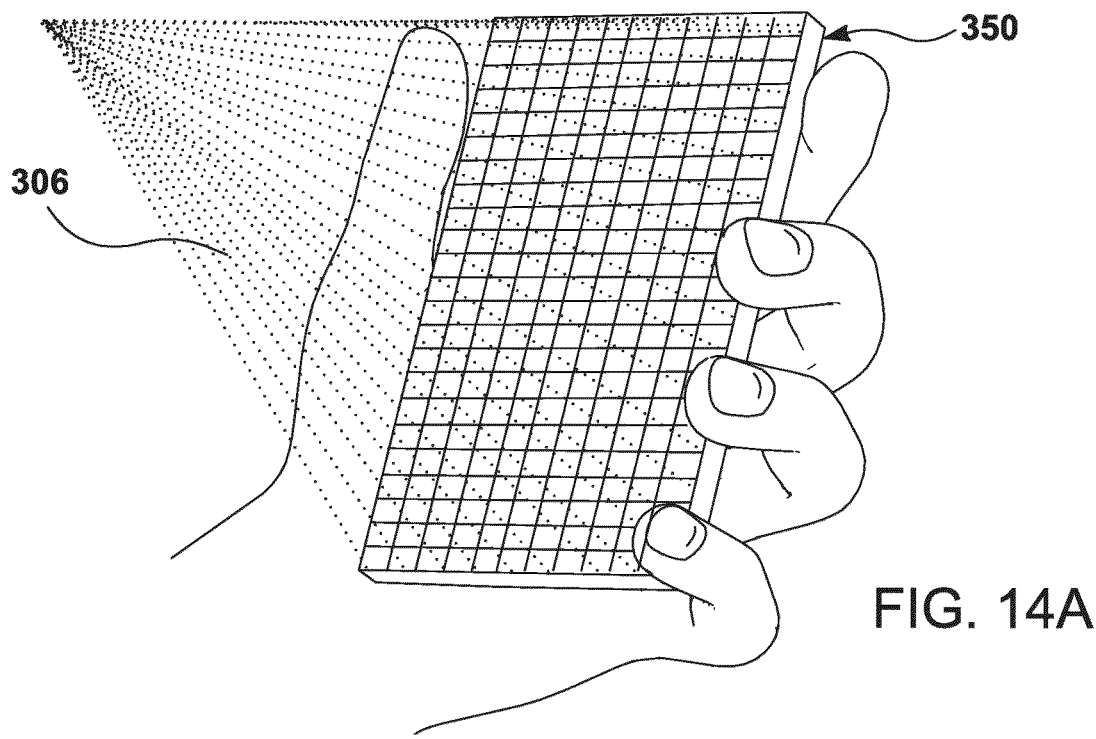
FIG. 14A-14B illustrates how an external AGUI device may use a handheld object can be detected and used as a display surface.
Figure 14B:
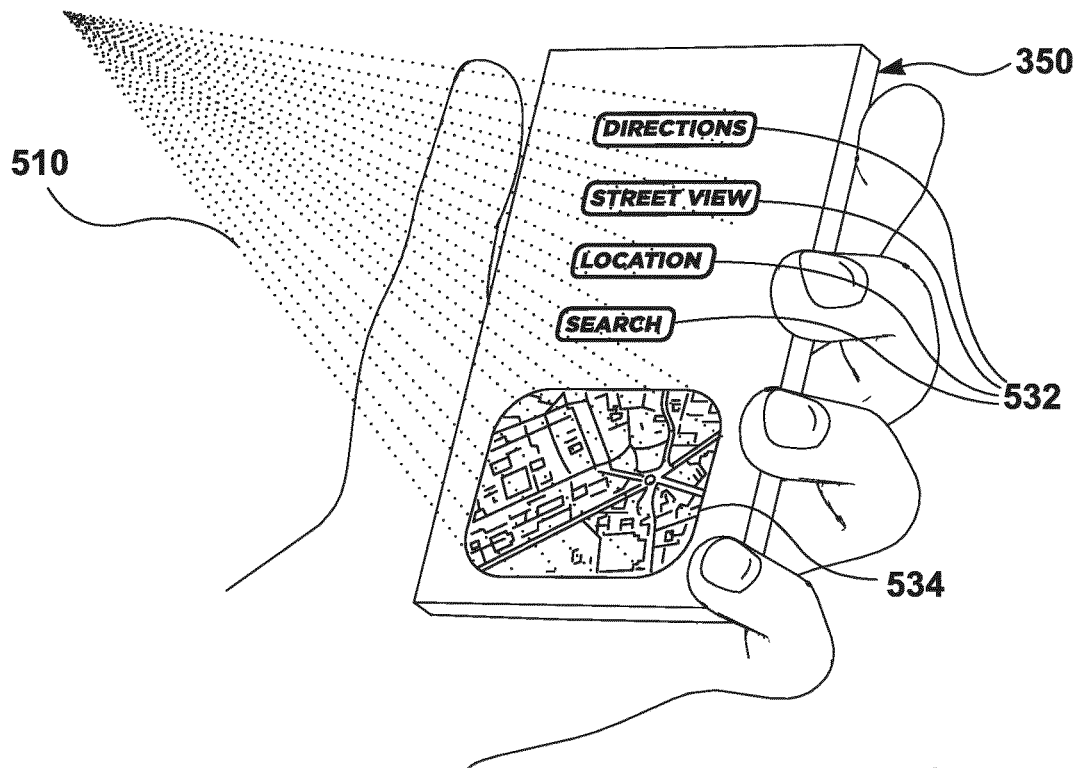

Referring to FIG. 14, an AGUI system may also be used with a passive display object 350. In this example, a rectangular slab is held by the user. The AGUI detects the presence of the slab as well as its position and extents. The slab may be composed of a particular material and have a texture or color that is amenable as a display surface. The slab may be passive or may incorporate sensors and electronic components that allow it to communicate with the AGUI system and report to the system its location, movement parameters, and orientation. This form of electronic slab may contain an identifier or a set of parameters that allow the AGUI to obtain a set of predetermined optimal display parameters to be used when projecting on it. It may also include other environmental sensors that measure the like levels, temperature and other factors that may affect the operation of the AGUI system.

Figure 15A:
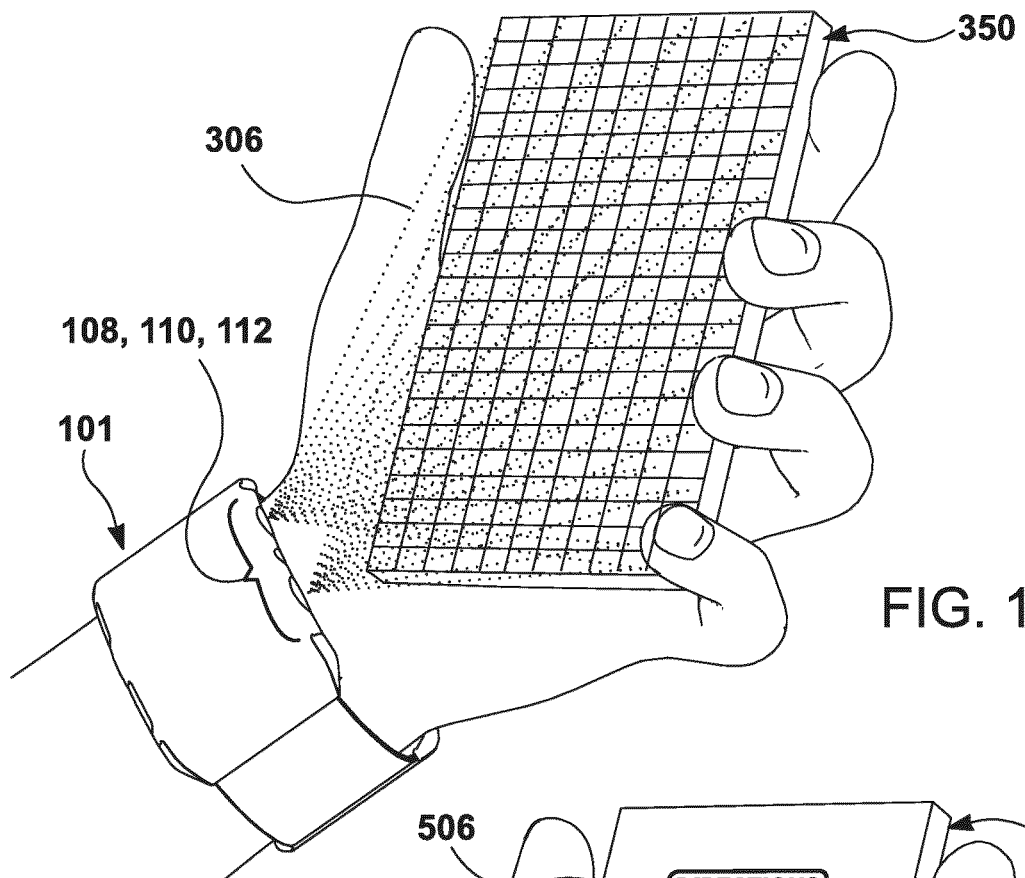
FIG. 15A-15B illustrates how a body mounted AGUI device may use a handheld object can be detected and used as a display surface.
Figure 15B:
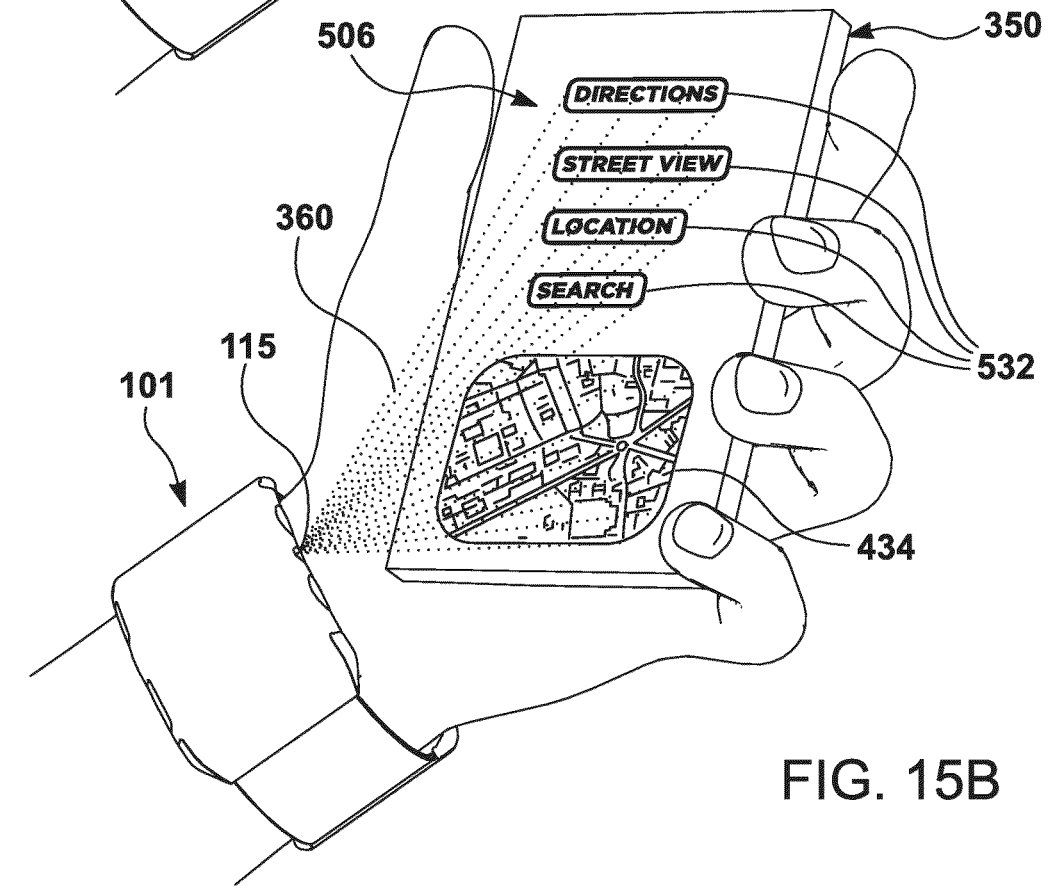

FIG. 15 shows a similar embodiment of the present technology except that the AGUI system here is a wrist mounted device 101 that detects and projects 360 onto the slab.

Figure 16A:
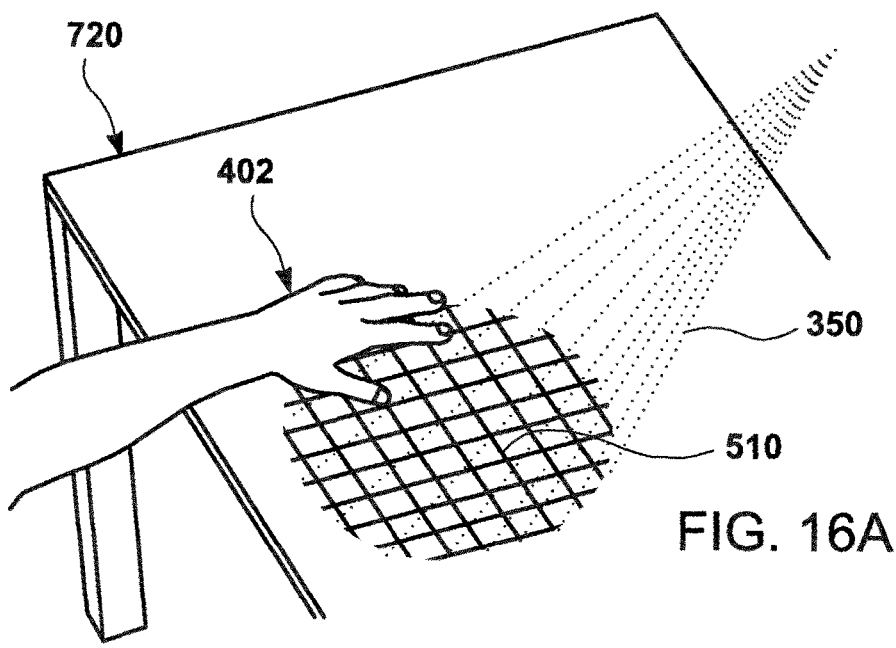
FIG. 16A-16B illustrates how an AGUI device may detect and use a horizontal surface as a display surface.
Figure 16B:
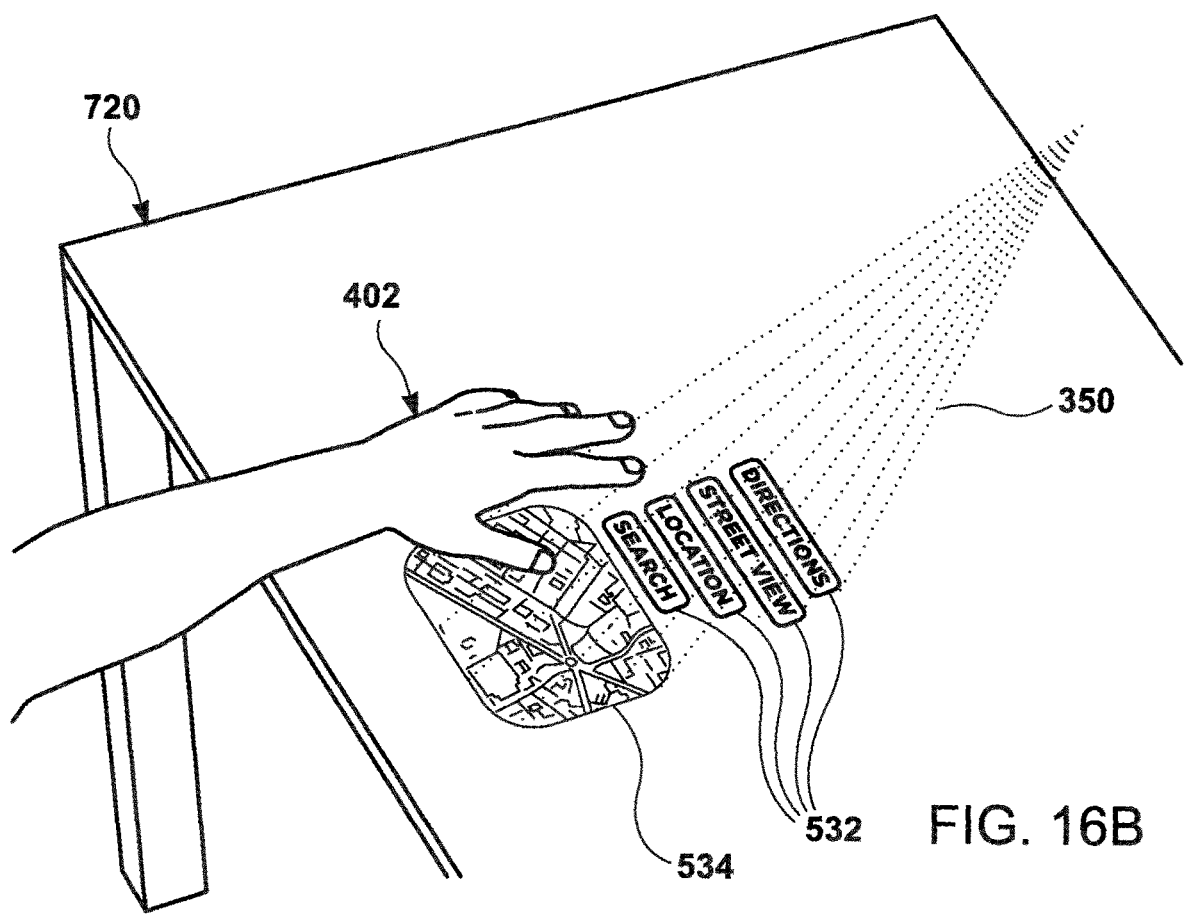

FIG. 16 illustrates a similar interface but where the slab is replaced with a table 720, desk, or similar horizontal surface. The table may be preregistered with the AGUI system which may be done by dynamically detecting a flat surface with a color and texture that makes it a good candidate or a display surface, or it may be chosen by the user and remembered as a preference or as having been used the last time. Gestures may be employed by the user to indicate the exact position and size of the area of the table to be used as a display. The AGUI system may also be used with a passive display object and/or depth mapping & imaging of an object 350 that can project interactive multimedia content 510 from remote projector, interactive tabs/menu items 532, and/or interactive multimedia content 534.

Figure 17A:
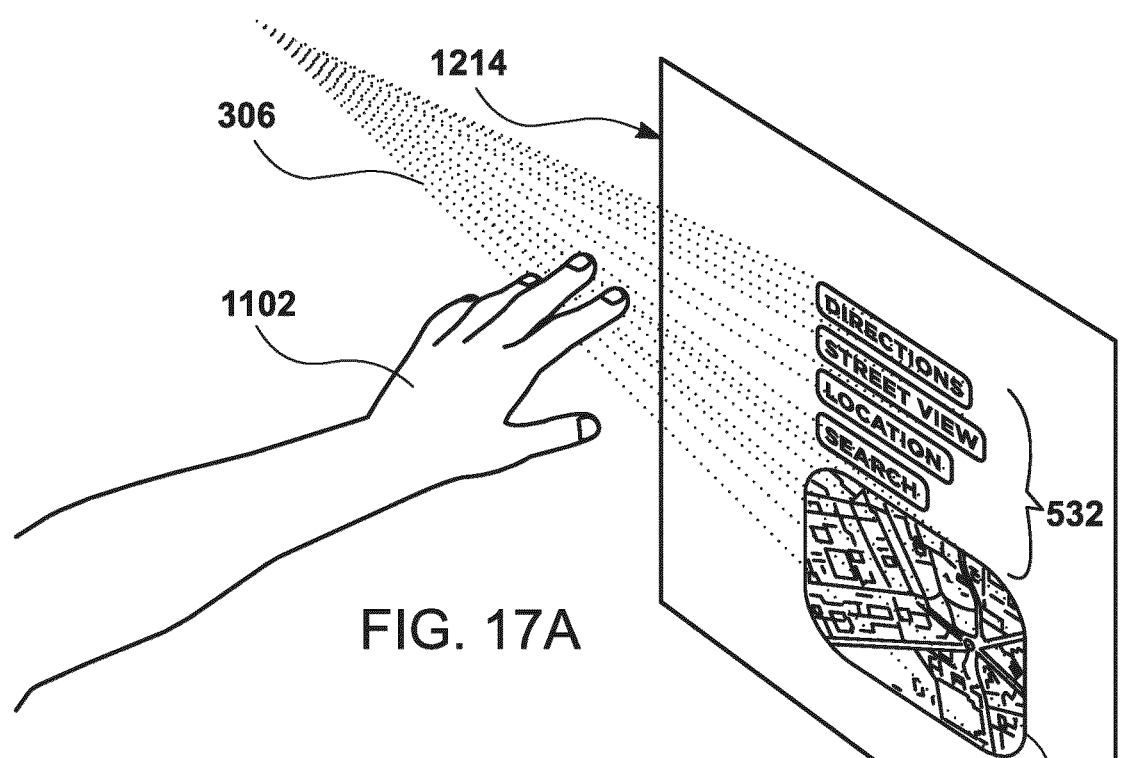
FIG. 17A-17B illustrates how an AGUI device may detect and use a vertical surface as a display surface and how gestures or touch can be used to manipulate the GUI.
Figure 17B:
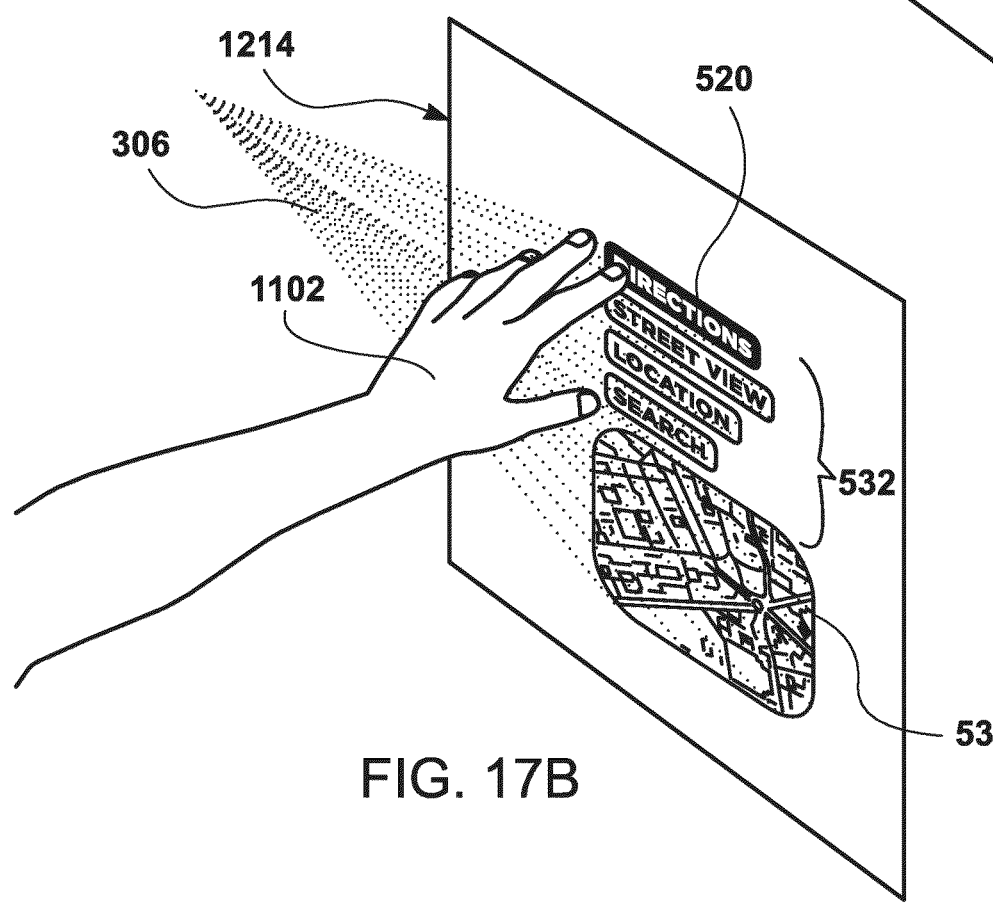

FIG. 17 shows a similar embodiment except that the display surface is a vertical surface 1214. The vertical surface may be a wall, the front panel of an appliance, or suitably treated transparent glass or plastic panel. The user may use their hand 1102 to make gestures or to touch the GUI elements 520 projected onto the surface 1214 to control the system. Alternatively, vertical surface 1214 may be capacitive or resistive touch sensitive and detect the user's touch.

FIG. 18 illustrates an embodiment of the present technology comprising AGUI enabled wearable devices and AGUI enabled eye glass and ear phones. The user 1002 is shown wearing a jacket with an AGUI device attached or included in the form of a lapel pin 130. In FIG. 18C an AGUI enabled ear piece 150 is also included and is in communication with the lapel pin 130. An imaging sensor and projector which may be incorporated into either the lapel 130 or earphone 150 and, either on their own or working together, can perform the detection, processing, projection, and display functions characteristic of an AGUI system. The system allows for virtual or augmented reality applications where a virtual object 714 is projected onto the user's hand 402 and may be manipulated in space by the user 1002. It can be appreciated that the AGUI enabled wearable devices can be a head mounted device.

Figure 19A:
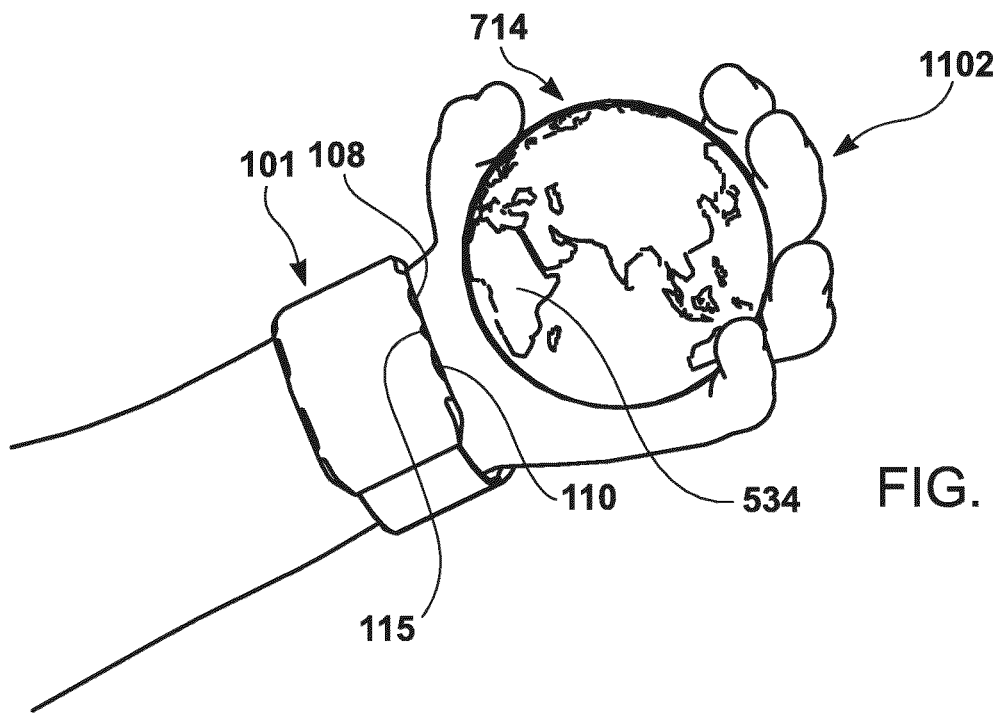
FIG. 19A-19B illustrates how an AGUI system can project two different interfaces on the same object.
Figure 19B:
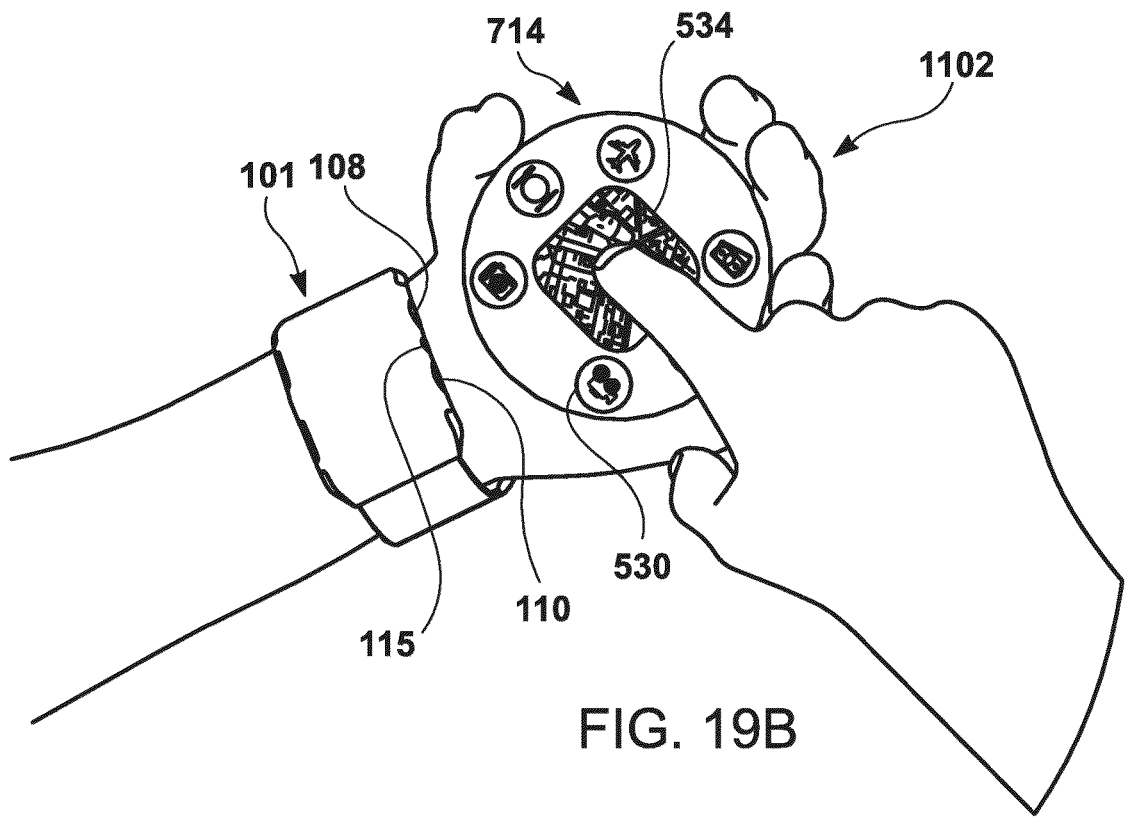

FIG. 19 illustrates how the AGUI system can track and project images onto objects being manipulated by a user. In the example given, the user holds a ball 714 in their hand 1102 and the AGUI system 101 projects interactive multimedia content, in this case an image of a globe 534 on the ball. The AGUI device 101 can also update the image to show a display surface 534 and control icons 530 that may be used to implement a game or other computer application.

The image projected may also when the user holds the ball 714 so that it is detectable and is viewable by the AGUI system 101, the globe is projected on the ball. Note that in an AGUI system with multiple projectors, as long as one projector has a line of sight to the ball 714, the globe may be projected on it. Alternatively, the ball itself may be an active device that can connect to the AGUI system using wireless networking protocols and have the ability to project the globe image on itself. The ball may also include sensors to communicate, position, velocity, and orientation in three dimensions as a user throws it. Portions of the ball may be obscured by the hand and the projector in the wrist mounted AGUI device may be unable to project onto it. The AGUI device will detect what portion of the ball is visible by its projector and project only onto the visible portion. Though a ball 714 is shown, any other tool, sports, or game device may also be used in a similar manner.

Figure 20A:
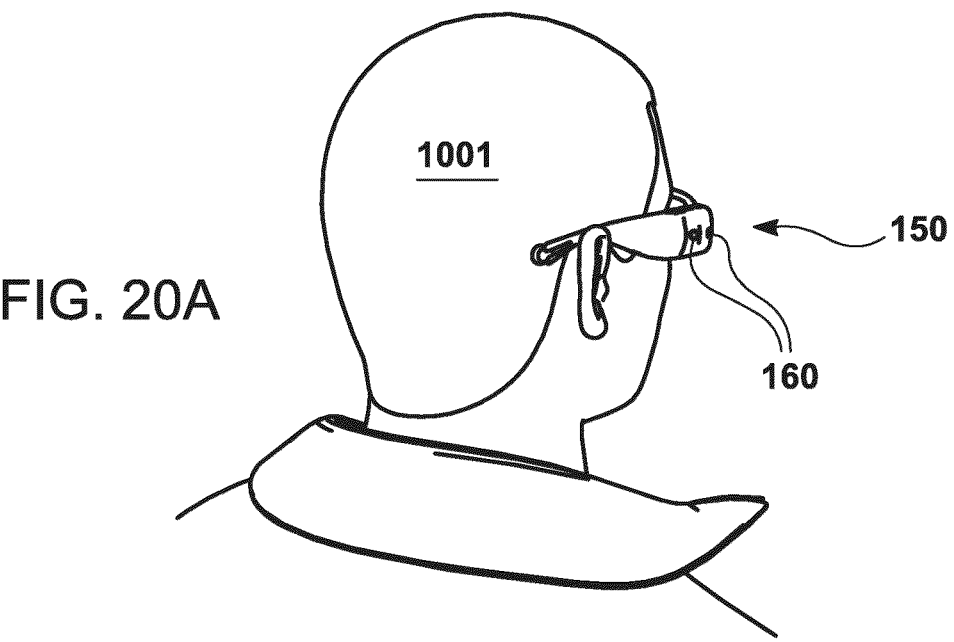
FIG. 20-A20-B illustrates AGUI enabled glasses that provide a heads-up binocular display.
Figure 20B:
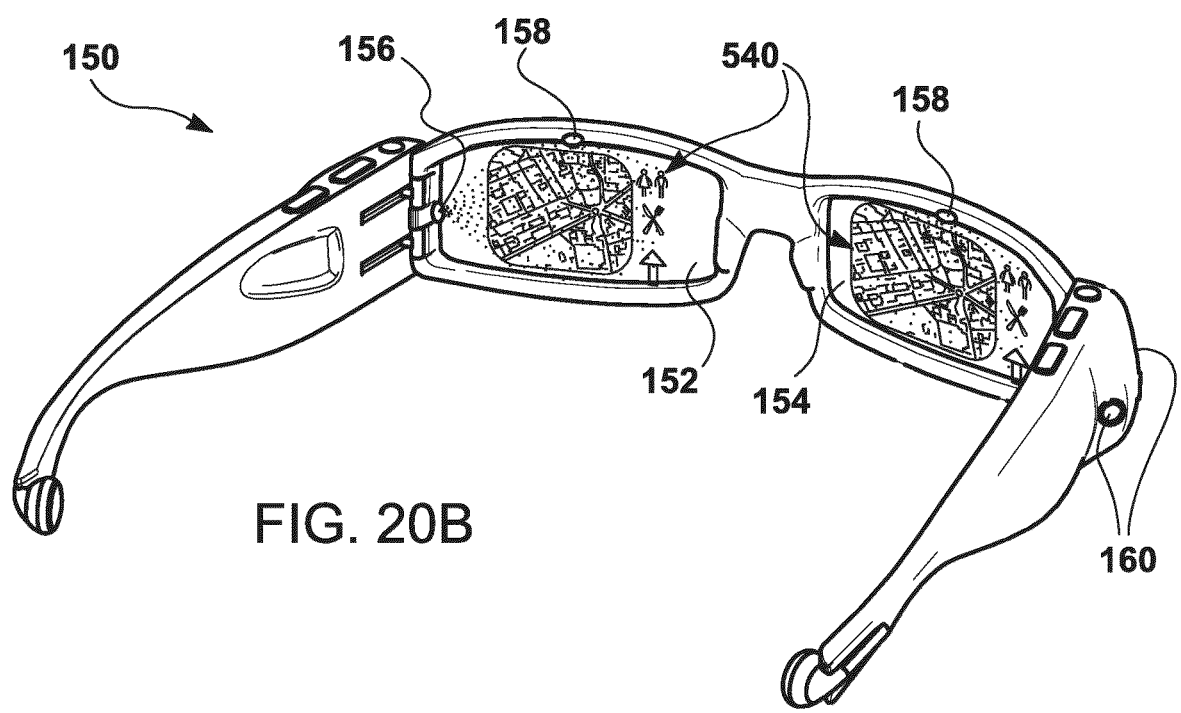

FIG. 20 shows an embodiment of an AGUI system comprising an AGUI device incorporated into eye glasses, headset, or other head mounted device 150. The arms or body of the eye glasses contain both sensors, including cameras 160, to sense the environment, processing and networking hardware, and projectors 156 to project a display on one or both lenses 156. Eye facing cameras 158 may be used for eye tracking and the results can be used to optimize the heads-up display or to provide context sensitive information based on that the wearer is viewing. The resulting heads-up display may include display surfaces 154 as well as control interfaces 540.

As best illustrated in FIG. 20, in some embodiments, the AGUI system Control buttons and/or speakers can be included on one or both of the arms.

Figure 21A:
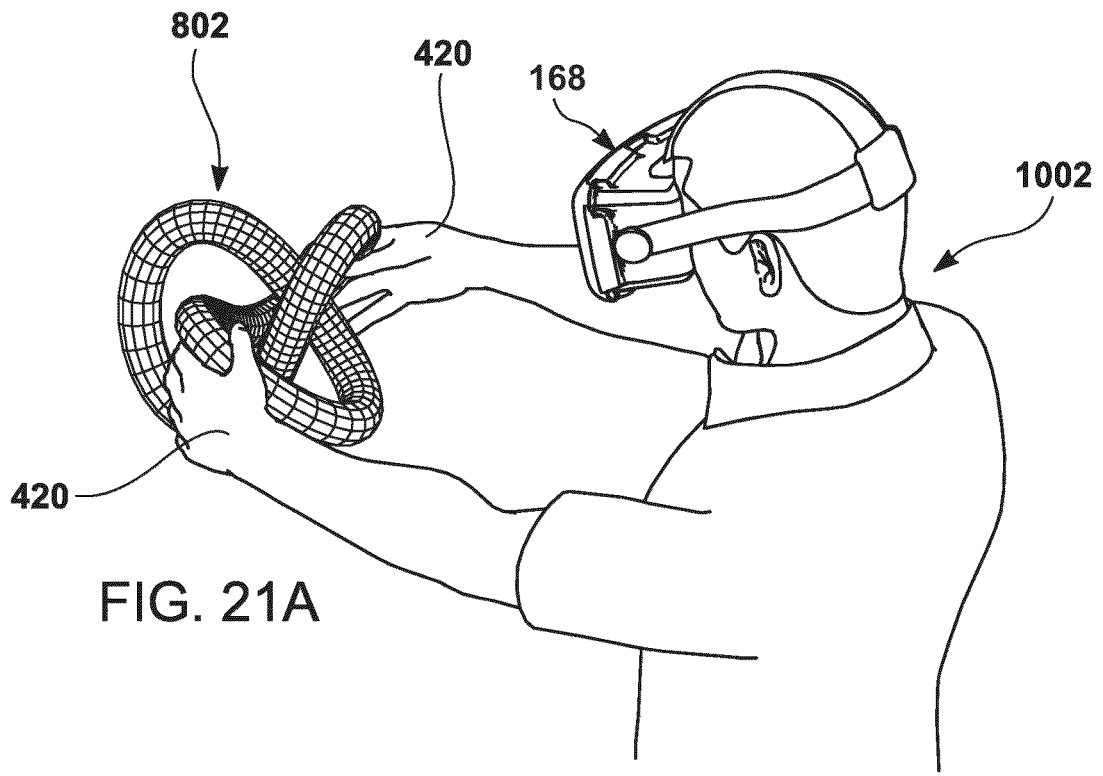
FIG. 21A-21B illustrate the use of an AGUI virtual reality headset being used to manipulate a virtual object using multipoint controls in space.
Figure 21B:
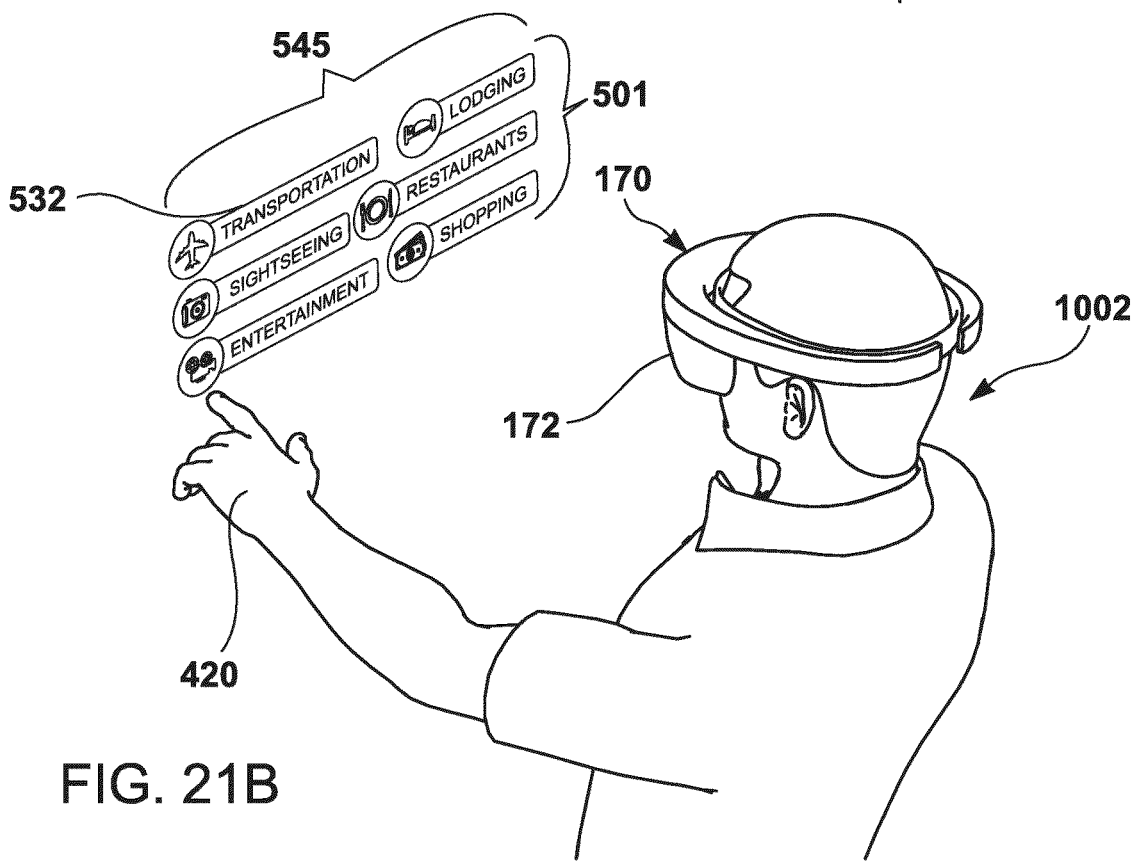

FIG. 21 shows how an AGUI system comprising a virtual reality (VR) or augmented reality (AR) headset 168 can be used for the visualization and manipulating of virtual objects 802 using multipoint control in space. In these embodiments, the user can use their hands to manipulate and control a virtual 2D or 3D object in space. FIG. 21B shows a user 1002 using an augmented reality headset 170 with an augmented reality visor 172 that is part of an AGUI system. An augmented user interface 545 and controls is viewed in the user's field of view is augmented and may be controlled using eye tracking, hand 420 gestures, and other techniques as known in the art.

Figure 22A:
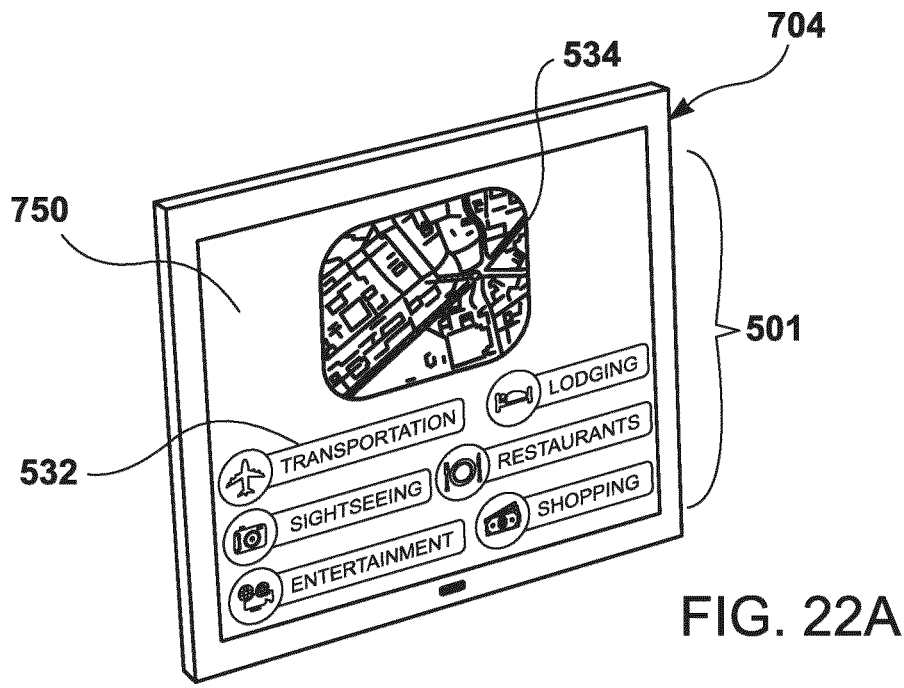
FIG. 22A-22B illustrate how an AGUI system may adapt display elements to the shape of surface.
Figure 22B:
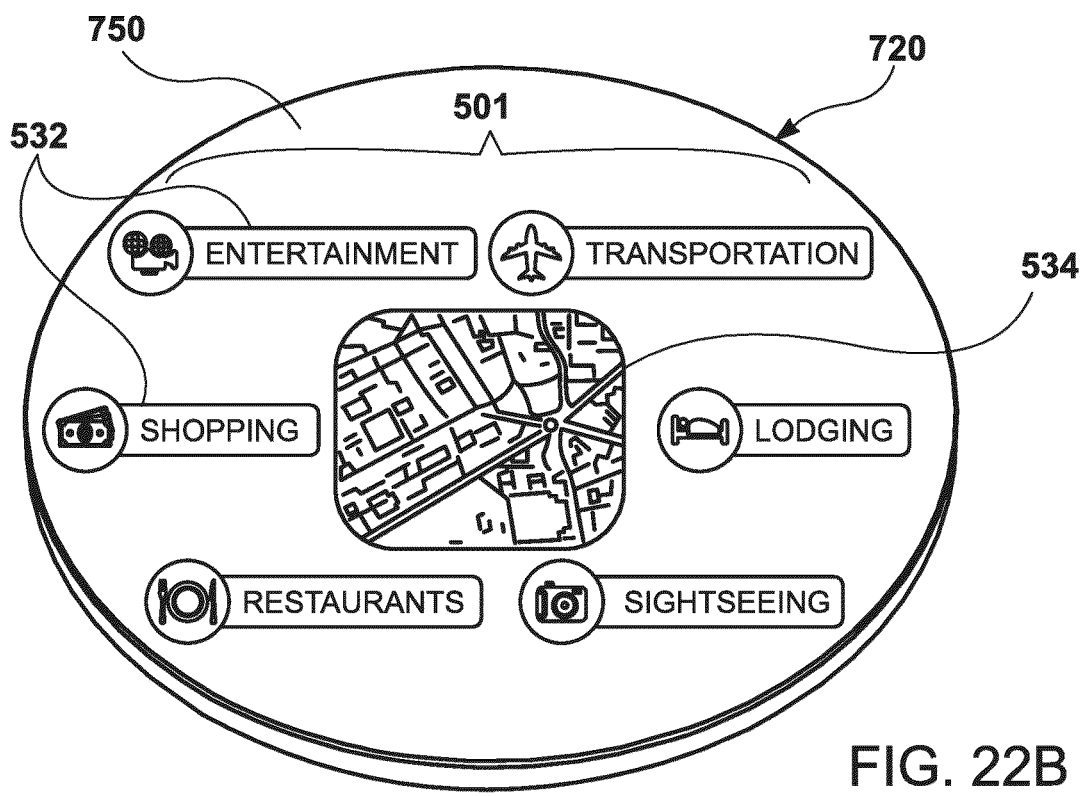

FIG. 22 illustrates how the AGUI system may adapt the layout of the information it is displaying based on the shape of a display surface. When utilizing a square 704 or rectangular display the display elements, the rectangular map view 534 and the labelled buttons 532 are laid out with the map on top and the buttons below in a grid like arrangement suited for a rectangular display. In the circle or oval display 720, the map 534 is now positioned in the center with the labelled buttons 532 placed around them in a circle, making better use of the available space. During use, the AGUI system may change the displays used or the shape of the display and may dynamically change the layout of displayed information to make better use of the display shape or in accordance with program or user preferences.

FIG. 23 illustrates similar concepts where the AGUI system implements a responsive display that adapts the display layout based on the size of screen available when using a laptop computer 704 or tablet versus a cellular phone 706. Also illustrated is the dynamic adjustment of layout optimized for different shaped small screened devices such as wrist watches 708.

Figure 24A:
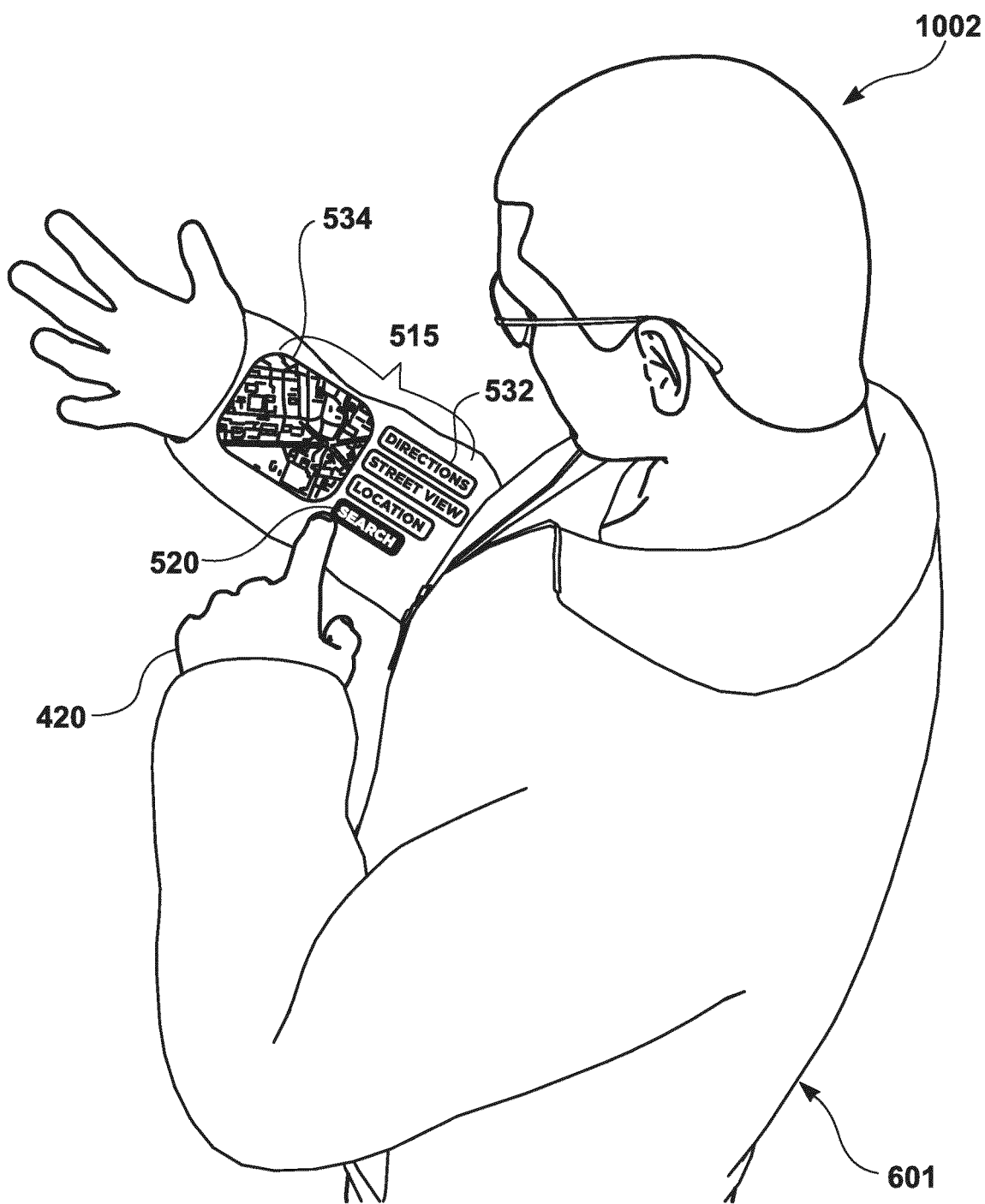
FIG. 24A-24B illustrates how an AGUI system may use clothing with organic flexible display elements embedded in fabric as a display.
Figure 24B:
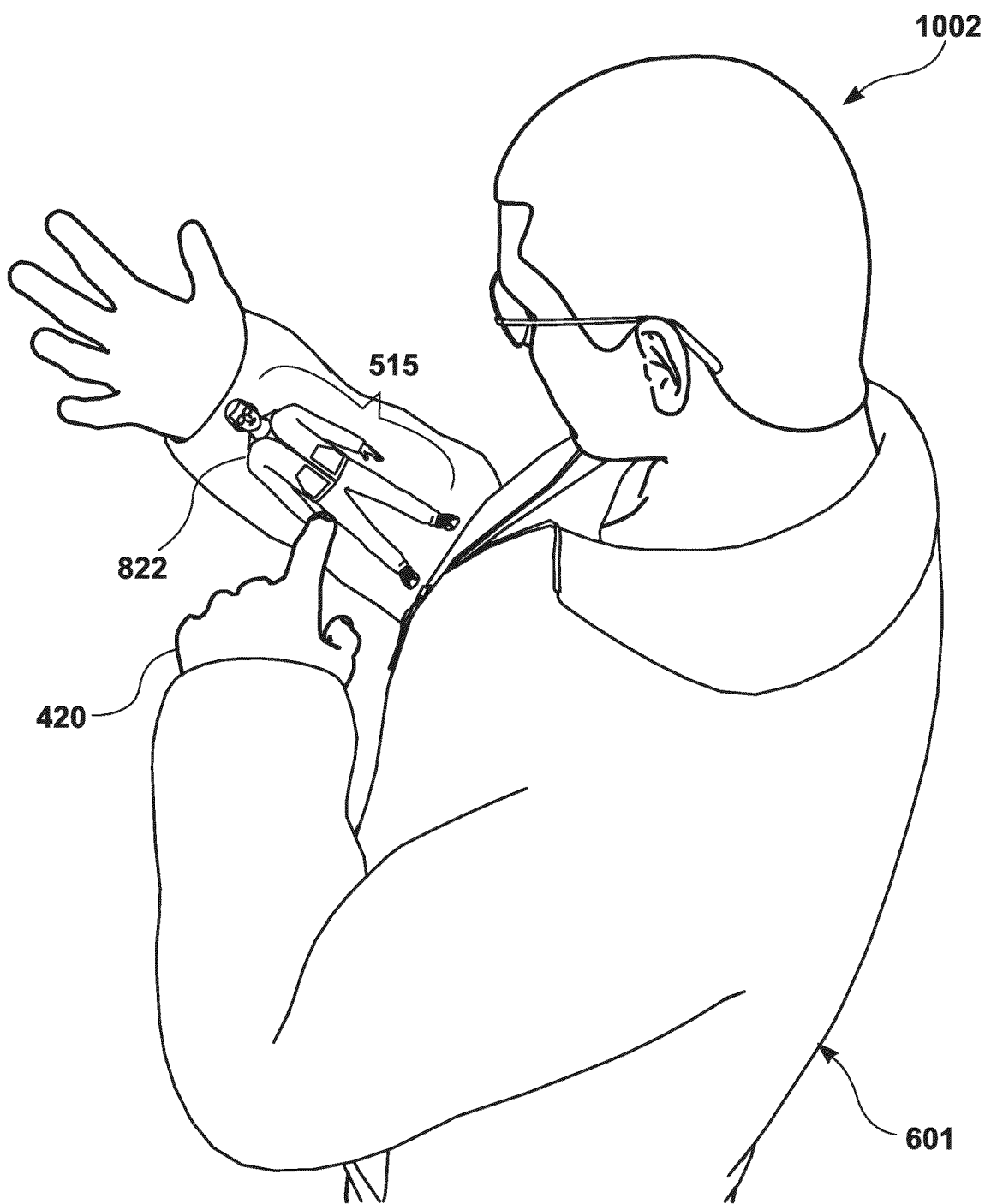

FIG. 24A illustrates a garment 601 incorporating display fabrics according to another embodiment of the present technology. The garment 601 shown includes an active display area 515 including display elements 534 and control elements 520. The display elements may be a matrix of illuminated threads or individual embedded picture elements and may use organic display elements based on OLED technology. Each picture element may also comprise a position sensor that is used by the AGUI system to determine the optimum display parameters from the point of view of the viewer. Display elements that are hidden by folds of the cloth may be turned off. Indirectly viewed elements may be displayed more brightly and directly viewable elements may be displayed less brightly to produce the overall effect of a uniform brightness display. As the cloth moves, the AGUI system may detect this and adjust the brightness, color, or other display parameter to dynamically produce a uniform display as the cloth moves. The user 1002 may select a control interface, such as a menu item 520 which can cause the display 515 to update to initiate a programmed event. FIG. 24B illustrates and embodiment where the user 1002 has an AGUI enabled jacket 601 where the user is able to view an image 515 in the fabric and control the AGUI jacket itself by selecting features on the image 515. The AGUI jacket may detect user's selection using resistive or capacitive embedded sensors in the fabric or a lapel, head mounted or externally mounted AGUI system, networked to the AGUI jacket, may detect the location of the user's hand 420 making control gesture or movements.

Figures 25A, 25B, 25C:
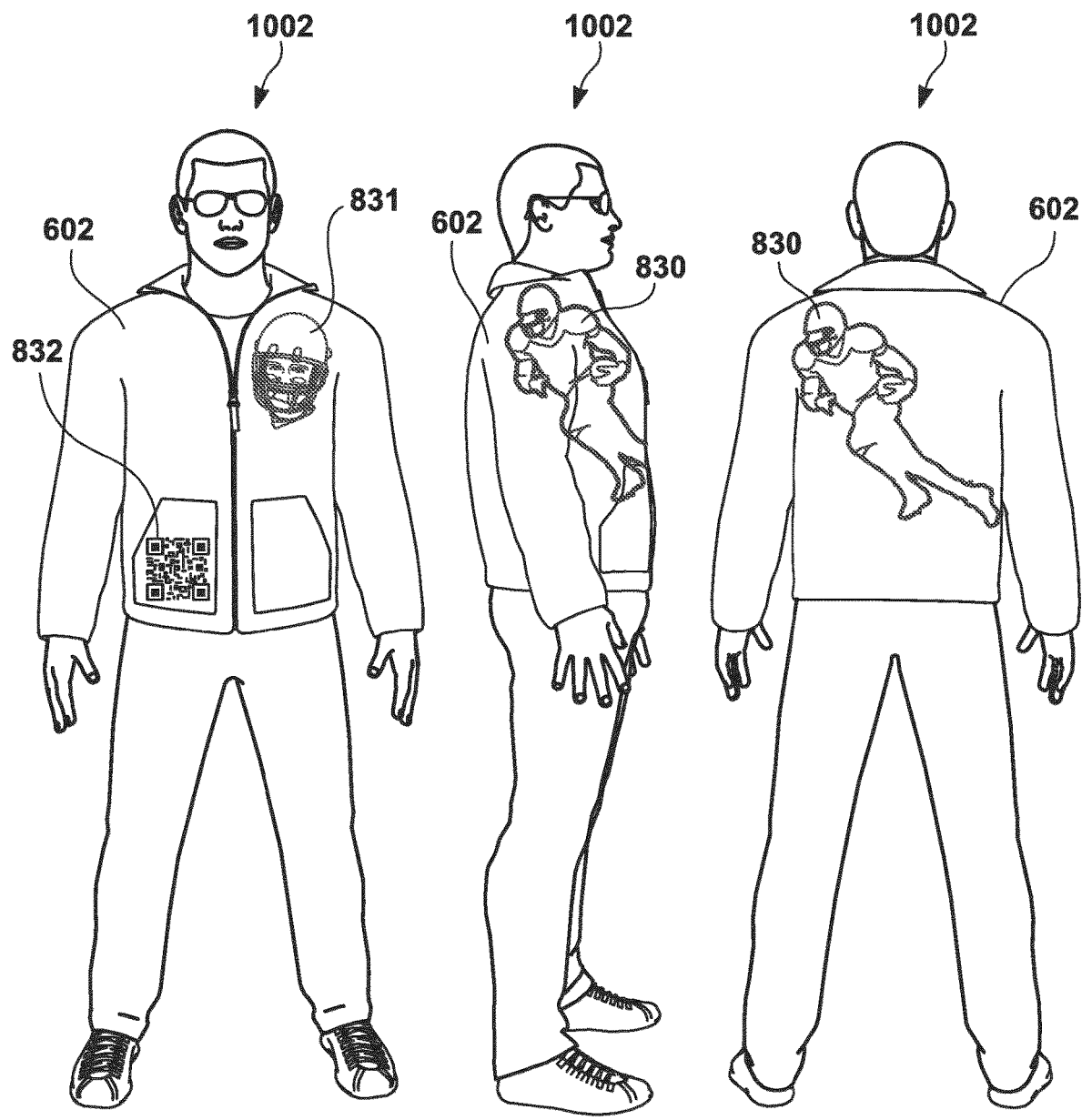
FIG. 25A-25C illustrates another example of the use of clothing with organic flexible display elements embedded in the fabric as a display.

FIG. 25 shows additional examples of an AGUI system using a garment incorporating an active display. Different which may implement a virtually reality sound system including displays on the front, back, and side of the garment. Display elements such as QR codes 832 can also be displayed for advertising applications.

Figures 26A, 26B, 26C:
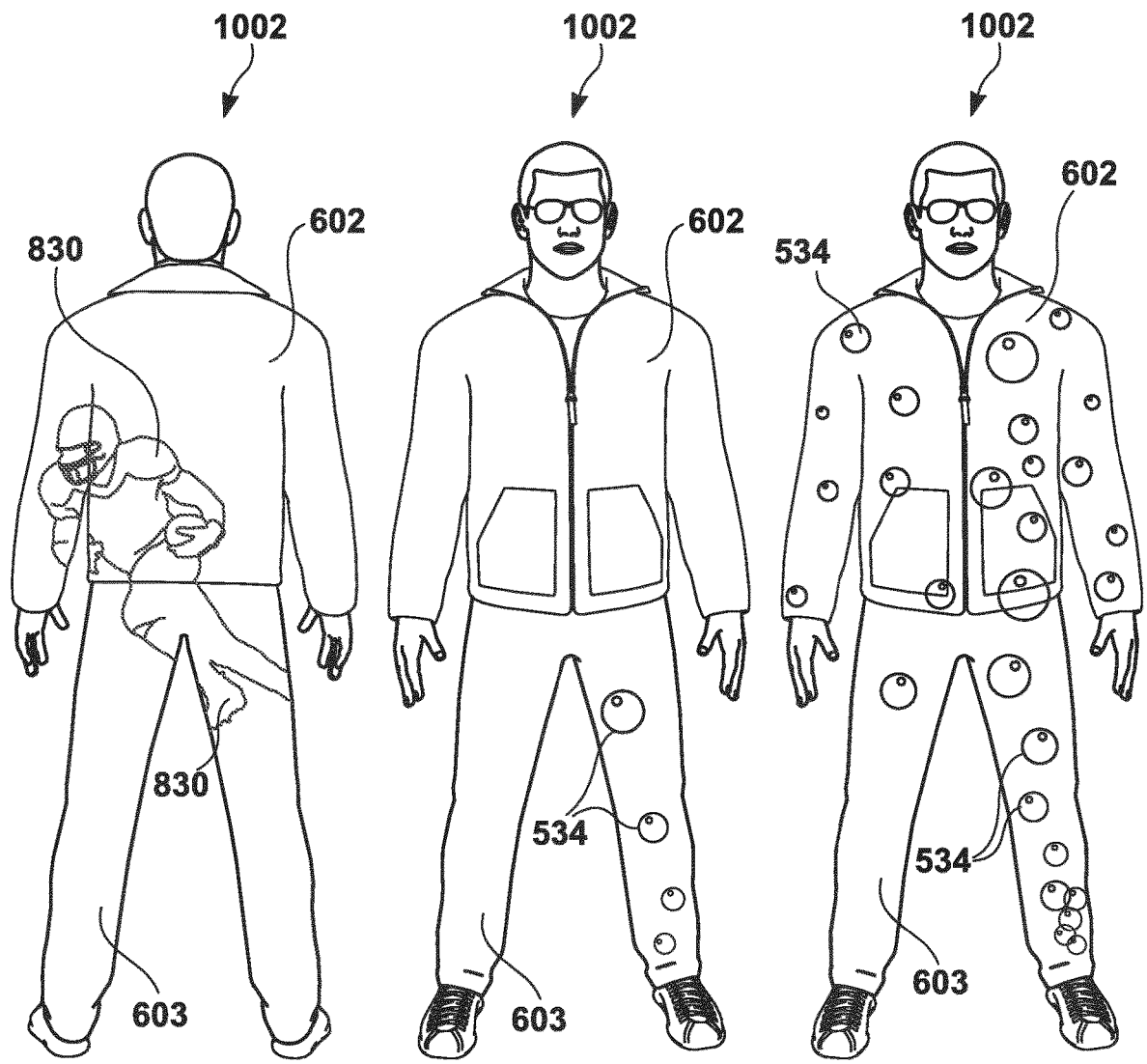
FIG. 26A-26C illustrates an example of the use of clothing with organic flexible display elements embedded in the fabric as a display where the individual clothing pieces are used together to present an individual display.

FIG. 26 illustrates how multiple AGUI enabled garments, in this case a jacket 602 and pants 603, may be networked and work together as a single AGUI system. As they are work together and will be used in close proximity to each other, the two garments may be networked using short range wireless protocols such as Bluetooth, as well as other networking protocols. When used together, the images displayed may be independent of each other but may also span the two garments and act as a single display.

Figure 27:
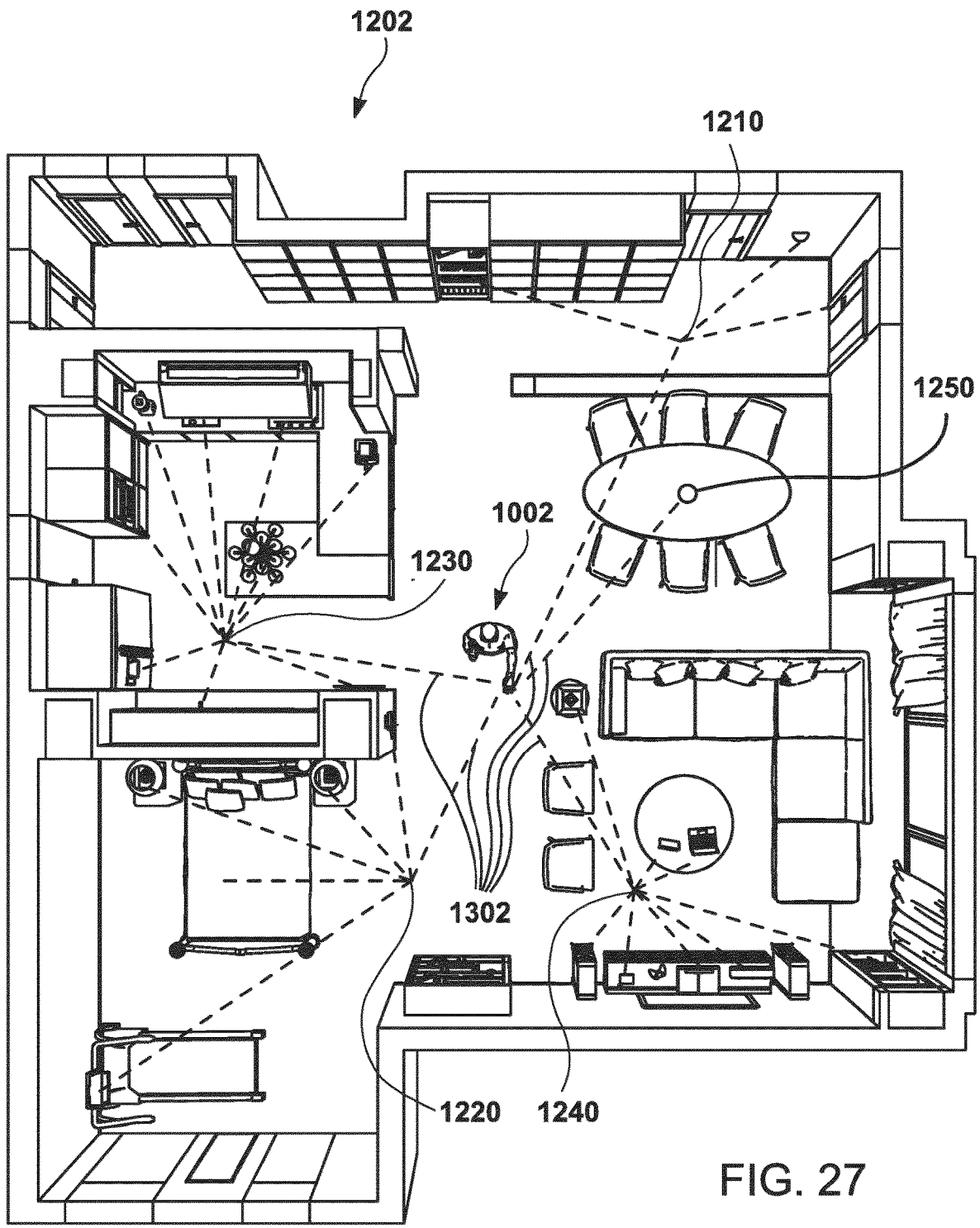
FIG. 27 illustrates multiple AGUI devices networked in an environment, detecting and interacting with a user in real time.

FIG. 27 illustrates the operation of an AGUI system as a user moves through an AGUI enabled environment 1202. The AGUI system comprises several AGUI devices positioned throughout the house and may include additional AGUI devices on the user. The AGUI system may also act as a home hub to control appliances, HVAC system, doors, locks, curtains, blinds, lights, security systems, and any other IoT (Internet-of-Things) enabled devices. There may also be active AGUI enabled displays such as laptops, cellphones, tablets, television, etc. AGUI devices may also be incorporated into active displays. The networked AGUI system maps out the environment in 3D 1202 including the user. As a user 1002 moves throughout the environment the AGUI system detects their location, field of view, velocity, acceleration, etc. and determines what AGUI displays are viewable by the user. The AGUI system dynamically determines the best displays to use as the user moves about the environment. The user may use gestures to indicate display preferences, including the size and shape, and also use gestures and traditional computer input methods to interact with the system.

As best illustrated in FIG. 27, in some embodiments, the environment 1002 can be, but not limited to, a building including an entry way 1210, a bedroom 1220, a kitchen 1230, a living room 1249 and/or a dining room 1250.

Figure 28A:
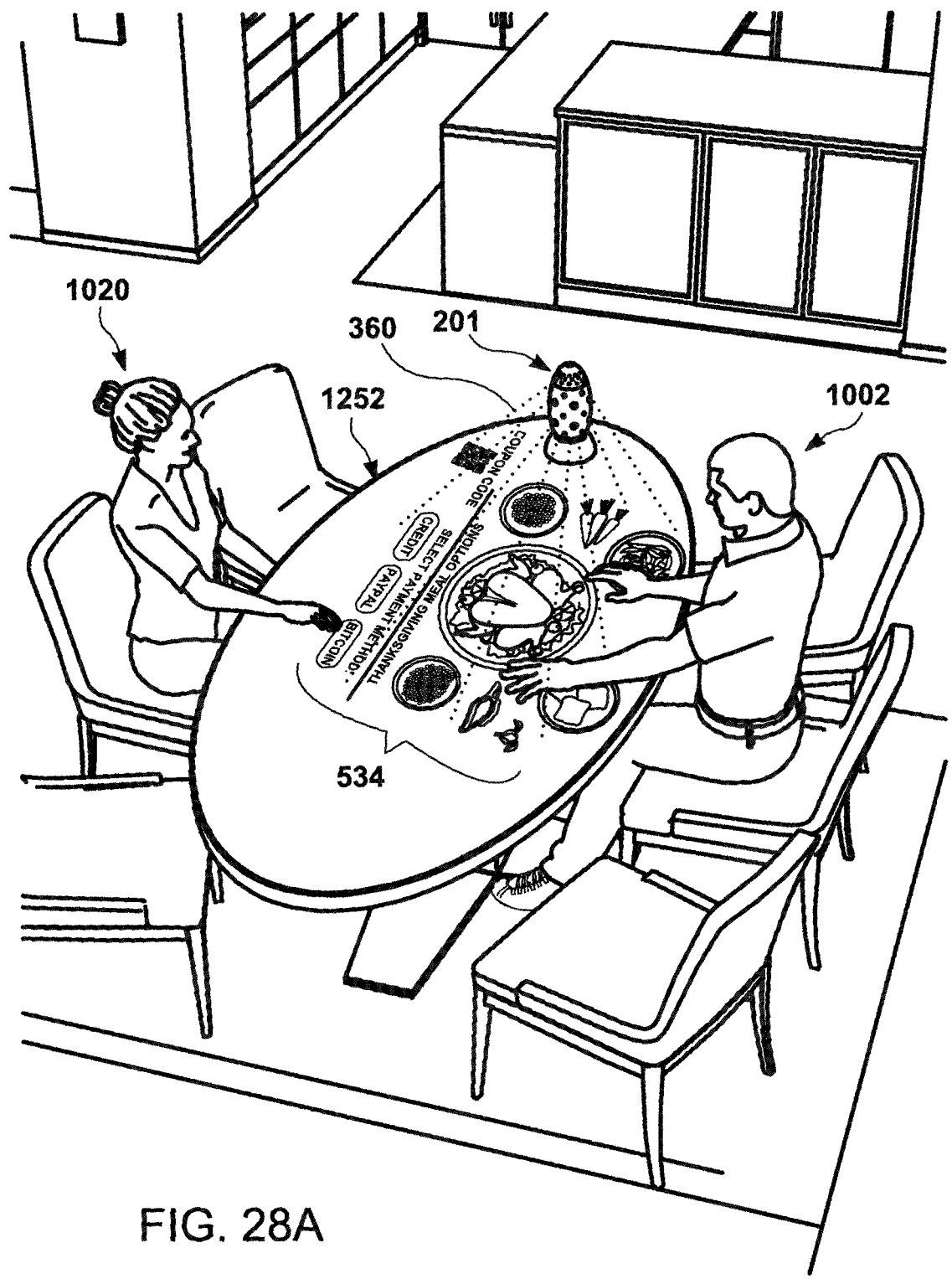
FIG. 28A-28D illustrates two users interacting with a single AGUI system.
Figure 28B:
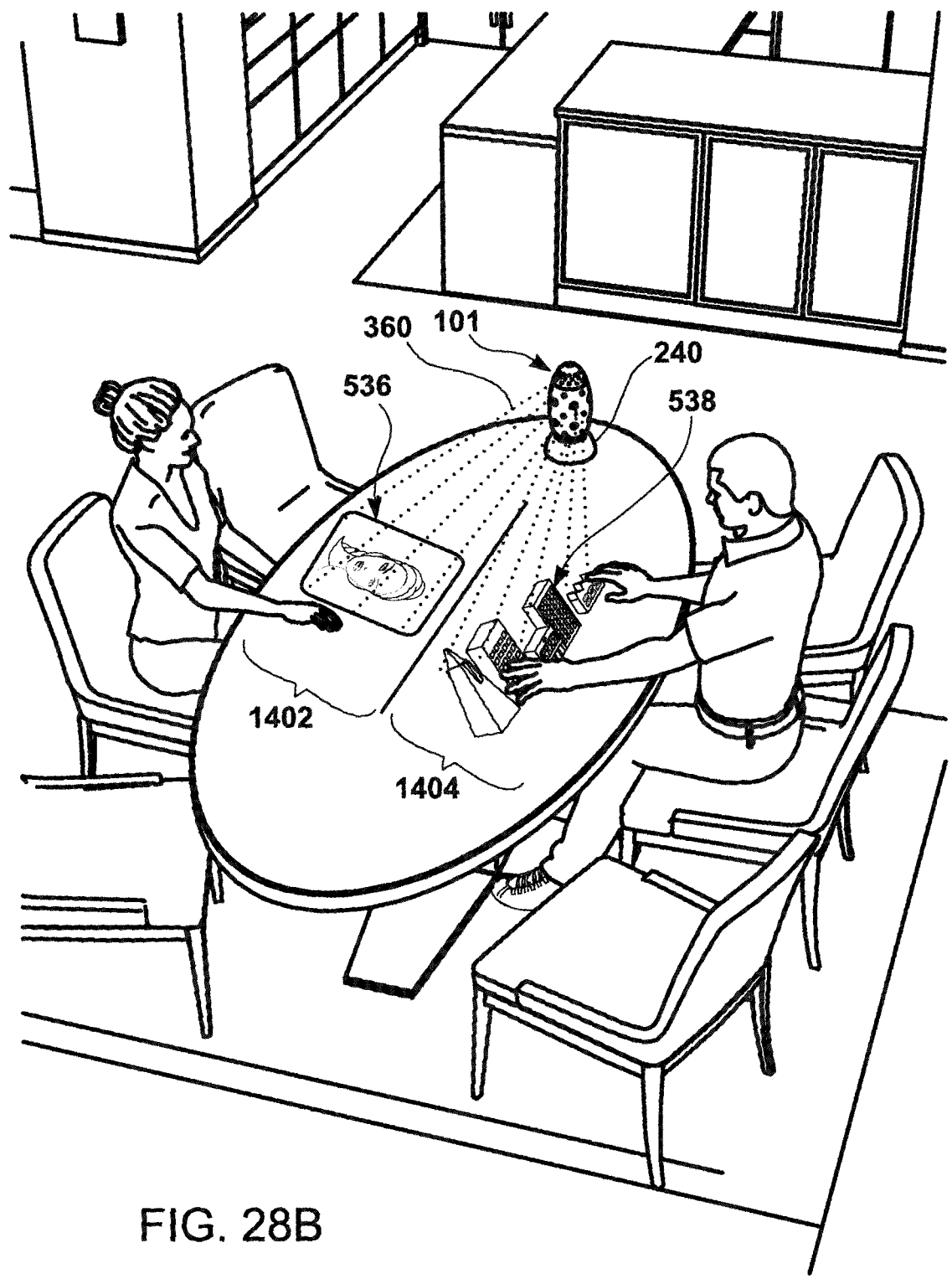
Figure 28C:
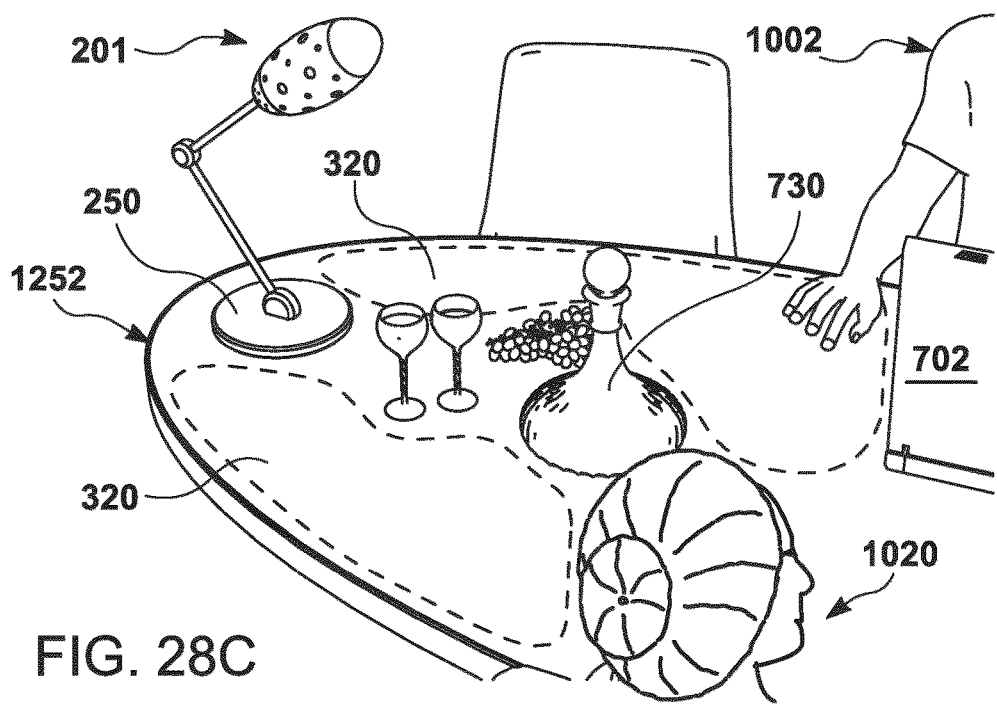
Figure 28D:
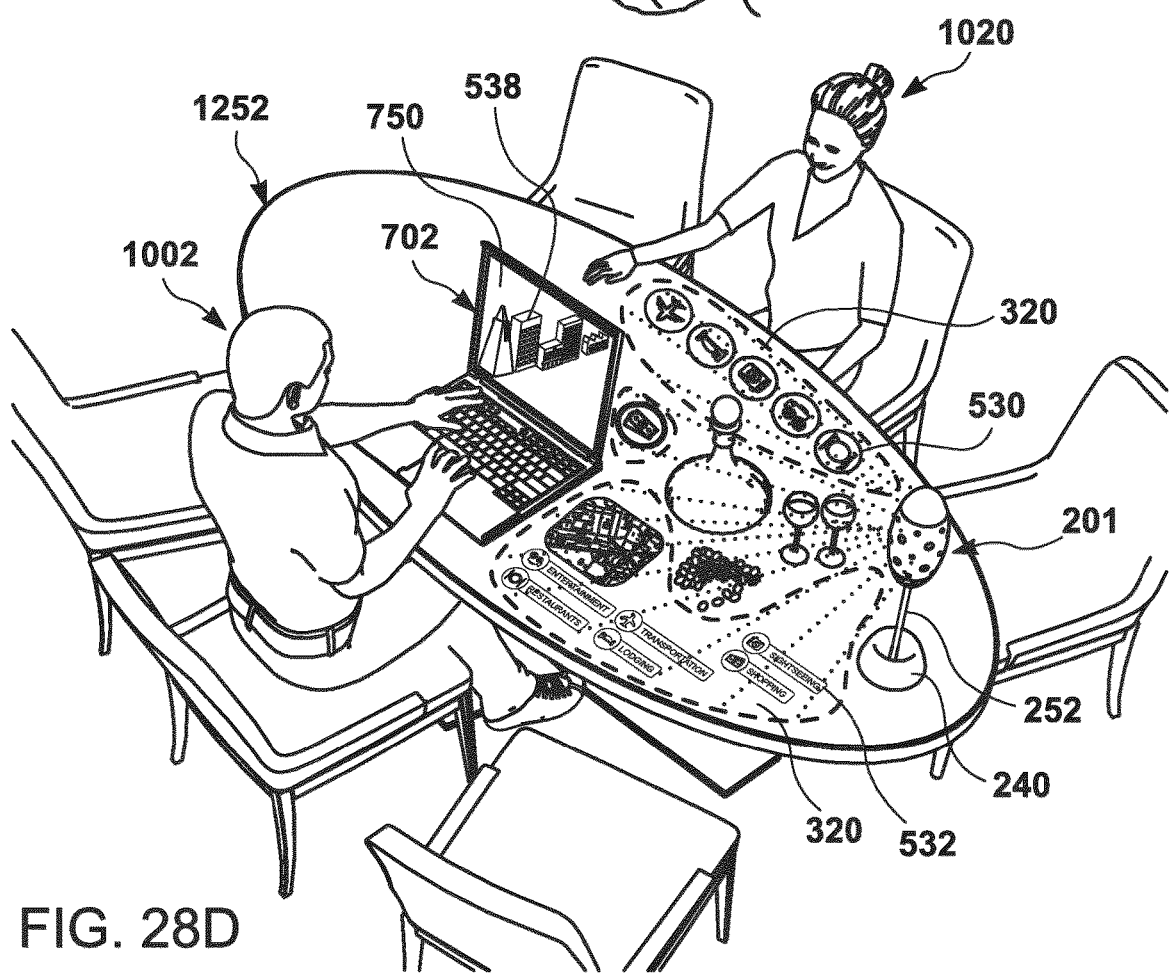

FIG. 28A illustrates an embodiment of the present technology where an AGUI system comprises an AGUI device 201 located on a table 1252 between two users 1002, 1020 that allows the two users to collaborate with the same user interface 534. The AGUI system detects the location and field of view of the two users and also detects body parts of the users that can be used to indicate gestures to control the AGUI system. The AGUI system has queried the surfaces in the environment and selected the desktop between the two users as the best display surface. The AGUI system can use a single or multiple AGUI devices to present displays optimized for either or both of the two users. Both users can simultaneously use the system or it may be configured that one user may only view content while the other may both view and control content. FIG. 28B illustrates how the same AGUI system may also support two independent user interfaces to the two users. The AGUI device may be configured to select a separate surface 1402, 1404 for each user to generate independent user interfaces 536 538 for each user. As illustrated in FIG. 28C, the AGUI system maps out physical objects on the display surface 1252 and removes areas that may not be used where the physical objects 730 prevent it. The remaining area 320 may then be used as is, or subdivided into a number of display surfaces. Similarly, for active surfaces, portions of an active display that are obscured from the user's view can be omitted from the surface and the remaining surface may be used as a single or multiple surfaces. When physical obstacles are moved within a display surface, introduced or removed from a display surface, the interface adapts in real time. Portions of a display surface may be moved to active displays, such as a laptop or TV, or be moved to a new surface. The display content may also be reorganized or resized to fit the updated available surface.

Figure 29A:
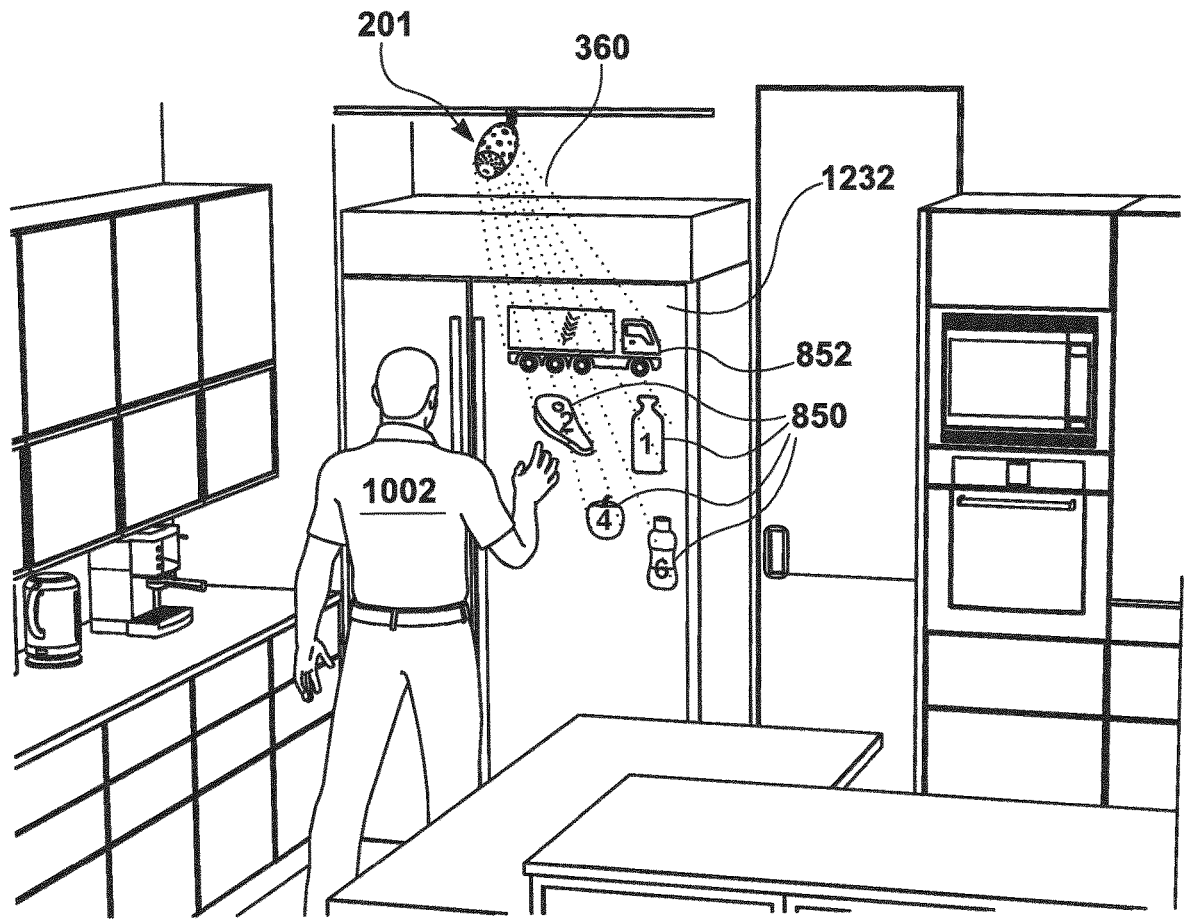
FIG. 29A-29C illustrates the use of an AGUI system in a kitchen environment including AGUI enabled appliances.
Figure 29B:
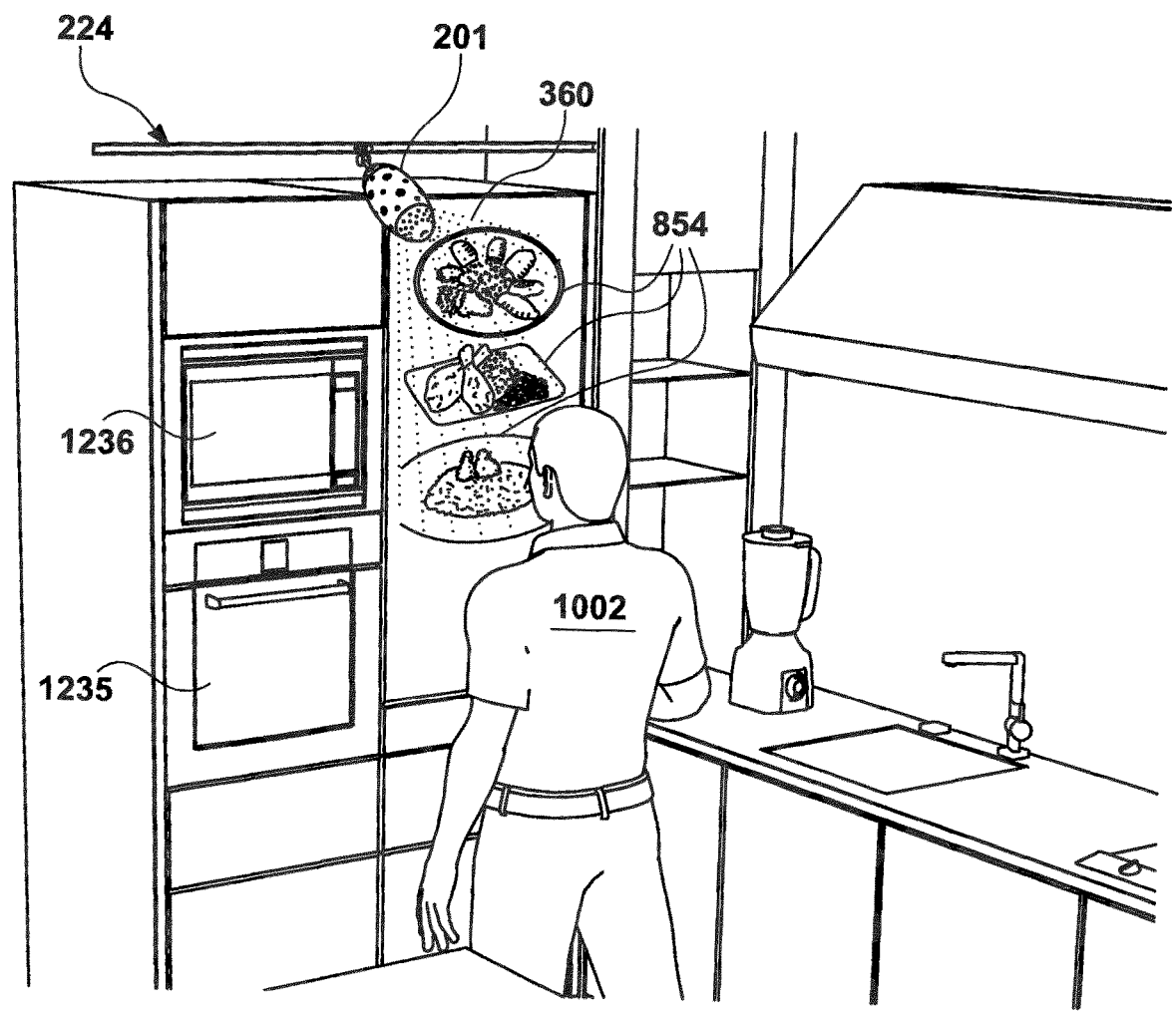
Figure 29C:
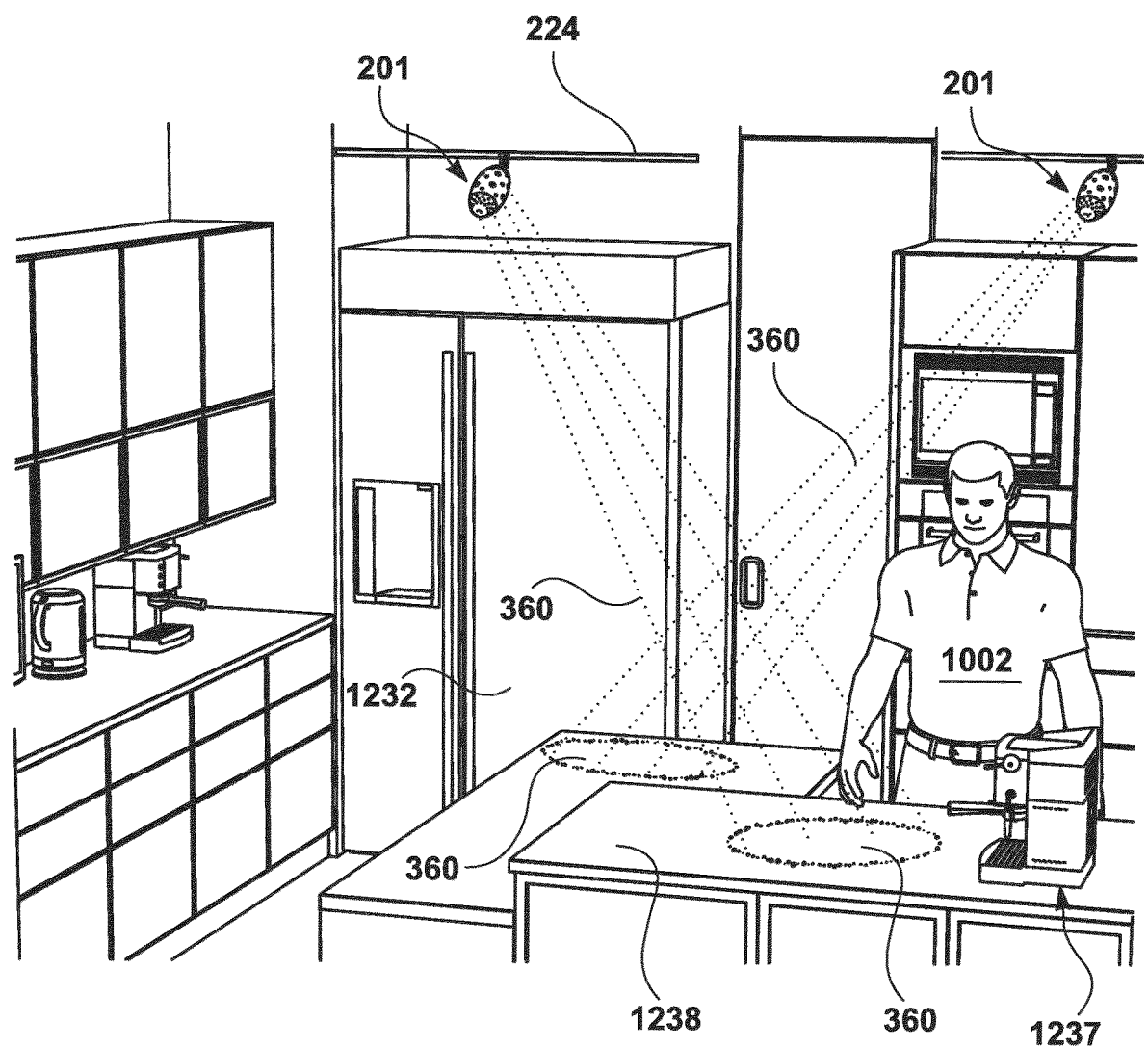
Figure 30A:
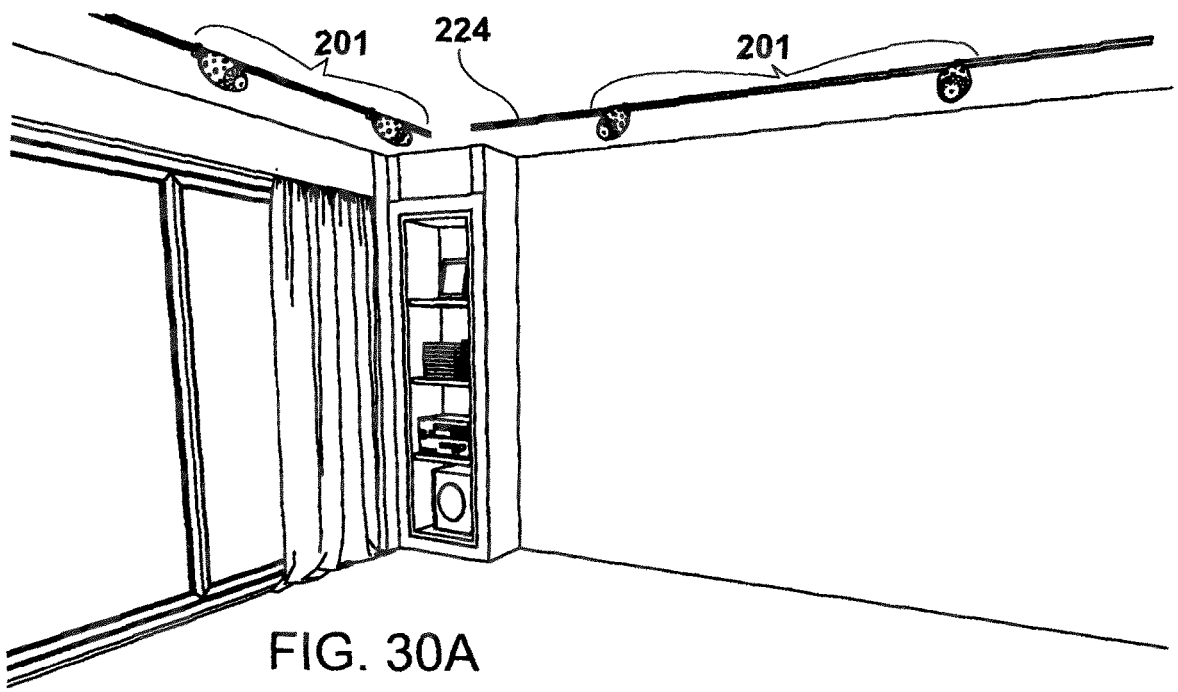
FIG. 30A-30D illustrates the use of an AGUI system to visualize the position of virtual reality furniture in a room.
Figure 30B:
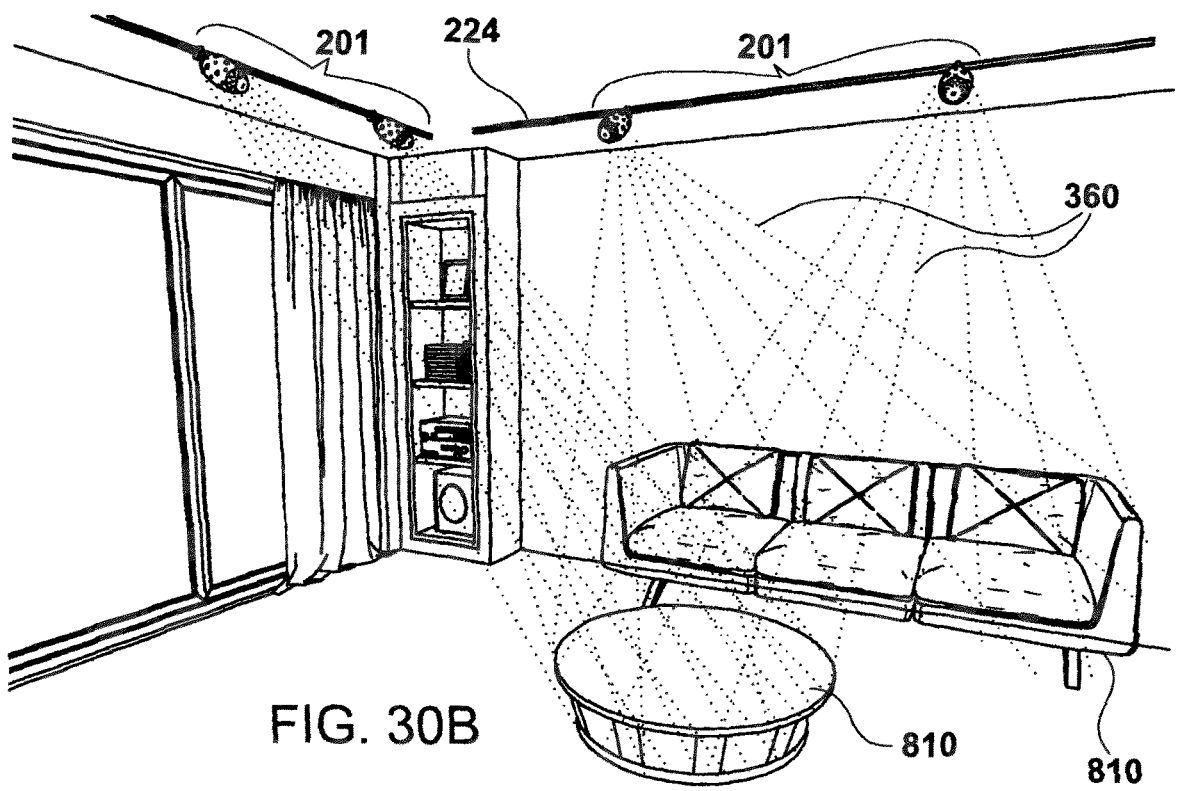
Figure 30C:
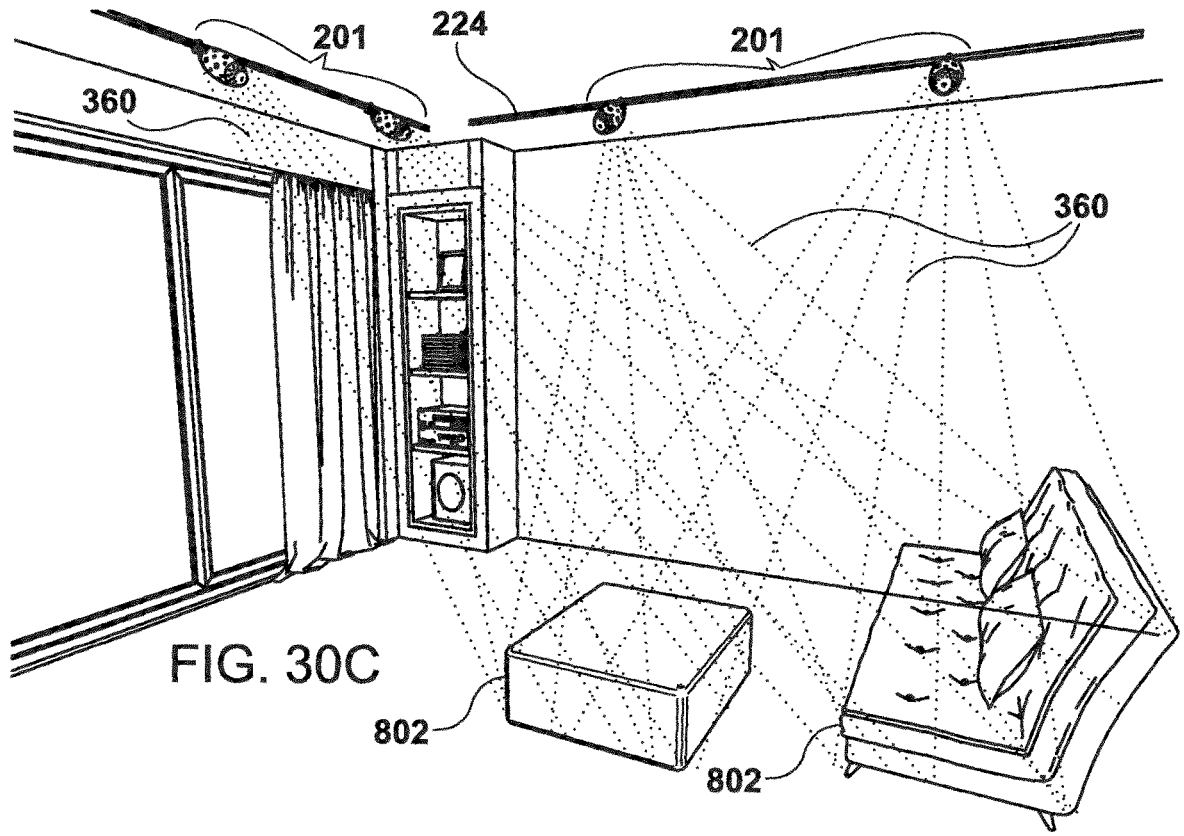
Figure 30D:
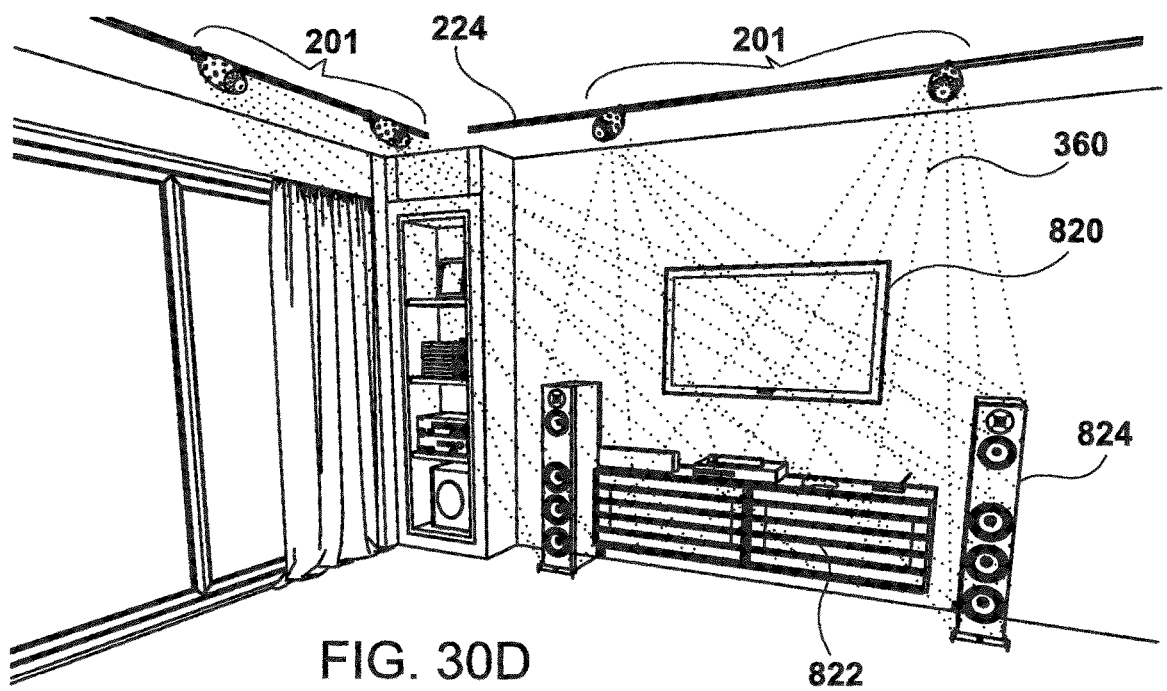

FIG. 29 illustrates how an AGUI system can be used together with household appliances 360 to enhance their usefulness. The system comprises an AGUI device 201 in proximity to the appliance, which may be AGUI enabled or not. It the appliance is not AGUI enabled the AGUI simply uses a surface of the appliance as an AGUI surface to project a display on. Preferably the content projected on the appliance surface is related to the use or content of the appliance which would be the contents of a refrigerator or settings for baking with an oven. The interface projected onto each appliance could allow a user to input settings to for the appliance as well as monitor the contents of the appliance. This may include the amount of remaining food 850 in the refrigerator or a control icon to initiate online purchases 852. An appliance may also be AGUI enabled which would allow it display content on an active display surface embedded or mounted on the face of the appliance. The AGUI enabled appliance could also include internal and external sensors that would provide up to date information on the contents and operation of the appliance. FIG. 29B illustrates how AGUI interfaces may allow a user to not only control appliances such as a microwave oven 1236 or an oven 1235 but also indicate the status of the cooking. As shown in FIG. 29C, two AGUI devices 201 may be networked together to implement a more complete user interface where if the line of sight from one device to a surface in use 360 is blocked for one AGUI device, the other can project an optimized image. As the user moves in the environment, a network of AGUI devices can collaborate to ensure that a surface has complete display content no matter how the user moves or where they are located.

FIG. 30 illustrates how the AGUI system comprising a single or a plurality of AGUI device 201 may be able to implement virtual reality applications by projecting images onto the floor and walls of a room. The AGUI device may be arranged on a track 224 to give adequate of the room. Couch and table 810 may be displayed in an augmented reality view to allow a user to view a room with a variety of in different sizes and shapes.

Figure 31A:
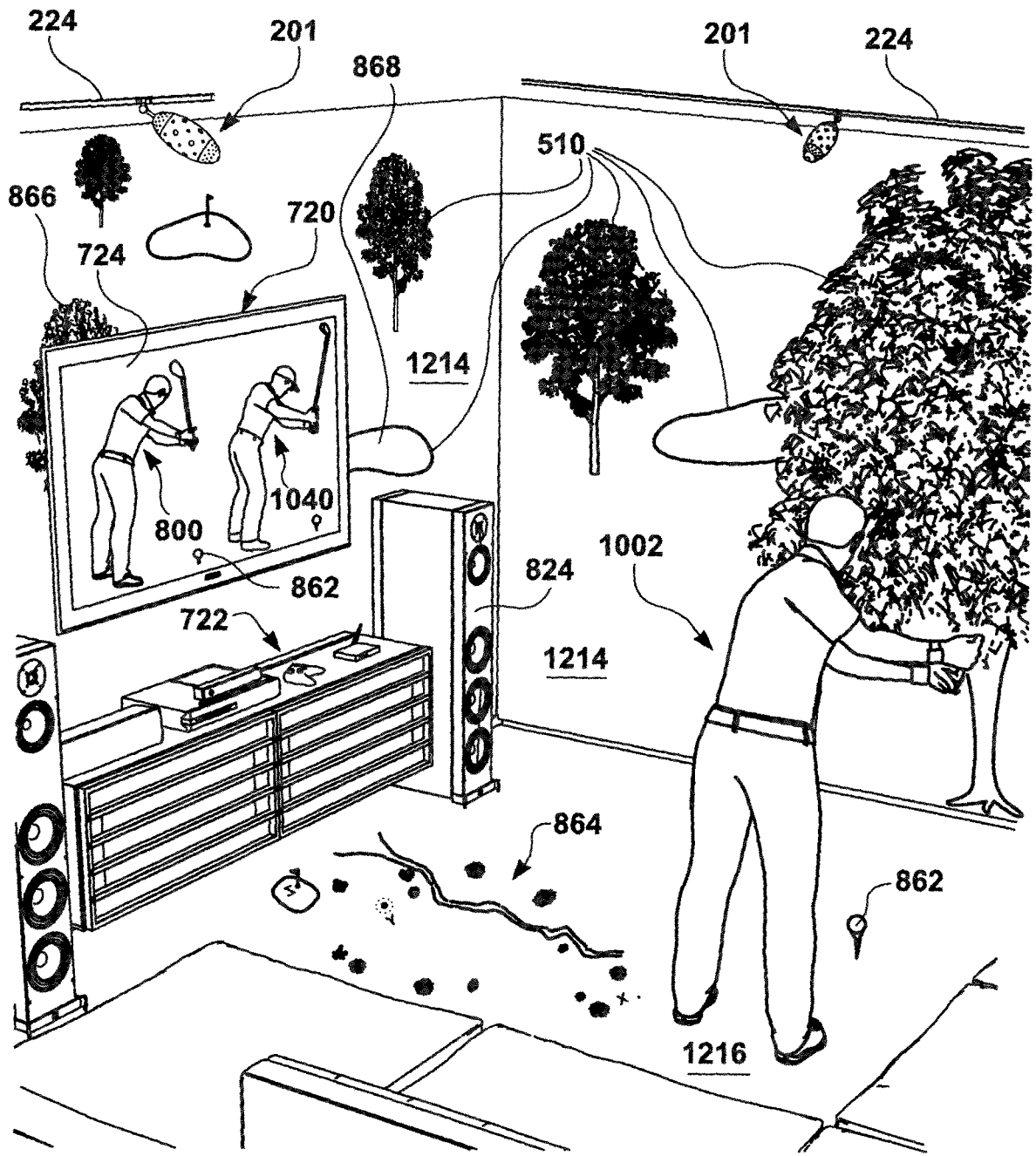
FIG. 31A-31B illustrated the use of an AGUI system in a virtual reality game including an augmented reality virtual environment.
Figure 31B:
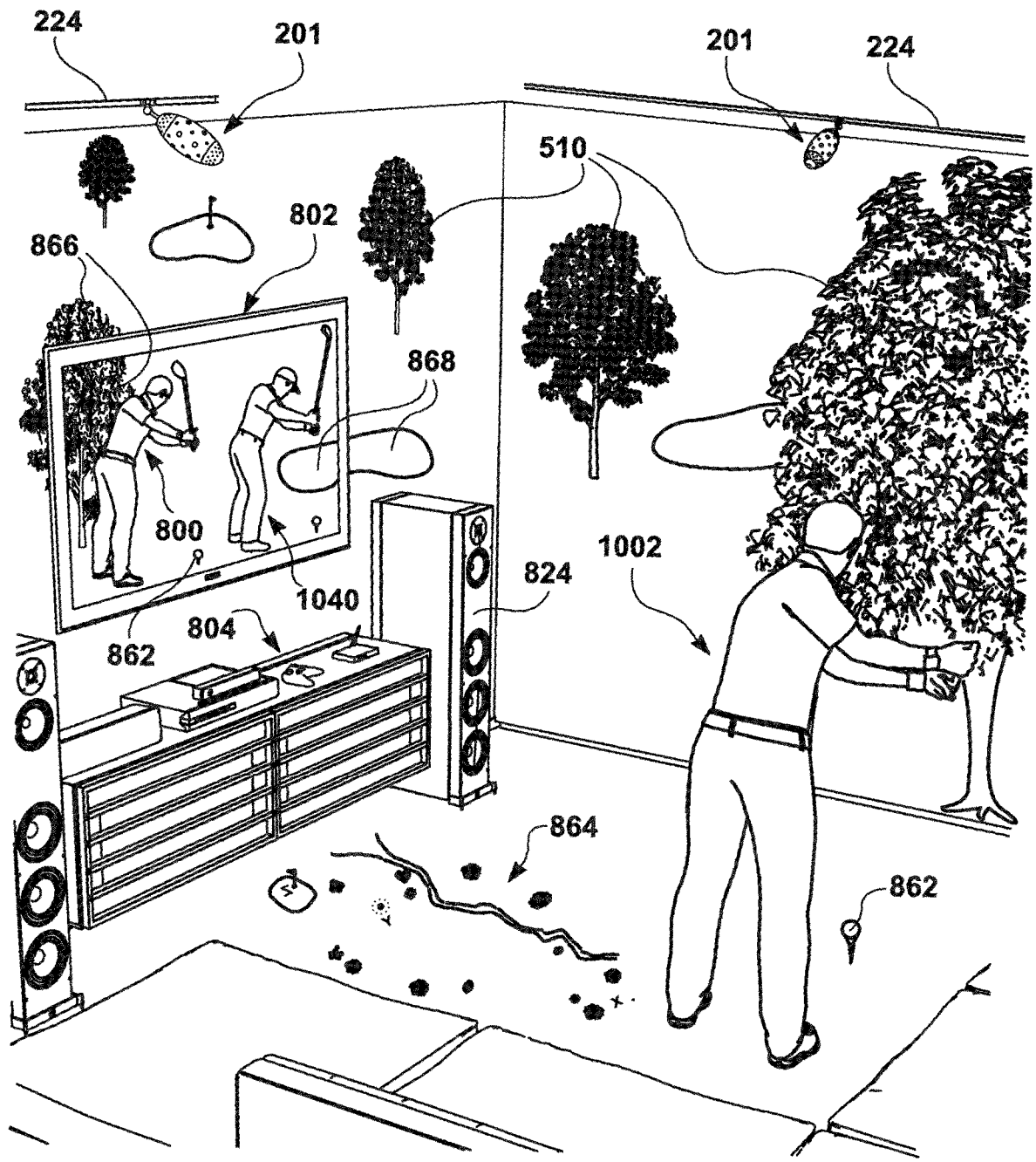
Figure 32A:
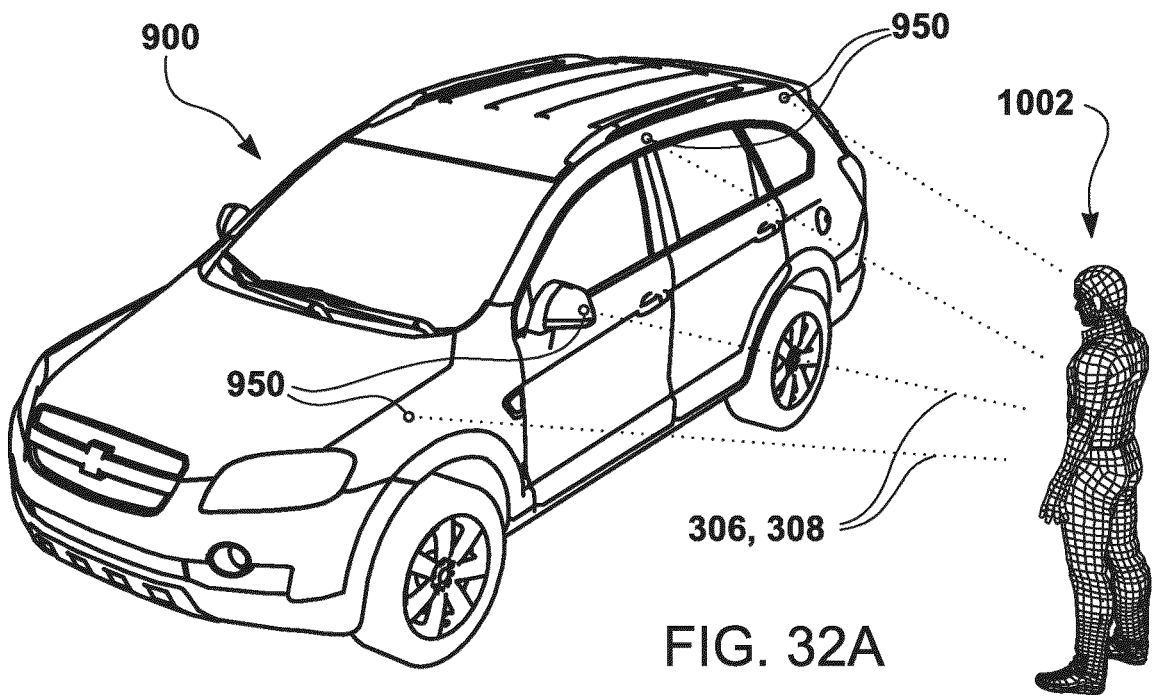
FIG. 32A-32D illustrates an AGUI enabled vehicle where the surface of the vehicle comprises active display surfaces.
Figure 32B:
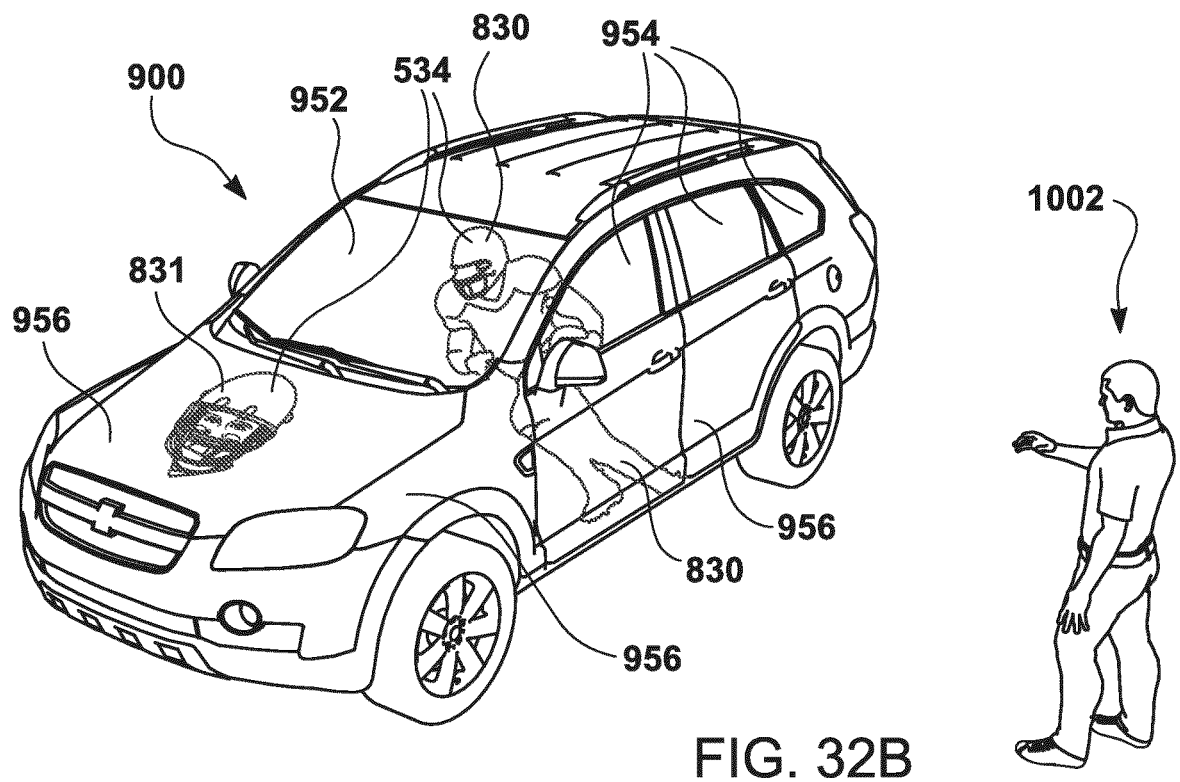
Figure 32C:
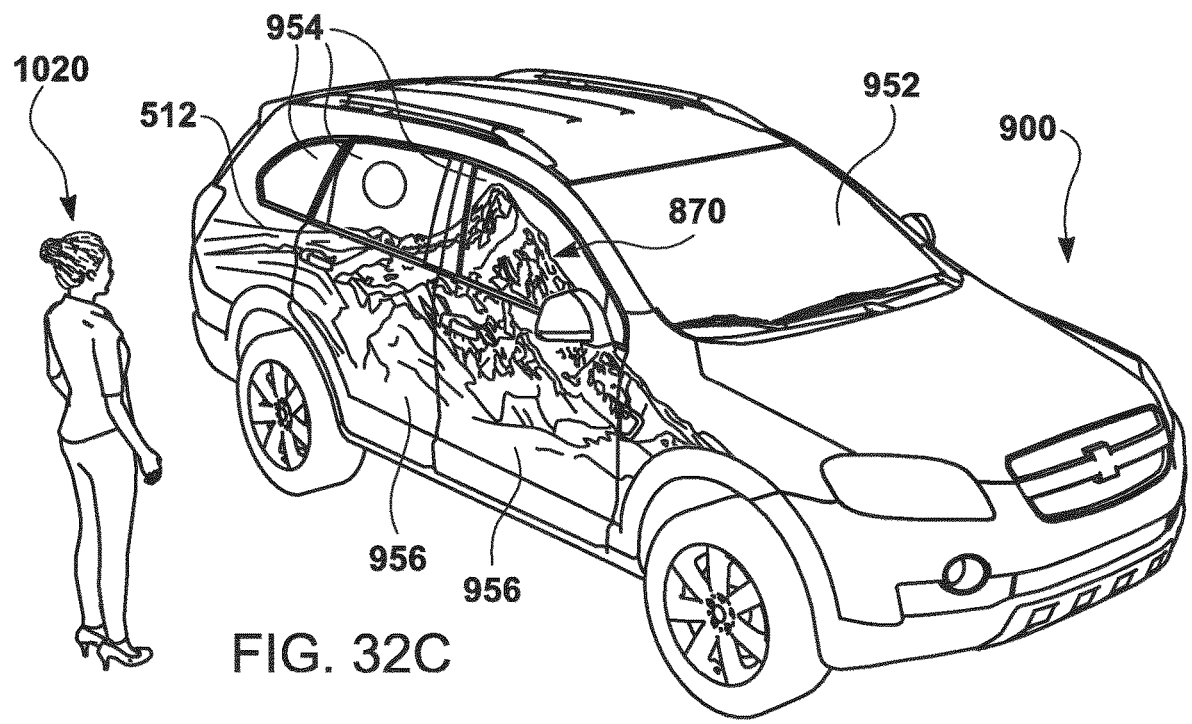
Figure 32D:
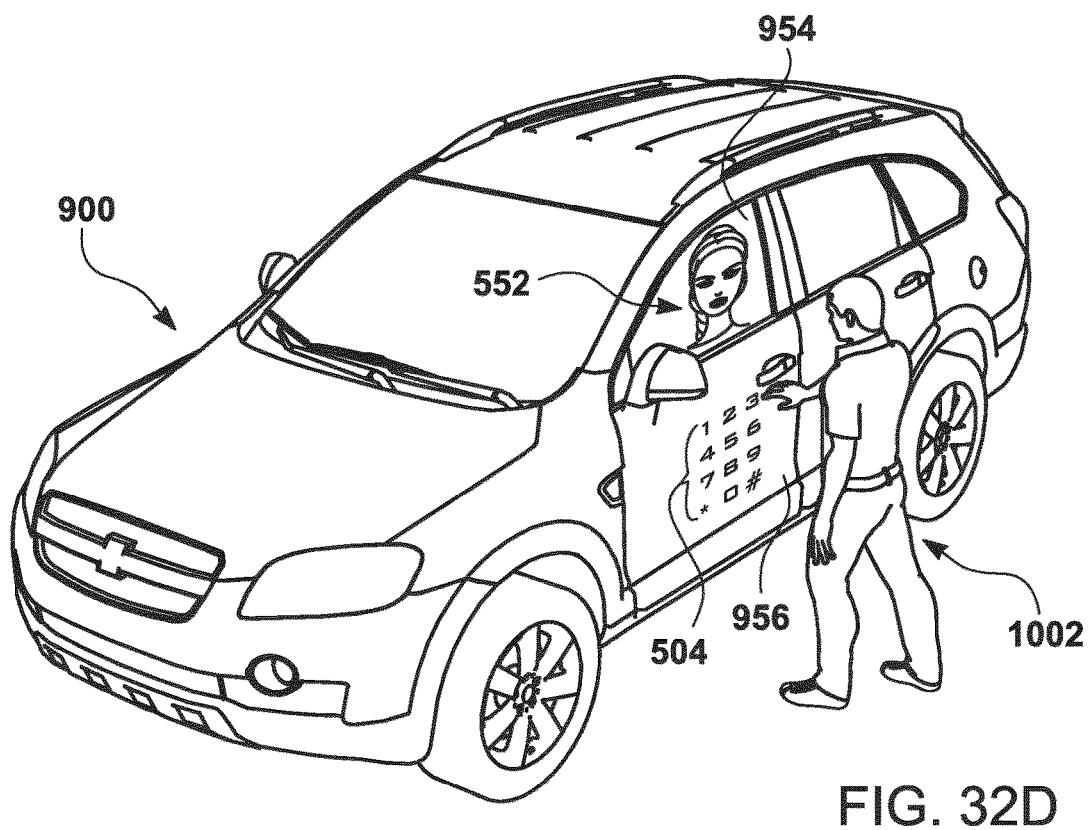

FIG. 31 illustrates how an AGUI system of devices 201 can be used to create an immersive, augmented reality environment for activities such as golf, tennis, hockey, cycling, skiing, and other sports or activities. The user's golf club may also be AGUI enabled with sensors to track the location, velocity, and acceleration of the golf club as it is being swung. Similar embodiments exist for other sports applications and applications that would benefit from an immersed environment or virtual reality. The TV 720, an active display may be used as a separate display as in FIG. 31A or may be included in the other augmented reality elements 866 as shown in FIG. 31B.

FIG. 32 illustrates a further class of embodiments that center around vehicular applications. A vehicle 900 incorporates a number of AGUI sensors 950 and detects when a user 1002 approaches the vehicle. The AGUI system may use a number of biometric factors to verify the identity of the user. The vehicle may then take a number of actions based on the user identified. This may include unlocking the vehicle, displaying a keypad on the door, or sending a message. The vehicle may be covered with an active surface such as an OLED or an active paint that allows for the surface or a portion of the surface of the vehicle to become an active display. Windows 952, 954 may have an embedded or surface, LED, LCD, OLED, a projection display, conductive paint or other coating or display system or surface so as to appear opaque unless the owner is detected to be approaching or close by, then becoming transparent. Images may be mapped and displayed on the surface of the vehicle that may change depending on a number of factors including the location of the vehicle, the presence of other people or objects, or whether the vehicle is moving or not. FIGS. 32B and C shows how a single image may be mapped and displayed over multiple panels and display surfaces or different images may be displayed on each side, section or display panel such as a door, window, wheel, hood or roof of the vehicle and how this may be dependent on who is viewing each side. FIG. 32D illustrates how a keypad 504 allowing entry to the vehicle may be displayed on the vehicle and how a video conference 552 link may be initiated with a third party to control access to the vehicle. Remote access control can be used to implement car rental or car sharing services.

As best illustrated in FIG. 32, in some embodiments, the AGUI system incorporated with the vehicle 900 can perform depth mapping 306 using a structured light imaging system, and depth and color mapping and 308 imaging using a camera array.

Figure 33:
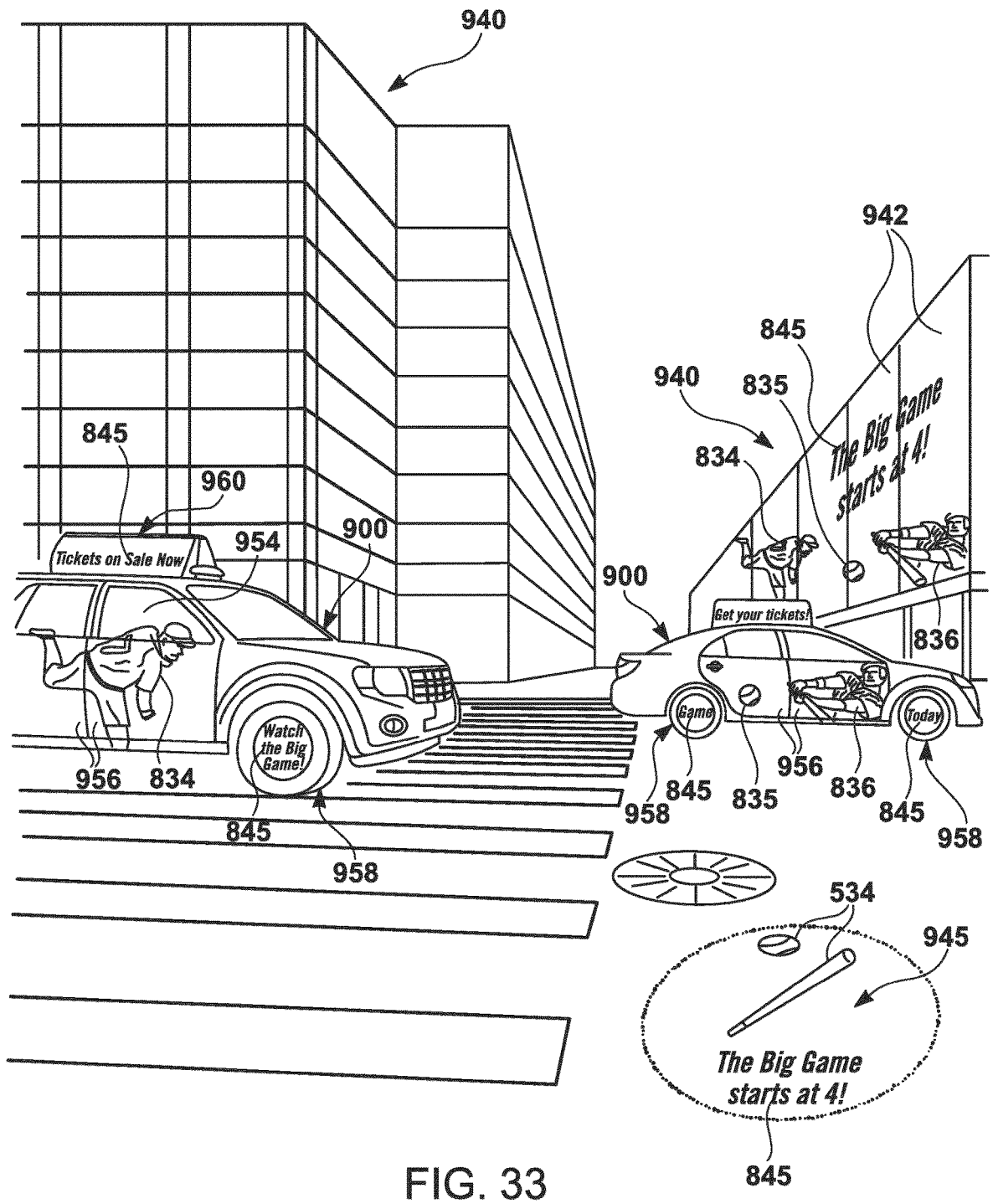
FIG. 33 illustrates AGUI enabled vehicles operating with AGUI enabled buildings in an environment.

FIG. 33 illustrates the use of AGUI systems in applications using vehicular media broadcasting. Vehicles 900 in motion are AGUI enabled with display surfaces on panels 956, windows, wheels and/or hubcaps 845 and on their roofs or roof advertisement panel 960 and on their hood, doors and other Panels 956 which may work independently or together to provide a spanned image while hubcaps 845 and roofs 960 provide independent displays. Images on rotating surfaces such as hubcaps 845 can be rotated in real time so as to present a stable image from the point of view of an external viewer. Buildings 940 can also be used as active AGUI displays or as passive projected display surfaces. Similarly, other surfaces such as the road or sidewalk 845 may also be used as active or passive display surfaces. Since the various AGUI devices are in communication with each other they can coordinate their displays. For example, the sports or themed displays in the figure may only be displayed when a vehicle 900 is in view of buildings 942. Panels 942 may display specific content when one or more viewers are detected or may display interactive content when one or more vehicle displays are detected a system may only illuminate or display content when the system detected that there was a viewer. Similarly, the external AGUI displays would only be illuminated when being viewed by and external viewer and would display different themes depending on the vehicle's location.

As best illustrated in FIGS. 33A-33C, in some embodiments, additional display elements can include a virtual footballer 830, and/or a virtual footballer's mask-helmet 831.

Figure 34:
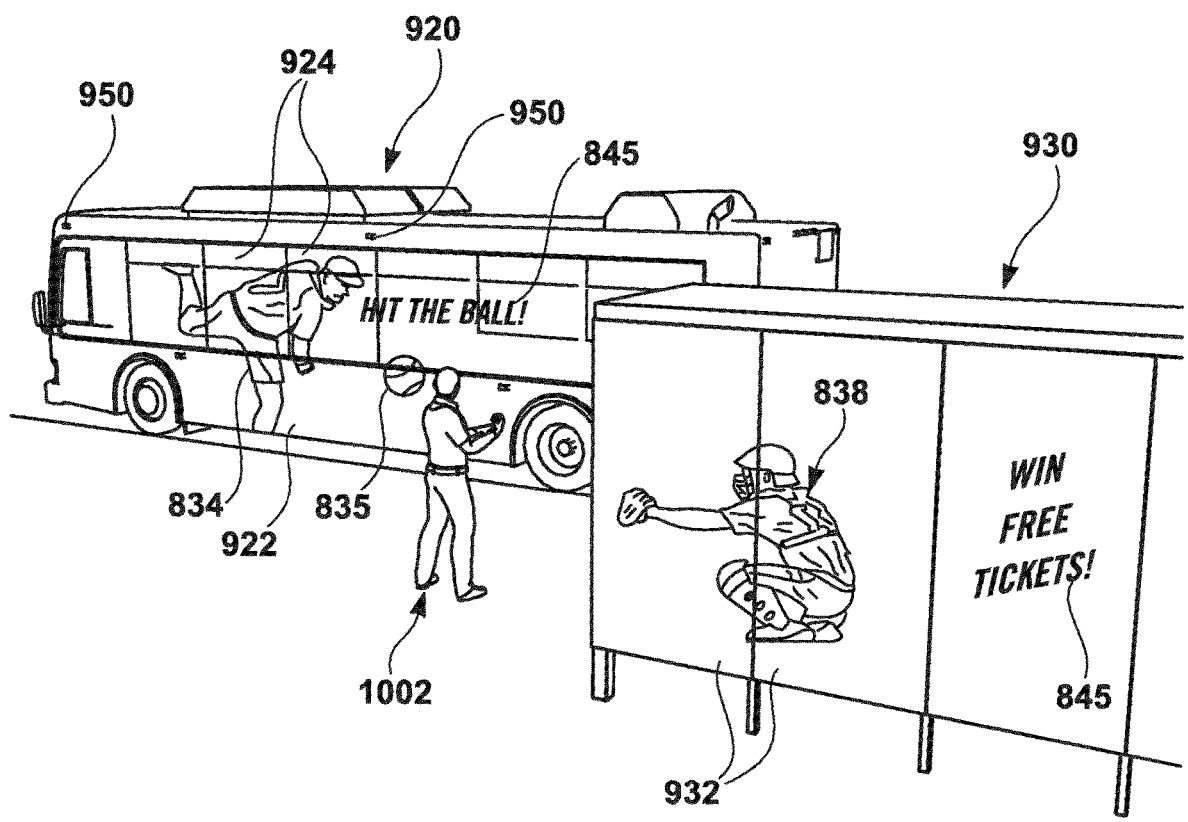
FIG. 34 illustrates a user in an environment with an AGUI system comprising moving and stationary AGUI devices.

FIG. 34 illustrates the use of AGUI systems in application with external viewers 1002, stationary AGUI devices 930, and AGUI devices in motion 920. As the bus approaches the bus stop, they begins to communicate with each other to dynamically form an AGUI system. A viewer 1002 is in proximity to a bus stop 930 which may initially be presenting a blank display or a variety of advertisements or other messages. When bus 920 arrives in proximity to the bus stop 930 the AGUI system detects that the viewer is present and proceeds to present a coordinated display distributed over the bus and bus stop surfaces. This may include rich, interactive content such as a contest. Here the bus display 845 prompts the viewer to take a virtual swing at a ball thrown by display element 834. The viewer 1002 then makes a swinging motion that is detected by the AGUI system in order to enter the contest. Content relevant to the contest 838 is also displayed on the bus stop 930. The displayed interactive graphic and multimedia content may also be dynamically updated, positioned and/or oriented in relation to one or more viewers such as the direction of the pitcher on the bus and the catcher on the bus stop in relation to the viewer. In the case of a 3D image and/or interactive multimedia content displayed on a the bus, such as the pitcher displayed on the bus and the catcher displayed on the bus stop may physically turn towards the viewer as the AGUI system dynamically adapts the displayed content to one or more viewers and display surfaces based on the relational position, location, orientation, viewing angle and/or point of focus of one or more viewers to one or more display surfaces. In the case of multiple viewers the AGUI system may select an optimum viewing angle and surface for viewing by all identified viewers.

Figure 35A:
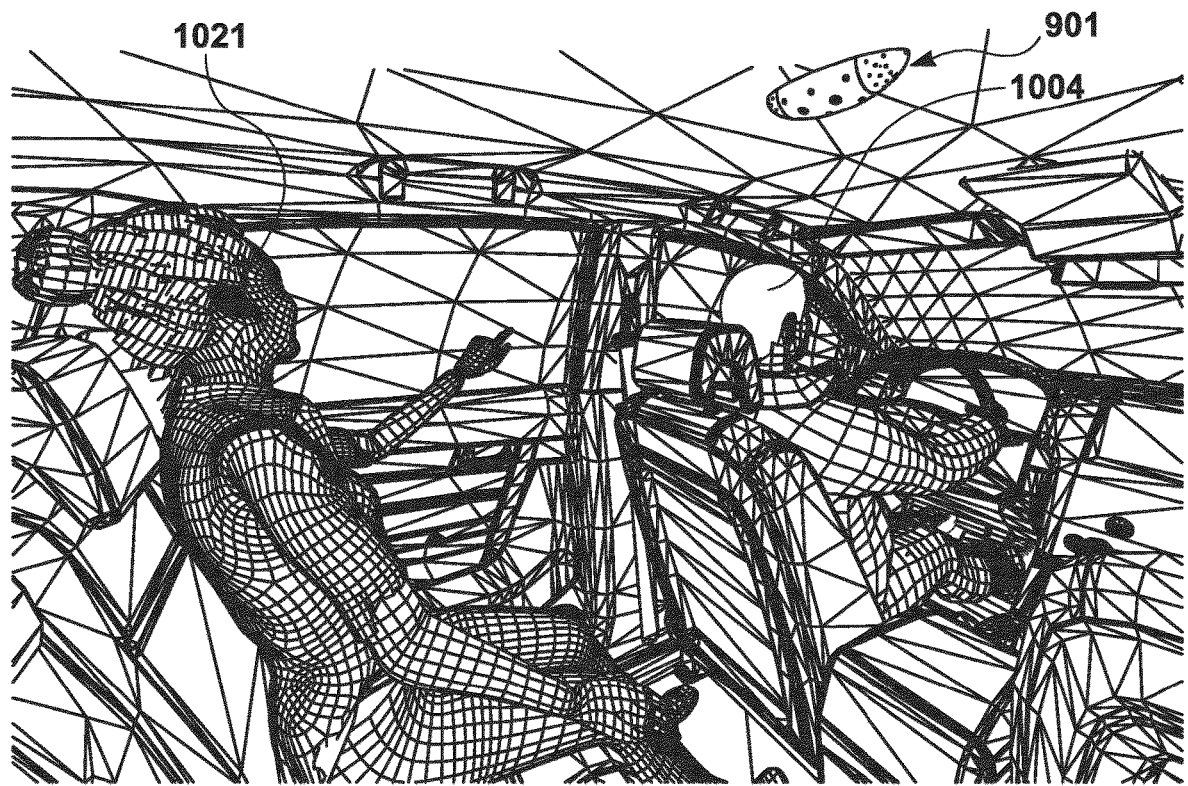
FIG. 35A-35B illustrates the use of an AGUI system in a vehicle where the interior and occupants are mapped and displays identified and used.
Figure 35B:
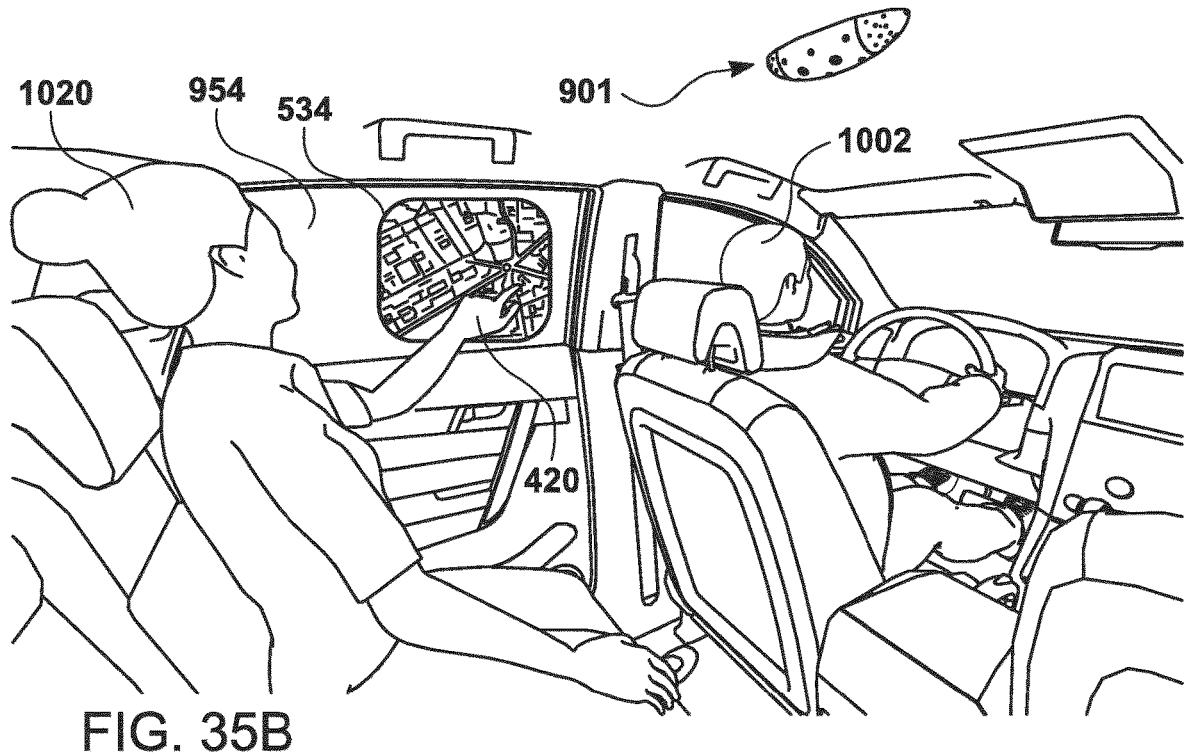

FIG. 35 illustrates a vehicle mounted AGUI system comprises an AGUI device 901 mounted on the ceiling of the vehicle where it can map out the interior of the vehicle including the location of the driver 1002 and any passengers 1020. The front window may be uses to project a heads-up display for the driver. A side window may be used as a display for the passenger. The driver's display would be restricted by safety and agronomical considerations and in many embodiments, would be defined by the vehicle manufacturer. Passenger displays would offer more flexibility and allow passengers to see a wide variety of information.

The AGUI device 901, as best illustrated in FIG. 35, in some embodiments, can include interconnectable modules, and can feature an oval, spherical, curve or other geometrical configuration.

Figure 36A:
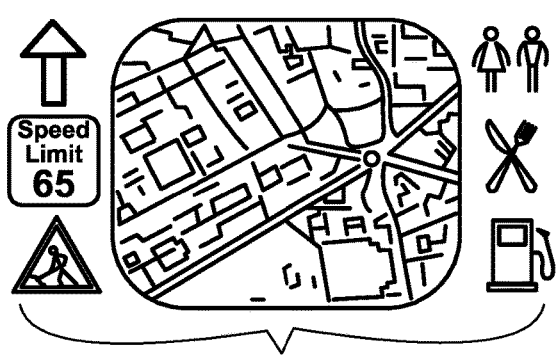
FIG. 36A-36C illustrates the use of an AGUI system in a vehicle to display information customized for a driver.
Figure 36B:
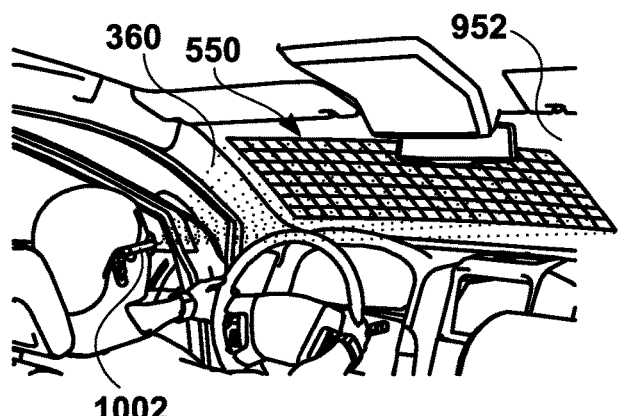
Figure 36C:
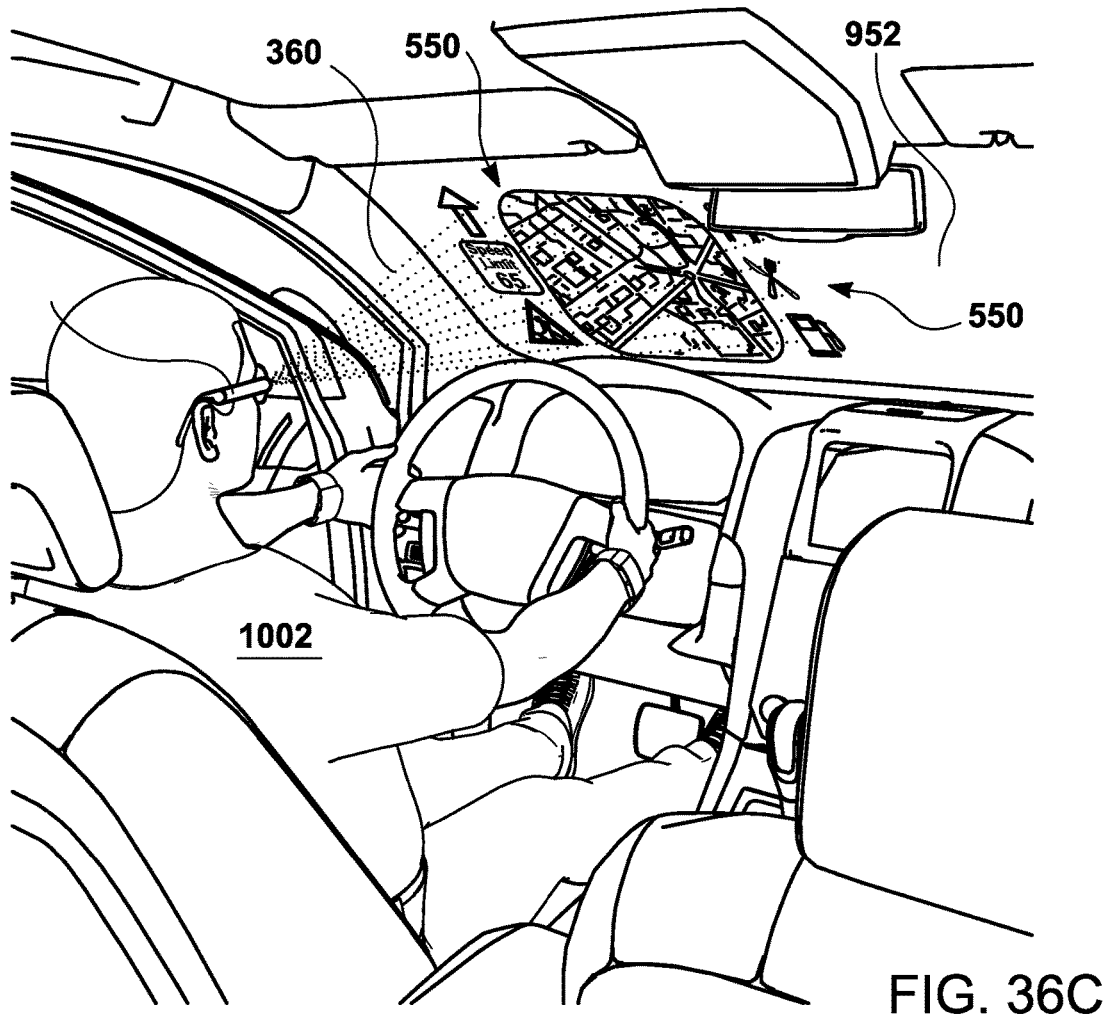

FIG. 36 shows an alternative implementation where the AGUI device is contained in the driver's eye glasses or a head mounted AGUI device. In this way the AGUI system would follow the driver about and could offer security features such as the vehicle would not start of move without an exchange of information with the driver's AGUI device.

As best illustrated in FIG. 36, in some embodiments, a vehicle head-up display/Interface 550 can be projected onto, for example, a windshield 952 or window of the vehicle. It can be appreciated that the AGUI device can be a heads-up projection interfacing system configured to display onto the windshield 952 or window of the vehicle.

Figure 37A:
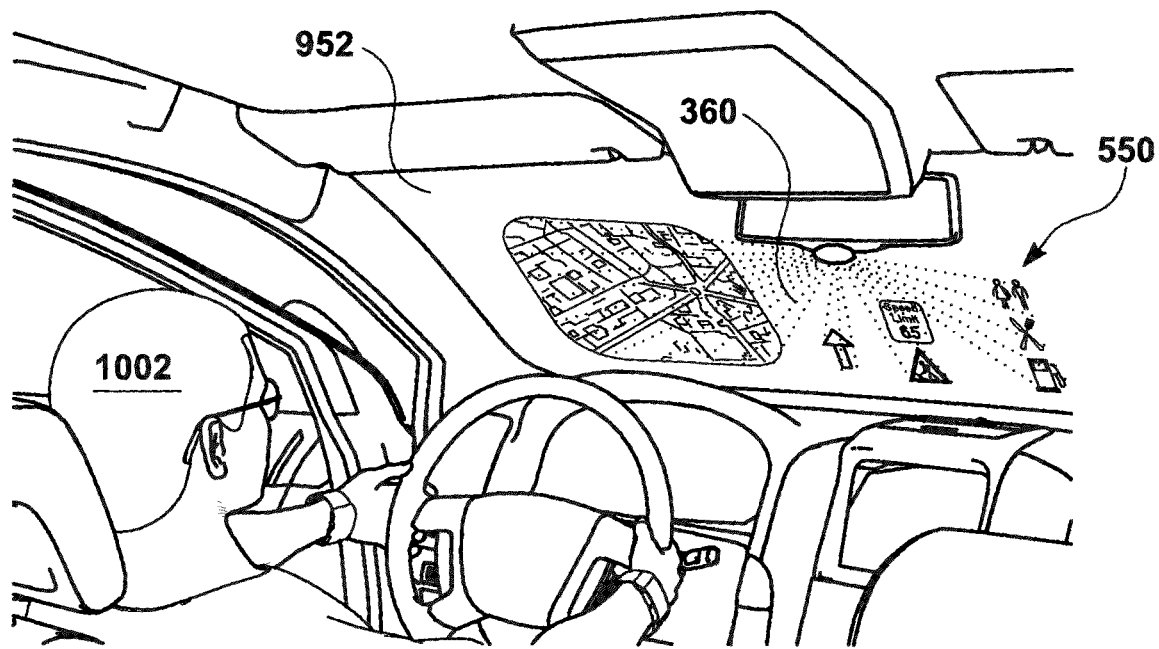
FIG. 37A-37B illustrates the use of an AGUI system in a vehicle interior illustrating a number of possible AGUI projectors.
Figure 37B:
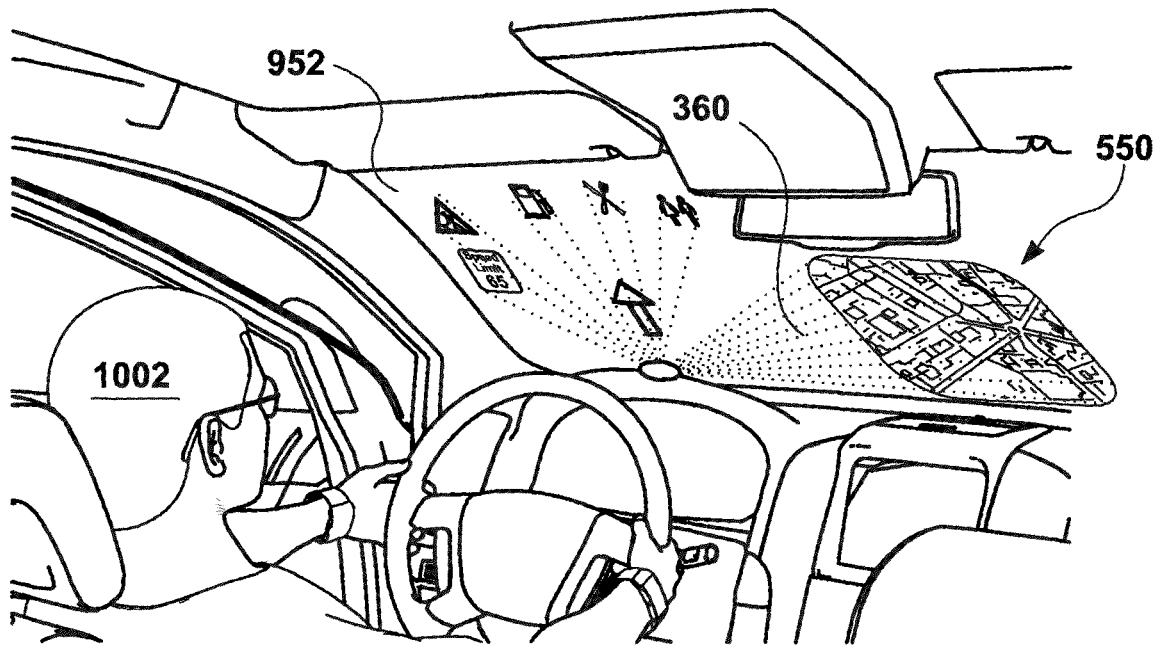

FIG. 37 illustrates how AGUI devices may also be included on the dashboard or together with the rear-view mirror. An AGUI system may use a single AGUI device or multiple, networked devices. This could include a dashboard device to project the drivers display, a ceiling mounted device to implement displays for passengers, and a device on the driver's person to provide security and authentication services.

Figure 38A:
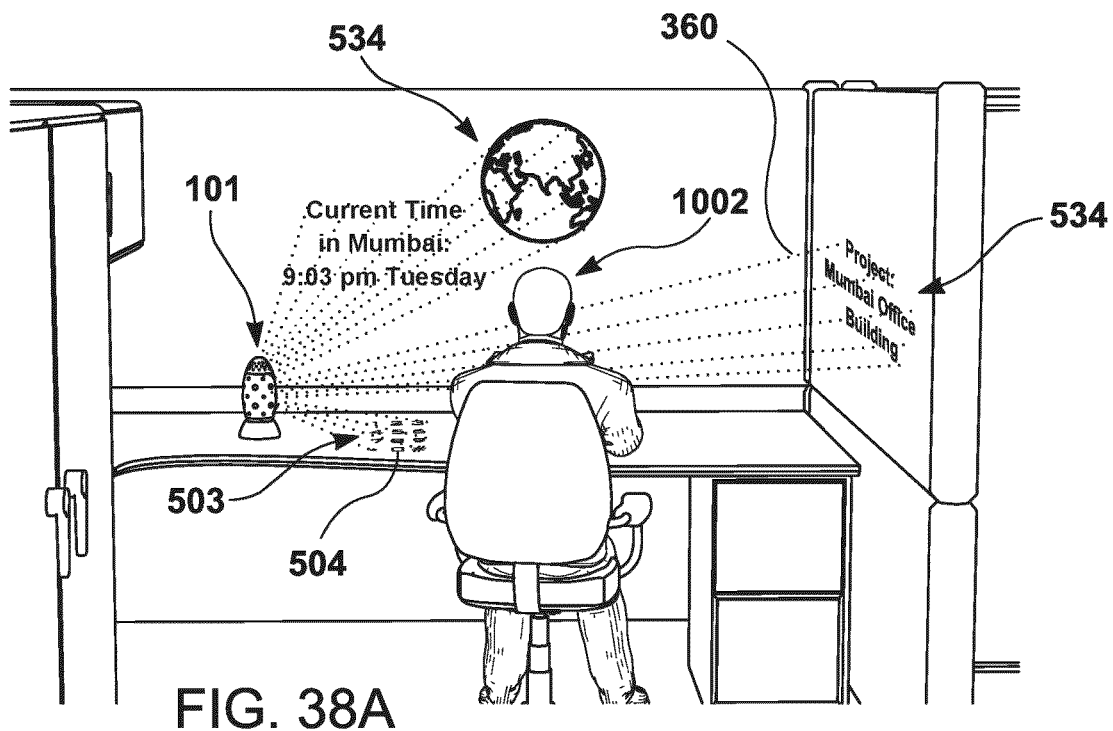
FIG. 38A-38B illustrated the use of an AGUI system in an office environment.
Figure 38B:
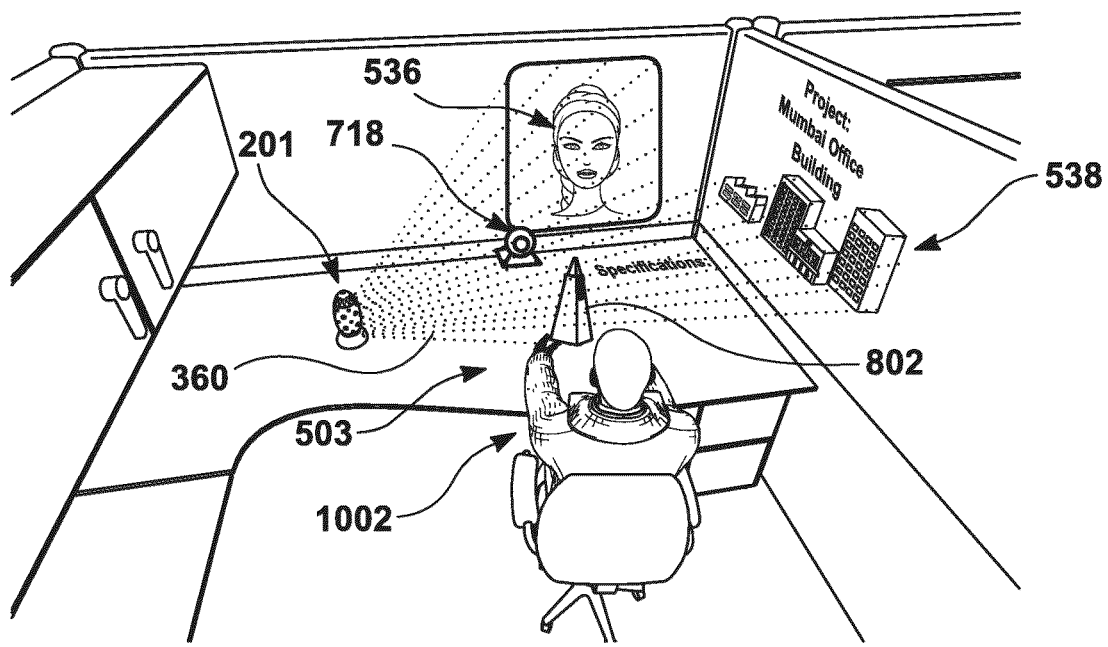

FIG. 38 illustrates the use of an AGUI system in an office environment. An AGUI device 101 is placed on a worker's desk to display user interfaces on the user's desk 504 and cubicle walls 534. The user will have the ability to use gestures or traditional keyboard and mouse input devices to select surfaces as display surfaces, position them, select their size and shape, and decide the content of each display.

A webcam 718, as best illustrated in FIG. 38, in some embodiments, can be in communication with the AGUI device 201 to provide additional camera input. Virtual 3D objects 802 can be projected onto the desk 504 and/or walls 534.

Figure 39A:
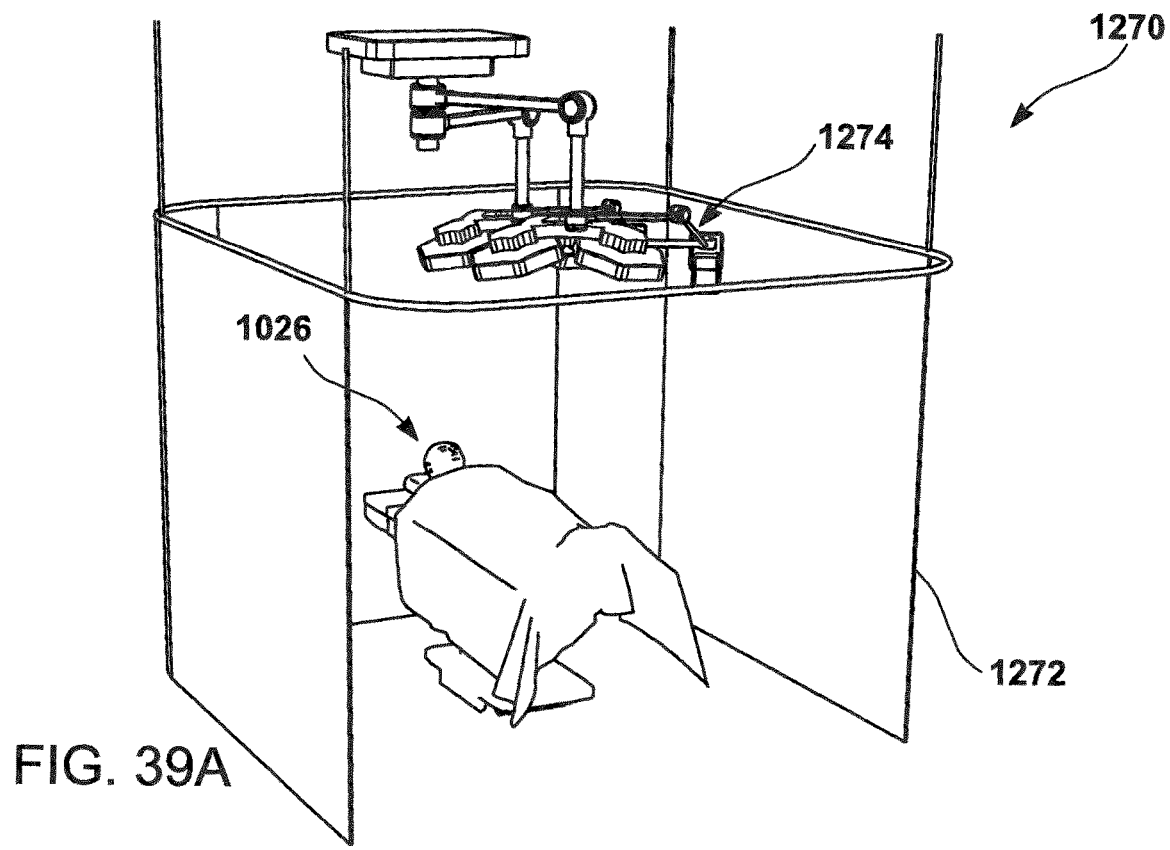
FIG. 39A-39C illustrates the use of an AGUI system in a hospital operating room environment prior or after an operation.
Figure 39B:
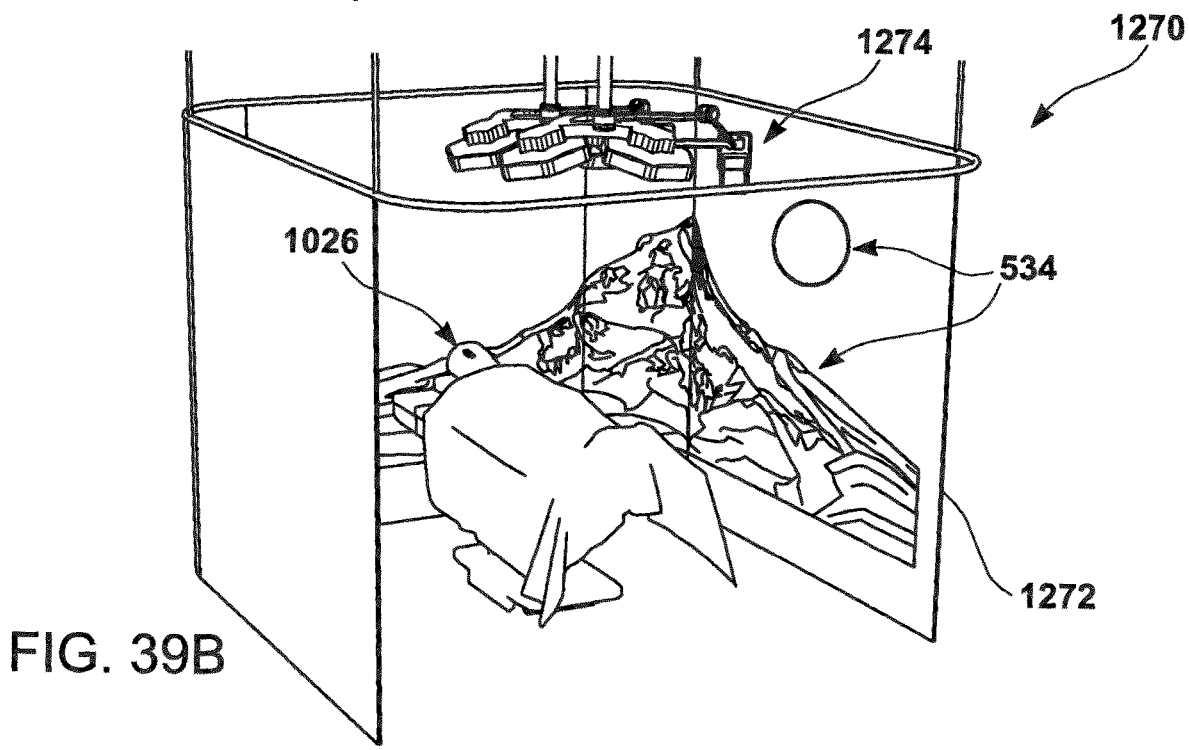
Figure 39C:
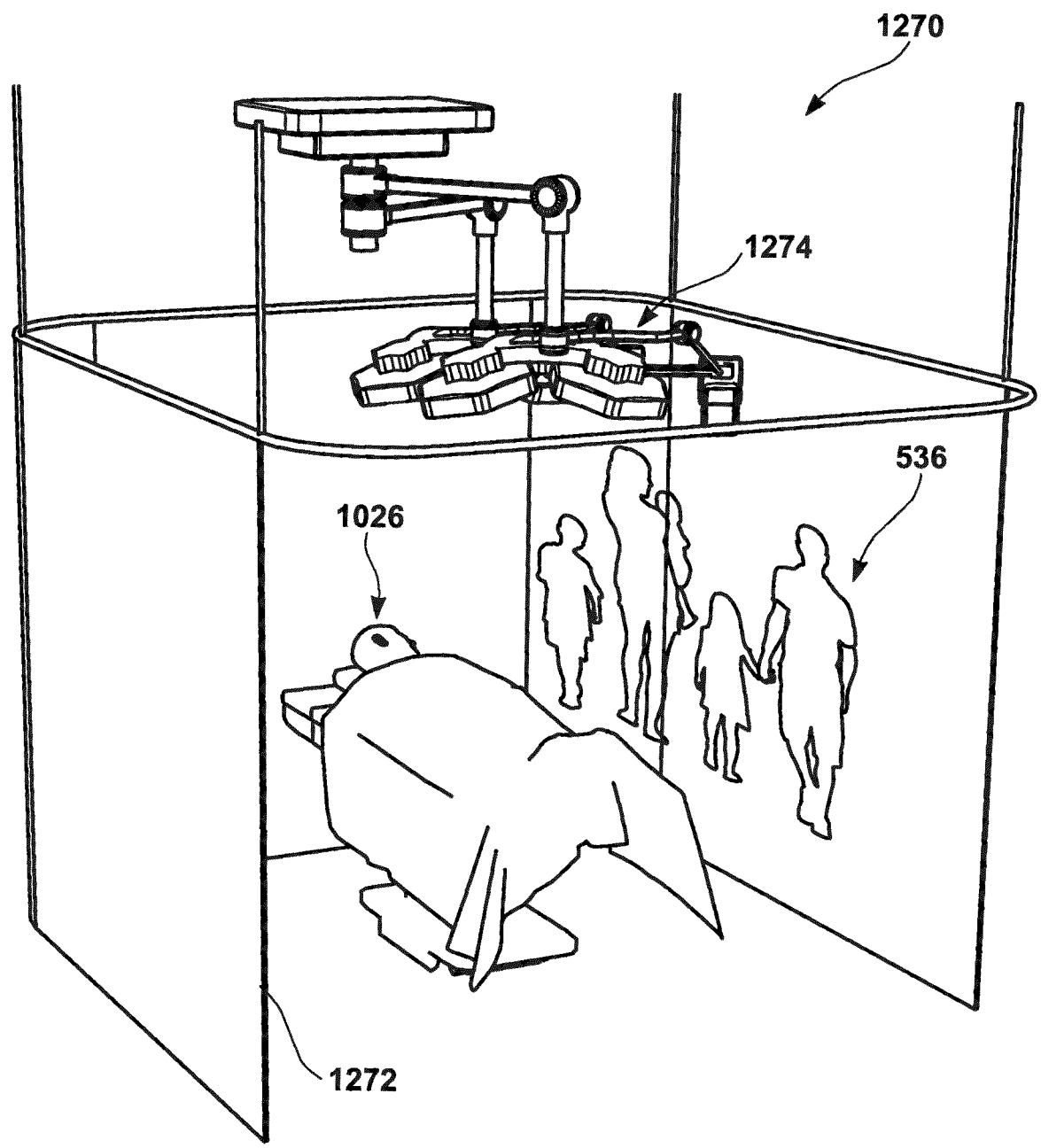

FIG. 39 illustrates the use of an AGUI system in a medical environment. An overhead lighting system incorporates an AGUI system 1274 which can project informational or soothing images for a patient 1026 pre or post operation. Video conferencing 536 may also be conducted with family, friends, or medical care givers.

Figure 40:
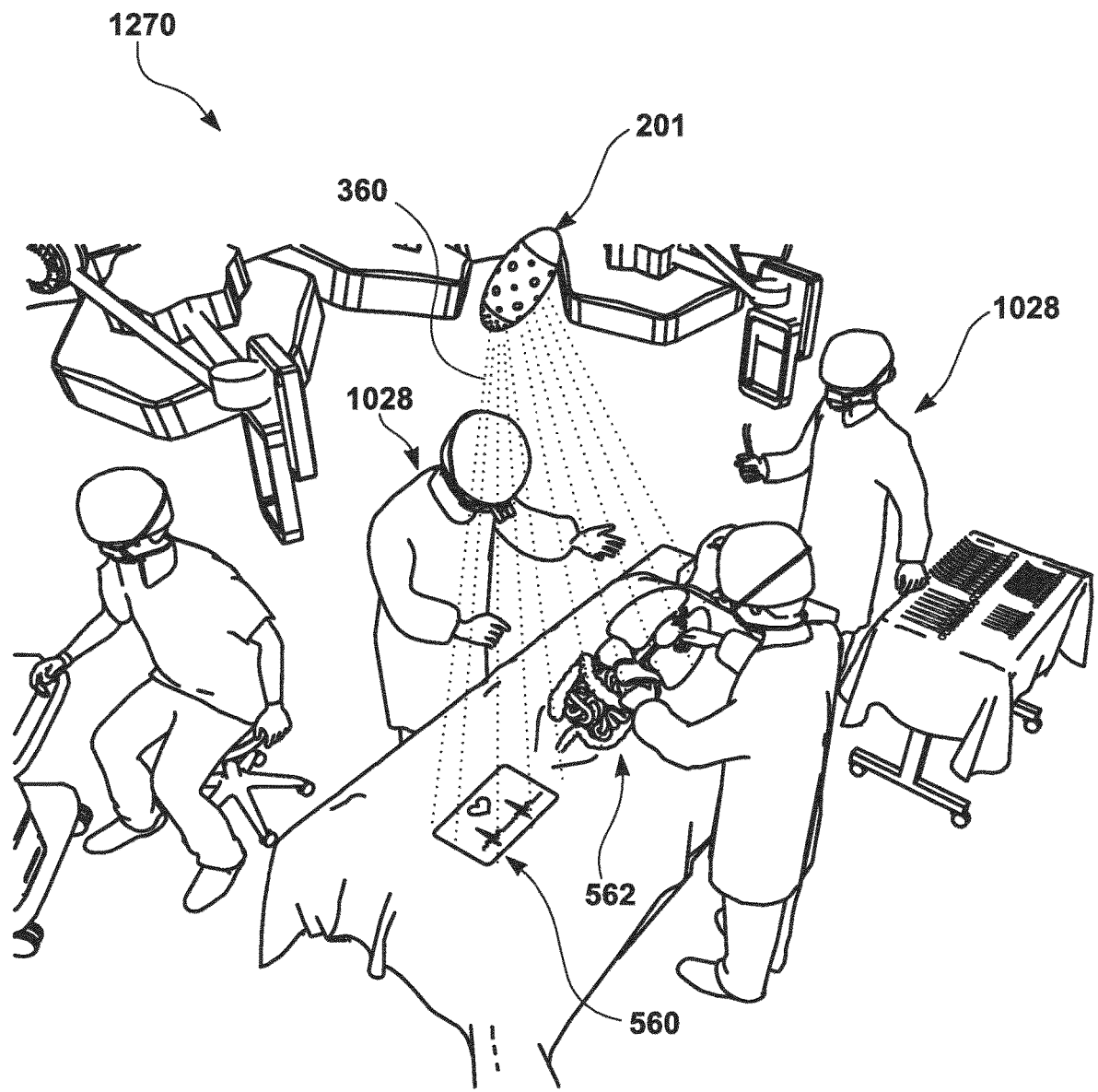
FIG. 40 illustrates the use of an AGUI system in a hospital operating room to provide information during an operation.

FIG. 40 illustrates how an AGUI device 201 may aid during an operation. The AGUI system has identified a surface on the patient's cover and is able to display the patient's vital signs 560 and other information in a convenient location to be viewed. In some applications, medical AGUI devices, internal and external to the patient, may be used to gather patient information; internal imaging, blood analysis, monitoring of vital signs, and other. The AGUI system may then process and prioritize the information and display a customized user interface to the members of the surgical team. Artificial intelligence may be used to detect anomalies and inform the medical staff at an early stage in the procedure.

Figure 41A:
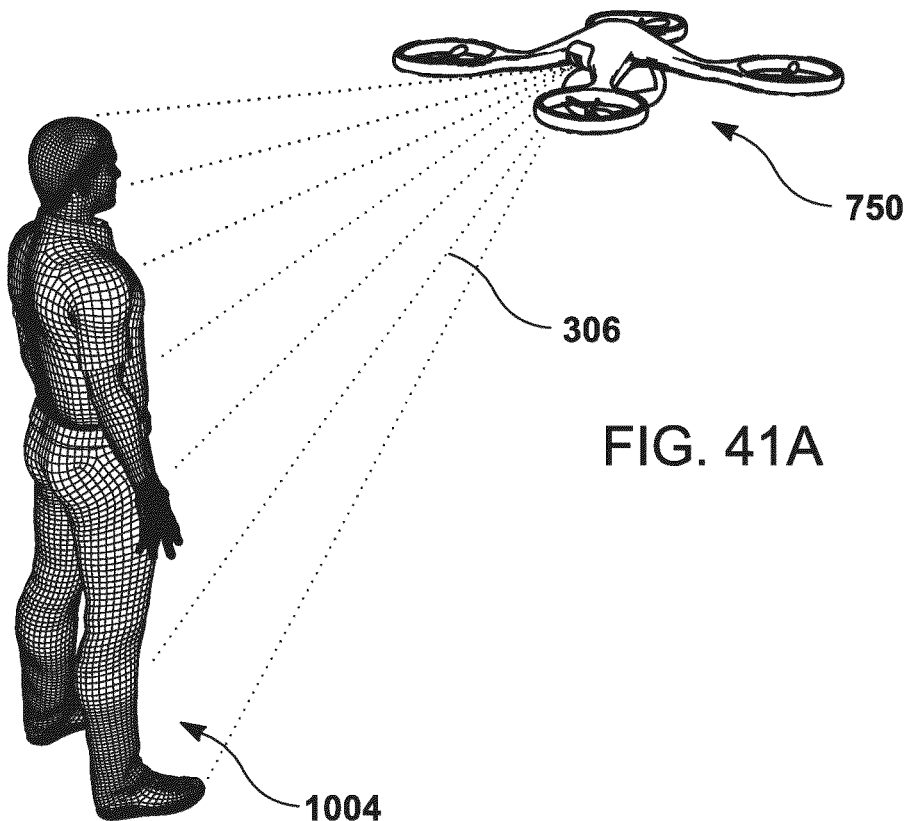
FIG. 41A-41B illustrated a drone based AGUI system.
Figure 41B:
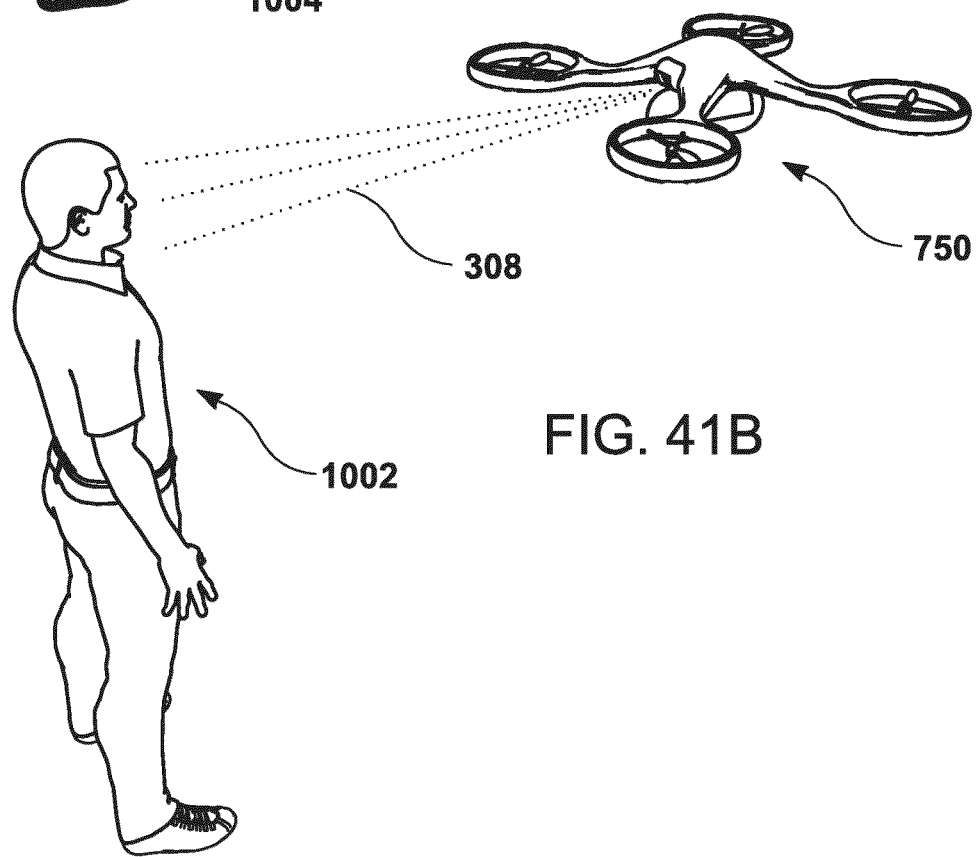
Figure 42A:
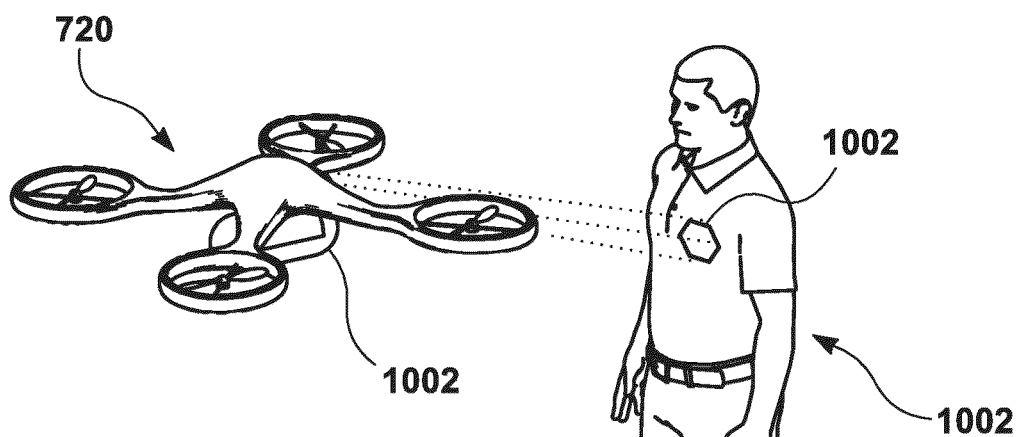
FIG. 42A-42B illustrates a drone based AGUI system that may be used to deliver packages.
Figure 42B:
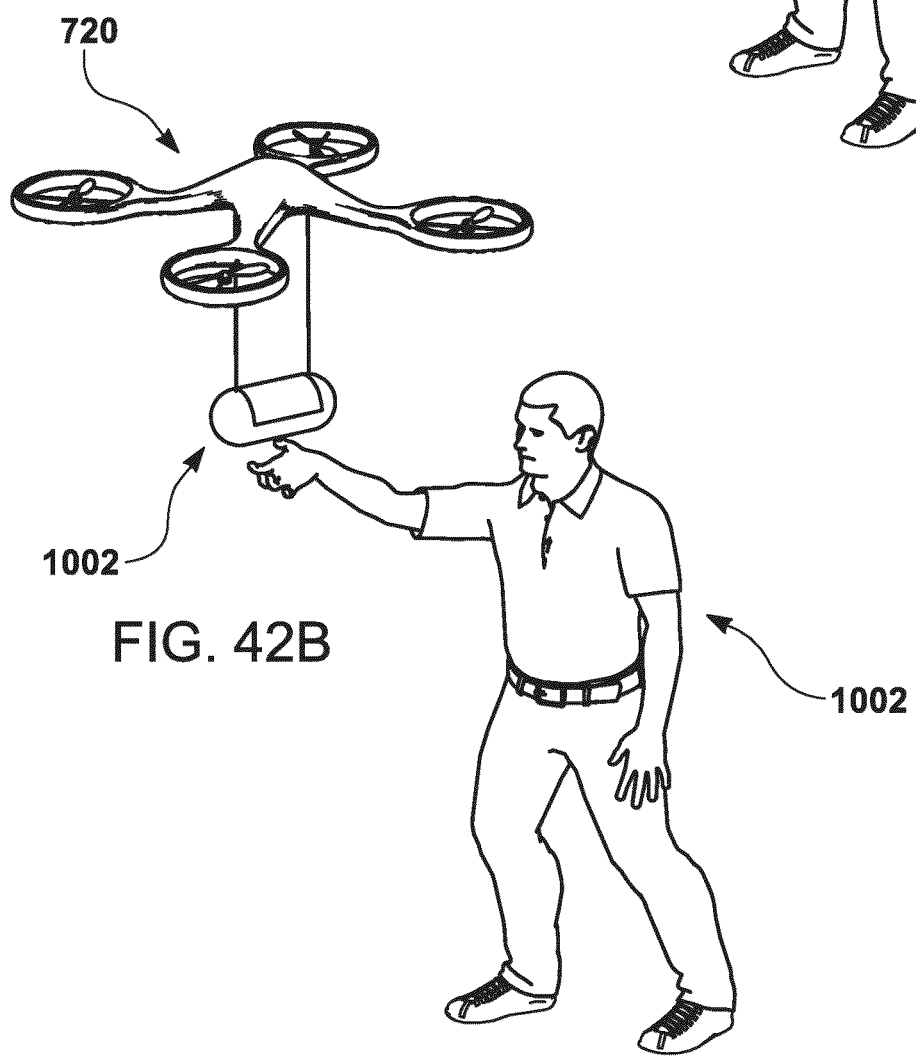
Figure 43:
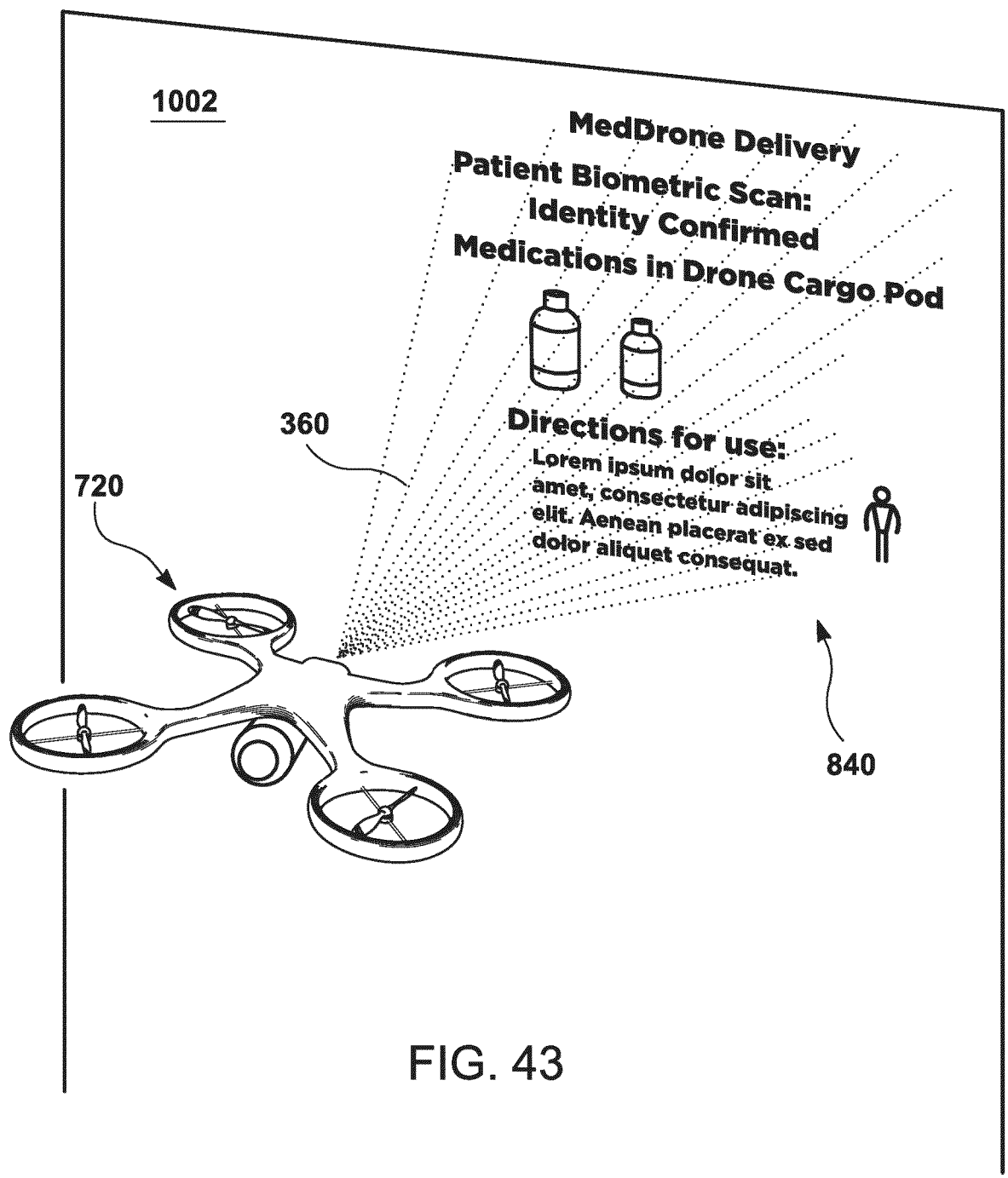
FIG. 43 illustrates a drone based AGUI system projecting instructions on a surface.

FIG. 41 illustrates the use of a flying drone as an AGUI device. FIG. 42 shows how an AGUI device 1002 may be used to perform delivery of goods. Here the flying AGUI drone detects or communicates with the package recipient. This may be done by the recipient 1002 wearing an AGUI enabled garment or wearable device, or by the being in possession of an AGUI dongle or similar device. Once the AGUI drone has authenticated the user, the package may then be delivered. FIG. 43 illustrates how in some embodiments, the AGUI drone may display a user interface 840 with directions relevant to the package or in order to obtain a signature or payment authorization from the user.

FIG. 41 illustrates the use of a flying drone 750 as an AGUI device. It can be appreciated that the AGUI device can be integrated with or attachable to the drone 750, and can include an aerodynamic body.

In some embodiments, the AGUI drone 720 can lower the package by way of motorized and/or retractable cables, as best illustrated in FIG. 42.

Figure 44A:
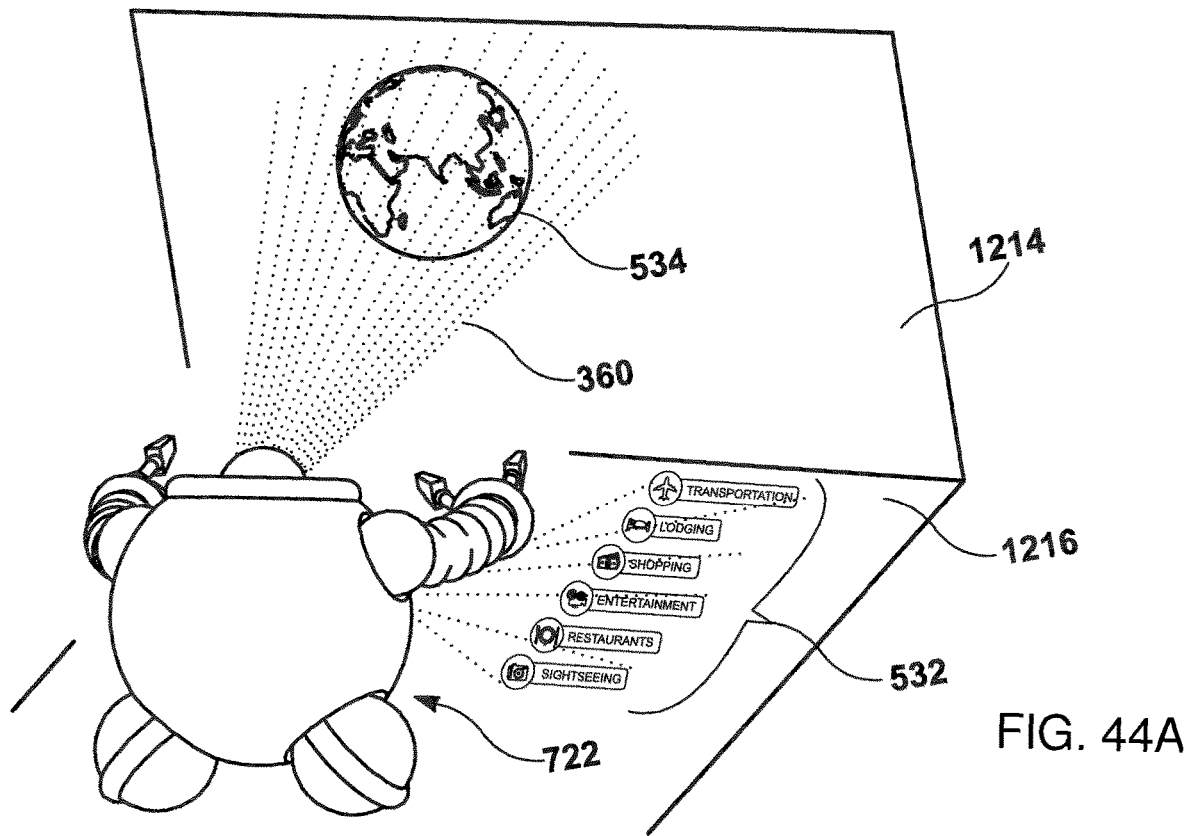
FIG. 44A-44B illustrates a rolling AGUI device that may move intelligently through its environment.
Figure 44B:
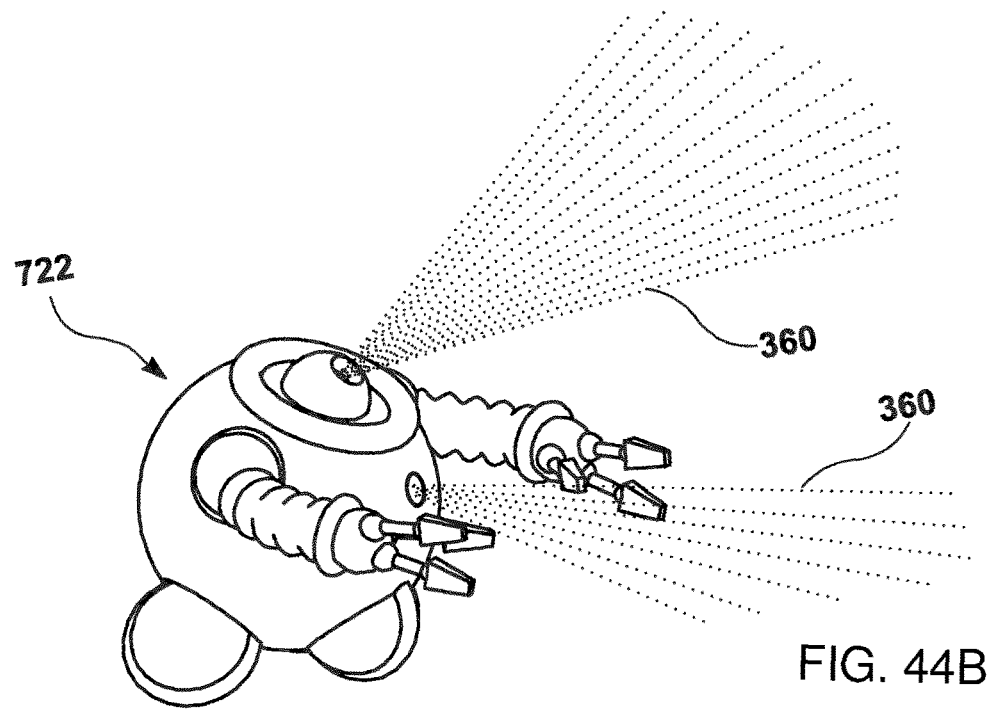

FIG. 44 illustrates the use of a rolling AGUI device such as the robot illustrated 722.

FIG. 44 illustrates the use of a rolling AGUI device such as the robot illustrated 722. The AGUI device can be attached to or replace a head unit of the robot. It can be appreciated that in some embodiments the AGUI device can be attached to or replace any part of the robot.

Figure 45:
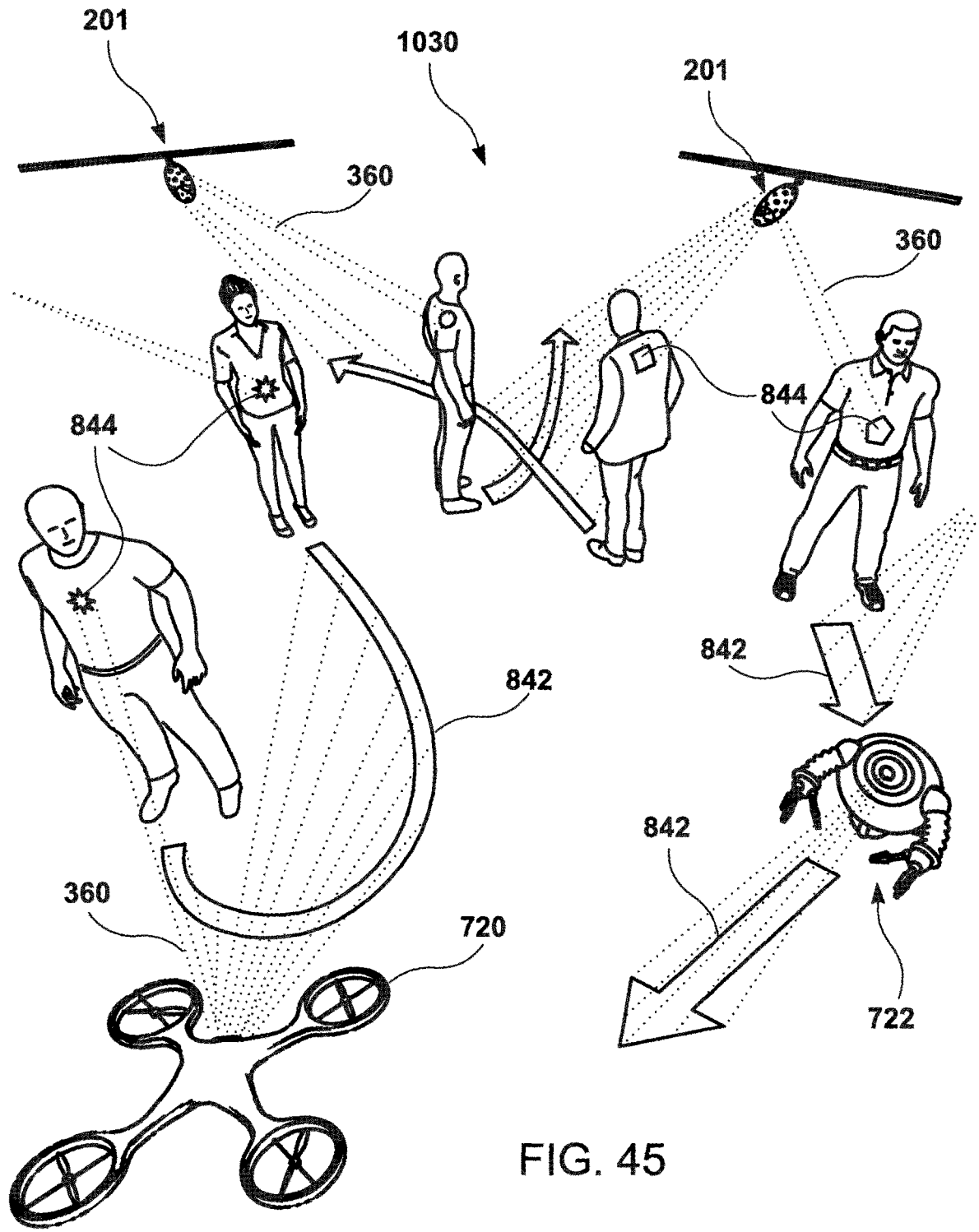
FIG. 45 illustrates a combination of AGUI projectors, flying, moving or stationary, interacting with multiple viewers.

FIG. 45 illustrates how a number of AGUI device may be networked together in a complex environment with a number of users in motion.

Figure 46A:
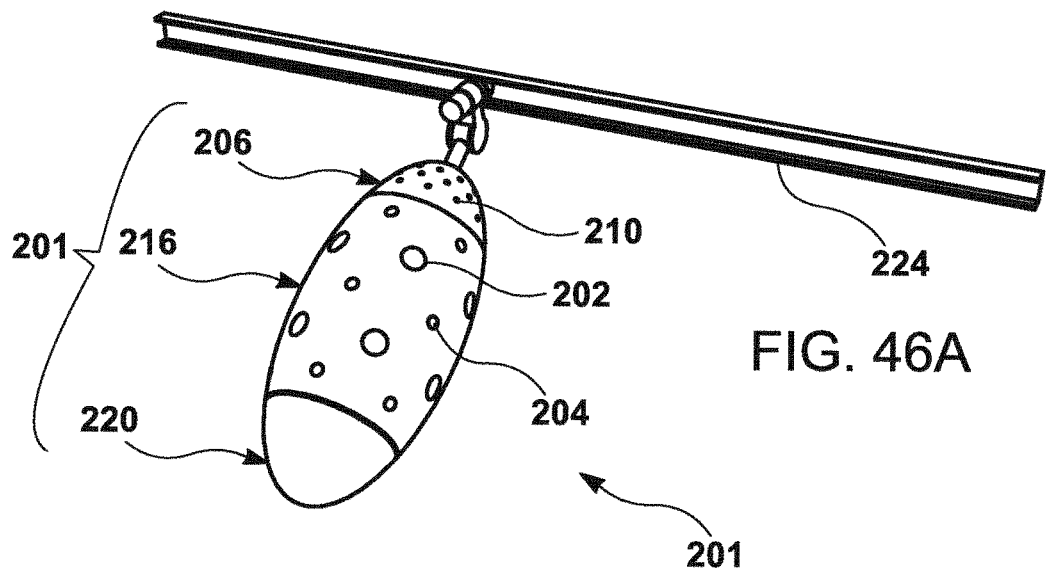
FIG. 46A-46B illustrates a track mounted AGUI device with a modular architecture.
Figure 46B:
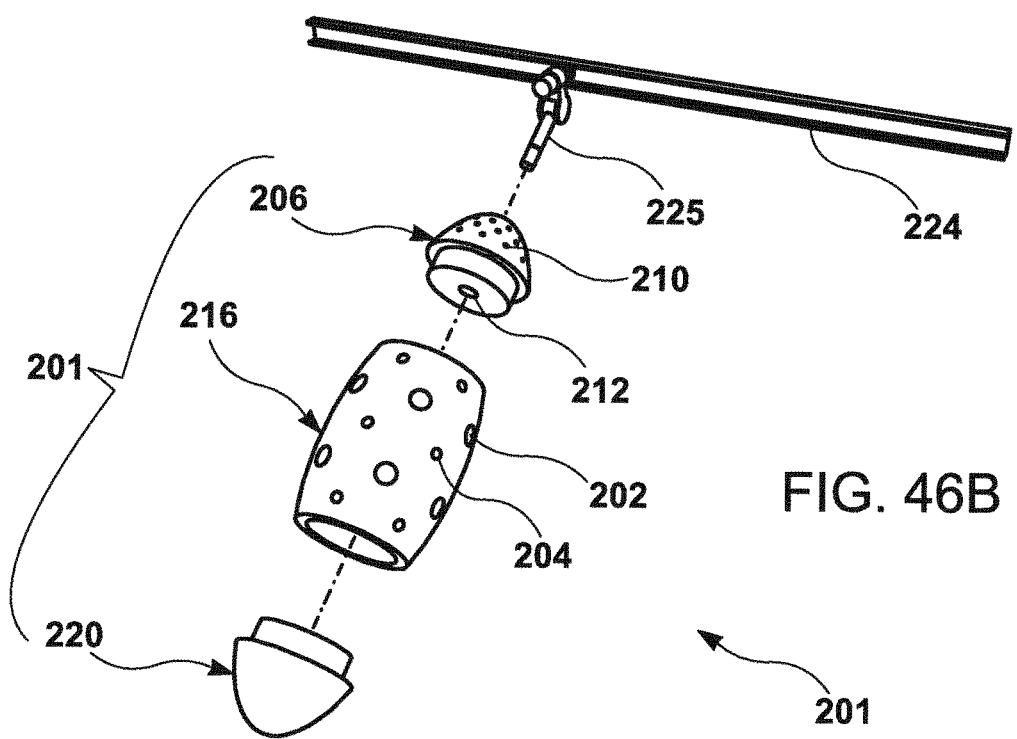

FIG. 46 illustrates how an AGUI device 201 may be constructed in a modular way. A track 224 is mounted and supplies power, and optionally, networking wiring. A track mount 225 for the device is coupled to a microphone and speaker array 206. The microphone and speaker module 206 is couple to a module 216 with light sensors and camera arrays. Finally, a light module 220 is attached so that the entire AGUI device 201 has the look of a typical track lighting module. FIG. 46 illustrates the use of a halogen or LED bulb 223 in the alternate light module 222.

Figure 47A:
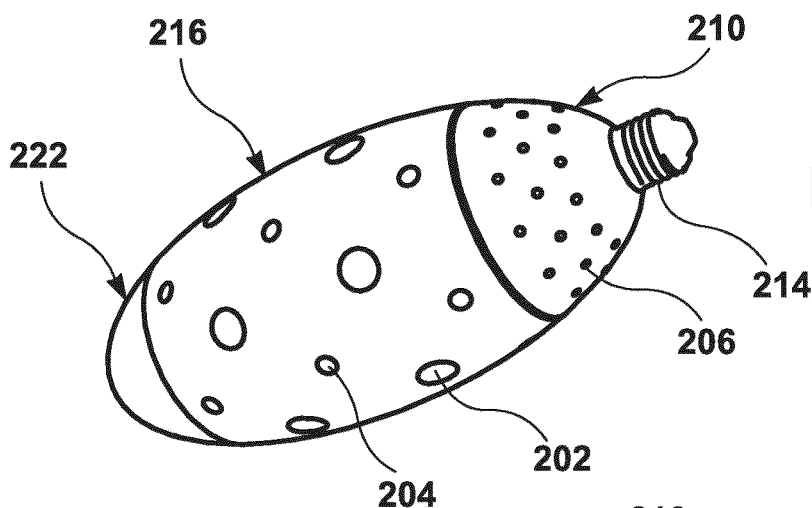
FIG. 47A-47C illustrates different plugin pieces and interfaces modules for an AGUI system. Microphones and sound. Combined with light source. Power port options (light bulb). Desk or track light. Different types of light interfaces. Hole is data and power port. Base or docking system.
Figure 47B:
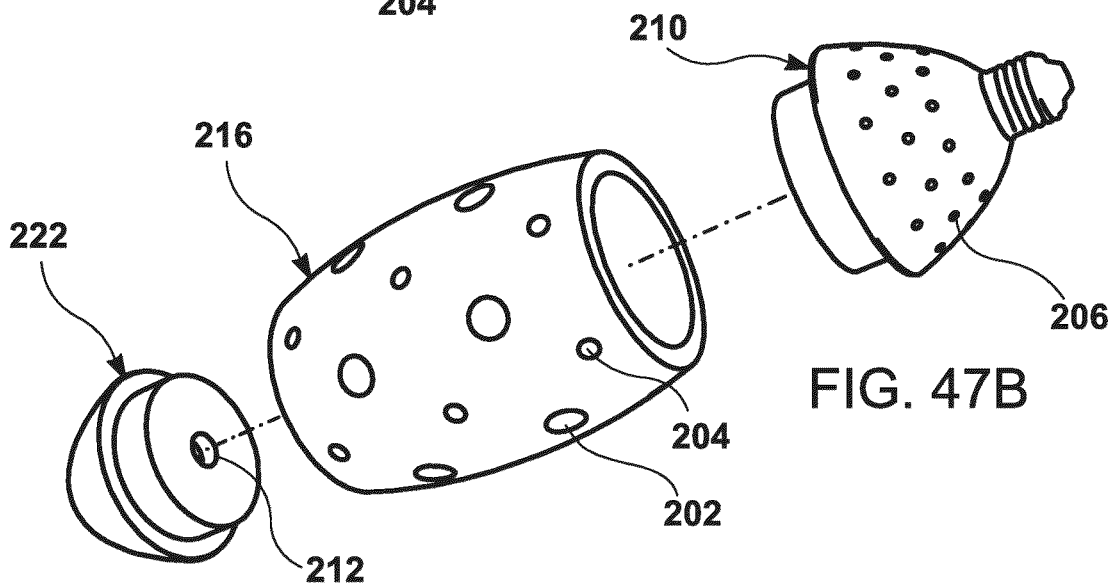
Figure 47C:
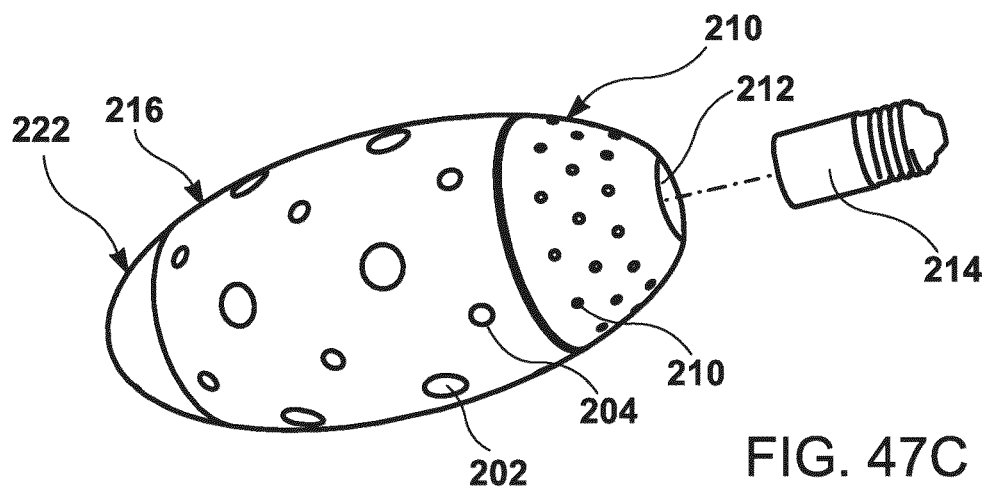
Figure 48A:
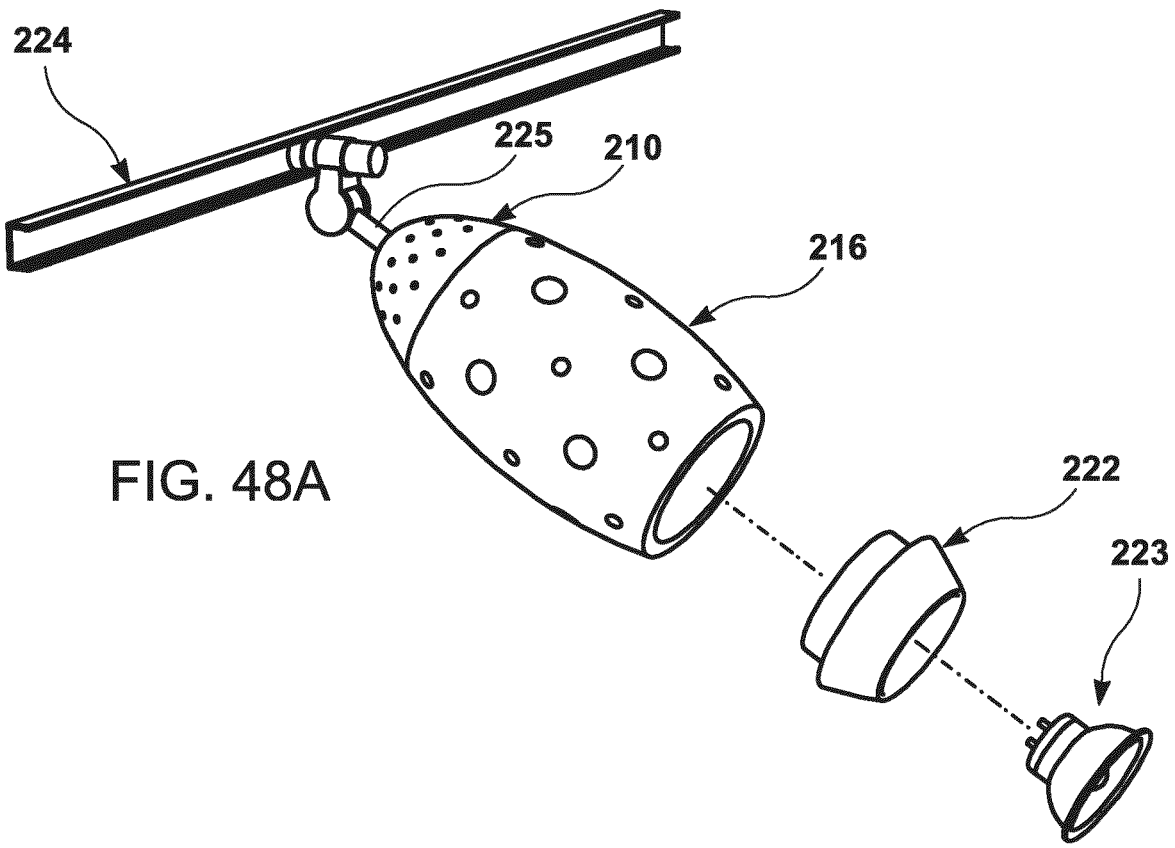
FIG. 48A-48B illustrates an AGUI device with an associated, non-AGUI device.
Figure 48B:
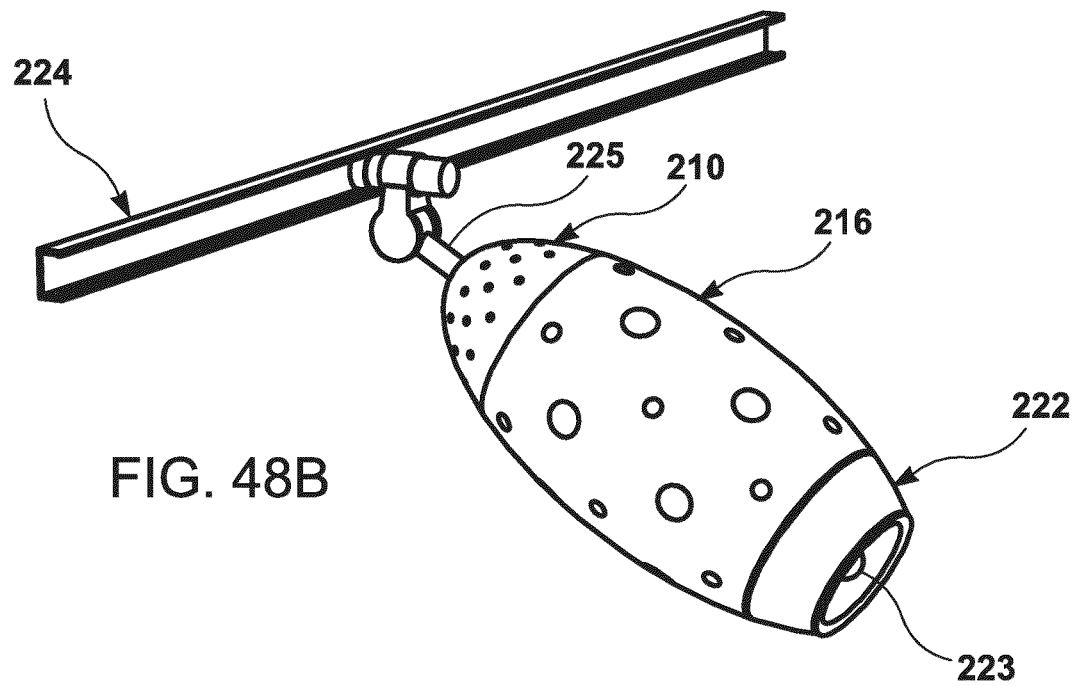

FIG. 47 shows how the module components may be interchanged. Here the microphone and speaker module 206 has been replaced by a similar module that screws into a standard light fixture socket. An alternate light module 222 is also used to provide a choice to the user. FIG. 48 illustrates how the light fixture adapter 214 may be removable and replaceable with other adapters to fit other types of fixtures such as bayonet type light fixtures and light fixtures of various diameters. FIG. 49 illustrates how a variety of base units 240 may be used depending on the application.

In the some embodiments of any one of the AGUI systems described herein, if the AGUI system determines that a projectable surface is detected, then the surface is mapped and characterized based on the mapping. After which, the AGUI system will select an appropriate projection scenario based on the surface characterization. Following this, the AGUI system will create a display based on the scenario, the current surface mapping and current desired display.

If the AGUI system determines that a projectable surface is not detected, but detects a surface that can create display and that the system can communicate with, then an external display scenario is created. Following this, the AGUI system will create a display based on the external display scenario. It can be appreciated that the AGUI system can create a display for both the projectable surface and the external display simultaneously.

It can further be appreciated that when two or more buses or vehicles are in close proximity the AGUI system can share information, display content and/or an interface between them, essentially creating a mobile network.

The present technology can include a controller system including computing hardware components and programming configured or configurable to perform operations associated with functions of the present technology device. Sensor subsystems including one or more sensors capable of detecting user and display surfaces can be utilized with or in the present technology. Display subsystems including one or more projectors capable of projecting image/data onto display surfaces and/or controlling peripheral display device can be utilized with or in the present technology.

The present technology is capable of continuously mapping its surrounding environment and can determine user location/orientation/field of view and/or user body part location/orientation, and/or optimal display surface(s).

The present technology is capable of continuously monitoring user and/or user body part movements for controlling the display subsystem and for determining user interface inputs associated with the displayed image/data.

One or more sensor arrays can be utilized in associated with mapping the environment and detecting user control interface.

In some embodiments of the present technology, each individual projector can be moveable to change its direction of projection, and/or the entire device can be moveable to change the direction of all the projectors.

The AGUI system of the present technology can utilize one or more Multi-Directional Smart Projector (MDSP) systems 201 that can include a mounting fixture configured or configurable to mount, support or attach to a surface or object, thereby allowing it to project images and sense conditions within an environment. The MDSP system 201 can be a compact device that embodies the general AGUI operations. The MDSP system 201 is capable of working and communicating with other MDSP systems or AGUI devices that might not be an MDSP system.

Figure 49B:
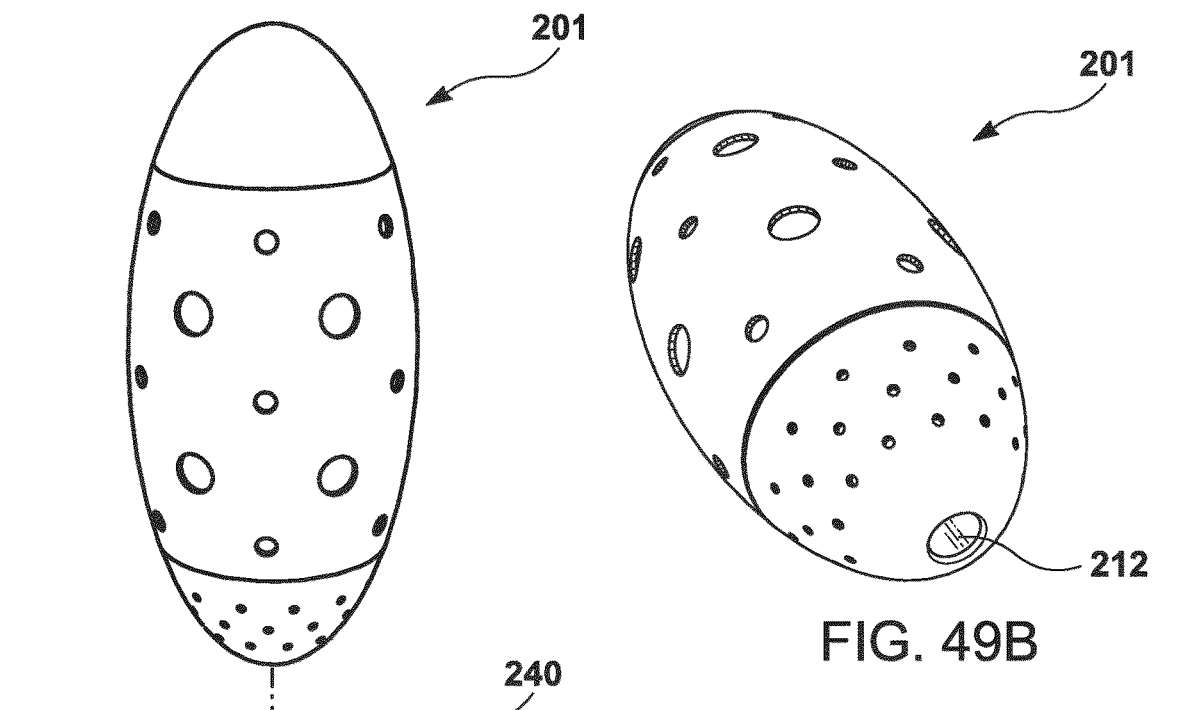
FIG. 49A-49C illustrates a modular base for an AGUI device.
Figure 49A:
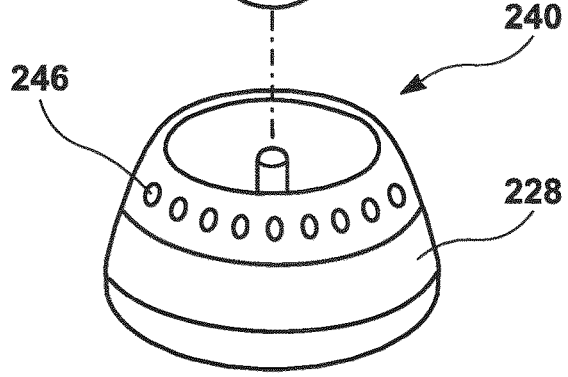
Figure 49C:
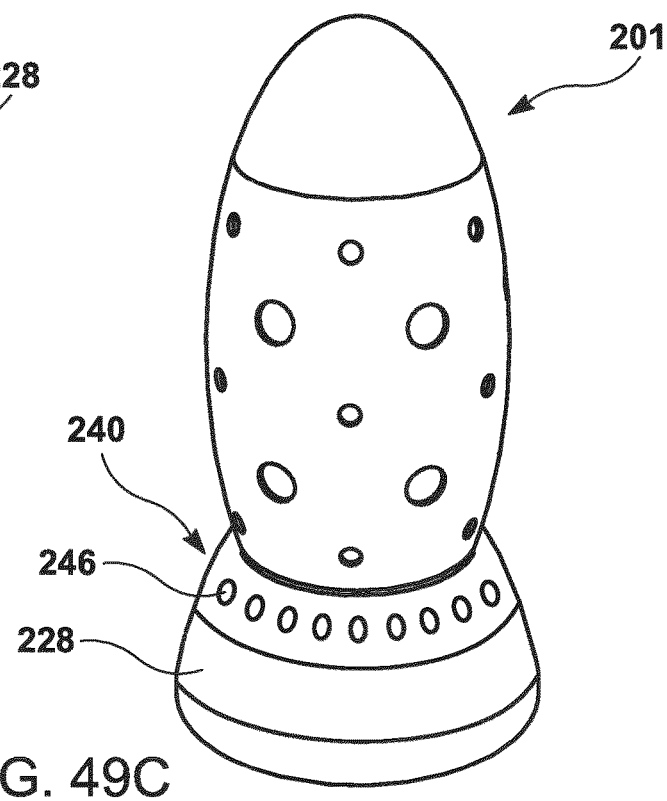
Figure 49D:
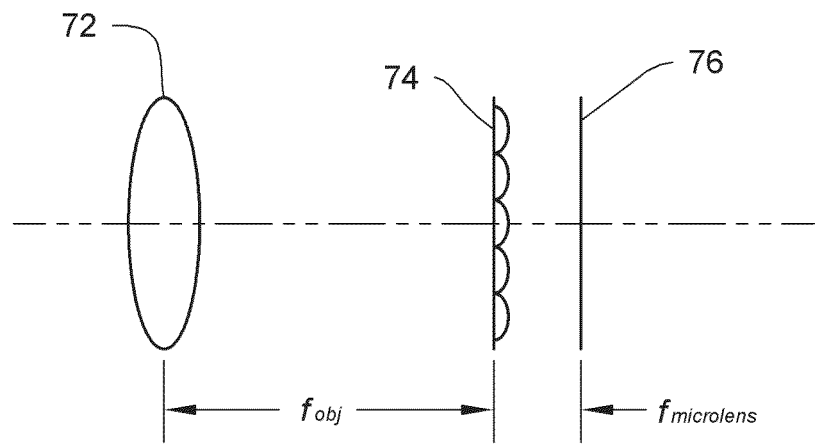
FIG. 49D is a diagrammatic representation of a plenoptic image system according to an embodiment that can be utilized in any one or more embodiments of the present technology AGUI system or device.

Some embodiments of the present technology can include a plenoptic system. As best illustrated in FIG. 49D, which is a plenoptic system according to one embodiment, the plenotic system can comprise an objective lens 72 that forms an image on a microlens array 74 and a CMOS sensor 76 that is placed in the focal plane of the microlens array 74. FIG. 49D is a diagrammatic representation of a plenoptic image system according to an embodiment that can be utilized in any one or more embodiments of the present technology AGUI system or device such as but not limited to the AGUI device shown in FIGS. 49A-49C, any one of the AGUI devices of FIGS. FIGS. 46A-46B, 47A-47C, 48A-48B or other embodiment(s) of the AGUI device.

An example of such an optical system can be found in the Apple iPhone 5s smart phone. In this example, the CMOS sensor 76 measures 4.8×3.6 mm with a pixel size of 1.5 microns. The array consists of 7,680,000 pixels, and is termed an '8 megapixel' sensor. It can be appreciated that other optical systems can be utilized with the present technology in replace of a smartphone camera or the described 8 megapixel sensor. Specific cameras or CMOS sensors with predetermined characteristics such as, but not limited to, resolution, megapixels, field of view, zoom magnitudes, etc. can be incorporated or utilized with the present technology.

The focal lens of the camera lens is computed from the size of the CMOS array 76 and the angular field of view of the camera. In the smaller sensor dimension, the field of view is 48 degrees. The focal length of the lens 72 can be given by equation 1.

$$f_{obj} = \frac{3.6}{2 \cdot \tan\left(\frac{48°}{2}\right)} = 4.04 \text{ mm} \qquad \text{Equation 1}$$

In following this example, a focal length ($f_{microlens}$) of the microlens 74 can be 0.5 mm and pitch (distance between lens centers) be 0.125 mm. The microlens array 74 is the same size as the CMOS sensor 76. This permits the creation of a 38×28 element microlens array.

The f-number is defined as focal length divided by the aperture diameter. The f-number of the objective lens 72 is the same as the f-number of each lens forming the microlens array 74.

The microlenses 74 have an f-number=f/4. For exemplary purposes, cell phone camera lenses typically have an f-number=f/2.2. Thus the cell phone camera lens is stopped to a 1 mm diameter aperture. If a longer focal length lens is used, the desired aperture diameter is larger.

This is a possibility for the MDSP system 201 because the physical thickness limitation of a cell phone does not apply to the MDSP system. However, the objective lens focal length can only be slightly increased, since as the focal length increases, the field of view decreases. To achieve a field of view similar to a smart phone and using a smart phone sensor, the focal length of the objective lens 72 needs to be similar to that used in a smart phone.

Summing the focal lengths of the objective lens 72 and the microlens 74, and allowing for lens and component thicknesses, the optical system between 5 mm and 6 mm thick with area equal to the CMOS sensor 76 and its mounting. If a longer focal length objective lens is used, the total thickness is greater.

To use such a plenoptic system, the CMOS camera can be connected to an image processing system containing a graphics processing unit (GPU).

The above design allows a dense sampling of the angular component of the light field captured by the plenoptic system due to the high count of pixels included in the sensor image associated with each microlens. But the spatial resolution, which is set by the number of microlenses in the array, is low. Thus, reconstructed images may have low spatial resolution.

Figure 49E:
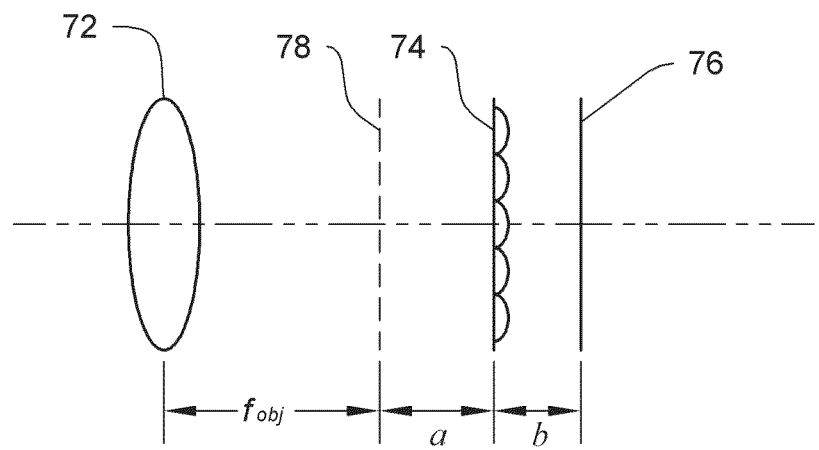
FIG. 49E is a diagrammatic representation of a plenoptic image system according to an embodiment that can be utilized in any one or more embodiments of the present technology AGUI system.

Referring now to FIG. 49E, an alternative exemplary plenoptic camera system can be utilized with the present technology. FIG. 49E is a diagrammatic representation of a plenoptic image system according to an embodiment that can be utilized in any one or more embodiments of the present technology AGUI system or device such as but not limited to the AGUI device shown in FIGS. 49A-49C, any one of the AGUI devices of FIGS. 47A-47C, FIGS. 48A-48B or other embodiment(s) of the AGUI device. This alternative exemplary plenoptic camera system can comprise of the objective lens 72 that forms an image on the microlens array 74 and the CMOS sensor 76 that is placed in the focal plane of the microlens array 74. However, the focal plane 78 of the objective lens 72 is located a predetermined distance "a" from the microlens 74, with the CMOS sensor 76 being located a predetermined distance "b" from the microlens 74. This alternative exemplary plenoptic camera design is configured or configurable to balance angular and spatial resolution while using substantially similar components found in the optical system of FIG. 49D.

The CMOS sensor and the microlens array are placed so that the CMOS sensor is imaged by the microlenses in the focal plane of the objective lens. Object distance="a"; image distance="b". The overall system length is larger than the first design but this can be accommodated in a MDSP. The values of "a" and "b" are adjusted to allow the spatial resolution of reconstructed images to be increased while decreasing the density of angular sampling.

The MDSP system 201 can include a micro laser projector. An exemplary micro laser projector utilizable in the present technology can be an optical system that projects images onto a surface using a combined laser beam consisting of red, green and blue beams. Full color images can be formed on the surface utilizing such a micro laser projector.

In the exemplary, embodiments of the present technology can utilize a scanner consisting of a programmable Micro Electro Mechanical System (MEMS) mirror. Such an MEMS mirror can be utilized with the optical system or other components of the present technology. The MEMS mirror is tilted under program control to direct the combined laser beam to various locations of the display area thus scanning the beam over the display area and so doing creating the display. As the MEMS mirror scans the combined laser beam, at each location the intensity of each of the 3 lasers making the combined beam is set by the program thus producing the desired color and brightness at that location. Given the limited expansion of laser beams as they propagate, the image is in focus over an extended depth of field.

An example of such a projection system is the MicroVision PicoP system. The physical dimensions are: thickness=6 mm; width=36.3 mm; depth=53.4 mm. It consists of two parts, the optical portion (IPM) and the electronic control portion (EPM). Both the IPM and the EPM have the same width, but the depth of the EPM is somewhat less than that of the IPM.

With IPM and EPM separated, both can fit into an enclosure of the MDSP system. Several such units facing in different directions may be included in a single MDSP system 201, thereby providing a wide angular range of coverage, including 360 degree coverage.

In some embodiments of the present technology, a camera and projector used as a pair can be utilized. The projected field of the PicoP system can be 45 degrees. This is comparable to the exemplary plenoptic camera system described above. The camera can image the entire projector image. This is true at all distances from these two systems if they are placed together and have the same central direction of view.

The camera system image can provide the stimulus to modify the projected image so that the intensity and contrast of the viewed image is that desired by the AGUI system. Input image data to the projector system can consist of three arrays of intensity values, one for each color. When the observed intensity (camera values) for each pixel and each color are not the values desired, the AGUI system can modify the image data sent to the projector system to correct for this difference.

There may be a limit to this correction, in that each laser has a maximum intensity. But such a system is able to compensate for variations in back scattered light due to changes in the surface on which the image is projected.

Arrangement of the camera/projector pairs within the MDSP system 201 can be utilized. A span of 360 degrees of projection and viewing the MDSP system 201 can be accomplished with eight projector/camera pairs 202, each pair covering just over 45 degrees of field of view, as best illustrated in FIGS. 49D and 49E. Using two layers of eight pairs each, the useful covered vertical space ranges from substantially 20 degrees above horizontal to 65 degrees below horizontal. This is achieved by tipping one set of eight pairs downward 45 degrees with respect to the set that projects nominally horizontally. It can be appreciated that any number of camera/projector pairs that cover a predetermine field of view range can be utilized to result in 360 degrees of projection and viewing.

The intensity of the laser beams is such that there is intense back reflection from any simple transparent exit window in the MDSP system 201. It is beneficially that such reflections should not fall on any plenoptic camera sensor in the MDSP system 201. A solution to this laser back reflection problem can be to place the objective lens 72 of the plenoptic camera system on the outer surface of the MDSP system 201, in the same plane as the exit window of the micro laser projector, and surround the rest of the camera with an outer opaque skin. The window reflections would come back into the MDSP system 201, but can never reach the camera sensor.

The MDSP system 201 can include electronic for operation of the optical and/or camera systems. The MDSP system 201 can be a self-contained unit comprising the following: electronics for image processing; electronics for communication in a networked AGUI system; power to operate all components.

Each plenoptic camera system can include a GPU to process the data collected from its CMOS sensor. This creates focused images and distances to the focal plane. This camera electronic package can communicate with an AGUI network controller to provide it with information including distance data for spatial mapping. The camera electronics can also communicate with the EPM of the projector to send modifications to the image data that the AGUI network controller sends to the EPM so that correct contrast is obtained for viewers.

Several criteria can be used to determine the location in space of a MDSP system 201 and the direction of view of its cameras and projectors. When there is more than one MDSP system 201 in a space, the AGUI controller requires the spatial location of each MDSP system 201 in order to generate a composite map of the environment and/or display area and objects within it. The AGUI controller requires location and distance information from the field of view of each MDSP system 201 and location and view direction of each MDSP system 201. With this data, the AGUI system can direct the projectors of each MDSP system 201 to form images in desired locations with desired content. The MDSP system 201 acquires or computes the sensed location and direction data similar to that available in smart phones.

It can be appreciated that the AGUI system and/or MDSP system 201 can utilize other camera systems. The MDSP system 201 can use camera systems other than the plenoptic system to provide 3D locations of objects in the camera system field of view.

One such system that can be utilized is a 'time-of flight' camera. Such systems offer the same capabilities as plenoptic camera systems. However these systems can be more complex in terms of physical components and electronic control.

Two cell-phone type cameras can be used as a pair. The optical axes of the paired cell-phone cameras are horizontally separated, for example like the separation of human or animal eyes. This provides stereo vision or imaging. In the MDSP system 201, such a camera stereo pair is in turn paired with the projector system described above. The two camera images are input to a GPU that correlates the images and extracts the depth positions of objects using parallax.

Some embodiments of the AGUI system can utilize multiple MDSP systems 201 within a given display space. These MDSP systems can be in communication with each other and/or other peripheral devices or systems.

Use of several MDSP systems 201 in a given space can provide advantages over a single unit. The cameras of the MDSP systems 201 can image one another and image common items within the space or environment. Such images can be communicated to the AGUI system controller. The AGUI system controller can use the direction of view of each MDSP system 201 as it views a neighbor and uses correlation of image details, and the direction of view of each MDSP system 201 to common objects to locate the MDSPs with respect to one another and to objects in the space or environment. Given this redundancy, location and direction data of all MDSP system 201 in the overall AGUI system can still be constructed. Such situations occur in spaces or environments where GPS signals are not sufficiently strong for the location and direction sensing electronics to work well.

Additionally, projection can still be accomplished if the projector in use is temporarily blocked by an object in the projector path. Another MDSP projector with an overlapping projection field can be assigned to take over creating the display.

Use of multiple MDSP systems 201 allows projection coverage of a larger display area than one projector can access, without distortion of images. An individual MDSP system 201 with projector and camera systems carefully arranged can project images that completely cover the area or environment surrounding it. However, if a planar display area is larger than the field of a single projector whose direction of view is essentially perpendicular to the display area, the other projectors in the MDSP will project at a large angle to the surface, thus distorting the images they form due this disadvantaged angle. Using additional MDSP systems 201 whose projection fields are adjacent to the field of the first projector but with their direction of view essentially perpendicular to the display area, an undistorted image field is created. Such combined projected images are coordinated by the AGUI system controller. By using two or more MDSP systems 201, the distortion problem may be removed without resorting to image warping.

When a large display is constructed with multiple MDSP systems 201, projected data can be scrolled from one area of the large display to another area. With conventional technology such multiple display usage can be realized by arranging two or more physical displays in close proximity. In the MDSP system 201, the location of the display area is smoothly reorganized when the AGUI controller perceives that viewers have moved. The projected data may be moved to adjust to the viewers' changed locations.

The placement of multiple MDSP systems 201 in a space or environment can be utilized for optimal performance. For optimal performance, multiple MDSP systems 201 may be placed in the space or environment in an organized fashion. The field of view of each individual MDSP system can be considered geometrically. The available display area is tiled by the fields of view of the multiple MDSPs. The MDSPs are placed so that the available display area is covered by the projectors and cameras of a MDSP without excessive multiple coverage of sub-areas. Some small overlap is desirable to ensure continuity as display data is scrolled or moved from one projector to another.

The fields of view of the MDSP projectors and cameras are considered together to form the composite field of view of the MDSP. Given a field of view expressed as a solid angle $\Omega$, and the distance to the display area d, the coverage area is given by $A = \Omega \times d$.

Where the MDSPs are placed in an elevated position such as, but not limited to on a wall or ceiling, for example as illustrated in FIGS. 1-3B and 30A-31B, there is a maximum distance dmax from the MDSP to a potential display area. The field of view of the MDSP is essentially square, so the solid angle is given by $\sigma = \sqrt{\Omega}$. Maximum display width=$\sigma \times$ dmax. If the display projected by adjacent MDSPs is not overlapped, the MDSPs can be placed at a pitch given by this width. To allow some overlap of display areas at the maximum distance, a slightly small separation distance between MDSPs is chosen.

Placement of MDSPs for most effective use is a matter of deciding on the maximum distance in which a group of MDSPs will have to display images, and then spacing the MDSPs using the considerations described above.

The MDSPs that are placed on the walls or on the ceiling near a wall might provide inefficient operation. A more efficient way to place MDSPs in such a space is to mount them centrally on the wall or centrally on the ceiling. Then an individual MDSP creates a display in the full space or environment surrounding it. A single MDSP creates a display on walls and surfaces that are perpendicular to one another if it is placed so that one of the fields of view of a projector/camera system covers the area.

As best illustrated in FIGS. 46A-49C, the MDSP system 201 can be a single integrated device or can include multiple modules such as, but not limited to, a microphone and speaker module 206, a light sensor and camera module 216, and a light module 220. The modules can be arranged in any sequence or arrangement, in an exemplary, the microphone and speaker module 206 can be attached or attachable to the mounting fixture, with the sensor and camera module 216 attached or attachable to the microphone and speaker module 206. The light module 220 can be attached or attachable to the sensor and camera module 216. It can be appreciated that additional modules can be utilized with the present technology. It can further be appreciated that the MDSP system 201 can include a general configuration allowing each module 206, 216, 220 to provide an angular coverage suitable for the environment where the MDSP system is located. In some cases, the coverage can include 360 degree coverage.

The microphone and speaker module 206 can include a microphone and speaker array 210. The array 210 can include multiple microphones in an annular or peripheral arrangement, and multiple speakers in an annular or peripheral arrangement. The annular or peripheral arrangement of the microphones and speakers can be provided to meet the angular coverage requirement for that environment. A power/data port 212 can be located at an end portion of the module 206, which can be operable connected to a corresponding power/data port of an adjacent module.

The microphone and speaker module 206 can feature, but not limited to, an oval, curved, tapered or conical configuration with the microphone and speaker array 210 being radially arranged. This configuration can provide 360 degree coverage of the environment.

The sensor and camera module 216 can include a light emitter and projector array 202, and a light sensor and camera array 204. The light emitter and projector array 202 can include multiple light emitters in an annular or peripheral arrangement, and multiple projectors in an annular or peripheral arrangement. The light sensor and camera array 204 can include multiple light sensors in an annular or peripheral arrangement, and multiple cameras in an annular or peripheral arrangement. The annular or peripheral arrangement of the light emitters, projectors, light sensors and cameras can be provided to meet the angular coverage requirement for that environment. It can be appreciated that a power/data port can be located at one or both end portions of the module 216, which can be operable connected to a corresponding power/data port of an adjacent modules.

The sensor and camera module 216 can feature, but not limited to, an oval, curved, tapered or conical configuration with the light emitter and projector array 202, and the light sensor and camera array 204 being radially arranged. This configuration can provide 360 degree coverage of the environment.

The light module 220 can be a LED or light bulb cover, with one or more light sources provided therewith. The light sources can be configured to provide an angular coverage suitable for the environment where the MDSP system is located. It can be appreciated that a power/data port can be located at at least one end portion of the module 220, which can be operable connected to a corresponding power/data port of an adjacent modules.

The sensor light module 220 can feature, but not limited to, an oval, curved, tapered or conical configuration with the light source located and/or the module 220 configured to provide 360 degree coverage of the environment.

It can be appreciated that the MDSP system 201 can have, but not limited to a spherical, oval or any geometric configuration. The microphone and speaker module 206 and the light module 220 can include a first end featuring a diameter less than an internal diameter of corresponding ends of the sensor and camera module 216. The first ends of microphone and speaker module 206 and the light module 220 are configured to be at least partially receivable in the corresponding end of the sensor and camera module 216, respectively. This configuration provides a modular function to the MDSP system 201, allowing for different modules to be operable interconnected.

In some embodiments, the MDSP system 201 can include a track mount adapter 225, and track 224. The track mount adapter 225 can be slidably and electrically operable with the track 224, with power and/or electrical communication signals being communicated to and/or from the MDSP system 201 via the track 224 and track mount adapter 225. The track mount adapter 225 can feature a hinge or pivoting mechanism, allowing the MDSP system 201 to be repositioned or re-orientated. The modules 206, 216, 220 can include a power/data port 212 located at at least one end portion thereof, which can be operable connected to a corresponding power/data port of an adjacent modules.

Figure 53:
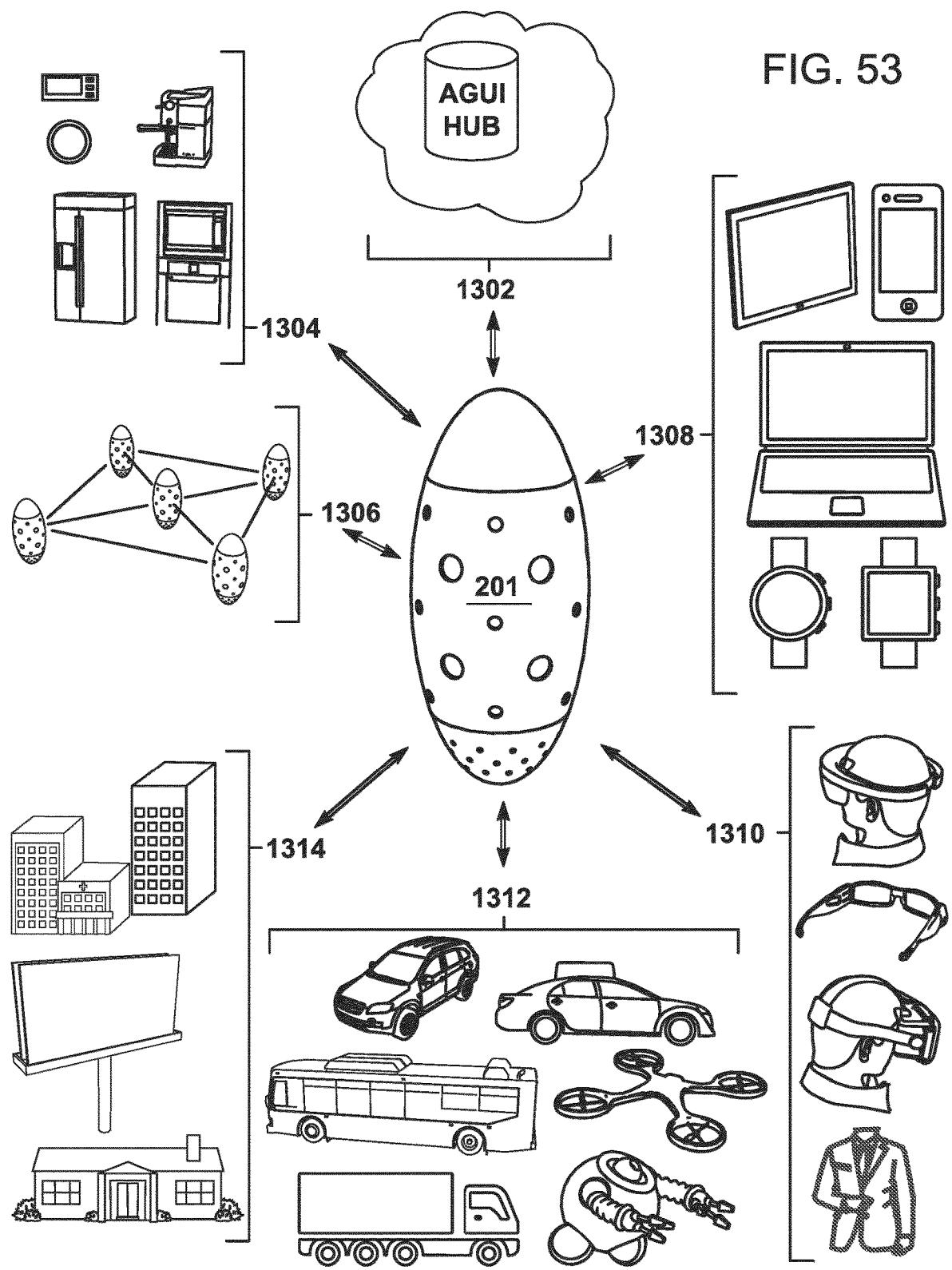
FIG. 53 illustrates the use of a network of AGUI devices where the central hub is also an AGUI display, interfacing, computing, communications and networking device.

FIG. 53 illustrates how an AGUI device may implement a number of different features that are combined in a single unit 201. In this embodiment, the AGUI hub 201 includes sensors to detect its environment, a projector, hub functionality, and networking ability. The AGUI hub may communicate with a AGUI Internet HUB/Server/Platform 1302, AGUI enabled home systems & appliances 1304, an AGUI device group network 1306, AGUI enabled desktop, enterprise and mobile computing devices and entertainment systems 1308, AGUI enabled wearable, augmented reality, virtual reality and mixed reality computing, display and interfacing systems 1310, AGUI enabled vehicles, robotics and transportation systems 1312, and AGUI enabled buildings, walls, ceilings, windows, streets and sidewalks, stores and businesses, billboards, kiosks, bus stops, train stations, airports and other indoor and outdoor displays and display systems 1314.

Figure 54:
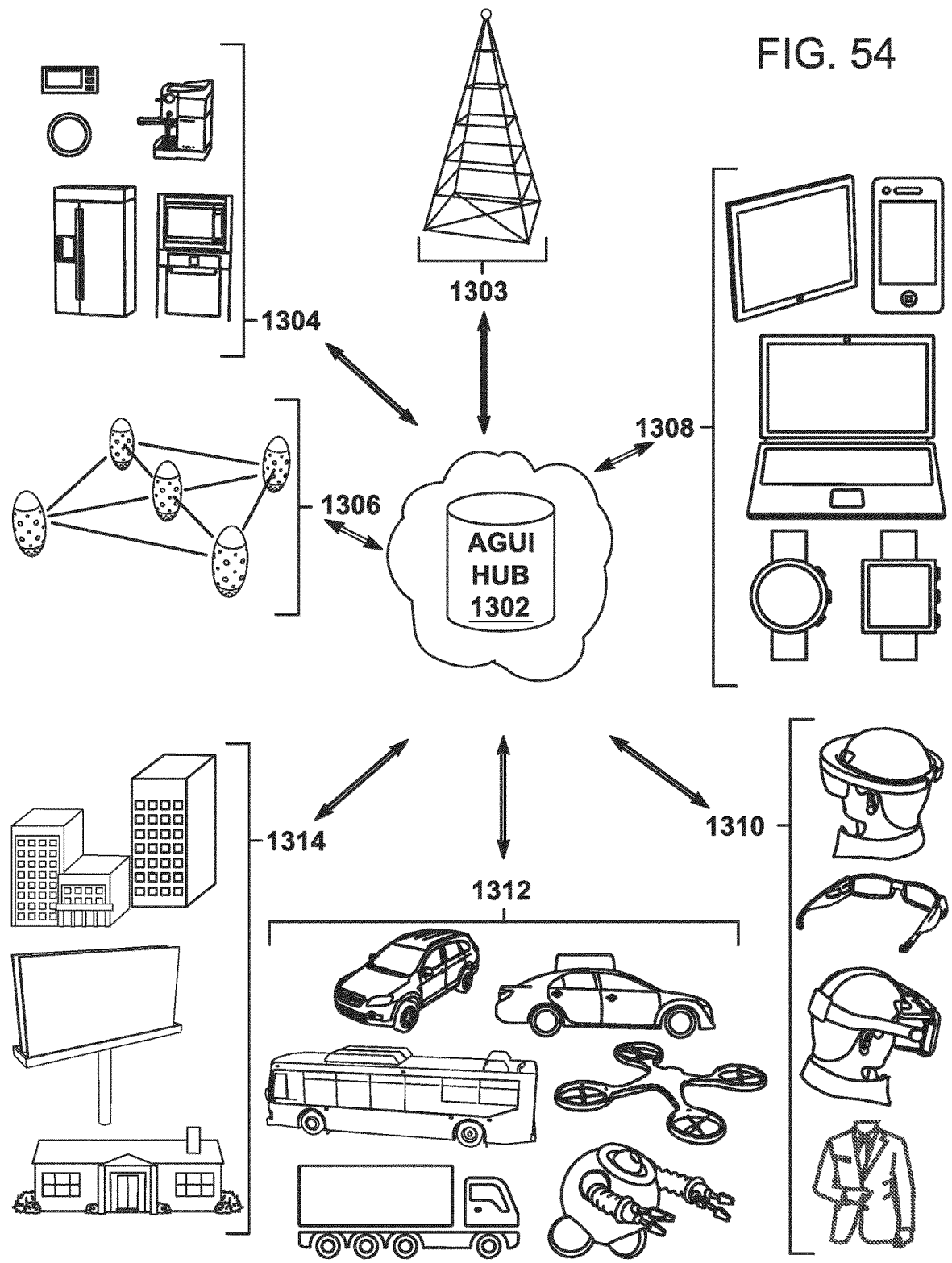
FIG. 54 illustrates the use of a network of AGUI devices connected to a central AGUI HUB where the HUB is an Internet or other network based platform and/or operating system that lacks a physical device other than the devices and systems that are connected to the HUB.

FIG. 54 illustrates how an AGUI device may implement the functionality of a networked hub 1302 without sensor or display features. In this embodiment, the AGUI hub 201 includes hub functionality, and networking ability. The AGUI internet hub/server/platform 1302 may communicate with cell tower/wireless communications infrastructure 1303, AGUI enabled home systems & appliances 1304, an AGUI device group network 1306, AGUI enabled desktop, enterprise and mobile computing devices and entertainment systems 1308, AGUI enabled wearable, augmented reality, virtual reality and mixed reality computing, display and interfacing systems 1310, AGUI enabled vehicles, robotics and transportation systems 1312, and AGUI enabled buildings, walls, ceilings, windows, streets and sidewalks, stores and businesses, billboards, kiosks, bus stops, train stations, airports and other indoor and outdoor displays and display systems 1314.

Other examples of an AGUI system incorporating these teachings exist, building on the concepts and description contained herein.

Reference will now be made in more detail to AGUI architecture, apparatus and operations of the AGUI system according to some embodiments. It will be understood that these AGUI architecture, apparatus and operations can be implemented in the AGUI devices, systems and methods of the embodiments described herein including those shown in any of the accompanying drawings.

1.2. Architecture Overview

Figure 50:
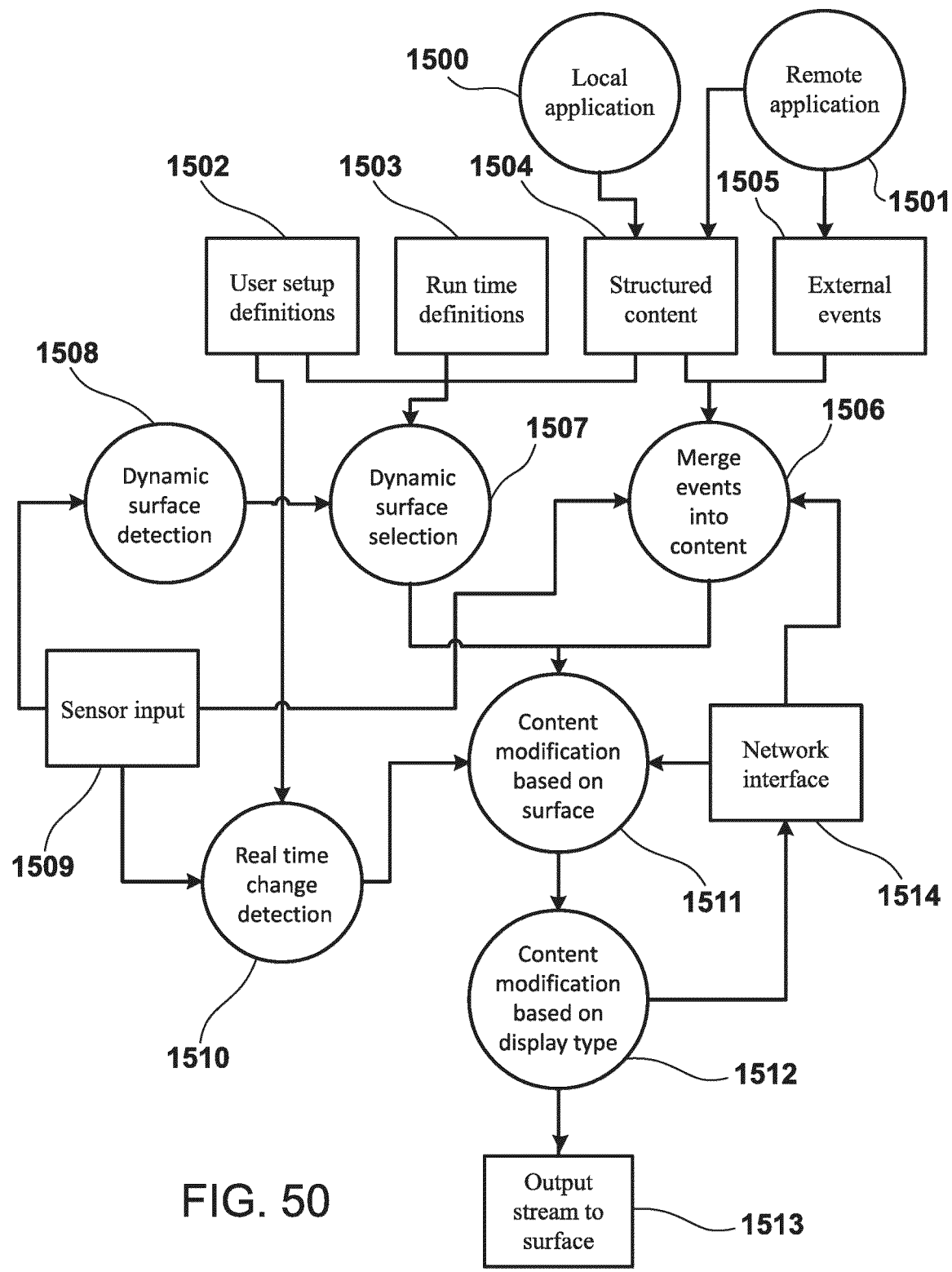
FIG. 50 illustrates a block diagram of the components of an AGUI system.

The architecture of the AGUI system is shown in FIG. 50. A local application 1500 is executed on an AGUI device and produces structured display content. A remote application 1501 may also be executed to also produce structured display content as well as receiving external events 1505. The content from the local application and the remote application are combined to produce the structured content 1504 used by the system. A number of inputs are used by the system to configure itself. One source of inputs are user setup definitions 1502 which are preferences or previous choices defined for each user or group of users of the system. Another is run time definitions 1503 which are decided or calculated as the application is run. The system may start a session by interrogating the environment and using rules to determine a choice of display surfaces. The system will remember these choices for the next time it is used. A user may explicitly override some or all of these display surface choices, after which the system will use the user preferences over the rule based choices it made.

1.3. Architecture Drawing

The following statements further clarify the individual elements of FIG. 50.

The hardware of an AGUI normally includes a CPU running an OS and a set of application programs. More information is in sections 1.1, 1.2, 5.1.

A program running on a remote system (another AGUI or any other device) can also provide AGUI input. More information is in sections 6.1, 6.2.

The AGUI starts with a set of programmed defaults. These can be over-ridden by the user at setup time. More information is in section 5.2.

An AGUI learns its behavior by maintaining information about ongoing usage. This may result in autonomous decision making. The user can always over-ride autonomous selections. More information is in section 5.2.

Content has fixed and variable components. Variable components may include options for displaying the content in different ways, depending on surfaces chosen. Variable components may also include parameters that are provided at run time by values from input sensors. More information is in sections 3.2, 3.3.

Data completing display content may originate externally to the device, and be transmitted to the device over network interfaces. More information is in section 3.1.

Actual content to be displayed is completed by integrating data from local sensors or from external devices. More information is in sections 3.1, 3.2.

The AGUI system reviews all accessible surfaces and chooses one or more for current display. Setup choices and run time overrides inform this process. More information is in sections 4.1, 4.2, 4.3, 4.4.

Some surfaces are tied to input mapping systems. The mapping system informs the AGUI that the surface is available for display, and provides detailed mapping information that will affect the display process. More information is in section 3.4.

Inputs provide numeric measurements from local sensors and mapping data for surface selection and organization. More information is in sections 2.1, 2.2.

The AGUI intelligently monitors input sensors and reacts to these in order to maintain display integrity, deduce actions to be taken, and modify display selection. More information is in section 3.4.

Specific content may have alternate display modes available, depending on display capabilities. More information is in section 3.2.

112. Completed display content may be transmitted to other AGUI or non-conformant devices. More information is in section 5.3.

113. The final step in outputting content is to render it specifically for the display. More information is in section 2.1.

2. Input and Output

2.1. Output Devices

The AGUI system makes use of output surfaces. When used generally, the AGUI surface may refer to any active electronic display or any surface on which a display may be projected. AGUI surfaces may be fixed in size or may change dynamically. AGUI surfaces may be rigid as in traditional flat panel displays or flexible, such as a display built on a flexible membrane or a flexible fabric with embedded display elements. Active AGUI displays may report information to the AGUI system to inform the system of the display's size, shape, resolution, display technology, location, communication protocol, and other parameters that the AGUI system can use to better use the display as an output device. A surface may be passive and does not report information to the AGUI system. The AGUI system uses sensors to locate and determine the location, size, shape, texture and other characteristics of the surface to decide whether to select the surface as an output and the best way to display images on the surface. An AGUI surface may also be a body part such as a hand, wrist, or forearm.

A number of common display types may be used by the AGUI system. One common type is to use the open palm and phalanx areas of the fingers as display regions. Alternatively, the back of the hand and back of the finger phalanxes may be used as display regions. The AGUI system will recognize the regions of the hand and assign functions to the regions. In some embodiment, the palm may be used as an explanation display region while the phalanx regions of the fingers can be used for sliders and other controls.

The AGUI may also use a horizontal surface as a display. A number of display areas can be defined for explanation regions, numeric keyboards, sliders, and other custom controls. Common examples of horizontal surfaces are desktops and tabletops. If a vertical surface is use as a display, one region of the surface may be used to display a video stream while other regions may be used for control icons. Common examples of vertical surfaces include walls, and household appliances. The display regions may be adjacent to each other or may be separated. An arbitrary number surfaces, displays, and display regions may be supported, limited by the usability of the user interface implemented.

Other common display types are low resolution electronic displays such as found in televisions and computer monitor displays, either the entire display or a window in the display. The AGUI is able to detect or query the resolution of these types of displays and may choose to display low resolution graphics, simple text frames and simple navigation icons on low resolution displays while displaying high resolution graphics, detailed text frames, and detailed navigation icons on high resolution displays.

2.2. Input Devices

Sensors may be classified into a number of types. A sensor may be coupled to or embedded in an associated passive surface, electronic output surface or display, providing operating parameters of the surface or display. Sensors can take the form of a module to detect gestures used to input user commands. A sensor may provide data values for an ambient condition such as temperature, color, light, location, as well as biometric information on users or others in proximity to the AGUI system.

A variety of sensors are used to determine the bounds and content of the environment in which the AGUI system is operating. Inputs have standard models and a plug-in architecture. Sensor inputs can also be incorporated in the output display such as a pointer, gesture, or control. Examples of common sensors include light and optical systems, cameras, motion, orientation and altitude sensors such as accelerometers, gyroscopes, altimeters and compass as well as temperature, chemical, electrical, electro-magnetic, biometric, radio frequency, wireless networking, GPS and others. Sensors allow the AGUI system to perform dynamic surface detection. Dynamic surface selection is the process where the system queries the environment to detect devices and surfaces that may be used to display information and controls. As one or more users of the AGUI system moves, or one or more AGUI devices, objects, or vehicles enter, leave, or move, or objects enter, leave, or move within one or more defined spaces, environments and/or locations, the AGUI system continuously detects surfaces that may be used and updates the selected surfaces based on the available surfaces, the user setup definitions, run time definitions, and the structured content to be displayed. The AGUI system adapts to the environment, the user, display content, and user and system constraints and preferences.

Sensors are also used to track changes and movements in the system as it operates. This ongoing, real time change detection takes into account the sensor input as well as user setup definitions to determine the correct action to take when the system detects movement.

The AGUI application accesses sensor input data through device drivers. Device drivers may apply to an individual device or to a class of similar devices. The device drivers transform the raw sensor signals into an abstract language that the AGUI application can access and understand. The AGUI system can accept input from physical and virtual sensors. Some non-limiting examples of physical sensors are a traditional keyboard, button, mouse, touchscreen, touchpad, voice and audio controls or a light or optical imaging system. A virtual sensor is an input derived from the manipulation of a virtual control displayed or projected on a surface. Sensor information can include the actual, real sensor input and include keyboard and physical button action, mouse movements and clicks, and touch screen point or region selection, motion and gesture input or voice and audio controls. Virtual sensors can include the bounds of a selected region, control levels of a slider or dial, and identified gestures deduced from a single or multiple finger or hand movement.

3. Content and Adaption

3.1. Adaption to Changing Input and Output Environment

The mapping and identification of people, objects, devices and environments, and the subsequent mapping of interactive graphic and textual content onto one or more surfaces may be accomplished by generating visual display sub-areas, typically squares or rectangles, breaking all visual content and surfaces in a camera's field of view into a virtual 2D or 3D grid of visual display sub-areas that may be either physically projected using a light imaging and projection system or be virtually computer generated. The size of each visual display sub-area may be expanded or contracted based on the type of graphic and/or textual content and level of detail, size and definition of content being projected or displayed on each surface. The size and shape of each surface identified through light and optical depth mapping, imaging, device or sensor networking and spatial positioning and the shape, edges and boundaries of each mapped and identified display surface may be further calculated in relation to their position within a 2-dimensional or 3-dimensional grid of squares. Each mapped surface may then be organized into zones of one or more visual display sub-areas and interactive graphic content may then be assigned to each visual display sub-area or zone of visual display sub-areas based on the size, shape and type of object and/or display surface and the type of content being displayed.

If a surface is detected, the AGUI system will use captured images to map and characterize the available surface. Mapping the surface consists of determining the 3-dimensional spatial location of each point of the projected pattern that can be captured in the image. The specific details of the embodiment of the image capture system will determine the exact methods that are used to create a 3-dimensional map of the available surface. In addition to mapping the surface the AGUI system will use the map to determine characteristics of the surface.

The AGUI system will detect the shape, viewing angle and orientation, and determine if the available surface is continuous over the field of the view of the image capture system. It will also detect areas where there is no surface and areas where there is available surface and use this information to detect specific surfaces. An example of a specific surface is a human hand with available surfaces on the palm and fingers. The AGUI will decide that the available surface is a hand and will use this information when detecting surfaces, selecting surfaces, adapting content to surfaces, and detecting changes in surfaces. If there are no 'holes' in the available surface and it is essentially flat and there is little if any distortion in a projected and imaged pattern plus the direction of projection and image capture is horizontal, the AGUI can judge that the available surface is a wall or vertical surface. If the available surface is mapped as essentially flat but the pattern has a characteristic keystone distortion and the direction of the projection is somewhat below horizontal, the AGUI system will judge that the available surface is likely a table top or some similar mostly horizontal surface. An AGUI system will be aware of a number of common surfaces that can be used and will remember and learn surfaces that were previously used in a particular location or environment.

If the AGUI system finds an available surface and in addition recognizes that this surface is associated with a device with which it can communicate and that has the ability to create a display or includes a display, yet another type of available surface will be found.

Interactive graphic content assigned to a visual display sub-area or zone of visual display sub-areas may freely move within the grid enabling content to continuously adapt to stationary or moving objects and display surfaces and/or enable one or more moving projection or display systems to adapt content in relation to one or more stationary or moving objects or other display surfaces. Content may also dynamically adjust in size, spatial position and orientation within each visual display sub-area or zone in relation to the spatial position and viewing angle of one or more viewing parties.

Figure 51:
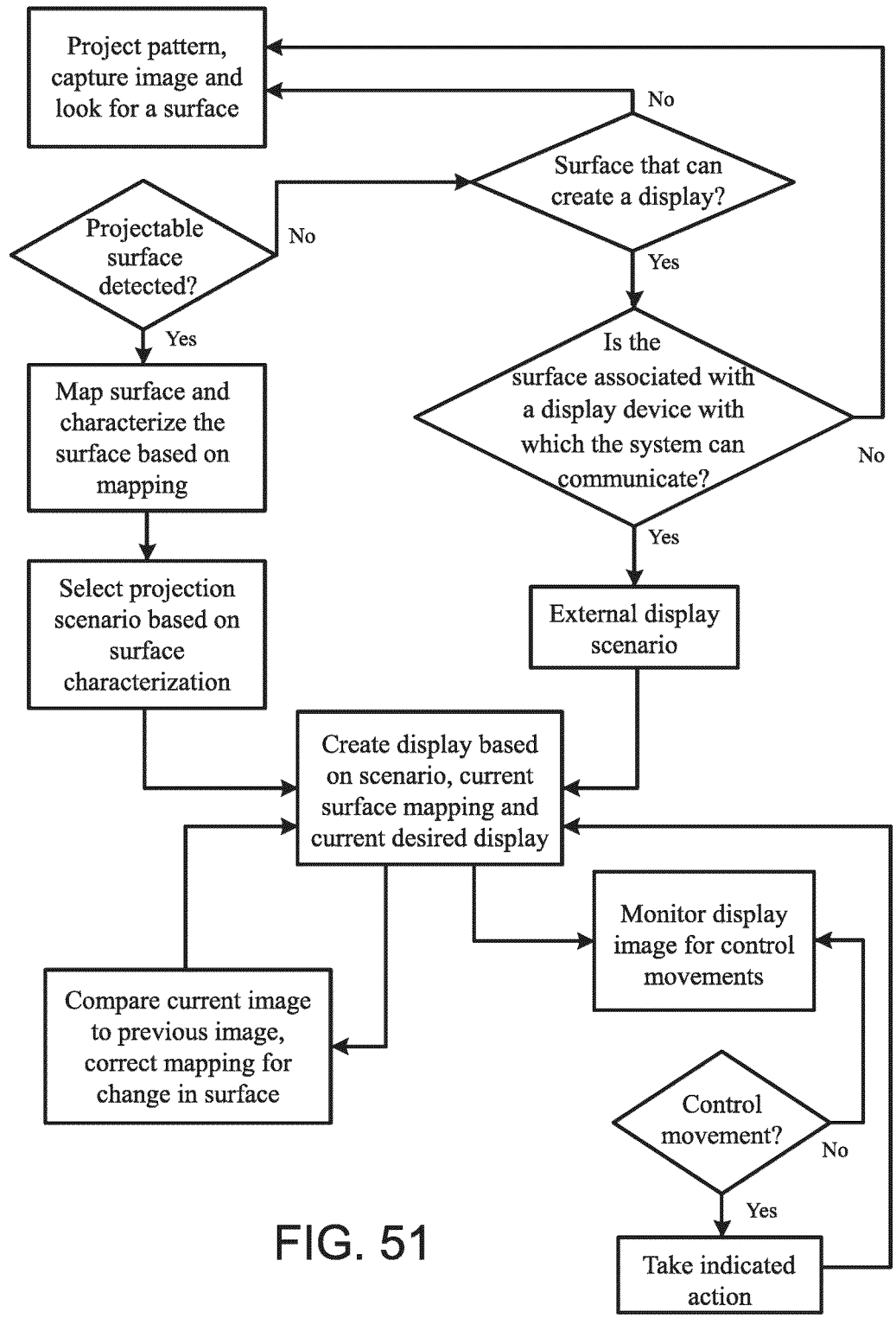
FIG. 51 illustrates a flow chart of how an AGUI may detect and use available surfaces for displays.

FIG. 51 illustrated the process of detecting and utilizing display surfaces according to one embodiment of the present technology. A projecting AGUI device with an integrated light pattern projector will project a light pattern within an area of the environment where a surface might be found. This can be a randomly chosen area, an area indicated by a user, a pre-defined area, or an area where a surface was previously detected. A detecting AGUI device, which may be the same device as the projecting AGUI device or a separate device, will detect the light pattern and use this information to detect any surfaces in the area under examination. The AGUI system will determine if the detected surfaces can be projected on. For example, a white or gray wall is easily projected on. A dark, shiny, uneven, or glass surface is likely not. Electronic surfaces such as a computer monitor are often reflective and would be detected as a non-projectable surface. If the system determines that a surface is non-projectable it next determines if the surface has the ability to create a display. This will typically involve querying the display using electronic or communication protocols as are well known in the art. If the AGUI system is able to communicate with the surface it will query it for information such as resolution, color depth, supported interfaces and protocols. If sufficient information is available, the AGUI determines that this surface is an electronic display, external or internal to the AGUI system, and may then use it for display.

For surfaces that are determined by the AGUI system to be projectable the system will then use images of the projected light pattern to map the surface and characterize its surface. The AGUI system will adjust and optimize its projection settings to produce an optimal display on a surface. This includes, choosing a resolution, adjusting the color and brightness, adjusting the shape of the image to account for the viewing angle of any viewers, adapting for the roughness, and surface texture of the surface, and adjusting for irregular shaped surfaces or surfaces with non-projectable areas or holes in them. The combination of projection settings may be grouped and saved as projection scenarios that can be recalled and reused on the same surface or similar surfaces later. Once detected and characterized the AGUI system creates a display based on a current display scenario, surface, mapping of elements to the display, and the characteristics of the current display or displays.

While the AGUI system is operating, it continues to monitor the image quality on the display surface. By using its imaging system, the AGUI device or devices will compare the current image to previous images and continuously make adjustments in the projection and display settings to obtain an optimal image for the use. At the same time the AGUI system also monitors for control movements; the selecting or movement of a control, a gesture, or an input. When a control is detected the AGUI will perform the appropriate action.

Figure 52:
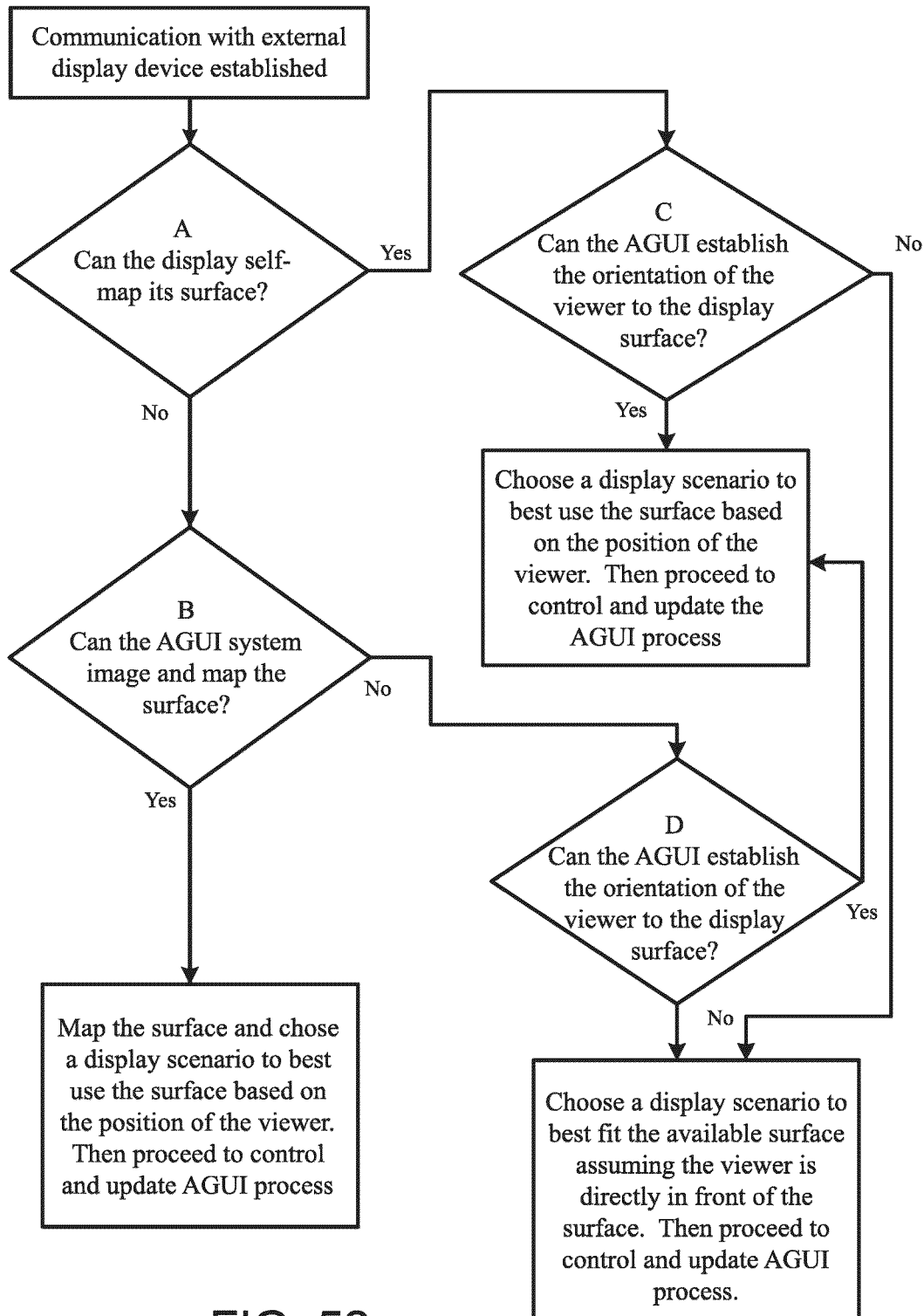
FIG. 52 illustrates a flow chart of how an AGUI system can select a surface to use as a display.

FIG. 52 provides further details of how the AGUI may query and interact with electronic displays. The process assumes that communication has been established between the AGUI system and the external display device. The AGUI will query the external display to determine if it can self-map its surface. A self-mapped surface is one that can determine the position and viewing angle of display elements with respect to the user or viewer. If the display cannot self-map its surface the AGUI will determine if it is able to image and map the display surface. If this is possible, it will map the surface and chose a display scenario to best use the surface based on the position of the viewer. Then proceed to control and update AGUI process. If the display surface has the ability to self-map, the AGUI will attempt to establish the orientation of the viewer to the display surface. If the orientation with respect to the view is successfully determined then the AGUI system will choose a display scenario to best use the surface based on the position of the viewer. It will then proceed to control and update the AGUI process to be aware of the scenario. Similarly, if the AGUI system cannot image and map the surface but can establish the orientation of the viewer to the display surface using other mean, the AGUI system will again choose a display scenario to best use the surface based on the position of the user. If the orientation cannot be determined, a scenario that assumes the use positions themselves in front of the surface will be chosen.

The remote application may trigger external events that are merged with the structured content. Input may also be received from networked devices and networked data sources. These inputs, together with information associated with the selected surfaces and real time change information are used to generate content based on the selected surfaces. The content is modified based on display type and an output stream of display data is generated to be sent to the selected surfaces.

The AGUI application produces a stream of output content. The AGUI system may also accept external events from a remote application which can include user input. Display content may be supplemented with sensor input data such as the user's temperature or heart rate. This can include input from the environment in the form of static sensors or sensors embedded in objects that may be manipulated by the user.

3.2. Content Adaption to Surfaces and Surface Response

In the AGUI system, an application determines display content. Content consists of frames. Each frame connects to at least one other frame via events that the application can recognize. Examples of events are a user action such as a gesture, a mouse click, a keyboard entry. Other examples include system occurrences, such as a change in mapping data input, a change in system setup, or an external request from another AGUI device.

When an event occurs, the system uses a lookup mechanism to determine what action should occur as in consequence. It may result in a change to the current frame, such as modifying a data field with a new input value. It may also cause a change in display dynamics. The application includes rules that control changes in display activity. Rules exist in a hierarchy, lowest to highest priority. The lowest priority rules are system defaults. Next are user adjusted thresholds that specify how large a change in an input or combination of inputs will cause an action to occur. Next higher priority are learned methods, that is, at run time, when the user overrides a certain programmed behavior a certain number of times, and subsequently the system remembers and the learned method becomes a rule. Highest priority rules are run time overrides when the system provides a way for the user to interact and change an autonomous selection.

The system monitors certain input values to adjust the displayed image. When the numeric values of a set of input values enters a certain range, a rule is triggered. The computation to determine whether a change should occur may be simple or complex. In a simple situation, a change of ambient light level might result in increased or reduced brightness of the display. In a situation of medium complexity, changes to the mapping data might indicate a shift or a resizing of the display surface. Again, the application consults rules to determine whether this should cause scaling or positioning of the display content to change to compensate for a change in order to maintain a steady display. Such geometric change possibilities also accommodate rotational changes in the user and surface relationship. In some cases, the rotation is in the surface plane, in which case the geometric transformation that must be applied to compensate for this is a linear transformation. If the surface tilts, a non-linear transformation that accounts for different surface elements being closer to or further from the user may result. In situations of further complexity, displaying content on non-planar surface elements of the surface results in algorithms that are aware of the non-planar properties. These situations include, adjusting for local curvature of a surface, raised or lowered sections, and situations that are hard to characterize with simple descriptors, and are better handled by a spatial compensation table.

Figure 7B:
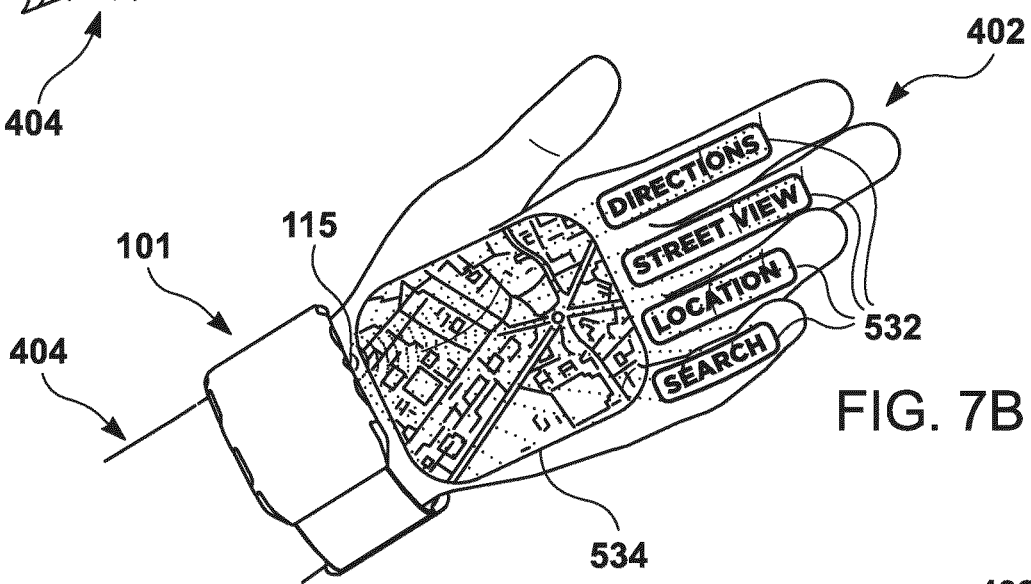
Figure 7C:
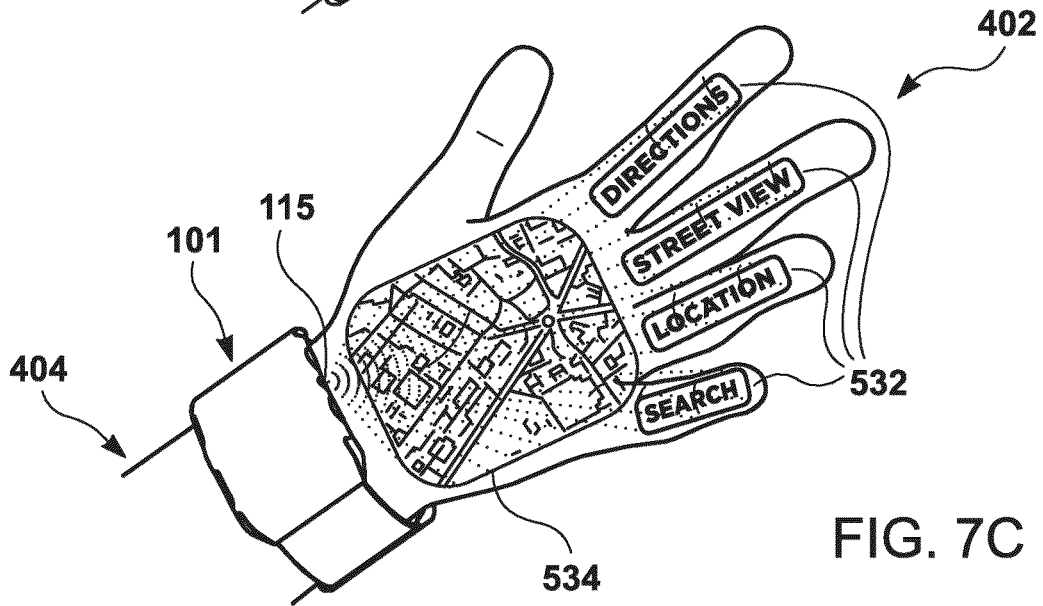

A frame may have different styles for displaying its content on some possible surface types. It is not necessary for a frame to have a display style for every possible surface type. Rules allow the system to make a choice between available display styles when a clear winning display style does not exist among the encoded possibilities. The system also has defaults that guide a primary choice. The user can over-ride the default behavior at setup or at run time. FIG. 7 shows the mappings in one normative system. Others are also possible. When the display type is a hand with palm and finger zones, the content may be pre-organized into an explanation region to display on the palm, selection regions to display on the fingers or parts of the fingers, and slider controls to display on fingers. In the case where the display type is a horizontal surface, the content may be pre-organized into an explanation region on one part of the surface, a numeric keyboard on a second part of surface, and sliders or custom controls on other parts of the surface. In embodiments where the display type is a vertical the content may be pre-organized into video stream on one part of surface and selection icons on another part of the surface. For a display type comprising a display built into clothing, the content may be a single combined graphic or text frame. In the case where the display type is a low-resolution window displayed in a TV or computer display the content may be low resolution graphics with simple text frame and navigation icons. Alternatively, where the display type is a high resolution window displayed in a TV or computer display the content may be rendered as high resolution graphics with detailed text frame and navigation icons.

The AGUI application is aware of the set of output devices and displays currently in use, and optimizes the content for those devices, generating a set of virtual output streams. The output streams are submitted to the specific device drivers. The device drivers perform the mapping from virtual streams to device-specific actual streaming data sent to the devices. The executing application owns a stream of virtual output content. Rendering this output, advancing the flow of the application, and loading a different or modified application is triggered by several events such as when new output surfaces are detected and existing output surfaces become unavailable, the user makes a selection, a sensor provides data that changes program flow, or a sensor provides data that completes an output display frame.

The AGUI system is provides clear output content even when the system components, environment, or parameters change. The AGUI recognizes the relationship between the user and the output surfaces, and adjusts the output accordingly. This adjustment makes use of all the relevant available input data that concerns the user, the surface, and the way the user views the surface. As an example, the AGUI makes constant corrections for perturbations of the geometry of the display surfaces or environment. If the user's hand moves, the content moves with the hand. If ambient light level changes, the AGUI amplifies or attenuates the output as appropriate. The AGUI compensates for detected surface irregularities, including curvature, color and texture. Shape irregularities include clothing shift and specific finger and palm area shape, and include allowance for computed dead zones where projected images cannot reach.

When the device displays onto a human hand, the camera system may identify fingers, determine the geometry of the hand and fingers, and map parts of the content onto the palm and each finger, providing a menu or control system. Detected perturbations of the fingers allow the AGUI to make corresponding geometric adjustment of the content so that coverage is optimized and clarity is maintained. Additionally, a gesture from a finger may be recognized. Depending on defined system setup choices, the gesture may be applied to the processing in different ways. Processing examples include a change to a virtual device such as a volume control slider for an audio subsystem, or a menu selection that advances static or streaming video output content.

When the device displays onto a large continuous surface such as a wall or table top, the device input provides surface response data, surface size and geometry, and location and orientation. Surface response data may include color and texture, allowing the device to optimize output for clarity. Surface size and geometry inputs allow the device to modify content to fit the display area and adjust for non-planar surface distortion. Location and orientation input may trigger content choices such as the display of a virtual keyboard on a horizontal surface or streaming video content on a vertical surface.

When the AGUI system creates a display by projecting a colored display onto a surface the AGUI system will dynamically control the colors so that the viewer will see the desired colored display. This is done by continuously capturing an image of the display and comparing the individual pixel intensities to the metameric color match desired. For a given 3 color sensor system, such as a CCD or CMOS camera, the spectral sensitivity functions of the 3 types of sensor are known. Using these spectral sensitivity functions, 3 captured intensities for each pixel are then converted to a metameric value. If the metameric value is not the desired one, the AGUI system will command the individual pixels of the projected image to increase or decrease intensity until the image is within tolerance of the desired metameric color. It is recognized that the color perceived by the viewer will be influenced by how the surface backscatters the projected light, the color of the surface and by the background illumination that falls on the surface and does not come from the projector. However, by first measuring the net effect of the projected light, the amount of backscatter, the color of the surface and background illumination, then increasing or decreasing the projected light and monitoring in real time the effect of these commanded changes, the AGUI can dynamically adjust the perceived color until it is within the desired range for each area of the projected display.

In some embodiments, the AGUI may project onto a flexible surface such as a fabric surface. When the AGUI establishes communication with a flexible self-luminous display system, such as a fabric or a garment with implanted OLEDs, it will determine the level of surface mapping detail that the self-luminous display system can provide to it. There are several types of fabric that provide different sets of information to the AGUI system.

The most complete set of data that a flexible self-luminous display system can provide consists of a set of three spatial locations for each luminous display element in the coordinate system of the display system and two orientation values for that coordinate system. The coordinate system is typically given orientation by assigning one coordinate to local vertical and assigning a second coordinate perpendicular to local vertical in a universally common direction, such as north. This type of a flexible self-luminous display must be able to create a spatial net giving the locations of all luminous elements with respect to one another and have the ability to sense local vertical and a universally common direction. If the AGUI system can sense its own orientation when its image sensor is directed at the flexible self-luminous display system, it will use the information received from the flexible self-luminous display system to create an internal map of the available display surface and then use this map to command the desired display to be formed by the flexible self-luminous display system.

Another type of flexible self-luminous display system is only able to provide a set of three spatial locations for each luminous display element in the coordinate system of the display system. If the AGUI system can capture an image of the flexible self-luminous display system, it will perform a 3-dimensional coordinate transformation on the received data until the transformed display matches its capture image with sufficient accuracy. The AGUI system then has a map of the available display surface and will use this map to command the desired display to be formed by the flexible self-luminous display system.

At the lowest level of complexity, the flexible self-luminous display system can provide no spatial information on position of display elements as the surface flexes. It can only provide static location information on the display elements so that they can be controlled to create a display. If the AGUI system can capture an image of the flexible self-luminous display system it will initially command the display to create a special referencing display and compare this commanded display to the captured image of the display. The AGUI system will then perform a 3-dimensional coordinate transformation on the commanded display so that it matches its capture image with sufficient accuracy. Thus, the AGUI treats the flexible self-luminous display system as it would a non-flexible 2-dimensional display. The AGUI system then has a map of the available display surface and will use this map to command the desired display to be formed by the flexible self-luminous display system. Then the AGUI continuously captures images of the flexible self-luminous display and uses them to update the initial map of the display, in this way dynamically accounting for surface flexure and changes in surface orientation with respect to the AGUI system.

If the AGUI system does not have the ability to image the flexible self-luminous display, it will assume that the viewer is oriented most favorably to view the display and will create a map of the display based on this assumption. Then the AGUI system will command the desired display to be formed by the flexible self-luminous display system.

A user manipulates the AGUI system by manipulating an active zone on a display. A potentially active zone on a finger may be selected for activation by a finger of another hand, or by a perturbation of the zone, such as a flicking motion. A finger covering a selection site on a passive display may provide the same activation.

Intelligence surrounding the projector's display capability adapts the device's output content to take advantage of the organization of the surface into zones. When the content comprises a user interface that includes selections, those selections may be organized onto the fingers, and explanatory static or dynamic video content is assigned to the palm area. Processed mapping data recognizes that finger zones include sub-zones separated by joints, and the device can choose to further divide selection content onto specific parts of fingers. When the content includes controls that map to functions with a continuously variable quantity, virtual controls conveying this function are also mapped to finger zones. When the content includes alpha-numeric data entry, such as a keypad for entering numbers, or a graphic interactive icon array, photograph, video or other interactive media, content is displayed on the palm and fingers, wrist or other body surface or surrounding objects and display surfaces.

If the device remains attached to the user, but the user has reoriented or moved the device, corresponding large changes are noted in the input mapping data. One of the following different display scenarios might then be identified. If the device is flipped, the mapping system identifies the back of the user's hand, consisting of regions as in the case of display onto the palm and fingers. The software again adjusts the output content to accommodate and make best use of this new surface organization. The device can be slid along the user's arm. The mapping system then discovers an additional larger continuous display area consisting of the user's clothing or skin area or a combination. Sensor inputs provide information about the response of the surface and its texture and color composition. These inputs permit further reorganization of content and adjustment to the parameters of display, so that content is geometrically mapped to match the surface requirements and adjusted for response variation over the surface. The displayed content remains clear and readable. Finger gestures from the user's other hand interacting with the display content may provide user interface input.

If the device is detached from the user, its mapping system searches further afield for passive display surfaces. The device is constantly searching for display surfaces that can be utilized. Sometimes these are automatically selected and brought into the device's set of currently available surfaces. At other times, the device may request that the user be involved in the selection of output surfaces from those available to the device. Examples of passive surfaces include a table top, a wall, or an appliance.

The device also has access to input data from sensors such as a gyroscope to give it an orientation reference, and can thus distinguish between a horizontal table top and a vertical wall. In an analogous manner to the device's display reorganization for a hand, the device makes decisions about how to best organize the content onto such surfaces. The mapping system and other sensors further guide the device in this activity. Inputs that are taken into account for this purpose include surface curvature, so that this can be compensated for clarity, surface orientation relative to the projector, so that the desired shape of the content is actually projected onto the surface, surface detailed response characteristic, so that surface distortion can result in shifts in the content to minimize the distortion's impact on clarity, and surface color composition, so that color can be remapped such that colors do not disappear.

The examples up to this point have all required the built-in projector to illuminate the display surface. Resolution is mainly a function of the projector. The type of surface also influences effective resolution. A smooth surface allows the projector to work simply. A rough surface may require compensation. The roughness can be modeled with the aid of mapping system input data.

The output of a single built in projection unit is limited to what is in the projector's display field. However, the device's output capability is not limited to what can be projected directly. The device can also connect via wired or wireless interfaces to other kinds of displays, including a front panel OLED display on the device itself, a flexible OLED display built into fabric attached to or in proximity to the user, a computer running a display application, a TV that assigns an input channel to the wrist device output, and another AGUI device.

The device makes value judgements, in keeping with the user's predefined expectations, about content modification. When the surface is the device's front panel OLED array, the content may be displayed with selection icons. When the surface is a fabric-based OLED array, the content might be modified to enhance the user's personal appearance. When the device connects directly or wirelessly to computers or televisions that recognize the device, the display unit provides its screen or a window of its screen to be used for the device's output. The device's general approach to making use of the surface does not change. The device will choose content and adjust it accordingly. In an analogous manner to the way the device receives mapping data, the size and shape of the display window and the display resolution are made available via the device's input sensors. These factor into the device's decisions about how to map content to a surface. A large high resolution display might inspire the device to generate detailed content, including text and graphic explanations. A low resolution display might result in less detail being shown. If the window has an unusual shape, this fact is available to the device, and might also cause the device to truncate or reorganize content to match that shape. AGUI systems comprising a wearable projector may have the ability to adapt content in real time based on the position of the user. The AGUI device comprises a wearable projector to display images on target viewing and interfacing surfaces. The system actively adapts projected content to one or more surfaces by assigning different projected content to one or more projectors based on optimum viewing or display angle of available projectors and/or wirelessly networks with other projection or active display systems. It operates as a motion and orientation sensor to identify the wearer's position and orientation relative to surrounding objects and display surfaces.

In other embodiments, an AGUI system operates to implement a heads-up-display. This may include the ability to identify wearable display types such as a binocular head-up display and autonomously adapt the user interface to a binocular, immersive display environment.

3.3. Displaying onto Vehicles and Other Moving Surfaces

Other embodiments of the present technology include the display of content on a moving surface. In a situation where the spatial relationship between the user and the surface only experiences small localized changes, data from the mapping system provides the necessary information so that the device can make small changes to the display output to accommodate those changes, and maintain clarity and lock in position. In a more complex situation, the user may be moving or the surface may be moving or both the user and the surface may be moving. If mapping data exists that can identify changes in the relative position and orientation of the user and the surface or display, algorithms can be run to adjust the content geometrically to maintain display clarity. Typically, the display surface can be imagined as an array of small triangular regions. If content were sent to the display uncorrected, the user would experience the content as geometrically distorted. If the mapping data can be used to model the distortion as a transformation, the inverse of this transformation can be applied to the content before it is displayed, and the user will see the content undistorted. This inverse transformation is recomputed constantly, and corresponding content adjustment is modified in real time so that the user experiences a display that appears not to be shifting.

In some embodiments the position of one or more viewers comprises their viewing position outside of a vehicle in relation to one or more display surfaces on the outside of a vehicle.

In other embodiments the device dynamically optimizes the display across one or more moving or stationary vehicles or other display surfaces such as billboards, buildings, store fronts, bus stops, ground, road, street and other display surfaces based on the spatial and relational position, location and orientation of one or more of the vehicles display surfaces to one or more display surfaces on one or more other moving or stationary vehicle display surfaces or other display surfaces.

In other embodiments the device dynamically optimizes the display across one or more moving or stationary vehicles or other display surfaces based on the spatial and relational position, location and orientation of one or more viewers based on each viewers viewing angle to one or more vehicles, vehicle display surfaces and/or one or more other moving or stationary display surfaces and/or based on the spatial position and orientation of one or more viewers to each other.

Display optimization may be accomplished using one or more sensors for imaging, mapping and/or identifying the distance, spatial position, location and/or orientation of one or more vehicles, vehicle display surfaces and/or other display surfaces to one another and/or for identifying the distance, spatial position, location, orientation and/or optimum viewing angle of one or more viewers to one or more vehicles, vehicle display surfaces and/or other display surfaces. This may also be accomplished using motion and orientation sensors on the vehicles and display surfaces combined with location and wirelessly networked data from one or more wirelessly connected vehicles and/or display surfaces. One or more viewers may also be identified and mapped based on their relational position, location, orientation, viewing angle and/or point of focus of focus in relation to one or more vehicles or other display surfaces by wirelessly connecting with one or more viewers connected devices or sensors such as mobile handheld, carried, wearable, embedded, attached, implanted and remotely monitoring devices, clothing and other sensors assigned to one or more viewers.

3.4. Creating Virtual Controls on Surfaces

As well as the embodiments discussed above, embodiments of the present technology may be used in a variety of applications, of which only a few are listed here.

The AGUI system may comprise a ceiling, wall, table or other surface mounted single or multi-directional mapping, imaging, projection and/or active display. It may also include an interfacing, networking and multimedia hub capable of depth mapping and imaging a room or other environment. As the environment is mapped, the system identifies people, objects and display surfaces, and dynamically and continuously adapts interactive graphic content to one or more passive and active display surfaces. This is based on the type of object or device, whether the display is an active or passive display surface. The system also considers whether there is autonomous or user controlled content selection and assignment of interactive graphic content to one or more objects and surfaces. The adaptive display system may assign a unique interface or graphic content to specific objects and surfaces based on object type, shape, function and application. The AGUI display system may also adapt graphic content based on the relational position of one or more viewing parties in a mapped environment. This can be based on the preferences of one or more identified viewing parties so that each viewer may view content specific to user preferences or specific to the device or object on which the graphic content or interface is assigned or displayed. The system may also dynamically move graphic content across multiple passive or active display surfaces or shift content from one display surface to another based on user selection or based on one or more users' activity, movement, position, orientation, direction and point of focus (where the person is looking) within a mapped environment. The adaptive display system may also select the optimum display surface and position, size, content and optimum viewing angle for one or more people based on the position of each person within a mapped environment on one or more display surfaces.

Virtual controls may be mapped to a variety of activities including an interface to front panel controls of a vehicle, adjusting the audio level for headphones, adjusting the temperature level of a thermostat, entering remote commands for a TV, and telephone number entry. In order to identify the selection of all the activity described above, the mapping system is constantly re-evaluating input data. Small data changes result in this activity being carried out. When signal change crosses a threshold, the system may identify a change of display surface. The device is constantly reviewing the mapping system signals and comparing signal patterns with patterns that would identify different surfaces.

3.5. Interpretation of Inputs (Small, Control, Surface Change)

Once the AGUI system has found, mapped and identified an available surface and used this information to select an appropriate AGUI scenario, the AGUI system will enter an active display and respond mode. It will project onto or command to be displayed on the surface visual control icons or features. At the same time it will use its image capture system to monitor the available surface and field of view for motion of various types. Once the available surface is mapped, the AGUI will be able to create a projected image or generate commands to display an image that is known to create a desired image at specific locations in 3-dimensional space. As the AGUI captures images of this display it will continuously compare the locations of the image features to their expected positions and use any difference in location to update that map of the available surface. These changes in the locations will be referred to as small motion detection by the AGUI system and are used to continuously update the mapping. At the same time the updated map is used to generate the current projected or commanded display so that it is always on the available surface in the desired locations. The AGUI system has the ability to judge if the available surface or the current portion of the display process has changed to the extent that the current display configuration is no longer appropriate. If this is found to be the case, the AGUI will reconfigure the display so that it is best for the current available surface.

In addition to the small motion detection performed by the AGUI system, it also analyzes the captured image for control motions. Depending on the current scenario, certain movements are recognized by the AGUI system as control signals. If such movements are detected, the AGUI system will cause the system it controls to take appropriate action.

The system may also change the display in response to the recognized command. For instance, if the AGUI system is embodied in a wrist mounted device with the current scenario being a display on a human hand and with a specified control icon projected onto the end of the middle finger of the hand, the thumb is observed to move over this icon and remain there, this may signal the AGUI system that the user has selected the control action associate with the icon. The AGUI system will then command the appropriate action by the system it controls to be taken, and in certain instances, change the display projected onto the hand. On the other hand, with the same scenario and display situation, if the thumb is observed to move to the middle finger icon and then move to the end of the index finger, this may signal the AGUI system to move the icon from the middle finger to the index finger without any other control action being taken. This type of interactive control is programed into the AGUI for the various scenarios it can expect and these controls can, of course, be altered by a person authorized to change the way in which the AGUI acts.

Another situation occurs if there is such a large change in the available surface that the selected scenario is no longer appropriate. In that case, the AGUI process will revert to the mapping and surface characterization portion followed by a new scenario selection phase.

Two types of movement need to be considered when analyzing monitored images created by the AGUI system. When the device moves with respect to the imaged space all features in the image move together, a movement known as a translation. This type of movement will continuously happen, whether there are small vibrations or larger movements. A second type of movement is the movement of the user's hand or portion of the hand with respect to the display being imaged by the AGUI system. This is not a translation but is the type of movement associated with a potential control movement and is local in nature. The AGUI can distinguish between these two types of movement. This can be done by a correlation procedure in which a correlation computation is done between sequential images with iteration to see if correlation is higher in an overall image translation of one image with respect to the other. Having found the translation with the highest overall correlation, this translation is applied locally. Local areas where the correlation markedly decreases are areas where local movement has occurred. These are local areas where a control motion may have been made. To assess this possibility the display content in the local area is assessed. If this area of the display is a control feature that can be commanded with a movement, the AGUI system considers a control action command to have been received and acts accordingly. This process is enhanced by the AGUI system by finding in the captured image hand and finger locations. The AGUI system can then use this additional information to compare the hand and finger locations to images of control features and give especial attention to non-translation motion in these areas.

To better understand how the above process is implemented the following example is given. The first step in the process is to account for any translation that has occurred in which the camera system itself moves with respect to the scene it is imaging. As the imaging system captures images, it compares the intensity of each pixel in the image just taken with the intensity of the same pixel in the previous image. These difference intensity arrays are continuously formed and updated with each new frame captured. If there is no movement at all between frames, each difference value will be zero or an insignificantly small number. If there is movement this will not be the case and by summing the difference and detecting a non-zero sum the routine will sense a movement of some type. The procedure used for this is known as a correlation procedure. The routine then shifts one array of intensities with respect to the other in both dimensions, performing a correlation at each step and finding the shift corresponding to the best correlation between the image and its shifted copy. As this is done for each captured frame, the time between capture is very small and so image shift to get the best correlation for the overall image will typically be only a few pixels. However, the shifting procedure is done until each pixel difference at some step has close to a zero value. This is done so that information is recorded for use in finding location movement. As the above procedure is done, the difference array saved for each shift step is labeled with the horizontal and vertical shift associate with it.

Of the shifted differences taken, the one with the best correlation is the one in which the translation effects have been removed. For this shifted difference array, areas that have higher difference values remaining are those where control motion may have occurred. In each of these areas where the AGUI has created a display control icon in the image the AGUI will examine all the saved difference arrays for that area and find the one with the lowest difference value. The difference in the pixel shift values for the translation difference array and the pixel shift values for the shift that removes overall translation gives the movement size and direction for that area within the scene. By recording the movement in display control icon areas over several frames, the AGUI system can tell if a control motion had occurred and take appropriate action. A control motion is a motion with sufficient movement in a relevant direction.

It can also occur, in some situations, that a finger or hand gesture will constitute a control motion where there is no display control icon by it. To account of this possibility, the AGUI system may use, instead of a display control icon location to check for motion, the mapped location portions of the hand. This will require the AGUI system to initially perform an image recognition function to find fingers and other hand parts in its field of view. Having initially done this pattern recognition, the image motion detection process will be continuously used to update the hand feature locations in the memory of the AGUI system. Then for each frame correlation with the previous frame, all the necessary location information is available to look for and use motion information.

Thus the scene will be intelligently painted onto the user's hand and fingers. In the same way that a conventional user interface now waits for a user command from a mouse, touch screen or keyboard, the AGUI reacts to the user's input in a variety of ways. The user may manipulate the interface using a finger of the other hand. The user may touch a virtual control to make a selection. The user may use a finger gesture, such as a flick of a fingertip, to make a selection. The user may slide a finger of the other hand over the control area of a virtual volume or brightness control to change the control's level. The user may tap the displayed virtual key of a keypad to enter that value.

Finger gestures are recognized via perturbations of data from the mapping system. The data is recognized as a finger. Perturbation data tracks its location. Localized changes to zone extent or localized continuously variable signal return path length imply a finger gesture. Localized changes to signal path in a certain area imply a selection from a finger of the other hand.

Selection items may advance the user interface, or may be mapped via networking to external devices. Advancing the user interface includes changing the content displayed and/or the way it is organized onto the palm and fingers. For example, a finger from the other hand might drag content from one finger to another, or from a finger to the palm area. Or a finger might tap a selection zone to activate a change in the whole displayed scenario.

4. Working With Surfaces

4.1. Surface Selection

The AGUI recognizes available electronic displays through wired and wireless connections, and through standard and proprietary protocols. Via these protocols, the AGUI receives display parameters from the displays, and negotiates with recognized devices for availability for display. A device that is available sends the AGUI its display parameters, including physical dimensions, pixels dimensions, pixel span, color resolution.

A standard display device may already run a standard protocol to allow it to connect to the AGUI system. In the simplest case of a directly wired display, this data is available immediately the wired connection is made, via that wired connection. In a more complex case of a wireless connection, pairing activity may have to take place prior to this.

A display device that does not run such a protocol natively can be made available to the AGUI by being provided with a custom protocol, which can be downloaded to the device or run from a dongle plugged into the device for this purpose. The purpose of the dongle can be to activate a protocol that is already resident on the display device, or to provide that protocol at run time. An example of this would be to plug an AGUI enabled HDMI dongle into a television or computer monitor that does not natively support the AGUI system.

Each surface has the capability to interact with the user in a unique fashion. The extent of the interaction depends on the completeness of the available scenario data. A scenario is a set of data that describes the environment and use of the AGUI system. The algorithms for selection take in the full set of available scenario data, merge this with the user's setup selections and preferences and the user's actual usage learned over time, and apply overall computed preferences to the content. If content has the capability to be displayed in different ways on a single display, the usefulness of that is taken into account. For example, if the user is known to be in close proximity to a table top, and if the content contains material that can make use of a table top user interface, the AGUI is encouraged to display that user interface. In general, when decisions about content choice and content distribution is made, a choice that favors user interaction is encouraged. However, this also depends on how the user has set the device up, and how the user has operated the device in the past.

When multiple surfaces are deployed in proximity to each other, the AGUI takes into account whether coordinate data for the surfaces suggests that they could together constitute a large continuous surface. When this happens, the AGUI may make this a strong preference among alternate display mode possibilities. In this case, the content is spread across the surfaces.

On the other hand, the multiple available surfaces may be disjoint and lack the kind of connection required for continuous display. The AGUI may then choose to repeat the content on each of the multiple displays. When this happens, the AGUI still tailors each display's actual content to the properties of the surface, including reorganizing content to accommodate non-displayable regions.

4.2. Surface Mapping

A specific display type is an array of OLED elements embedded into clothing. For displays of this type, each OLED announces its coordinates so that the AGUI can build a 3D map of the overall surface that can be viewed by a person in proximity to the clothing OLED array. The coordinates will include the location of each display element and may also include an indication of the viewing angle of each element. This analysis includes awareness of OLEDs that are hidden from view. The map is constantly rebuilt as the array shifts with time. When assigning content, the AGUI is aware of OLEDs that are not visible, and these are excluded in the geometric transformation of the content thereby improving performance. Content may contain within its structure the ability to display in different modes. The display mode can also be affected by input sensors that provide context information. The AGUI algorithms include scenario-based choices and geometric corrections.

In one example, sensor input data indicates to the AGUI that its output surface is a human hand, and that a sub-mapping of the hand is possible. The sub-mapping may identify zones representing individual fingers and a wrist or palm area. The AGUI may then take the display data stream and split it so that specific parts of the display content are directed towards specific zones. Fingertips may be identified as menu selection points. The wrist or palm area may be used for static or dynamic content.

As another example, via sensor input data the AGUI may recognize that its output surface is a passive flat surface, such as a table top or a wall. The AGUI performs a different organization of the content, one better suited to the different properties of that surface. In both examples, the AGUI can also paint virtual controls such as sliders that can be operated by a finger or gestures.

The AGUI discovers and detects passive surfaces and the detection system sensors identify physical properties related to displaying on the surface. These include the presence of the surface, the spatial separation, orientation, shape and complexity, surface resolution, surface response, surface type, surface properties, and whether the surface is a 2D or 3D surface. The AGUI also detects the geometrical relationship to the user and viewing angle of the user, properties of the surrounding environment, and real time perturbations of separation, orientation, shape and response of the surface. Input and output are often tightly bound together. A passive output surface makes use of input sensors to establish both geometrical and response characteristics of the surface and its surface's relationship to the projector. At the application level, the AGUI sees input and output peripherals as abstractions delivering or consuming virtual signals. The application does not interface directly with peripherals, but interfaces through an abstraction layer designed so that peripherals conform to a common interface model. This abstraction layer captures each peripheral's properties that are essential to the application's activity.

A method to determine if a detected surface may be used for projections is for an AGUI system that includes a projection and imaging sensor to only project a recognizable grid intermittently while continuously capturing frames that include the surface. The image of the frame where a pattern was projected is compared to the previous image frame where no pattern was projected. If an intensity change is found, there exists a surface in the field of the projector that can back scatter light and so represents a surface onto which a display can be projected. This could, for instance be a wall, an article of clothing or a table surface. However, a glass or reflective surface such as a computer display screen would in almost all cases reflect light so that it would not reenter the imaging system of the device and so would not represent a surface onto which displays could be projected even though it might well be a surface that could create a display and could participate in the system AGUI system if the system could communicate with it.

If no projectable surface is found, there may well be an active display device that could be used as an AGUI display in the field of view of the device image capture system. This type of surface can be detected by analyzing the image frames other than the one coincident with the projected pattern with known feature detection methods to look for text or other features characteristic of computer displays. If the likelihood of such features in the captured image is sufficiently high, the AGUI system will assess if it is also in communication, or could be in communication, with a device that is likely to be able to create a display. If this is the case, the AGUI process will attempt to connect to the display, to obtain configuration information, and to use the device as a display.

The AGUI displays onto an active or electronic display via a direct or wireless connection. An active display is characterized by configuration data received from the display itself or from an external source once the display has been identified. Other characteristics of the display are determined by the AGUI system. Characterization of the display consists of detecting the presence of the surface, the image or pixel resolution, surface type, physical dimensions, physical shape, and color depth. The system also takes into consideration environmental characteristics such as ambient light, areas of bright light or shadow, and the distance of the viewer from the display and their viewing angle. The system assumes that any of the display properties can change at any time and monitors the display for changes.

Display and surface interfaces may be abstracted through the use of data standards, giving the AGUI the capability of flexible operation. Sensor input is abstracted. Output surface and display specifications are standardized. The AGUI application drives any given output surface with a set of virtual video streams. The driver for the specific device performs the mapping of virtual streaming data to actual data that drives the device hardware. In constructing the virtual video stream, the application leaves compensation for surface type, spatial and response to the device driver. The application's virtual video construction takes into account a number of characteristics of the output surface such as surface shape data. The surface shape may be flat (a planar surface), a known kind of curvature, an irregular shape (via a mapping table). Other characteristics are surface type—electronic or passive; surface size; surface topography—flat, circular, elliptical, parabolic, hyperbolic or other shape; surface resolution. Further characteristics are surface response characteristics such as color, texture, depth pattern.

There are a number known methods that the AGUI can use for mapping a non-planar surface. These include stereoscopic optical systems, plenoptic multi-lens array systems and optical systems where either a structured light pattern is projected onto a surface or a scanning system sequentially creates a structured light pattern by scanning a point of light onto the surface and the surface is imaged by an optical system displaced from the projecting system.

In the case of the structured light method, because the optical axes of the projection system and the imaging system are not coincident the difference between the expected and observed positions of points in the pattern can be used in a triangulation method to calculate depth information and so, in conjunction with the 2-dimensional location information collected by the imaging sensor, a 3-dimensional map of the surface can be determined.

One state-of-the-art method for the AGUI system to use to map a non-planar surface is a 'time-of-flight' camera system. Such a camera system determines the location of object points in a plane perpendicular to the line-of-sight of the camera using the captured image just as is done with normal camera images. The distance to individual object points along the line-of-sight is found by illuminating the object with an extremely short duration pulse of light. This can be achieved using LED or lasers that can be turned on and off with times on the order of picoseconds. Each pixel sensing element of the 'time-of-flight' camera is connected to gated receiving elements and the 'gates' are opened in coordination with the pulse of illumination. It takes light a finite length of time to travel to an object point, be back scattered, and return to the camera sensor. The farther the object point is from the camera, the longer the delay and since light can only be received during the time the gate is open, as the time of delay changes, the amount of light collected changes because some of the light reaches the camera after the collection 'window' has closed. This effect allows the camera system to calculate the distance between the camera and each object point.

To achieve a sufficient signal when using such short pulses of light a very bright illumination source is needed, hence the use of lasers or very bright LEDs. In addition, the wavelength of light used is typically in the near infrared, as very bright sources are available in this wavelength range and the light is almost outside the visual range so that a bright source is not uncomfortable or distracting to the human user.

For the purpose of mapping the shape of a non-planar display surface, a key factor is not the absolute distance to each object point but the difference in distance between points. These values can be found by setting the timing of the receiving 'windows' so that some object point is found to have a zero distance. Then the distance found with this arrangement for all the other points is the difference in distance from the reference point (the point with zero distance).

Once a non-planar surface is characterized by having three coordinate values found for each object point, the surface is mapped. In terms of data that can be used by a computer system, the information can be thought of as existing as a 2-dimensional image with an intensity value at each location in the image. The locations in the 2-dimensional array can be the object points where rays of light from locations in the image sensor intersect the object. This gives the 2-dimensional location of each object point in a plane perpendicular to the camera line-of-sight. The intensity value then gives the distance difference value, or third dimension, of the object point from some reference distance point in the object.

The current information on the 2-dimensional location of object points defines for the AGUI system the available surface to create a display and allows it to best create a display with this available surface. The differential distance information, the third dimension, is used by the AGUI system to compare current object distances with prior object distances and so, in conjunction with lateral movement information, to track motion between points in the non-planar surface. For instance, the AGUI system uses this information to detect control movements.

In some embodiments, special use of 'time-of-flight' camera systems may be used with embedded source fabrics. For non-planar display surfaces such as garments with addressable OLEDs embedded in them another possibility exists for surface mapping using a 'time-of-flight' camera system. It is possible to embed in such a garment fabric not only the visible light OLEDs that create the visible display but also an array of diode lasers or near infrared LEDs that can be pulsed with very short pulse durations. Then instead of having the 'time-of-flight' camera system provide the special illumination, the garment itself provides its own special illumination. Now, since there is no need to have back scatter and the loss of source light this entails, the sources do not have to be as bright, or if they are very bright, the signal to noise ratio of the system is markedly enhanced.

If such a display system were detected by the AGUI system that also had access to a 'time-of-flight' camera system, the AGUI system would collect from the display system information on the pulse length of the special sources and time between pulses. The AGUI system would then instruct the 'time-of-flight' camera system to set its gating properly to coordinate with the sources in the display system. Then, with the special sources in the display system pulsing, the AGUI system would move the timing of the gating until at least one of the sources was found to have a zero distance. At this point full mapping would proceed as described above for a normal 'time-of-flight' camera system.

Some devices with non-planar display surfaces may have the ability to self-map their display surface. For instance, a garment with embedded visible light emitting elements, such as OLEDs, could also have sensors embedded that could sense the distance to nearest neighbor location sensors. This differential distance information is then used to construct a 3-dimensional net, thus mapping areas of the surface. Each location sensor would have a neighborhood of visible light emitting elements, whose position would be calculated with respect to the 3-dimensional net using interpolation methods. The device with this type of self-mapping capability then will have continuously updated 3-dimensional location information on each display element. When the AGUI system establishes communication with the display device and senses it is a self-mapping device, the AGUI system will command the display device to transmit the 3-dimensional pixel information. Then the AGUI system will have information it needs to find the shape of the available display surface and to command an appropriate display to be created. In addition to the 3-dimensional surface representation, the AGUI system will need to determine the orientation of this surface to the viewer. If the AGUI system has the capability to capture, it captures images of the display surface so it will have a representation of the display surface as viewed by the user. The AGUI system will then perform a 3-dimensional coordinate transformation of the transmitted surface element location data until the transformed data matches the image of the surface. This establishes the orientation of the surface to the viewer. If an image capture system is not available, the AGUI system will assume the viewer is located with the best view of the display surface and then proceed to create the best possible display.

4.3. Surface Mapping Algorithms

The AGUI system may be operating on a device that does not have projection capabilities. However, the device may have other types of interaction sensor systems such as those currently found on mobile devices, desktop and laptop computer systems that employ glide pad sensors, touch screen or mouse user input control systems or it may be in communication with devices that have these capabilities. When the AGUI system recognizes that it is operating in such an environment, it will adapt its interaction and control actions to fully utilize these capabilities.

The AGUI system may also find that it can communicate with a display device whose physical shape can change. Such a display device may even be able to self-map itself as its shape changes. An example of a display device that can change the shape of the display surface and can self-map the shape changes is a garment embedded with OLED elements that are commanded to illuminate to create a desired display. The OLED display device has location sensors embedded in it that communicate with one another thus giving real-time information on the 3-dimensional position of each location sensor with respect to its neighbors. The display device also has information on the location of each OLED with respect to the locations sensors. An array of points whose locations with respect to one another are known constitute a mathematical 3-dimensional surface. Thus the display surface is self-mapped in 3 dimensions. In addition, since the location of the OLED display elements are known with respect to the location sensors, the OLED display itself is self-mapped. For the AGUI system to make such a surface useful to a user, the location of the user with respect to at least three of the location sensors must also be known. Then the location and orientation of the display surface with respect to the user is known. With this added information on the position of the user to the display surface, the AGUI system can command the display surface to create a display that provides an optimal image when viewed by the user of the AGUI system.

The AGUI may alternatively find that it can communicate with a display device whose physical shape can change but does not have self-mapping capability. In this case, for the AGUI system to use this display surface the AGUI system needs to have the capability to map the display surface in real-time. Real-time mapping is most conveniently done by equipping the AGUI system with the ability to capture images and then using this ability to capture images of the display surface. Then, in communication with the shape changing display surface control, the AGUI system first commands a display to be created and then images the created display. Comparison of the commanded display with the imaged display allows the AGUI system to map the available display surface and to not only most efficiently use this available surface but also to continuously update its mapping to allow for shape changes that may occur.

In an AGUI system, several classes of displays are possible. Self-mapping can be limited to a 3-dimensional correlation of the display elements to the surface or can also include an addition 3 degrees of rotational freedom with respect to a line-of-sight between the viewer of the display and the display itself. If self-mapping is limited to a 3-dimensional correlation between the surface and its display elements, the AGUI system will decide to create a display that best uses the available display surface and will assume that the viewer faces the surface with the best orientation for viewing. If the display surface is the display screen of a desktop or laptop computer, the 3-dimensional mapping would give the location of the display pixels with respect to a 2-dimensional plane. However, in most cases the orientation of this surface to the viewer will not be supplied by the display device to the AGUI system. If the display is a garment with OLEDs embedded in it and had location sensors so that the position of the OLEDs with respect to a garment coordinate system were to be known, this would provide a 3-dimensional map of the display surface elements. However, the orientation of the garment to the viewer might not be information that the garment device could provide to the AGUI system.

If the AGUI can receive some mapping information from the display device and in addition can view the display being detected, the AGUI will make the decision to use the mapping information in addition to image information to establish not only surface display element mapping with respect to the surface itself but also will map the surface with respect to the viewer's line-of-sight before proceeding to the next step. If this cannot be done, the decision to take the alternate path as indicated it made.

It may well be that the display device has no self-mapping capabilities. In that case if the AGUI can view the display the decision is made to map the surface itself and then proceed to choose the scenario best suited to the display and its orientation. If the AGUI system is unable to do this, the decision to choose a scenario in which an assumption is made that the viewer is facing the surface is made. The surface is oriented so that it display surface can be best seen by the viewer. In either case, once the scenario has been chosen the AGUI process will proceed to its control and update portion.

Another possibility is that although the AGUI system cannot map the surface including its orientation to the viewer it may be able to establish the location of the display device with respect to itself. For instance, both the AGUI system and display could have GPS location capabilities so a line-of-sight between the viewer and the display can be established using the information. If in addition the display device has the ability to measure its orientation and transmit this information to the AGUI system, this is sufficient information for the AGUI system to select the best scenario to use the display device. If this type of information is not available, the AGUI will decide to choose a scenario in which an assumption is made that the viewer is facing the surface and the surface is oriented so that its display surface can be best seen by the viewer. In either case, once the scenario has been chosen the AGUI process will proceed to its control and update portion.

4.4. Surface Types (Hand, Clothing, Automotive, . . . )

An example embodiment is the display of content onto an array of OLED's embedded into clothing. Content sent to the OLED array may be a combination of text and graphics. The OLED's in the array are aware of the identity and separation of adjacent OLED's. This separation data is the basis of the determination of a geometric transformation that removes the distortion that would be caused by the geometric organization of the OLED's not being rectilinear.

AGUI systems may include adaptive clothing with the ability to adapt to a flexible multi-sensor display surface and adapt content on the mapped body or clothing in relation to optimum viewing by one or more other people. In these embodiments, customized content may be displayed on different sections of the clothing such as a phone interface on a jacket sleeve or mapping and assigning a specific advertisement or graphic content on the back of a jacket based the relational position of one or more viewers.

Some embodiments of AGUI systems comprise UAVs (Unmanned Aerial Vehicles). These include the ability for a moving projection system to continuously adapt the angle of projection or continuously adapt graphic and interactive content onto one or more mapped surfaces. This is based on the spatial position of a moving aerial projection and/or active display system in relation to one or more mapped objects or surfaces or the relation of one or more viewing parties to the aerial display system.

AGUI systems may include automotive and other vehicular applications. These include single or multi-directional location, orientation and event specific mapping, imaging, projection or active displays. These systems may interface or network with multimedia display hubs and other AGUI systems.

4.5. Use of Multiple Surfaces

The device also has the capability to drive more than one surface. While the built-in projector is coupled to the physical surface that is currently in its light path, the device can support multiple wired or wireless displays.

In the simplest configuration, the device replicates its output to each surface that it is currently connected to. The first level of enhancement is for the device to reorganize the output optimally for each of its different surfaces. The device may also recognize that it is connected to a set of displays of compatible type, and that its output content can be spread from device to device, providing a smaller number of larger effective surfaces. The device may also reorganize content based on the strengths of each connected surface, and offer modified content uniquely tailored to each. For example, a TV might show a video, while a passive horizontal surface might show a virtual keyboard for data entry. When the AGUI device recognizes closely positioned or overlapping display surfaces such as a TV or other active display mounted on a wall the AGUI display system may communicate with the active display while projecting content around the active display to generate a single coordinated image, media content or interactive graphic user interface across the active and passive display surfaces or the AGUI display system may assign distinct content to the active display and passive display surfaces or a combination of coordinated and distinct content across active and passive display surfaces.

When an AGUI device connects to one or more additional AGUI devices, further possibilities become available. Just as a single AGUI can project the same content onto multiple surfaces, several AGUI's can cooperate and show the same content. Alternatively, as in the more advanced configurations of a single AGUI, a group of connected AGUI's may collaborate to split content, and split functionality. Each AGUI device has the capability to operate autonomously or in activity synchronized with other AGUI devices.

The adaptive display system may also select to assign multiple interfaces to a single display surface such as a table or wall based on the position of each person in relation to the display surface so that multiple people can be interfacing on a single display surface and user specific content can be assigned to zones on one or more display surfaces.

4.6. Managing Multiple Users

The AGUI system may identify one or more users in close proximity to one another, remotely connected or independent of one another. The AGUI system may manage a multitude of users and assign independent accounts, operating systems and/or adaptive graphic user interfaces (AGUI's) to each user, to a group of users or to an organization or company. The AGUI system may identify a user using one or more methods of identification such as imaging and/or mapping the hand, face, eyes, body, heart rate, using voice recognition or other biometric identifiers and/or through password, voice command, touch, gesture or other stored user input. The AGUI system may also identify a user by a user's connected device, clothing or other handheld, wearable, mobile, embedded, implanted, vehicular or other wired or wireless networked device and/or sensor that may also incorporate its own identification systems, network identification and/or methods of identifying their assigned user or users. The AGUI system may also identify the size, location, spatial and relational position and orientation of one or more users to one another and/or to one or more active or passive display surfaces with or without verifying the identify of one or all of the users and make autonomous decisions as to how to optimize content for one or all of the users Each user may have a customized AGUI interface that is adapted to the age, height and other physical characteristics, color and layout preferences and/or unique tasks, activities and interest of each user.

When the AGUI system identifies two or more users and identifies the users environment the AGUI system may adapt a graphic user interface or other multimedia content to each user based on the location, spatial position, orientation and point of focus of each user in relation to each other and/or in relation to one or more handheld, wearable or other devices, objects and/or surrounding display surfaces. When a user moves from one area to another or when a user changes their position, orientation or point of focus in relation to one or more display surfaces, the AGUI system may follow each users movements, spatial position, orientation and point of focus moving the AGUI display from one display surface to another and/or one AGUI device to another and/or adapt the displayed content based on the type of display surface in which each user is interfacing. For example if two users are in the same room such as a kitchen and one user is facing a refrigerator and another user is in front of a stove the AGUI system may display content specific to each user and specific to the device, appliance, object or other display surface in which each user is facing and/or interfacing. Each display surface such as a stove top or refrigerator door may have a unique AGUI layout and content customized to the size, shape, functionality and/or contents of each device, appliance, object or other display surface. The AGUI system may adapt the displayed content in real-time based on each user preferences and the display surface. For example one user may drink milk and eat cheese and may have their own food items in the refrigerator while another user may be lactose intolerant and have only non-dairy items in the refrigerator. The AGUI system may identify each user when they are standing in front of the refrigerator and display content and information specific to each users preferences and food items contained within the refrigerator specific to each user and identify which items are assigned to each user and which items are group items. The AGUI system may also map and display information specific to food or other items contained within or specific to the refrigerator or other device, appliance, object or other display surface. For example the AGUI system may image, map and/or wirelessly identify the food items or other contents of an appliance such as a refrigerator using one or methods of item identification such as object or logo/image recognition, by imaging a barcode, QR code, or other coding system, by wirelessly connecting with an RFID chip or other sensor assigned to each item or by another method of device, object or item identification. The AGUI system may image and/or map the spatial position, contents and status of items placed inside a refrigerator, oven or other device, object, appliance, vehicle or space such as closet, drawer, cupboard, cabinet, trunk or other storage area and identify how long an item has been in the space, the temperature of an item, how long an item has been cooking, how much of an items contents are left in the container, or other information on the status of a device, appliance, object, item, person, vehicle or other space or display surface and enable one or more users to interface with and/or take actions regarding such items such as remotely ordering a new item, turning on or off or changing the temperature of refrigerator, oven or other device or system or beginning, ending or controlling a task such as brewing coffee, or altering the temperature of a stove top based on the status of a task in progress. These tasks may be controlled directly by a user or may be programmed or assigned to the AGUI system to make autonomously based on a set of defined parameters such as the length of time an item has been stored, the amount of an item left in its container, the items temperature or any other variable assigned to a task. The AGUI system may then order a new item directly or may alert one or more users as to the status of an item or task in progress either through a visual or audio alert or via a text, email, phone or other message, communication or alert.

The AGUI system may image, map, monitor and/or communicate with items directly or may network with connected devices, objects, appliances, vehicles or other systems and surfaces such as a computer, phone, television, connected refrigerator, oven, coffee maker or other device, object or appliance or a connected space such as a home, office, building, store, restaurant, gym, theatre or other space or a car, bus, train, plain, boat or other vehicle which may have its own sensors and methods for identifying and monitoring the items, persons and or other contents within or outside of the connected system, The AGUI system may support a single group account in which multiple users all have the same or different levels of access to a single AGUI platform with standard or unique assigned AGUI layouts for each user, device, appliance, object or other display surface in a house, office, vehicle or other assigned area or across multiple devices, appliances, objects, vehicles, or other assigned areas or spaces. In this scenario different users may be assigned different levels of access to the core platform and/or to the interfaces, controls, programs and/or applications assigned to each device, appliance, object, area or space. An example would be a household with one or more children of different ages where a younger child may have no access or control over the interface assigned to a specified device such as an oven and may be assigned limited access or controls to the interface assigned to another device, object, appliance or other display surface such as a refrigerator wherein the child may only access and interface with certain sections or tasks of the refrigerator such as the water dispenser or a vegetable or snack drawer or may only open the refrigerator at specific times set by an authorized user. While a teenager may have unlimited access to the interfaces of all or most devices, appliances but may have limited access to the family vehicle or vehicles with access limited to locking or unlocking the vehicle or adjusting the temperature but an authorized user may needed to remotely start the engine or unlock the steering wheel enabling the teenager to drive. The AGUI system may also be programmed to only allow a specific user to interface with a device, appliance, object, vehicle or other system when an authorized user is present.

The AGUI system may serve as the operating, interfacing and control system for a connected device or may simply operate as an adaptive display and interfacing layer and system for a device with all device programming, applications, controls managed by the connected device, appliance, object, vehicle or other connected systems own onboard operating system.

The AGUI system may assign different levels of authority to each user with regards to editing controls and interfacing access and functionality.

In this scenario the AGUI system operates as each users independent mobile adaptive operating system in which each AGUI device may map and identify each user as they move from one display surface to another and/or from one AGUI device to another and continuously adapt content independently based on each users distinct account and display preferences and based on each users distinct account setup and applications.

5. Configuration

5.1. Startup

When power is applied, the system enters a new environment, or the system is reset, one of the first actions of the AGUI system is to interrogate the environment where it is located including the space that can be viewed by its image capture system and identify any displays or surfaces that could be used as a display surface. The AGUI system may also identify one or more persons, users and/or viewers in the proximity of one or more of the AGUI devices, vehicles, persons or other objects or display surfaces. The user may be identified using the AGUI devices onboard sensors which may include a light and/or optical imaging system, or other biometric identification system and may also include a motion, orientation, location or other sensor to identify the location, activity and position of the device and/or the user. In some embodiments of the present technology, this interrogation may be done by projecting a measuring grid or pattern and seeing if the image capture system records an image of this pattern. An image of any portion of the projected pattern is sufficient to inform the AGUI system that a surface exits. It is also possible that an image is captured that contains features that have not been projected but that show that there is a surface in the field of view of the AGUI system. If, in addition, a communication has been made with a potential display device and the location of this device, person, vehicle or other object or surface is found to be within the field of view of the AGUI system, it may be that the available surface for display is the display surface of the external device. AGUI systems, including those that are fixed in place, may store a list of displays and surfaces and attempt to confirm their presence and availability for use when performing dynamic surface detection.

5.2. Setup and Run Time Configuration

The AGUI system is aware of its surroundings and must be able to detect and configure surfaces and displays on which to output information and controls. The system divides displays into two types. The first is the traditional active or electronic display. Examples include traditional computer monitors, TVs, projectors, and any other device that can be queried and return data describing its characteristics such as physical interface, communication protocol, resolution, and color depth. The other type is a passive display or surface. A passive surface has no electrical or electronic connection to the AGUI. Typically, the AGUI displays onto a passive surface via its internal projector or an external projector. It is associated with input sensors, such as a mapping system, that allow for the detection of the surface, reporting relevant data required to use the surface as a display. The presence and parameters of these passive display surfaces must be detected by sensors in the AGUI system. Examples of passive displays are hand, arm, table, wall, vehicle, building. All displays are detected, identified, and have their properties determined and monitored for updates and changes.

At setup time, the AGUI may prompt the user to provide parameter ranges that input data is subject to for identifying and selecting surfaces. For example, a horizontal surface need not be absolutely horizontal, but a margin may be established. Vertical surface identification owns a similar set of parameters. A user may also implicitly set up parameter ranges by adjusting existing surfaces set up automatically by the system. By overriding default settings, the system can take the user update settings as new parameters.

When initializing and setting up the AGUI system user interaction may be required. Pre-operation setup of the device includes interaction between the user and the AGUI hardware to collect or verify a variety of data. This setup data can include specifying or verifying the list of available surfaces, the list of available ambient sensors, or the list of available gestural interfaces. For each surface, the criteria for selection of that surface as an output device or criteria for recognition of geometric or response perturbation are determined.

The mapping and characterization of the surface can typically be done by analyzing a small number of image frames. Once it is done, the AGUI will use the characterization of the available surface to set the appropriate scenario for the AGUI display. For an AGUI system, the scenario includes the way in which the display is created so that it is best adapted to the available surface. For instance, if a human hand scenario is used the images fall on the fingers and palm instead of between fingers and control features fit on the fingers and palm with sizes that can be readily seen by a human viewer and can be manipulated by that person. In the case of a hand scenario a projected keyboard would not be appropriate as a control feature. However, if the available surface were a tabletop, a projected interaction keyboard would be appropriate. If the available surface were part of a device that could be commanded by the AGUI system to create a display yet another scenario would be used by the AGUI system.

The executing application is aware of the system's input and output capabilities and reworks the output content based on several criteria such as setup preferences, input data, the currently selected output surfaces. Input data can define output surfaces, complete output content, and redefine the executing application.

Setup parameters and run time selections provide capability for driving more than one surface. Surfaces may display the same content, with each surface receiving modified content appropriately for that surface. Content may be divided between surfaces, so that content is spread across a set of surfaces. Content may be organized differently for different selected surfaces, making best use of each surface's capabilities.

5.3. Choosing Display Surfaces

The AGUI has built in capability to identify a surface type based on processed input data. Sensors can determine a number of parameters using a number of means including light imaging systems, light scanning systems, rangefinders, depth mappers, optical imaging systems, camera systems, plenoptic capture systems, networking and sensor mapping body arrays, real time streams of planar or non-planar geometric perturbation data, real time ambient condition sensors, OLED specification data, and specifications of flexible or clothing-based surfaces.

The first step in this process is to receive raw input data from sensors directly or wirelessly connected to the AGUI. The AGUI then organizes this data so that at the surface identification level it is seen as AGUI spatial data including coordinates, orientation, curvature, and display device response data such as color and texture.

Other attributes also inform the identification process. For example, if the available surface is discontinuous but locally continuous it can be divided into a pattern of zones that resembles a hand and fingers. The AGUI may initiate a recognition process for that class of display. At setup time, the AGUI interacts with the user to determine appropriate ranges for number of zones, size and relative positions of zones. At run time, these parameters are part of the verification process for a valid hand/fingers display.

Run time events also inform the identification process. At setup time, the user may have specified that certain incoming events, such as ambient light or temperature, would trigger different surface identification parameters sets.

Once setup is complete, the AGUI makes autonomous decisions about surface selection. When there are several candidate surfaces available, the user may override the autonomous selection. The AGUI records the user's run time overrides. When it has built up a sufficient database of override selections, the AGUI starts to modify the autonomous process based on this run time learning. Thus, selection becomes a mixture of what the user has set up and what the AGUI has learned through use.

In the simplest situation, a single AGUI displays its content onto a single surface. In more complex scenarios, an AGUI is able to display onto multiple surfaces, and optimize both the content itself and the organization of that content to match the characteristics of each of the multiple surfaces.

The AGUI system implements a process flow that can project display content onto surfaces and image those same surfaces. The AGUI system can also be embodied in a device that can sense its orientation and movement in space and its orientation to the direction of its projection system and image capture system using such available technology as motion, location and orientation sensors, cameras, light, optical and acoustic depth mapping and imaging systems. The AGUI system can also be embodied in a device that can search for, communicate with, and command other potential display devices.

The AGUI system supports several different classes of displays and adapts the output for these classes. Different algorithmic methods can be employed to process and use several different types of display surface shape information.

Devices with flat displays are the type of surface found in desktop and laptop computers, smart phones and tablets. These display surfaces are 2 dimensional planes. When the AGUI establishes communication with this type of external display device it will receive information on the type of device and then will recognize it as having a planar display surface. It will also receive information as to the size of the display area and the number and location of the display pixel elements. If the AGUI system has image capture capabilities and an image of the device can be captured, the image of the display will be compared to the known shape of the display when viewed directly and the distortion of the image will be used to find the orientation of the display surface to the viewer. However, in most cases, it will be assumed by the AGUI system that the user will orient himself/herself to the display for a direct view and will command displays to be generated using this assumption.

Other devices have non-planar display surfaces and cannot provide self-mapping information. When the display surface is not planar the AGUI system needs information on the 3-dimensional shape of the display surface. This information will be used to create a display that most favorably uses the available surface and to detect changes in the surface that may be control signals.

When the AGUI has more than one surface available for use as displays, the system will decide which content is to be placed on each available surface in several ways. When the AGUI system recognizes more than one available display it will determine for each if the display is an active or a passive surface. An active display is one such as the display of a desktop, laptop or tablet computer or a self-luminous display of any type that may be controlled by the AGUI system via communication with the device. A passive display is a surface such as a wall, a tabletop, a human hand, or a household object such as the surface of a refrigerator or stove. For a passive surface to be an available display surface a projector system of some type that the AGUI system can control must be available to the AGUI system. Having determined the character of each available display surface the AGUI system will, based on predetermined instructions, decide on the appropriate display content to place on each. However, once displays are initially identified there may well be control icons on these surfaces, which when activated, will instruct the AGUI system to change the display on one or more of the available surfaces. This feature allows the AGUI to use multiple display surfaces in a dynamic fashion.

The AGUI system will continuously monitor the display surfaces it has initially found and determine if they are still available. If a surface, for any reason, becomes unavailable, the AGUI system will reassign displayed information as necessary to display surfaces still available. For certain surfaces display content is only needed when they are available and when such surfaces become non-available, the AGUI will not create that specific display content.

If a surface changes its shape but is still available for display, the AGUI system will determine how best to use this surface, taking into consideration its use of all other available surfaces, and change the display on the changed surface as appropriate.

If one or more of the display surfaces available to the AGUI system can move with respect to their surrounding environment and if the AGUI system can determine the surrounding environment in some way, the AGUI can be instructed to change the display on any one of the surfaces based on its surroundings as the environment changes. For instance, if the AGUI system includes a laptop computer sitting on an outdoor table in front of the user and a self-luminous display on a passing bus, information from the display on the bus for that user will only be presented when the bus in the vicinity of the table. Then, as the bus passes, its display system will become unavailable and will leave the first AGUI system but may join a second AGUI system further down the street and create a different display there.

When the AGUI system has multiple available surfaces on which to create displays and has the ability to determine where the user is looking and from this information to determine the field of view of the user, the AGUI system can be instructed to only create displays on surfaces that can be seen by the user. For instance, if the user walked into a kitchen area and looked toward the refrigerator, the AGUI could then project information detailing the contents of the refrigerator on the door of the refrigerator, or if the refrigerator had on its door a self-luminous display panel, the AGUI system could command this information to be displayed on the panel. Then, when the user looked away from the refrigerator, the display on the refrigerator door could be discontinued.

The AGUI may also make use of all available surfaces and map content onto a portion or the entirety of a space in order to generate a virtual environment. The AGUI then dynamically adapts the displayed content based on the position, point of focus and field of view of one or more users.

The AGUI can be instructed to treat some of the multiple surfaces available to it as those on which displays are used only when viewed and others on which displays are created whether they are viewed or not.

The field of view used by the AGUI system to decide when to create a display on certain surfaces can be defined in several ways. If the AGUI system includes a head location or eye direction-sensing device of some type worn by the user, the device can be used by the AGUI system to determine where the person is looking. This definition of field of view can be defined as the personal field of view as it applies to the field of view of a particular person. Another definition of field of view applies to situations where a moving display surface comes into an area where a number of people could view it if they looked at it. This definition of field of view can be termed area field of view. For instance, in the case of a moving vehicle such as a car, bus, truck, train or plane with a projected or self-luminous display on one or more of its surfaces such as its side, front, rear or roof panels, doors, wheels or windows, the AGUI system will map all available display types and surfaces on the vehicle and adapt a single graphic display, media content and AGUI to one or more of the display surfaces on the vehicle. The display may cover some or all panels and display surfaces. It may assign a single graphic display to the entire vehicle, or may assign an interface and/or distinct graphic and/or multimedia content to a section of the vehicle such as the side of the vehicle across all panels, windows, wheels and other display surfaces on the selected side. The AGUI may also assign a single graphic user interface to a single panel, window, wheel or other display surface, or the AGUI may assign multiple graphic and/or multimedia displays and interfaces to a section of the vehicle or to one or more panels and display surfaces.

The AGUI system may also dynamically map and display an interactive graphic user interface across two or more networked vehicles in close proximity. This is based on the geometrical relationship (spatial position, location and orientation) of a vehicle and/or vehicle display surfaces to one or more other vehicles and vehicle display surfaces. For example, if one bus is driving or parked in front of another bus, a graphic user interface may be mapped across both busses. Content may be assigned across the side and/or roof display panels of both buses or vehicles. Certain information may be considered appropriate for display when the bus passes certain locations on its route. A bus could display time to various destinations based on the bus stop it was passing. It could display advertisements for local businesses in its current location.

Similarly to a conventional computing device controlling multiple displays, the AGUI is not limited in the number of surfaces it can be connected to at any given time. It can duplicate the same content on each surface or divide the content between surfaces. If content is duplicated, it may still be tailored individually for each surface, in several ways. Depending on the type of display, surface, size, shape, pixel resolution and other variables, form factors and object, device or surface functionality the AGUI may choose to send graphic images, video, icons or other interactive graphic content, detailed text or an abbreviated text synopsis. Depending on active surface components identified, the AGUI may choose to send static content or a user interface with selections. If content is divided, the AGUI will try to find the best way to use the distinctive characteristics of each surface. An identified hand with finger and palm zones suggests implementing a selection user interface. A large continuous projection or display area suggests showing instructional text, graphics, or a video stream.

5.4 Surface and Display Mapping

Utilizing a light and/or optical imaging and/or depth mapping system an AGUI apparatus may map one or more available surrounding surfaces. When possible the AGUI system will accurately identify and calculate the precise shape, size and parameters of one or more surrounding passive display surfaces as projection display candidates and then generate a display zone based on the mapped parameters for each display candidate in which an AGUI may be assigned. When mapping active display surfaces such as electroluminescent, backlit, organic, embedded or other self-illuminated displays such as an LED, LCD, OLED or other active display system, screen, panel or material in which the display output is incorporated in the display surface, the AGUI system may network with each screen or active display and receive information on the precise display parameters of each active display system. When available, an active display system may also provide its own spatial position, orientation and/or location data which the AGUI system may incorporate into an image and/or depth map of its surrounding space to identify active display surfaces as independent display candidates and assigned independent display zones or may be coordinated with a passive display surface such as a television screen mounted on a wall grouping with a projection system to generate a single coordinated active and passive display surface and larger display zone.

When mapping a space using one or a combination of light and/or optical imaging and/or depth mapping and/or other available method of depth mapping surrounding spaces, surfaces and display candidates and/or networking with active display systems, the AGUI System is able to able to identify and calculate the size, shape, spatial position and display parameters of one or more passive and/or active display candidates in a mapped space.

When image and/or depth mapping is not available the AGUI system may use spatial positioning data from one or more networked active display systems to generate a basic positional map of all active display candidates in a space and map the spatial position of one or more active displays in relation to a primary AGUI apparatus or one of the active display systems may serve as the primary AGUI apparatus for a given space.

5.5 Display Zones

Once one or more passive or active display surfaces or spaces have been mapped, the AGUI system may identify one or more display candidates in a mapped space such as a ceiling, floor, walls, tables, chairs or other furniture or appliances that may serve as an optimum surface or space to assign an AGUI display.

A single surface, mapped space or other display candidate may be assigned a single display zone or may be assigned multiple display zones based on the optimal available display area. For example if a wall is partially covered by a painting or if a lamp or table is placed in front of a section of the wall, the AGUI system may assign a primary display zone for the entire wall with sections blocked out as non-active sub display zones and then map, assign, adapt and display content around the non-active display zones on the wall using a passive surface display system such as a projector. Alternatively the AGUI system may assign sub-zones to a primary zone for each display candidate for example a wall may assigned as a single display candidate with a single primary zone and then sub-zones may be assigned above, below and to the left and right of the picture frame on the wall and different display content may be assigned to each sub zone.

A single display candidate such as a table may be assigned multiple sub zones based on the position of two or more users so that each user may be assigned their own subzone to display their own customized AGUI display and content. Two or more users may also select to combine their sub-zones to create a group interface zone or may select to generate additional personalized subzones and assign different applications and content to each sub zone.

The AGUI system is able to dynamically map moving surfaces, identify display candidates, generate display zones and subzones, assign and display content to the zones and arrange, modify, map and adapt an AGUI interface and display content within one or more zones in real-time. For example a wearable AGUI apparatus such as a wearable wrist projection system may image and map the users hand and fingers and generate a single display zone for the entire hand and fingers when the fingers are pressed together and dynamically generate sub zones for each of the fingers when the fingers are apart. The AGUI may assign one AGUI interface when content is assigned to a single display zone on the hand and switch to another AGUI Interface when the user spreads their fingers apart enabling independent functionality, applications, content assignment and adapted content display to each zone and sub zone in real-time.

5.6 Modular Computing and Interfacing

Each display zone or subzone may operate as an independent computing platform or may operate as a display and interfacing module within a larger computing platform in which active display content may be assigned, displayed, controlled and interfaced by one or more assigned users and naturally moved from one passive or active AGUI display surface to another either by the user or by the AGUI system as it maps the movements of an assigned user as they move from one AGUI display surface or space to another.

6. Networking

6.1. Networking Overview

Various devices can be networked with the AGUI system. Network interfaces can conform to a defined AGUI standard or be non-conformant devices. Non-conformant devices may have a wrapper to appear to be AGUI conformant. The following sections describe a survey of supported networking possibilities.

6.2. Networking from the User's Perspective

A single user may interact with a single AGUI. A single user may interact with multiple individual AGUIs. A single user may interact with a cooperative network of AGUIs.

Multiple users may share a single AGUI. Multiple users may interact with multiple individual AGUIs. Multiple users interact with a cooperative network of AGUIs.

6.3. Networking from the AGUI's Perspective

A single AGUI may act autonomously.
Multiple AGUIs may act individually autonomously.
Multiple AGUIs may form a cooperative network.

6.4. Networking from the Display Surface Perspective

A single surface may be owned by a single AGUI. Multiple surfaces may be each fully owned by a single AGUI.

A single surface may be owned by multiple individual AGUIs. Multiple surfaces may be share-owned by multiple individual AGUIs.

A single surface may be owned by a cooperative network of AGUIs. Multiple surfaces are owned by a cooperative network of AGUIs.

6.5. Multiple AGUIs in a Network

Less complex embodiments of the present technology include a single AGUI. The single AGUI device selects a surface, adjusts content for that surface, then displays content on that surface. However other embodiments of the AGUI system are more complex. A single AGUI device can control multiple surfaces simultaneously. The AGUI device is often a device owning a single projector that is able to dispense light. This does not preclude the possibility that the AGUI recognizes and connects to other types of surface that do not require illumination. Surfaces that do not require illumination from the AGUI include local heads up displays, electrically or wirelessly connected devices such as a computer, phone, tablet, TV appliance, vehicle, wearable device, or other type of pixel array (e.g. an array embedded in clothing, furniture or other objects, devices and surfaces).

A system of AGUI's may run a distributed application in which AGUI's share both output and input data.

Two or more independent AGUIs, each controlling one or more separate surfaces, or a group of AGUIs operating as a network controlling multiple surfaces are other possible configurations. For embodiments that incorporate multiple AGUI's in a network, a simple network configuration has one master AGUI device controlling multiple slave AGUI devices. This is handled similarly to the case of a single AGUI controlling multiple surfaces. The master AGUI fully owns its own projector and its connected surfaces. The slave AGUIs provide further surfaces under its control. These are added to its list of connected surfaces. The master AGUI undertakes one further step, to send the content to the slave AGUIs.

In a more advanced situation, a network of AGUI's can negotiate to form a peer-to-peer network rather than a master-slave network. This configuration may involve several activities. One activity is an AGUI negotiating or directing other AGUIs to enable content for display based on specific capability. Content may be organized to be held on each AGUI as fixed data that may be transmitted from one AGUI to another as needed or read from a common linked database. AGUIs organize entry and exit requirements from the network. The network is always seen as a temporary structure that will change dynamically as AGUI devices are turned on or off, or AGUI devices enter communication range or disappear from range. Individual AGUIs use their local connections and intelligence to determine its current set of Surfaces.

6.6. Networking Example

FIGS. 62 and 63 show an embodiment of the networking principles discussed in the previous sections. In this scenario, a Master AGUI Device or Internet or other network based program, platform, website or application, labeled "AGUI HUB" (reference 201), is a Master controller platform having access to Slave AGUI devices over any kind of network. The network is a vehicle for communication between the Master AGUI HUB and the Slave devices or slave software applications running on slave devices. The network may be Internet or other wide area network, a local wired network, a local WiFi network, a local peer-to-peer connection such as Bluetooth, or any other communication system that permits data traffic.

The Master AGUI HUB may own display devices and surfaces or may not own any display surfaces, but only direct display activity on Slave AGUIs. Such Master directive activity includes sending content to the Slave AGUIs and working with each Slave device to optimize its display activity. In some cases, a Slave may be able to make all necessary display choices without intervention. In other cases, a Slave may itself have display choices that it cannot resolve, requiring the Master to be involved in choosing appropriate surfaces and/or assisting with detailed content choices. All AGUI content and functionality may be stored locally on a Master AGUI Device or all AGUI content and functionality may be stored and controlled remotely on the Master AGUI Hub or a combination of local and remote data storage and functionality.

The Master AGUI HUB may also have direct access to surfaces (reference 1308) such as phones, computers, TVs, furniture, appliances, buildings, roads, vehicles and other display surfaces. Additionally, the Master AGUI Device or HUB may control displays on the user (reference 1310) such as the hands, fingers, arms and other body surfaces as well as wearable devices and systems such as smartwatches, heads-up-displays glasses, headsets, clothing, prosthetics and implants. In a larger context (reference 1312), the Master AGUI may be in communication with vehicles, vehicle devices, vehicle surfaces, robotic assemblies or other mobile and/or moving systems. In another scenario (reference 1314), the Master AGUI may be in communication with Slave devices, vehicles, buildings, stores, businesses, billboards and/or other indoor and outdoor displays, display systems and/or surfaces Such an organization of a Master and a set of Slave devices is at all times reconfigurable as devices are turned on and off, come into range for activity, or exit that range. Furthermore, such an organization may itself be a node in a larger organization of smaller organizations.

The Master AGUI HUB may also assign content and/or transfer content from one or more devices, vehicles, buildings, stores, businesses, billboards or other indoor or outdoor displays, display systems and/or surfaces to one or more other devices, vehicles, buildings, stores, businesses, billboards and/or other indoor or outdoor displays, display systems and/or surfaces.

In this example embodiment, the AGUI HUB Master recognizes that it is in control of several Slave AGUIs (reference 1306). Each of these may be tied to one or more passive or active surface (reference 1304) such as household appliances. The Master only makes detailed display choices when a Slave AGUI is unable to make the choice without intervention.

7. Multi-User Operation

Special further consideration is now given to a situation where the AGUI system has within its current ensemble of display surfaces a number of display devices or has a large display surface, such as a table top, where a multitude of different displays may be active at once, and where the AGUI system recognizes that more than one user is able to view and interact with one or more of the available displays. For the AGUI system to deal with this special situation it must first be informed that multiple users exist. It must then decide how best to allot display surfaces to the multiple users. The AGUI system can obtain this information and use it in a number of ways.

7.1 Identifying Users

The AGUI system begins the process of dealing with multiple users by establishing that there are indeed multiple users. This can be done in a number of ways.

If an individual has a device associated with their person that can communicate with the AGUI system, the AGUI as it continually interrogates its surroundings, will detect this device and when it does so, it will attempt to establish that person's identity and location. Such devices include cell phones, wrist mounted devices, and tablet computers. These are devices that persons carry, have personal identification as to their owners and communicate with external systems. If an AGUI system can use such information to make an identification, this individual is included as an identified user within the system. Some devices can not only provide identification for a person but can also provide information on their location. In that case, the AGUI system will use this information to track the location of the identified individual as they interact with the AGUI system.

For an AGUI system that can image an extended area, it will use image recognition techniques that are well known to find persons in its field of view. If the AGUI system is communicating with a powerful enough computer system or network and if it has access to images of identified individuals, it will attempt to identify persons it finds in its field of view. Those individuals that can be identified are added to the known users within the AGUI system and other unidentified individuals are added as unknown but located users.

Of those unidentified users some may be later added to the identified users in the following way. The AGUI system will, as will be outlined below, create a display that can be conveniently accessed by each of the various current users. The AGUI system will also make available on the display for an unidentified user the ability for that person to inform the AGUI of his/her identity. This will be done with adequate security measures so that unidentified users will not be allowed to inform the AGUI system of a false identity. These secure identification methods include iris recognition, voice recognition, fingerprint recognition, facial recognition, recognition of entered passwords and combinations of these methods.

The AGUI may also encounter situations where it is informed that there are multiple users but neither their locations nor their identities can be established. For instance, this can occur when the AGUI is made aware that it is being used in a meeting situation and can image the area of interest but has not ability to do image analysis on the scene so as to detect individuals in a reliable way.

7.2 Actions Following Identification of Multiple Users

For each identified user, the AGUI will determine which of its current displays and/or display locations is an appropriate one for that identified individual to view and use. It will then decide how best to customize one or more display for the use of each individual—taking into account potential situations where a display surface must be shared between one or more of the identified individuals.

For instance, if the available display surface is a tabletop and several identified individuals are seated at the table, the AGUI can have the ability to create a display surface in front of each individual with content specific to that individual. The AGUI system, using the afore-mentioned ability to dynamically change the placement of content based on changes in the available display surface, can, for instance change the placement of display information for an identified individual if a portion of the table top allotted to that individual becomes unavailable for display—say, for instance, if a cup is placed in a portion the projected display for that person.

If the person moves within the area in which the AGUI can create displays, it will make available a display surface for that individual, changing the location of the display as the person changes location. In doing so, the AGUI will avoid conflicts that will occur as one person moves into the area of a display surface allotted to another user.

7.3 Actions Following Detection of Unidentified Users

In this situation there is not enough information available to the AGUI system to allow it to customize displays and/or display areas to specific individuals and in that case it will treat all persons on a common basis.

However, it can allot display areas in a way that will make it convenient for the various observed persons to have a display that each can use. In this case, the AGUI will make available to each unidentified user the ability to inform the AGUI, in a secure way, of the person's full identity. In the case of identified users, the AGUI system will make available display surfaces that change location as the person moves location, avoiding conflicts in allotting display surface area.

7.4 Mixed Identified and Unidentified Users

There can also be a situation where there are multiple users present for the AGUI system but only some can be specifically identified as to their person and location whereas the others are only identified by location. The AGUI system will then allot a display to each person but only customize the display that is appropriate for use by a fully identified individual. All other dynamic aspects of dealing with changes in available display areas for each person are handled the same for all by the AGUI system.

7.5 Identity and Location of Users is Unknown

The AGUI system may not be able to identify the location of multiple users but may be made aware that there are multiple users in some other way. This is a commonly occurring situation where the multiple users are assembled at a meeting. Then the AGUI system will allot display space in a way so that as many as possible of the multiple users can view it.

7.6 Multiple Users in a Vehicle

Another example of the AGUI system allotting different display surfaces to multiple users, sometimes individually identified, is the case of the interior of a vehicle, such as an automobile, where there is a driver and there may be passengers in the front and in the back seats of the vehicle, each identified by their seating placement in the vehicle. The AGUI system can have access to various built-in sensing devices in the vehicle such as seat occupancy sensors, interior imaging systems and various devices carried personally by the occupants of the vehicle. The AGUI system uses these sensors to identify the presence, location and designation of duty or function in the vehicle. For instance, the AGUI system will sense the presence of the driver and assign displays created in various ways to provide the driver with information needed for the task of a driver. These include heads-up displays and various dashboard displays in addition to appropriate audible information. The passengers will also be identified by the AGUI system by their presence and location in the vehicle and will be assigned displays that they can readily access and interact with in the fashion heretofore described.

7.7 Access to Personal Data and Security Considerations

When the AGUI system identifies and allots display space to multiple individuals it can also provide to those individuals whose identities have been established, via the display allotted to them, access to personal information and/or data that may reside elsewhere in devices or systems with which the AGUI system can communicate. These situations include allowing an individual to access personal information and/or data on a remote system such as an internet 'cloud' system on another computer system—local or remote. In this way, the AGUI system, in the case of multiple users, can allow each individual user to access personal information in a way that is only available on the display allotted to them.

When the AGUI system provides personal information to a display surface and when it is creating or using multiple display surfaces for multiple users, it employs security measures so that information for a given individual is not displayed on the display allotted to another individual. Thus each of the display areas allotted acts as though it were an individual display device that is not in communication with other individual display devices.

Of course there are situations in which this separation of access is not adhered to. For instance, when the AGUI is facilitating a 'gaming' situation in which multiple individuals use a common 'gaming' platform, the AGUI will allow different users to access and control the displays that are common to users involved in the 'game'.

8. Avoiding Critical Field of View Interference

When the AGUI system creates a display, such as a heads up display, the AGUI system will have the additional responsibility to recognize critical fields of view in which it would be unsafe to place displays causing them to interfere with ability of the user to view objects in that portion of the total field of view. Situations of this type can occur when the AGUI creates such displays for the pilot of an airplane or the driver of a car. In these situations, there are field of view areas in which critical external events are seen and which the user must rapidly recognize and correctly take control action.

Any display that will interfere with the ability for the user to see and react to events so occurring must be avoided. So the AGUI will place the heads up or virtual display in areas that will not conflict with user ability to see and react to external events. This is best done by equipping the AGUI system with the ability to map and interpret the total field of view of the user.

9. Additional Design Notes

In addition, if the AGUI system has the ability to sense the head and eye direction of the user, it can place the display dynamically as the users turn their heads so that the display can be seen with a minimum of additional head or eye movement but so that at no time is a critical portion of the total field of view interfered with by a display. It is recognized that the human visual system is quite sensitive to motion in the periphery of its visual field. So to prevent the user from being distracted by rapid changes in a virtual display that is at a given moment not in the central portion of the user's visual field, the AGUI will make changes to the display in a way so any changes are gradual thus preventing undue distraction caused by the changes.

Figure 56:
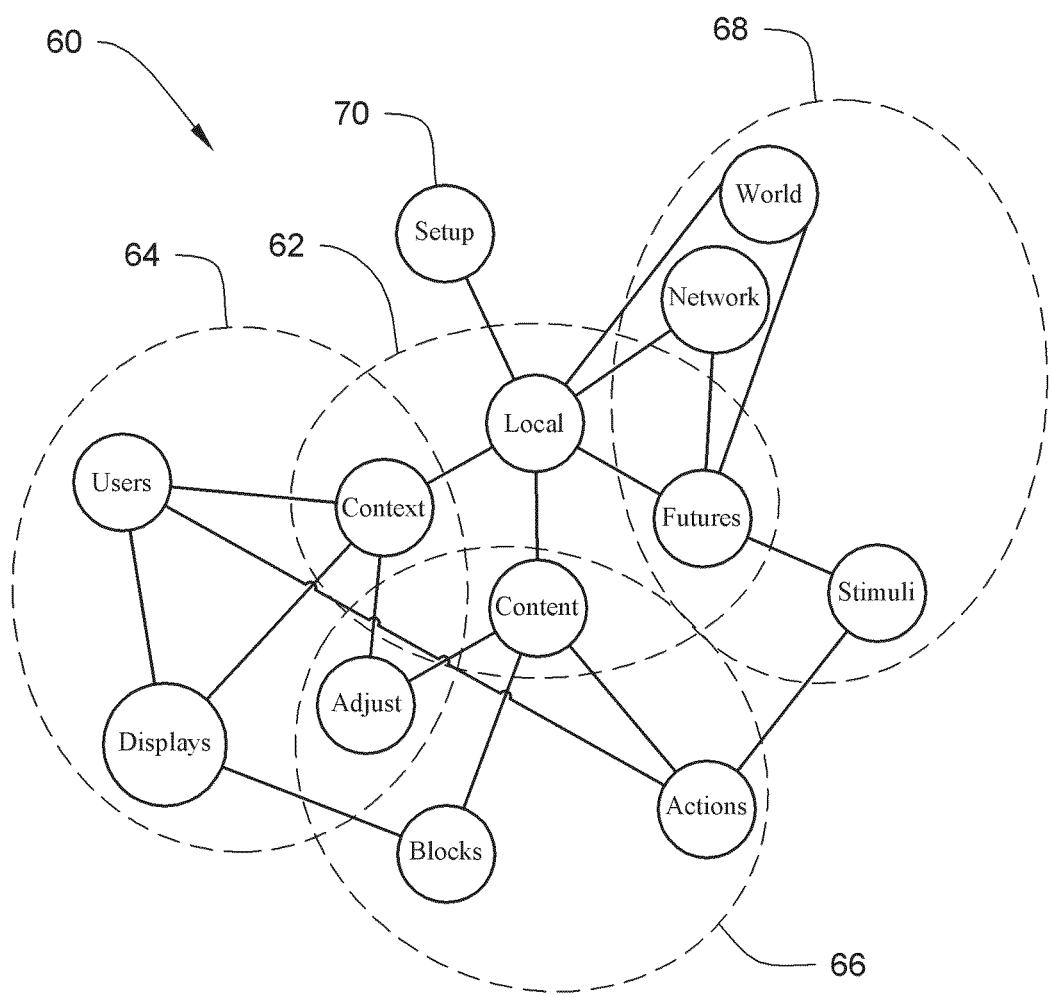
FIG. 56 is a diagrammatic representation of an embodiment of a general AGUI operation of an AGUI device

Referring to FIG. 56, embodiments of the present technology of the AGUI device, system or method can utilize the following general synopsis of the AGUI operation 60. In the exemplary, a general AGUI operation can include core processing 62, a dynamic display system and process 64, a dynamic graphical user interface (GUI) 66, a change mechanism 68, and a setup process 70.

The core processing 62 of the present technology can include a "Local" computing device including at least one central processing unit (CPU) and software including instructions that can be configured or configurable to organize display "Content" in the light of "Context". Available hardware and recognition of "Users" of the dynamic display 64 is taken into account in this process. The Content can be generally described as what is to be displayed and acted on, and the Context can be generally described as how the material will be displayed. The Local operation or process of the core processing 62 can be in communication with the Context, Content and/or a Futures of the core processing 62, and/or with a "Networked" AGUI system and/or the outside "Word" of the change mechanism 68, and/or with the "Setup" 70.

Input can be derived from the current operating Context. The Context can include "Users" and mapping data. Active "Displays" of the dynamic display system and process 64 may include mapping systems to allow them to optimize usage and to identify User interaction.

Conflicts can be resolved by the AGUI system and/or by a remote system operable connected with the AGUI system. Not all potential Content may be displayed at any given time. This optimization can include selecting from available Displays, available Users and available content "Blocks" of the dynamic GUI 66.

Regarding Context of the core processing 62, available Displays such as, but not limited to, projectors, surfaces, electronic devices, etc., can be recognized and/or characterized. The Context knows or can determine which Display devices are currently in use. It knows or can determine how to drive or control all the available Displays. It acquires mapping data and identifies User entry such as, but not limited to, gestures, key presses, mouse clicks, etc.

The Context of the core processing 62 can be in communication with the Local of the core processing 62, the Users and/or Displays of the dynamic display 64, and/or an "Adjusts" system or operation of the dynamic GUI 66.

Regarding Content of the core processing 62, can include the Blocks to be output, along with possible "Actions" of the dynamic GUI 66 that could result from Users interacting with the Content. Content may be static or dynamic or a combination thereof. It may include visual, sound and vibration data.

The Content of the core processing 62 can be in communication with the Local of the core processing 62, and/or the Adjusts, Blocks and/or "Actions" systems or operations of the dynamic GUI 66.

The core processing 62 can include "Futures" including all possible future scenarios that could result from a user Action, or an external input from a "Network" AGUI system or from the outside "World" of the change mechanism 68.

When a Future is selected by the Local processing, it replaces the current Content. A Future may be dynamically defined. The Futures list may change as a result of Local, Network or World activity.

The Futures of the core processing 62 can be in communication with the Network, World and/or Stimuli systems or operations of the change mechanism 62.

The dynamic display 64 of the present technology can include and/or determine all available Display devices, along with mapping data that provides detailed geometric and response data necessary for clear display. It can further include and/or determine all identified Users.

The dynamic display 64 of the present technology can include the Context, which can be also be included with the core processing 62, an "Adjusts" system or operation that includes mechanisms for adjusting details, such as which Displays are currently active, which are currently selected, which Users are available to interact with Content, and/or which Users are currently selected to provide input.

Output can be adjusted in real time to accommodate changes in Display details, and devices becoming available and unavailable. Users come and go into the environment covered by the AGUI system, and output optimization changes accordingly.

The Adjusts system or operation of the dynamic display 64 can be in communication with the Context and/or Contents systems or operations of the core processing 62.

Regarding the "Users" system or operation of the dynamic display 64, the AGUI system can work with no identified User. If there is one or more User, the Users' locations may be determined from mapping data when this is available. Display details may be optimized for known Users.

The Users system or operation of the dynamic display 64 can be in communication with the Context of the core processing 62, the Displays of the dynamic display 64, and/or the Actions system or operation of the dynamic GUI 66.

Regarding the "Displays" system or operation of the dynamic display 64, the Content of the core processing 62 may span one or more Displays for continuous coverage. Mapping data allows Display data to be optimized for clarity. This can include geometric transformations and color and intensity controls of the Display.

The displays utilized in the AGUI system can be, but not limited to, passive displays, active displays, watches, cellphones, tablets, TV's, computers, wall surfaces, floor surfaces, ceiling surfaces, multi-panel displays, appliances, OLED furniture, projection systems, tiles, multi-panel displays, vehicle surfaces, wheels, windows, garments, headsets, head-up displays, glasses, head mounted systems, body worn systems, or visors.

The dynamic GUI 66 of the present technology can include the Content, which can be also be included with the core processing 62, the Adjust, which can be also be included with the dynamic display 64, Blocks and Actions.

Regarding the Content, this system or operation can include the material to be outputted. This may be static or dynamic. It may include combinations of text, video, sound and/or vibration.

Regarding the Blocks system or operation, the Content can be organized into component Blocks. The Blocks that are actually output at any time depends on the state of the current Context. Blocks may have associated Actions.

The Blocks system or operation of the dynamic GUI 66 can be in communication with the Content of the core processing 62 and/or the dynamic GUI 66, the Displays of the dynamic display 64, and/or the Actions system or operation of the dynamic GUI 66.

The Actions system or operation can provide a mechanism for Users to interact with the AGUI system. Actions may be always available, or may be associated only with specific Blocks being active. When a User triggers an Actions, a Stimulus results, thereby proving an input in the AGUI system.

The Actions system or operation of the dynamic GUI 66 can be in communication with the Content of the core processing 62 and/or the dynamic GUI 66, the Blocks of the dynamic GUI 66, and/or the Users of the dynamic display 64, and/or the Stimuli of the change mechanism 68.

Regarding the Adjust system or operation of the dynamic GUI 66, this can be a cooperative process that links the operating Context and the Content to be output.

The change mechanism 68 of the present technology can include the Stimuli, the Futures which can be included with the core processing 62, the Network and the World.

The Stimuli system or operation can be triggered by local Actions of the dynamic GUI 68. A Stimulus may trigger a Future Content set to be loaded. Additionally, a Stimulus may modify the existing Content set and/or may modify a Future.

The Stimuli system or operation of the change mechanism 68 can be in communication with the Futures of the core processing 62 and/or the change mechanism 68, and/or the Actions system or operation of the dynamic GUI 66.

Regarding the Network system or operations of the change mechanism 68, a change request may be driven by another AGUI in a Network in communication with this local AGUI. The local AGUI system may send a request to another Networked AGUI.

The Network system or operation of the change mechanism 68 can be in communication with the Futures of the core processing 62 and/or the change mechanism 68, and/or the Local system of the core processing 62.

The World system or operation of the change mechanism 68 may accept external change requests from outside the AGUI Network system. Thus, the Local AGUI system can receive requests and/or control commands from system, devices and/or processes that are not a Networked AGUI system. The AGUI may trigger changes outside the AGUI system.

The World system or operation of the change mechanism 68 can be in communication with the Futures of the core processing 62 and/or the change mechanism 68, and/or the Local system of the core processing 62.

The setup 70 of the present technology can include a "Setup" system or operation. A new AGUI system may be pre-programmed to perform in a certain way with operator preferences. An AGUI system can have Content loaded via a Setup mechanism 70. An AGUI system may be set up with fixed or dynamic lists of Futures and Displays.

It can be appreciated that the AGUI system can be configured or configurable with preloaded settings, parameters, drivers, instructions, tables, databases, etc., or these can be programmed anytime.

It can further be appreciated that a broad general synopsis of an exemplary operation of the AGUI system has been described, which can be utilized in any embodiment of the present technology or later technology derived from the present technology.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

Figure 55:
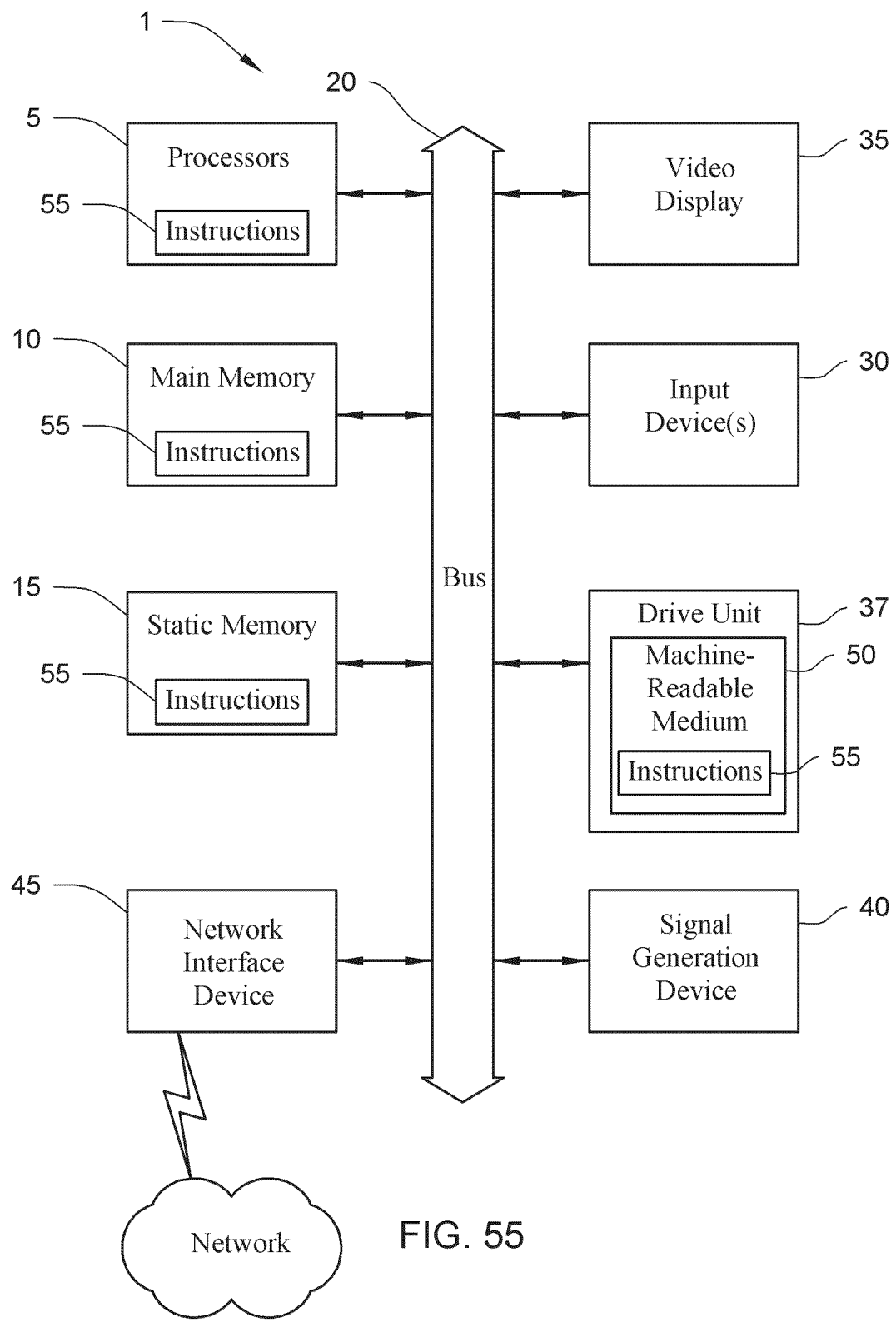
FIG. 55 is a diagrammatic representation of an embodiment of a machine in the form of a computer system.

FIG. 55 is a diagrammatic representation of an embodiment of a machine in the form of a computer system 1 of an AGUI device, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment or any other configuration as described herein with reference to any of the embodiments. The machine may any type of device described and/or shown herein in any of the accompany drawings or a robotic construction marking device, a base station, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The embodiment of the computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processors 5 during execution thereof by the computer system 1. The main memory 10 and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP) etc.). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 1 are required and thus portions of the computer system 1 can be removed if not needed, such as Input/Output (I/O) devices (e.g., input device(s) 30). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. In other embodiments, any one or more of the method or process steps or blocks shown in the flow chart may be omitted or re ordered in relation to the other steps or blocks.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. An adaptive graphic user interfacing system comprising:
   a sensor component configured or configurable to dynamically map an environment in proximity to the sensor component to detect a user and a display candidate;
   a display output component configured or configurable to provide display content on or to the display candidate; and
   at least one processing unit operably connected or connectable to the sensor component, the display component and at least one memory, the processing unit being configured or configurable to:
  determine a user's relational position to the display candidate in real time;
  identify one of the display candidate and the user in real time;
  continuously adapt the display content based on the user's relational position to the display candidate in real-time as the user moves in relation to the display candidate; and/or
  the display candidate moves in relation to the user,
wherein the display candidate comprises at least one display surface of an object, and wherein the at least one processing unit is further configured or configurable to dynamically assign and/or organize different portions of a graphical user interface as the display content according to any one or any combination of: type of the object, shape of the object, function of the object, relational position of the object to another object or to the user, relational position of a user to another user, characteristic of the display surface, relational position of the display surface to another surface or to the user, to thereby adapt the display content.

2. The system of claim 1 wherein the display candidate is selected from the group consisting of passive display systems, and active display systems.

3. The system of claim 1 wherein the display content is selected from the group consisting of a graphical user interface, interactive media content, icons, images, video, text, interactive 3D objects, environments, buttons, and control affordances.

4. The system of claim 1 wherein the system further comprising a microphone and speaker component in operable communication with the processing unit, and being configured or configurable to receive and/or provide an audio signal.

5. The system of claim 1 wherein the processing unit being further configured or configurable to optimize the display content or a second display content viewable by a second user based on a second user's relational position to the display candidate or a second display candidate.

6. The system of claim 1, wherein the at least one processing unit is further configured or configurable to:
  dynamically select as the display content information associated with any one or combination of: the type of the object, a function of the object, the type of application of the object, the type of application of the mapped environment.

7. The system of claim 1, wherein the sensor component is further configured or configurable to dynamically map the environment in proximity to the sensor component to determine at least one characteristic of each of a plurality of display candidates; and
  wherein the at least one processing unit is further configured or configurable to:
  dynamically select at least of the display candidates from said detected plurality of display candidates based on said determined characteristics of said plurality of display candidates and/or the user's relational position to the display candidate(s).

8. The system of claim 1, wherein the at least one processing unit is further configured or configurable to:
  continuously adapt the display content in real time according to the dynamically selected at least one display candidate.

9. The system of claim 8, wherein the display candidate comprises at least one surface of an object, wherein the at least one processing unit is further configured or configurable to:
  dynamically select and/or organize different portions of a graphical user interface as the display content according to any one or any combination of: type of the object, shape of the object, function of the object, relational position of the object to another object or to the user, relational position of a user to another user, characteristic of the display surface(s), relational position of the display surface(s) to one another, another surface or to the user, to thereby adapt the display content.

10. An adaptive graphic user interfacing system comprising:
  at least one sensor component configured or configurable to dynamically map an environment in proximity to the sensor component to dynamically detect at least one user and a plurality of display candidates;
  at least one display output component configured or configurable to provide display content across the plurality of display candidates; and
  at least one processing unit operably connected or connectable to the sensor component, the display component and at least one memory, the processing unit being configured or configurable to:
    determine a user's relational position to the plurality of display candidate in real time;
    identify the plurality of display candidates and/or the at least one user in real time;
    continuously adapt the display content based on the user's relational position to the plurality of display candidates in real-time as the at least one user moves in relation to the plurality of display candidates; and/or
    at least one of the display candidates moves in relation to the at least one user,
    wherein the at least one processing unit is further configured or configurable to dynamically assign different portions of said at least one graphical user interface as display content to different display candidates of said plurality of display candidates.

11. The system of claim 10, wherein the sensor component is further configured or configurable to dynamically map the environment in proximity to the sensor component to dynamically determine the plurality of display candidates based on:
  the user's relational position to a plurality of display candidates in real-time as the at least one user moves in relation to the plurality of display candidates; and/or
  at least one of the display candidate moves in relation to the at least one user.

12. The system of claim 10, wherein the sensor component is further configured or configurable to dynamically map the environment in proximity to the sensor component to dynamically determine at least one characteristic of each of the plurality of display candidates; and
  wherein the processing unit being configured or configurable to:
    continuously adapt the display content across the plurality of display candidates based on said dynamically determined characteristics of said plurality of display candidates.

13. The system of claim 10 wherein said plurality of display candidates comprises at least one display surface and at least one display device.

14. The system of claim 13, wherein said sensor component is further configured or configurable to dynamically map the environment in proximity to the sensor component to map said at least one user and at least one other user and dynamically detect the interaction of said users with at least one portion of said at least one graphical user interface provided to at least one of the plurality of display candidates.

15. The system of claim 10, wherein said plurality of display candidates comprises at least on display surface of at least one object.

16. The system of claim 15, the processing unit being further configured or configurable to:
dynamically select and/or organize portions of at least one graphical user interface and assign said portions as display content to different display candidates of said plurality of display candidates according to any one or any combination of: type of the object, shape of the object, function of the object, relational position of the object to another object or to the user, relational position of a user to another user, characteristic of the display surface, relational position of the display surface to another surface or to the user, to thereby adapt the display content.

17. The system of claim 16, wherein said graphical user interface portions comprise information associated with any one or combination of: the type of the object, a function of the object, the type of application of the object, the type of application of the mapped environment.

18. The system of claim 17,
wherein the at least one processing unit is further configured or configurable to:
dynamically select said information based on said detected plurality of display candidates.

19. The system of claim 16,
wherein the at least one processing unit is further configured or configurable to dynamically assign different portions of said at least one graphical user interface as display content to different display candidates of said plurality of display candidates.

20. The system of claim 16, wherein said sensor component is further configured or configurable to dynamically map the environment in proximity to the sensor component to map said at least one user and dynamically detect the interaction of said user with a plurality of graphical user interfaces provided to the plurality of display candidates.

21. The system of claim 20, wherein the processing unit being configured or configurable to:
dynamically select and/or organize said plurality of graphical user interfaces or portions thereof and assign said plurality of graphical user interfaces or portions thereof as display content to different display candidates of said plurality of display candidates according to said dynamically detected interaction of said at least one user with said plurality of graphical user interfaces.

22. The system of claim 20, wherein the processing unit being configured or configurable to:
continuously adapt the display content across the plurality of display candidates based on the dynamic detection of the interaction of at least one of users with said at least one portion of said at least one graphical user interface and/or the relative positions of said users.

23. The system of claim 10, wherein said sensor component is further configured or configurable to dynamically map the environment in proximity to the sensor component to map said at least one user and dynamically detect the interaction of said user with at least one portion of said at least one graphical user interface provided to at least one of the plurality of display candidates.

24. The system of claim 23, wherein the processing unit being configured or configurable to:
dynamically select and/or organize portions of said at least one graphical user interface and assign said portions as display content to different display candidates of said plurality of display candidates according to said dynamically detected interaction of said at least one user with said at least one portion of said graphical user interface.

25. An adaptive graphic user interfacing system comprising:
at least one sensor component configured or configurable to dynamically map an environment in proximity to the sensor component to dynamically detect at least one user and a plurality of display candidates;
at least one display output component configured or configurable to provide display content across the plurality of display candidates; and
at least one processing unit operably connected or connectable to the sensor component, the display component and at least one memory, the processing unit being configured or configurable to:
determine a user's relational position to the plurality of display candidate in real time;
identify the plurality of display candidates and/or the at least one user in real time;
continuously adapt the display content based on the user's relational position to the plurality of display candidates in real-time as the at least one user moves in relation to the plurality of display candidates; and/or at least one of the display candidates moves in relation to the at least one user,
wherein said plurality of display candidates comprises at least one display surface of at least one object, the processing unit being further configured or configurable to dynamically select and/or organize portions of at least one graphical user interface and assign said portions as display content to different display candidates of said plurality of display candidates according to any one or any combination of: type of the object, shape of the object, function of the object, relational position of the object to another object or to the user, relational position of a user to another user, characteristic of the display surface, relational position of the display surface to another surface or to the user, to thereby adapt the display content.

26. The system of claim 25, wherein said graphical user interface portions comprise information associated with any one or combination of: the type of the object, a function of the object, the type of application of the object, the type of application of the mapped environment.

27. The system of claim 26,
wherein the at least one processing unit is further configured or configurable to:
dynamically select said information based on said detected plurality of display candidates.

* * * * *